US010786102B2

(12) United States Patent
Baltz

(10) Patent No.: US 10,786,102 B2
(45) Date of Patent: Sep. 29, 2020

(54) SINGLE HAND OPERATED COLLAPSING HANGER

(71) Applicant: Kyle L. Baltz, Rossmoor, CA (US)

(72) Inventor: Kyle L. Baltz, Rossmoor, CA (US)

( * ) Notice: Subject to any disclaimer, the term of this patent is extended or adjusted under 35 U.S.C. 154(b) by 77 days.

(21) Appl. No.: 16/146,267

(22) Filed: Sep. 28, 2018

(65) Prior Publication Data

US 2019/0038059 A1 Feb. 7, 2019

Related U.S. Application Data

(63) Continuation-in-part of application No. 15/593,757, filed on May 12, 2017, now Pat. No. 10,085,578.

(60) Provisional application No. 62/480,000, filed on Mar. 31, 2017, provisional application No. 62/335,431, filed on May 12, 2016, provisional application No. 62/303,135, filed on Mar. 3, 2016.

(51) Int. Cl.

*A47G 25/40* (2006.01)
*F16B 5/00* (2006.01)
*A47G 25/44* (2006.01)

(52) U.S. Cl.

CPC ......... *A47G 25/4023* (2013.01); *A47G 25/40* (2013.01); *A47G 25/442* (2013.01); *F16B 5/00* (2013.01); *F16B 5/0084* (2013.01)

(58) Field of Classification Search

CPC .. A47G 25/4023; A47G 25/442; A47G 25/40; A47G 25/4015; A47G 25/403; A47G 25/20; A47G 25/26; A47G 25/28; A47G 25/30; F16B 5/0084

See application file for complete search history.

(56) References Cited

U.S. PATENT DOCUMENTS 1,389,309 A 8/1921 Kaufer
1,509,780 A 9/1923 Robertson
1,817,369 A 8/1931 Hadden
2,421,433 A 12/1945 Poole
2,491,836 A 10/1947 Simmet (Continued)

FOREIGN PATENT DOCUMENTS

DE 609712 C * 2/1935
FR 2399227 A1 3/1979

(Continued)

OTHER PUBLICATIONS

International Search Report for International Application No. PCT/US19/53456, dated Feb. 19, 2020.

*Primary Examiner* — Ismael Izaguirre

(74) *Attorney, Agent, or Firm* — Carlson, Gaskey & Olds, P.C.

(57) ABSTRACT

A garment hanger with particular ease of use advantage when removing or hanging crew neck or turtleneck type shirts or blouses. The hanger provides an easily manipulated and intuitive mechanism for collapsing the garment support portions of the hanger, thus allowing for simple passage through the narrow neck hole of a garment. The hanger further provides an easily manipulated and intuitive mechanism for returning the folded garment support portions to their extended and supportive positions, which can be done with the hanger enveloped within a garment, thus providing an improved means for hanging some shirts or blouses without the need to feed a hanger up through the bottom opening of the garment.

20 Claims, 120 Drawing Sheets

(56) References Cited

U.S. PATENT DOCUMENTS

| | | | | |
|---|---|---|---|---|
| 2,512,133 | A | 1/1948 | Baer, Sr. | |
| 2,439,838 | A * | 4/1948 | Wingate | A47G 25/4023 223/94 |
| 2,494,272 | A | 6/1948 | Whitsel | |
| 2,538,971 | A | 7/1948 | Leumi | |
| 2,518,367 | A | 3/1949 | Penhallegon | |
| 2,531,108 | A | 6/1949 | Casey | |
| 2,620,102 | A | 2/1950 | Bremer | |
| 2,652,958 | A | 12/1950 | Alvord | |
| 2,724,533 | A | 7/1953 | Hansen | |
| 2,900,117 | A | 1/1956 | Veltry | |
| 2,817,554 | A | 9/1956 | Hasselmark | |
| 3,039,662 | A | 1/1959 | Strong | |
| 2,898,887 | A | 8/1959 | Van Haltern, Jr. | |
| 3,120,837 | A | 5/1964 | Johnson | |
| 3,152,822 | A | 10/1964 | Griffiths | |
| 3,205,863 | A | 9/1965 | Rhoades | |
| 4,231,499 | A * | 11/1980 | Smith | A47G 25/4023 223/94 |
| 4,616,861 | A | 10/1986 | Kurosaki | |
| 4,792,165 | A | 12/1988 | Nishimura | |
| 5,052,599 | A | 10/1991 | Platti | |
| 5,085,358 | A | 2/1992 | Lam | |
| 5,217,262 | A | 6/1993 | Kurosaki | |
| 5,476,199 | A | 12/1995 | Halverson et al. | |
| 5,813,578 | A * | 9/1998 | Hsieh | A47G 25/4061 223/85 |
| 5,836,487 | A | 11/1998 | Lam | |
| 5,984,381 | A | 11/1999 | Yamagishi | |
| 6,021,932 | A | 2/2000 | Lam | |
| 6,164,504 | A | 12/2000 | Richard | |
| 6,206,254 | B1 * | 3/2001 | Lin | A47G 25/442 223/89 |
| 6,688,503 | B2 | 2/2004 | Viazanko et al. | |
| 6,964,360 | B2 * | 11/2005 | Tubman | A47G 25/442 223/85 |
| 7,097,081 | B2 | 8/2006 | Frassinelli | |
| 7,165,790 | B2 | 1/2007 | Bella et al. | |
| 7,328,822 | B2 | 2/2008 | Stokes | |
| 7,644,844 | B1 | 1/2010 | Bonner | |
| 8,177,106 | B2 * | 5/2012 | Betts | A47G 25/447 223/94 |
| 8,814,013 | B2 * | 8/2014 | Almeida Levi | A47G 25/40 223/94 |
| 9,055,834 | B2 | 6/2015 | Zechini | |
| 9,895,969 | B2 | 2/2018 | Alexander et al. | |
| 10,081,969 | B2 | 9/2018 | Alexander et al. | |
| 2001/0032391 | A1 * | 10/2001 | Onion | B26B 1/046 30/161 |
| 2011/0284597 | A1 * | 11/2011 | Kaleta | A47G 25/4023 223/85 |

FOREIGN PATENT DOCUMENTS

| | | | |
|---|---|---|---|
| GB | 2420971 | A | 6/2006 |
| WO | 2017197256 | A1 | 11/2017 |

* cited by examiner

Figure 24
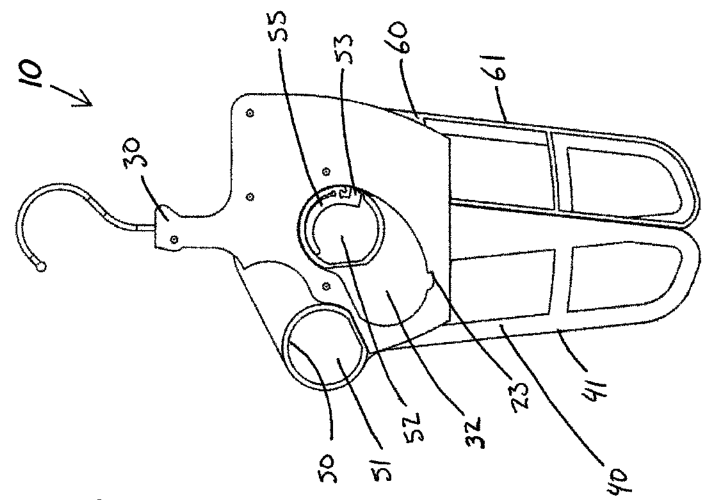
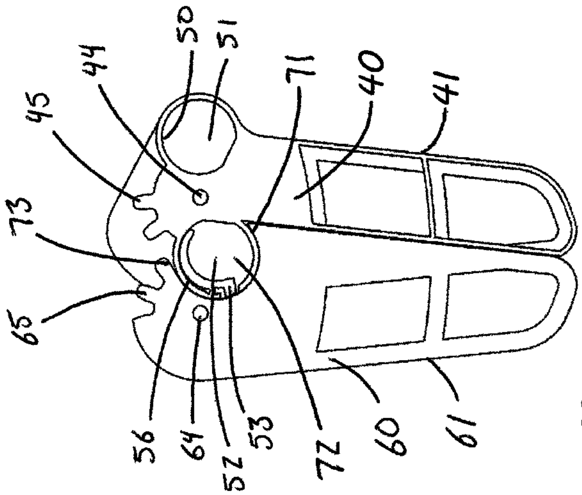
Figure 23
Figure 22
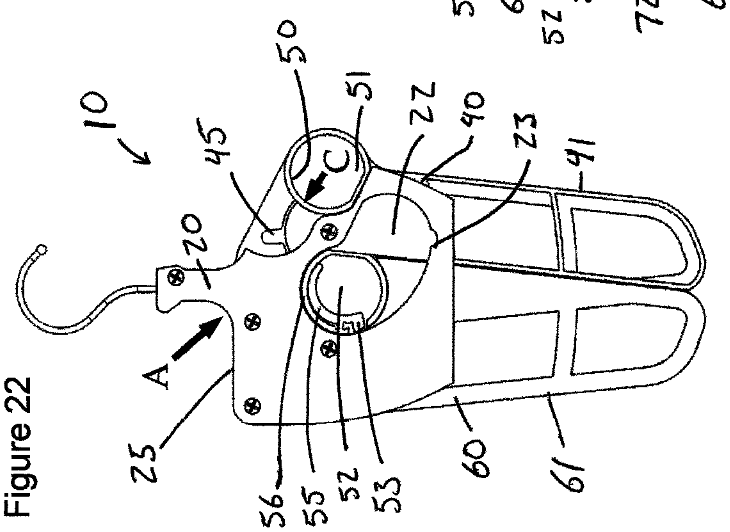

Figure 28
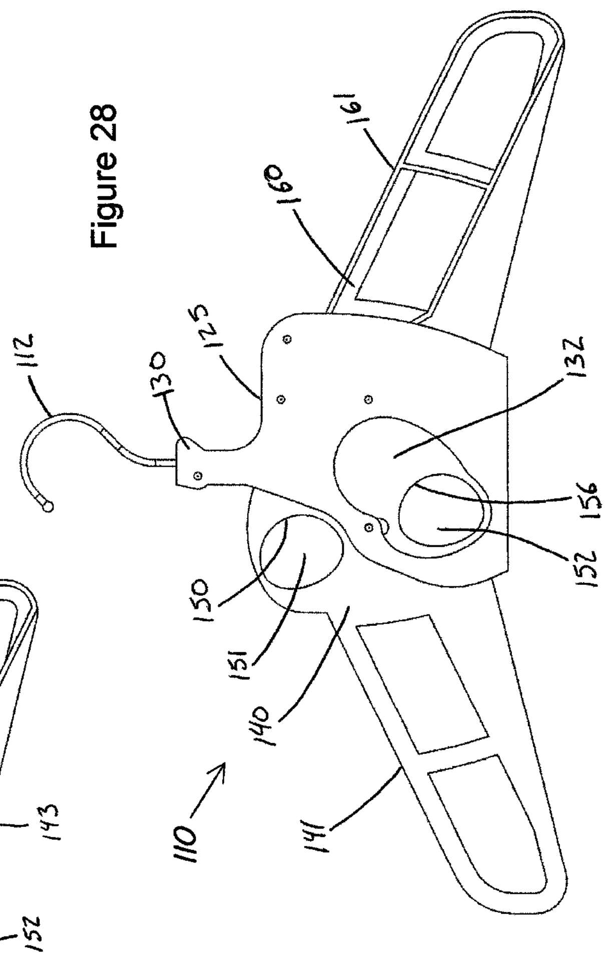
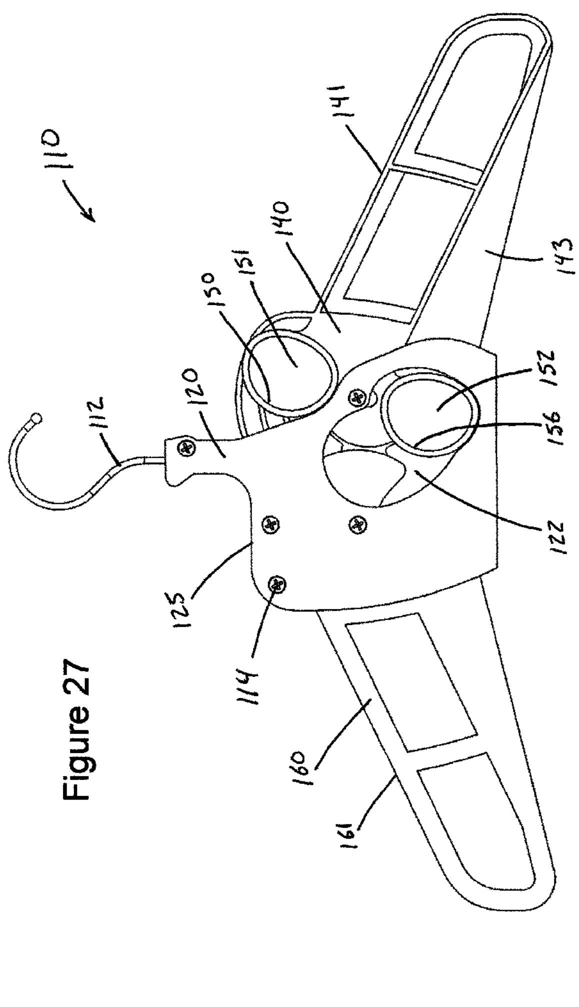
Figure 27

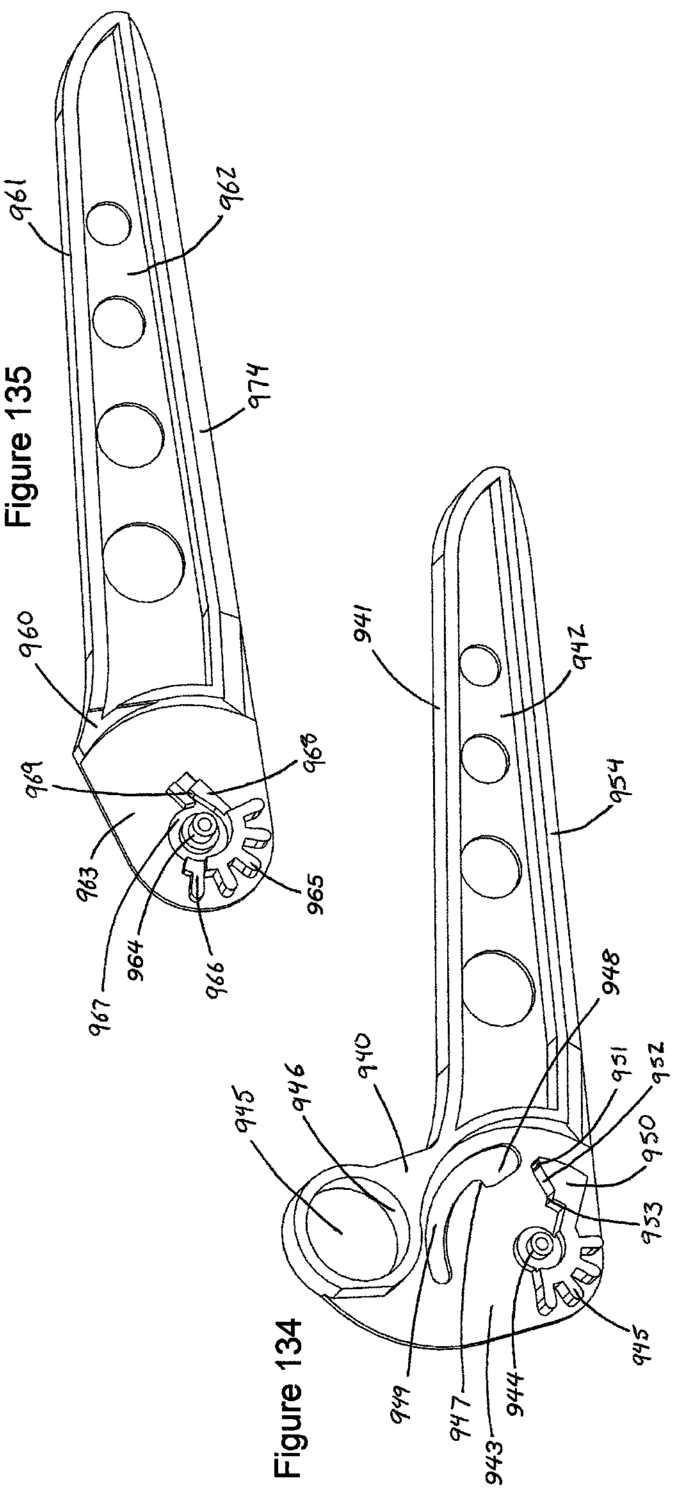
Figure 135
Figure 134
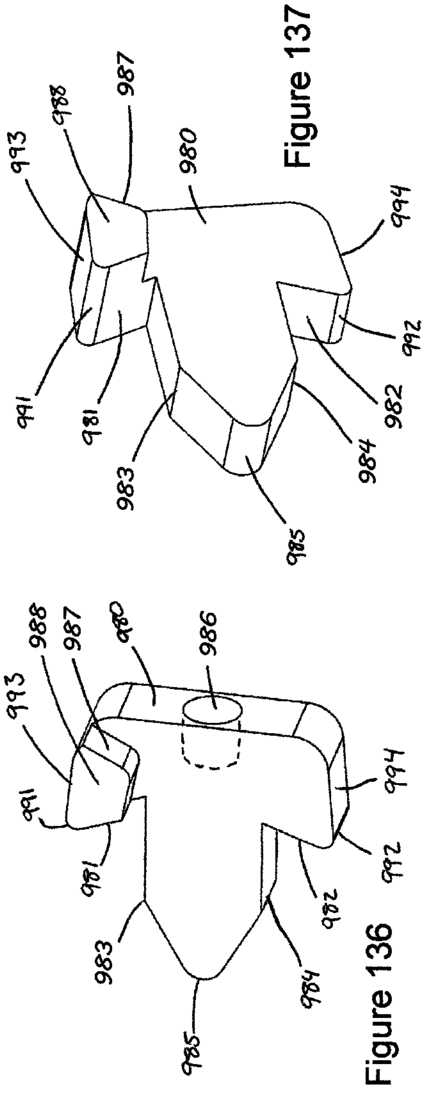
Figure 137
Figure 136

Figure 216
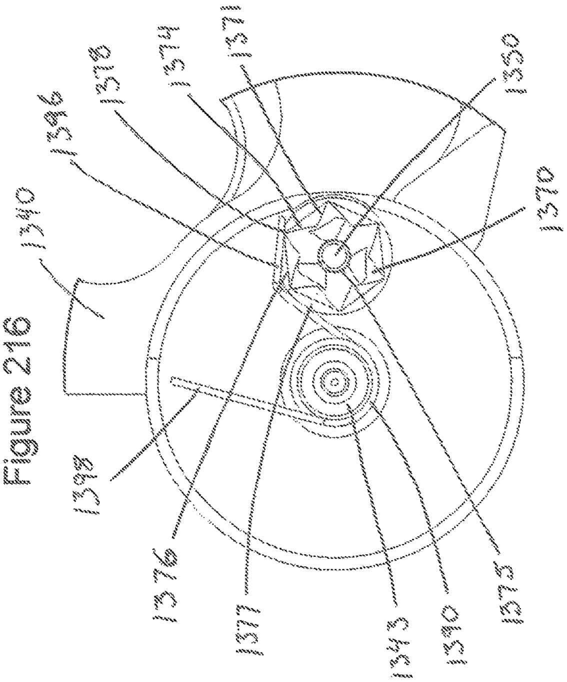
Figure 215
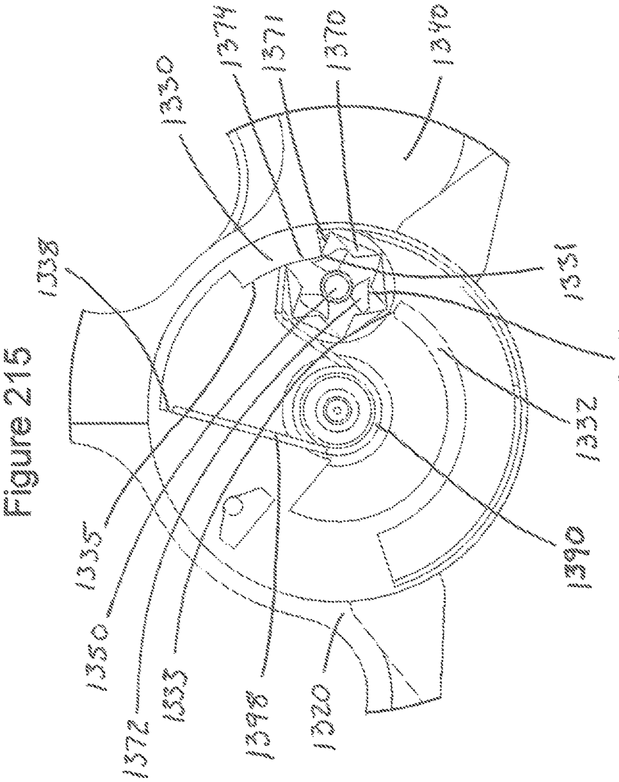
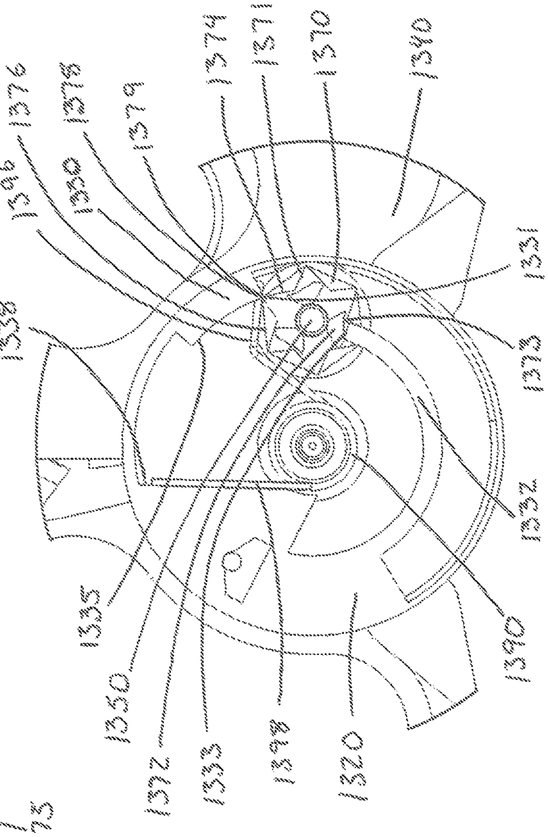
Figure 217

1430
1431
1432
1434
1435
1439
1436

1430
1431
1432
1470

1430
1431
1432
1439
1439
1470
BB
BB
BB
BB 1430
1431
1432
1470

1470
1475
1476

1479
1475
1479
1476
1470

SINGLE HAND OPERATED COLLAPSING HANGER

BACKGROUND

Traditional rigid clothes hangers can often be challenging to use when attempting to slide them into place within shirts or sweaters with non-opening fronts or backs. Typically one must hold the rigid hanger in one hand while using the other hand to hold a non-opening shirt, such as a crew neck tee-shirt, at its waist opening and then thread the hanger through the center of the shirt with the first hand while positioning the shirt to drape over the hanger with the second hand. Because of the typically flexible and stretchable nature of clothing, a shirt will actually hang upside-down when being held at the waist opening as a hanger is inserted and it will not be righted until the hanger has passed the point of the center of gravity of the shirt, at which point the cloth of the shirt will drag over the hanger until it slides into place with the hanger hook projecting through the neck opening of the shirt. These movements can often be challenging and clothing can often be permanently stretched or damaged, especially if a garment has an especially small neck opening or is made of delicate material, such as a fine wool sweater. Removing a garment from a rigid hanger can be equally as challenging and potentially damaging to the garment as it essentially requires the reversal of the same steps for hanging the garment.

Because of the difficulties associated with using rigid clothes hangers with non-opening garments, it would be preferable to have a collapsing clothes hanger which could fold in some manner so that the supportive features of the hanger could pass easily through a garment's neck opening from above and then expand within the center of the garment to then support the shoulder portions of the garment as the hook feature of the hanger remains sticking out above the neck opening of the garment. Many such designs have been proposed in the past with the common elements of having shoulder support features which hinge pivotably about axes which pass through a smaller center section which has a support hook attached. When the shoulder support features of such designs are pivoted downward to a more closed position they can be passed through the neck opening of a garment and then expanded back out to a more open position where they effectively support the garment as the hook feature of the hanger remains outside of the garment so as to be placed over a hook or closet hanger rod.

One common shortcoming of many folding hanger designs is that although they may be easily folded, they may be much more difficult to open back up to a rigid position, especially if using only one hand. This drawback makes it very difficult to use one hand to insert the folded hanger into the neck opening of a garment being held by a second hand and then expand it within the garment using the first hand. Furthermore, because of the flexible nature of most garments they will drape down along the members of a folded hanger and the weight of the garment will offer significant resistance to expanding the hanger back to a supportive position. Some folding hanger designs attempt to overcome the resistance to expanding caused by a garment by use of some manner of resilient biasing means, such as a spring that will be compressed as the shoulder supports are folded. This approach is inherently flawed in that in order for the spring force to effectively counteract the resistance from the heaviest of garments, it must possess a spring resistance that would be overkill for the lightest of garments. Therefore the spring reinforced folding hanger designs may be exceptionally challenging to fold with one hand as intended, due to a more forceful spring being used than typically necessary in order to insure that it is strong enough to support the heaviest of garments.

SUMMARY

Disclosed herein is a collapsing clothes hanger which may be manipulated through its various conditions by the use of one hand. The hanger may include a latching mechanism which selectively holds folding garment supports, hereto known as "wings," in a locked and extended condition. The latching mechanism is simple to manipulate, so as to be unlocked in an intuitive manner, thus allowing the wings to fold to a collapsed condition. In the collapsed condition the hanger wings may easily pass through the neck opening of a garment for removal or insertion. The hanger may also include bracing and lifting surfaces which allow for a pinching or squeezing motion of the operative hand to reposition the wings from the collapsed to the extended condition. This operative mechanism allows for the relatively powerful force of a squeezing hand to overcome moderate forces which a garment might impart on the hanger as it is expanded back to the extended condition while enveloped within the garment.

Most of the disclosed collapsing hanger embodiments are constructed with features and surfaces intended for grasping and operating the hanger through all of its various conditions with just one hand, and without the need to significantly reposition or assist the operative hand while transitioning from one condition to the next. Further, many of the disclosed collapsing hanger embodiments allow for a very controlled folding and extending of the wings by virtue of having manipulation surfaces which can remain in contact with and under the control of palmar and finger portions of the operative hand throughout the various hanger manipulations.

BRIEF DESCRIPTION OF DRAWINGS

FIG. 22 is a front view of the collapsing hanger assembly with the wings in the fully closed position. The palm rest is denoted by the arrow A and the lift handle is denoted by the arrow C.

FIG. 23 is a section view of the first and second wings at the position seen in FIG. 21, taken along line D-D of FIG. 14.

FIG. 24 is a back view of the collapsing hanger assembly with the wings in the fully closed position.

FIG. 27 is a front view of the collapsing hanger assembly of FIG. 25.

FIG. 28 is a back view of the collapsing hanger assembly of FIG. 25.

FIG. 120 is a close-up front view of the area generally outlined by the ellipse U in FIG. 119.

FIG. 121 is a close-up front view of the area generally outlined by the ellipse U in FIG. 119, with the moving wing guard flange removed so as to see the assembly portions behind.

FIG. 122 is a front view of the collapsing hanger assembly of FIG. 109, with the components repositioned to the collapsed configuration.

FIG. 123 is a close-up front view of the area generally outlined by the ellipse V in FIG. 122.

FIG. 124 is a close-up front view of the area generally outlined by the ellipse V in FIG. 122, with the moving wing guard flange removed so as to see the assembly portions behind.

FIG. 125 is a front view of the collapsing hanger assembly of FIG. 109, with the components repositioned to the re-latching configuration.

FIG. 126 is a close-up front view of the area generally outlined by the ellipse W in FIG. 125.

FIG. 127 is a close-up front view of the area generally outlined by the ellipse W in FIG. 125, with the moving wing guard flange removed so as to see the assembly portions behind.

FIG. 128 is a front perspective view of a collapsing hanger assembly with the wings extended to an open position, according to a thirteenth embodiment.

FIG. 129 is a front perspective view of the collapsing hanger assembly of FIG. 128, with the components repositioned to the collapsed configuration.

FIG. 130 is an exploded view of the collapsing hanger assembly of FIG. 128, as seen from a front upper perspective.

FIG. 131 is an exploded view of the collapsing hanger assembly of FIG. 128, as seen from a rear upper perspective.

Figure 128:
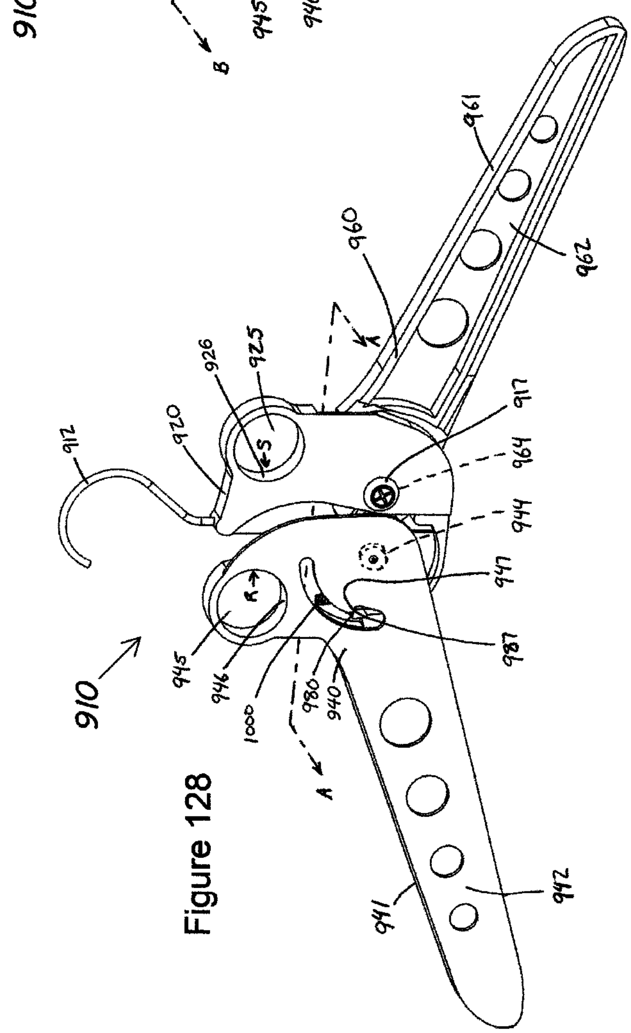
Figure 132:
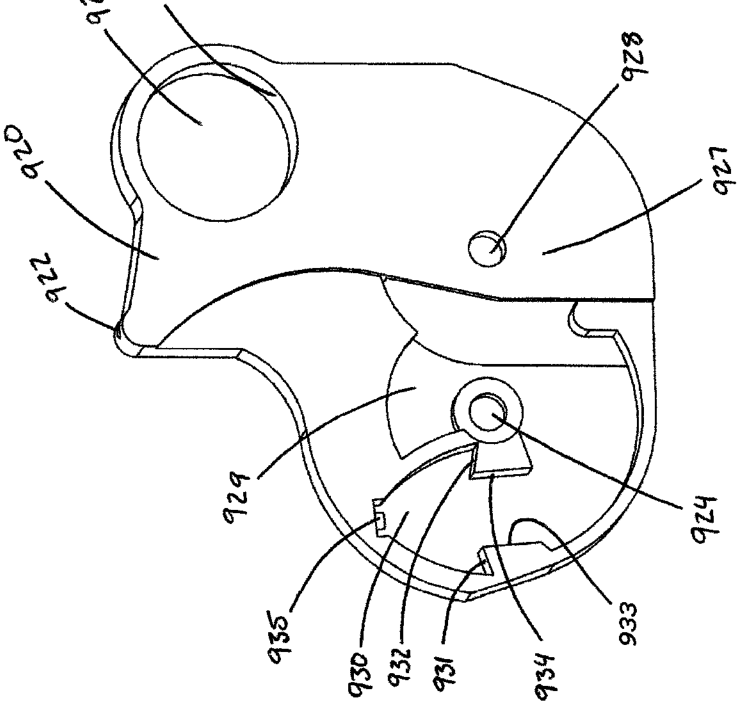

FIG. 132 is a front perspective view of the frame portion of the collapsing hanger assembly of FIG. 128.

Figure 133:
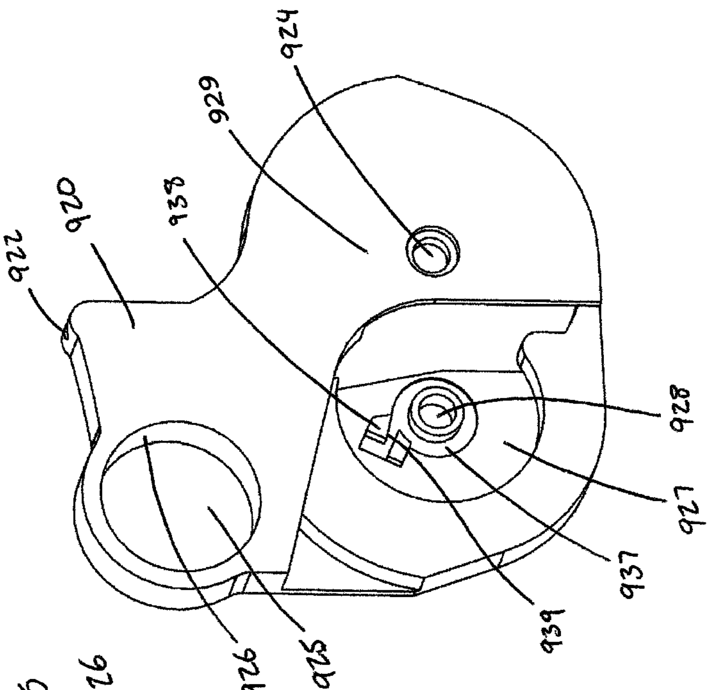

FIG. 133 is a rear perspective view of the frame portion of the collapsing hanger assembly of FIG. 128.

FIG. 134 is a rear perspective view of the first wing of the collapsing hanger assembly of FIG. 128.

FIG. 135 is a front perspective view of the second wing of the collapsing hanger assembly of FIG. 128.

FIG. 136 is a front lower-right view of the latch member of the collapsing hanger assembly of FIG. 128.

FIG. 137 is a front upper-left view of the latch member of the collapsing hanger assembly of FIG. 128.

Figure 138:
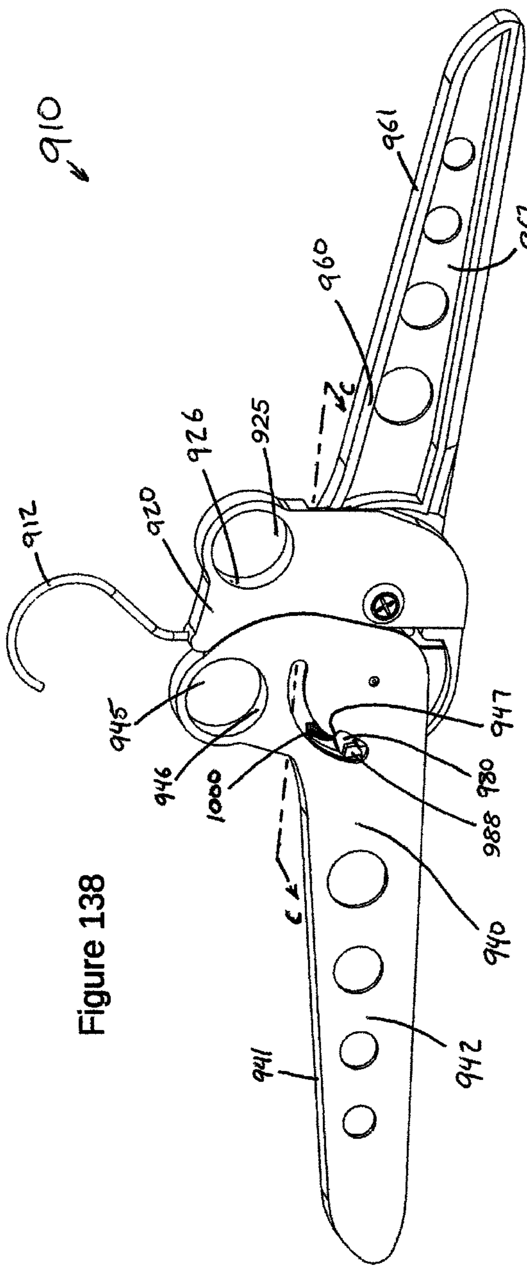

FIG. 138 is a front perspective view of the collapsing hanger assembly of FIG. 128, with the components positioned in the unlatching configuration.

Figure 139:
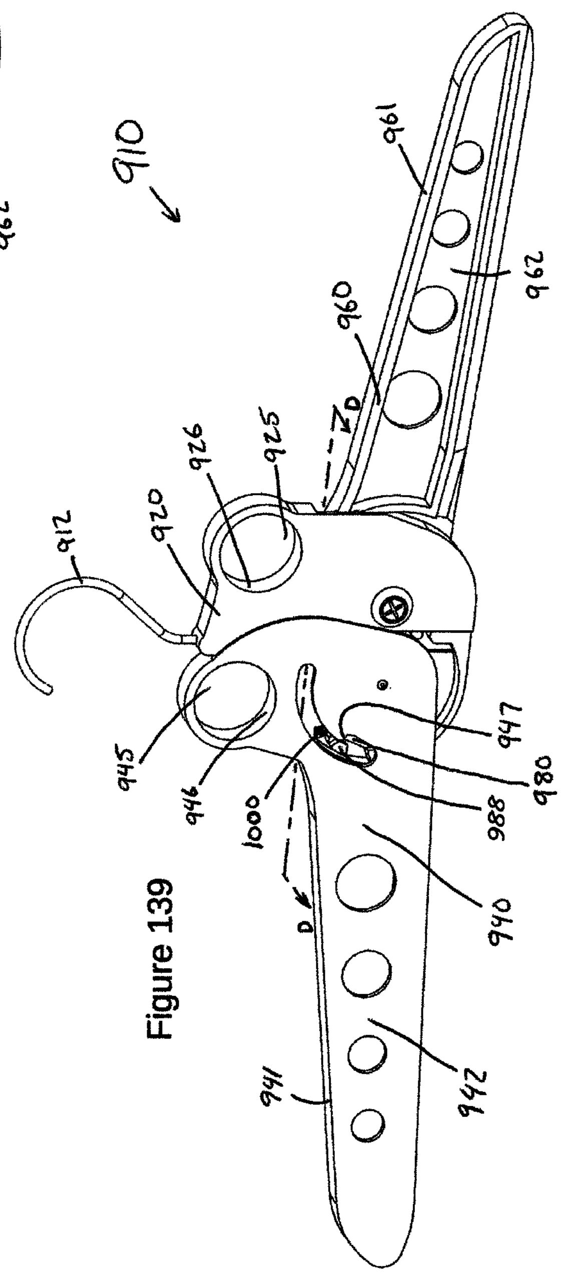

FIG. 139 is a front perspective view of the collapsing hanger assembly of FIG. 128, with the components positioned in the re-latching configuration.

Figure 140:
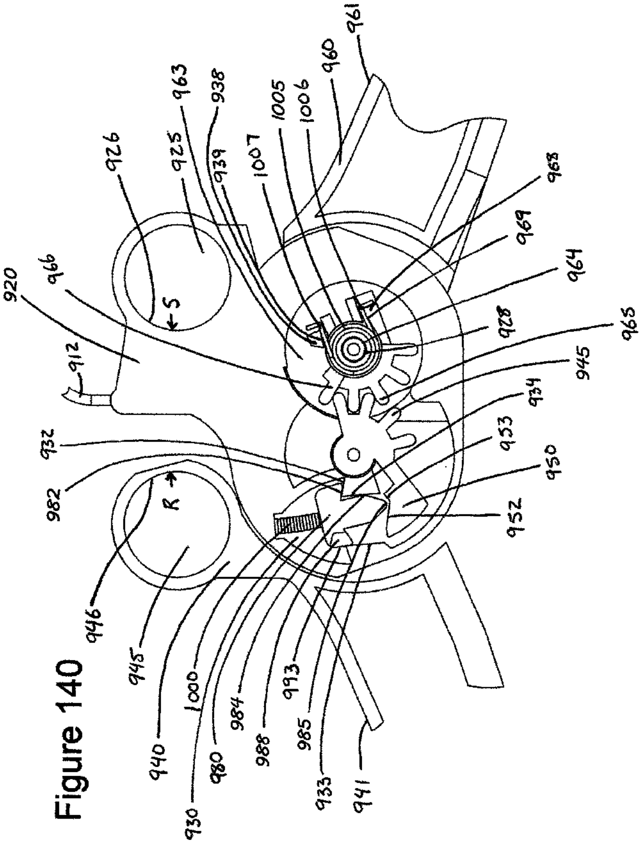

FIG. 140 is a front section view of the central area of the collapsing hanger assembly of FIG. 128, as divided by the section line A-A.

Figure 141:
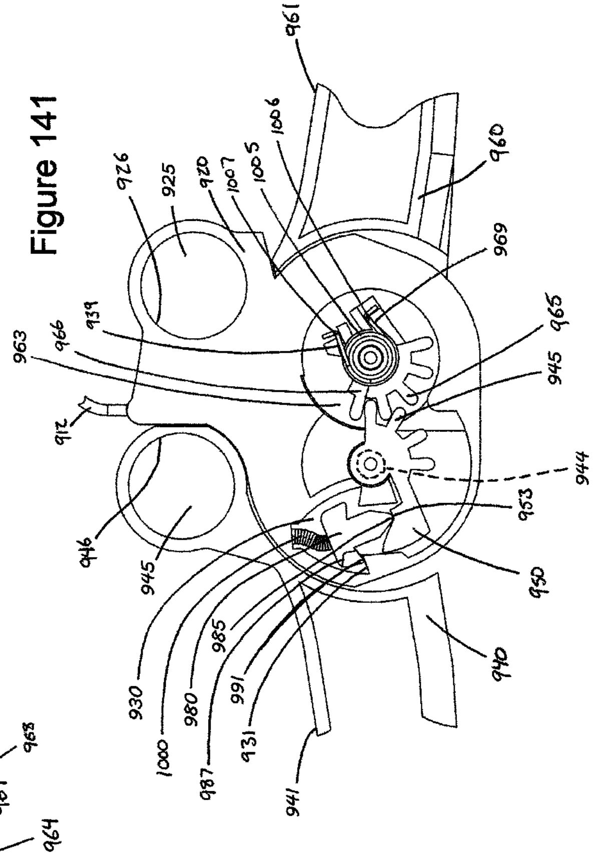

FIG. 141 is a front section view of the central area of the collapsing hanger assembly of FIG. 138, as divided by the section line C-C.

Figure 129:
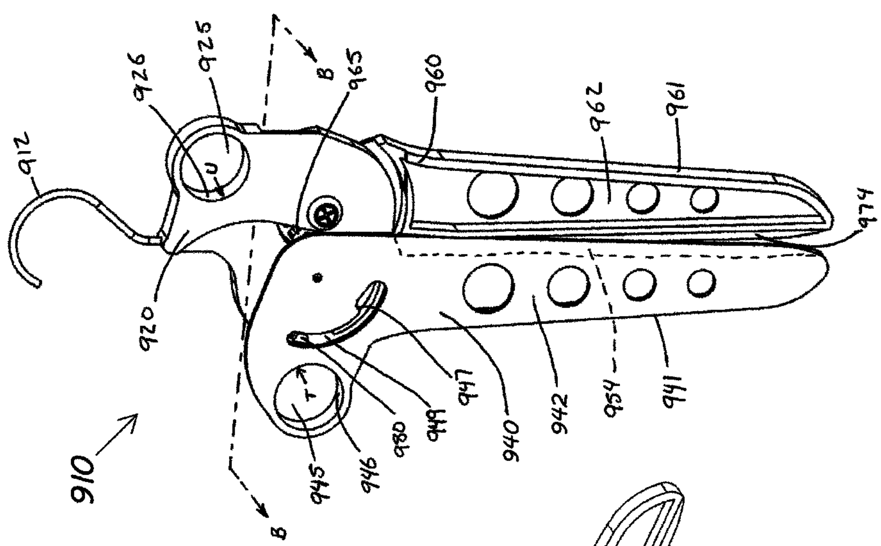
Figure 142:
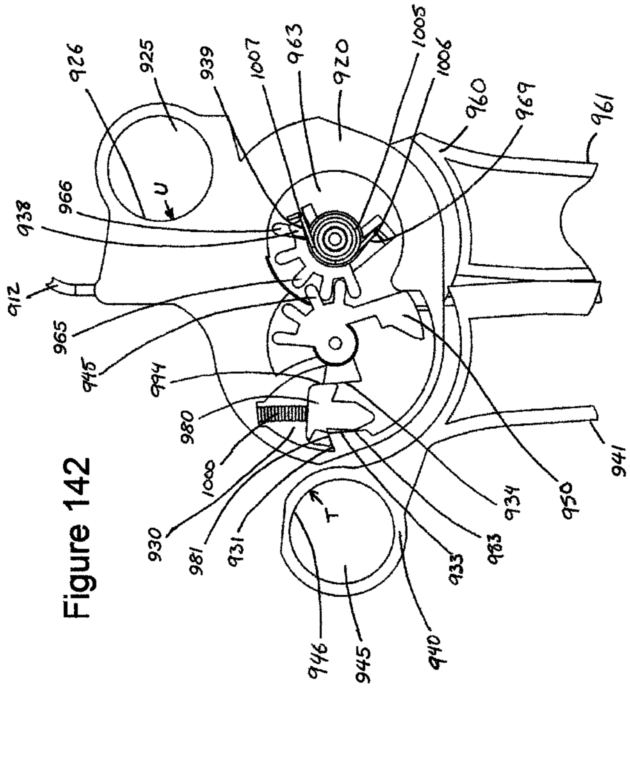

FIG. 142 is a front section view of the central area of the collapsing hanger assembly of FIG. 129, as divided by the section line B-B.

Figure 143:
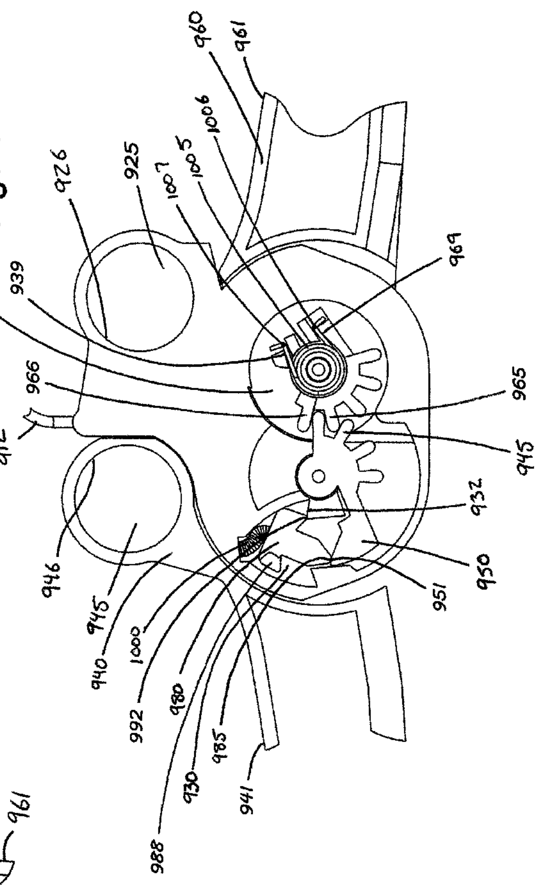

FIG. 143 is a front section view of the central area of the collapsing hanger assembly of FIG. 139, as divided by the section line D-D.

Figure 144:
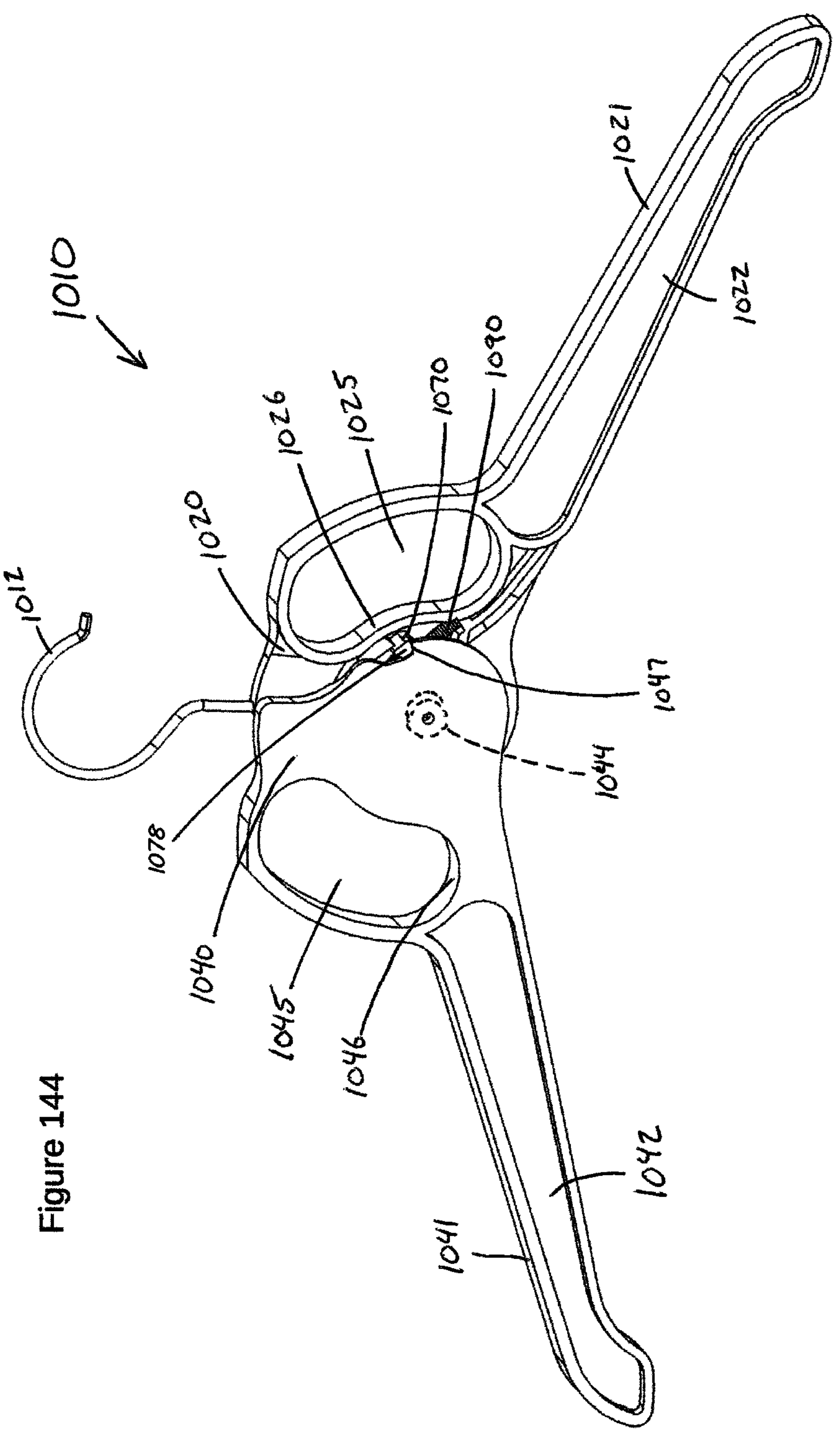

FIG. 144 is a front perspective view of a collapsing hanger assembly with the wings extended to an open position, according to a fourteenth embodiment.

Figure 145:
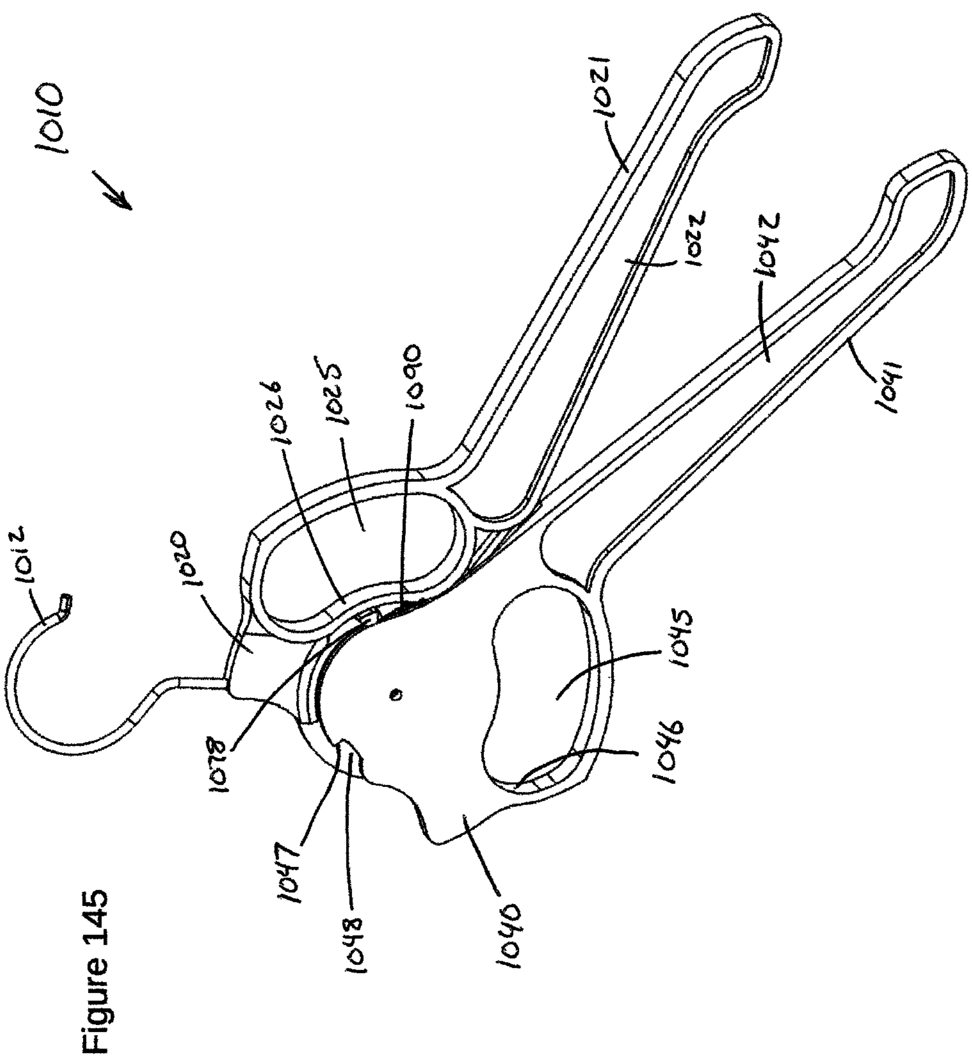

FIG. 145 is a front perspective view of the collapsing hanger assembly of FIG. 144, with the components repositioned to the collapsed configuration.

Figure 146:
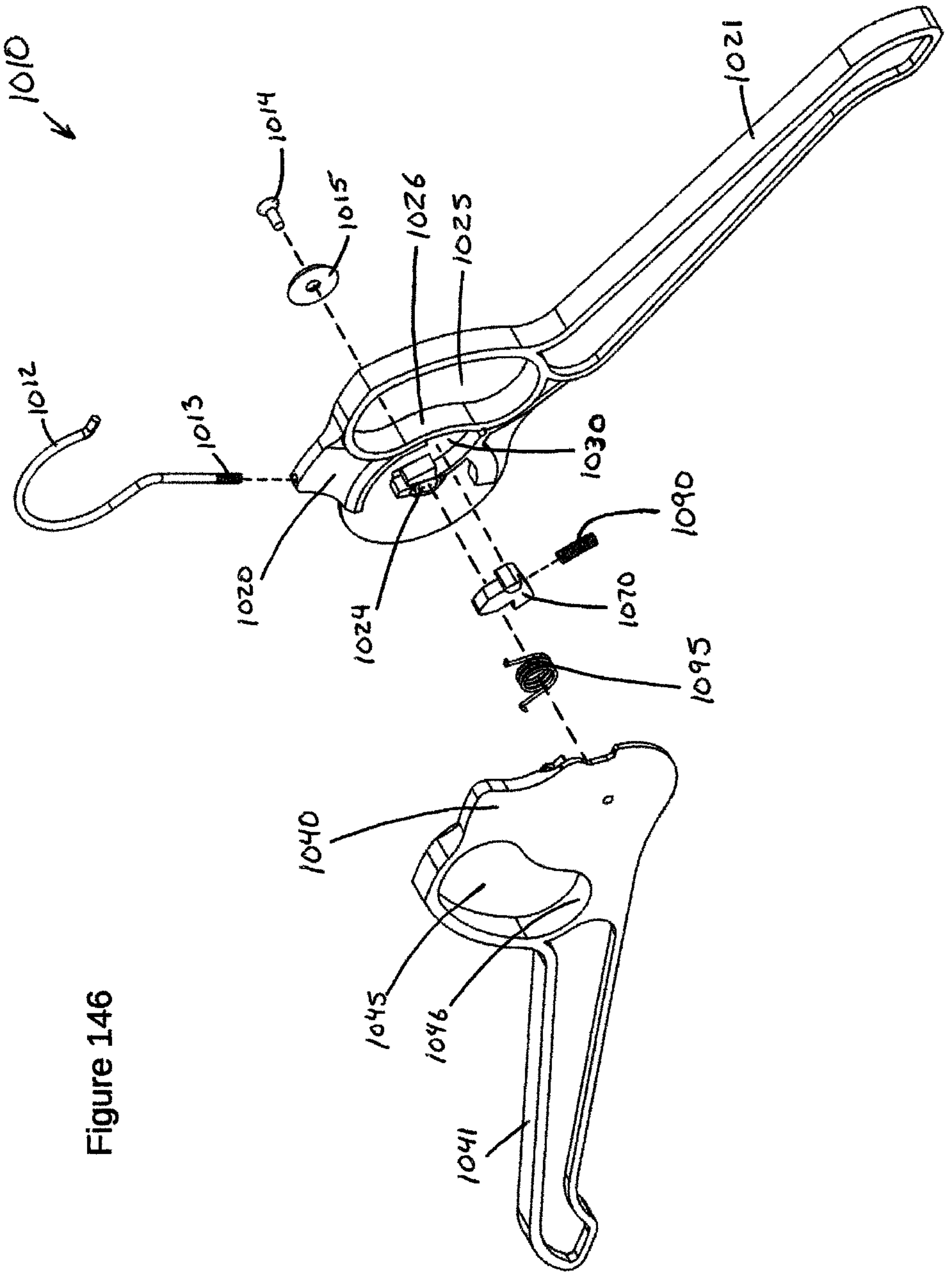

FIG. 146 is an exploded view of the collapsing hanger assembly of FIG. 144, as seen from a front upper perspective.

Figure 147:
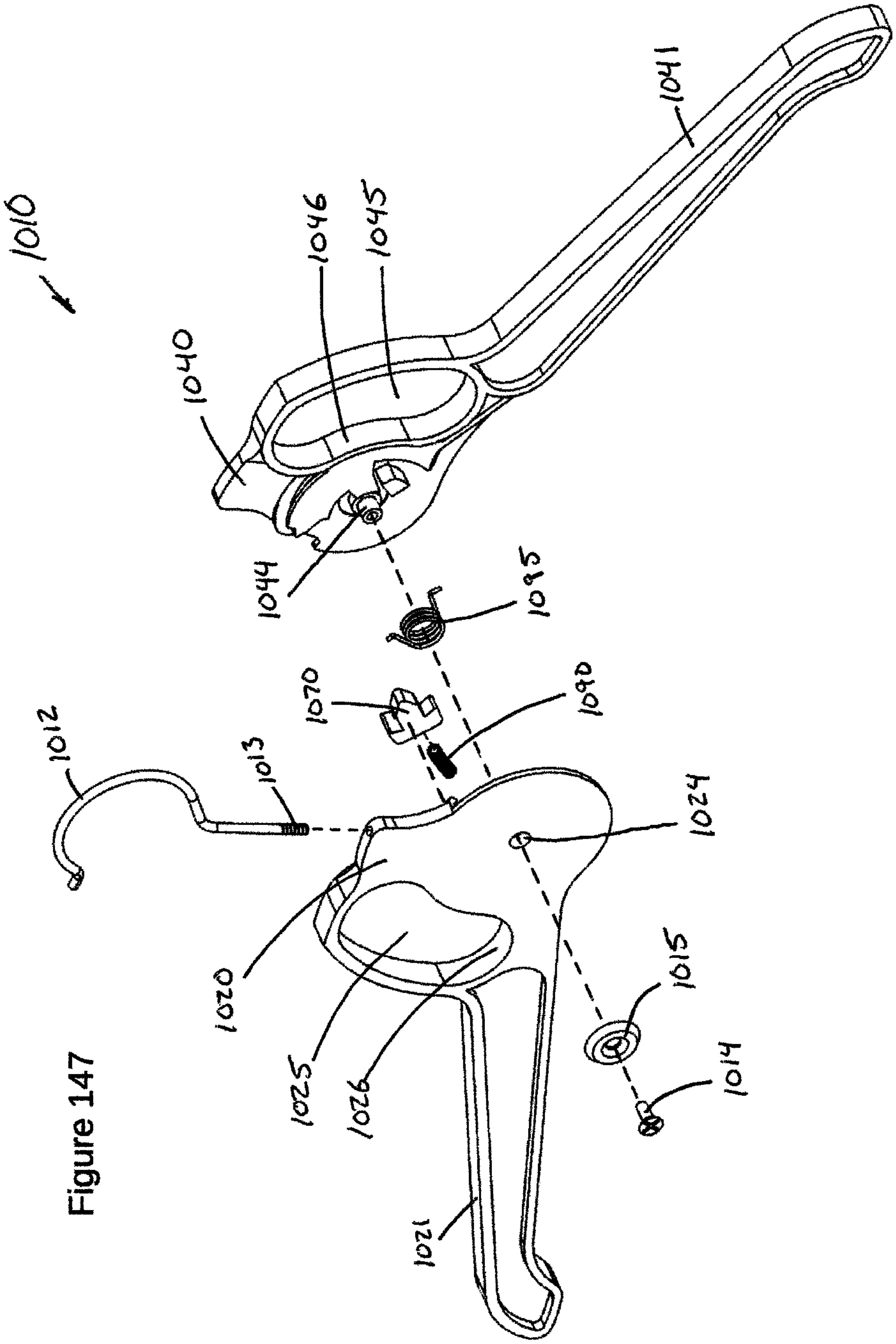

FIG. 147 is an exploded view of the collapsing hanger assembly of FIG. 144, as seen from a rear upper perspective.

Figure 148:
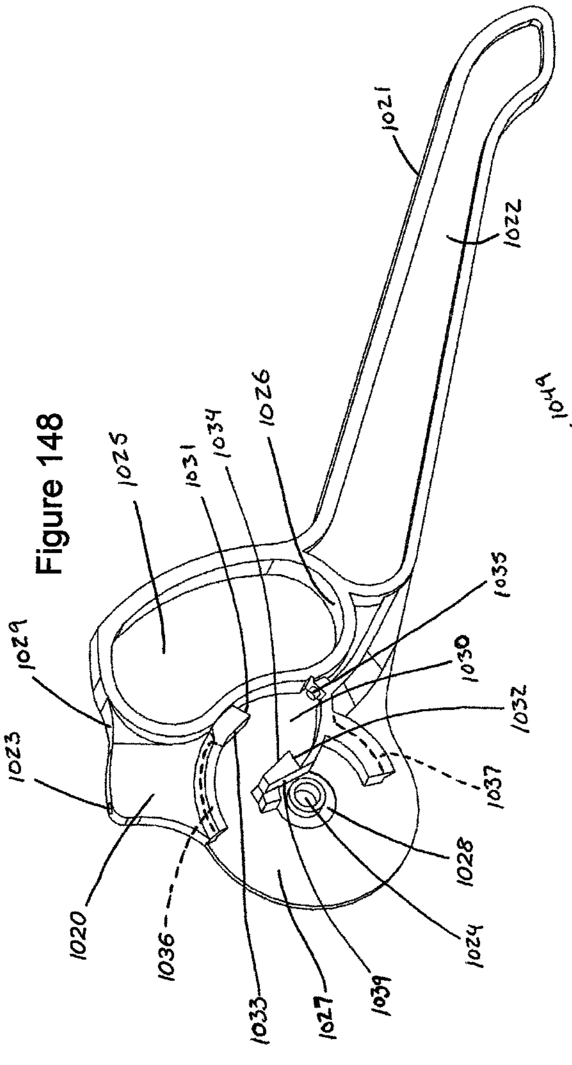

FIG. 148 is a front perspective view of the static wing member of the collapsing hanger assembly of FIG. 144.

Figure 149:
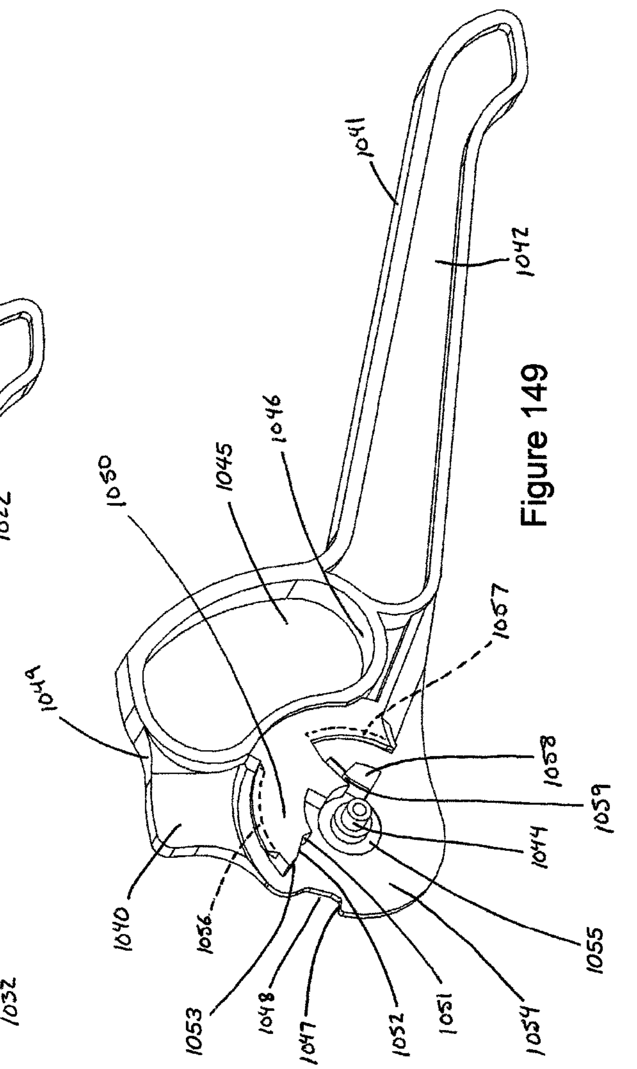

FIG. 149 is a rear perspective view of the moving wing member of the collapsing hanger assembly of FIG. 144.

Figure 150:
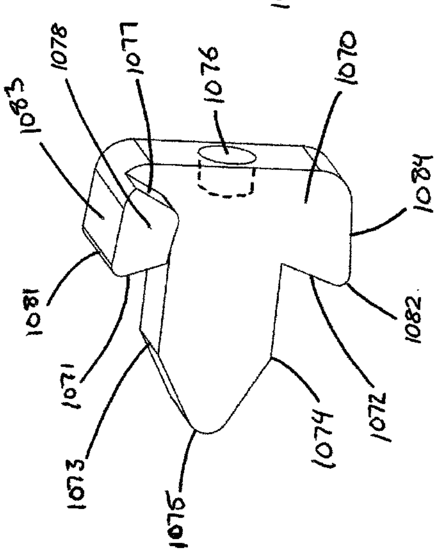

FIG. 150 is a front upper-right view of the latch member of the collapsing hanger assembly of FIG. 144.

Figure 151:
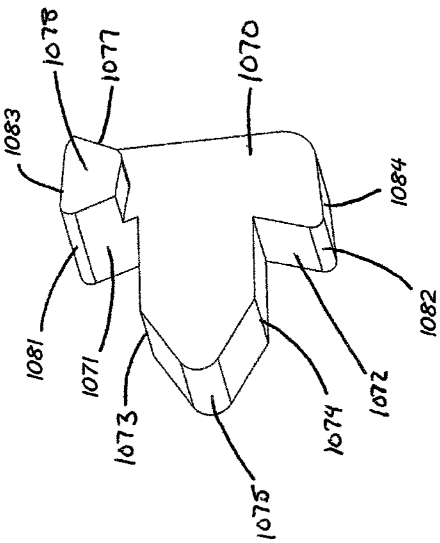

FIG. 151 is a front lower-left view of the latch member of the collapsing hanger assembly of FIG. 144.

Figure 152:
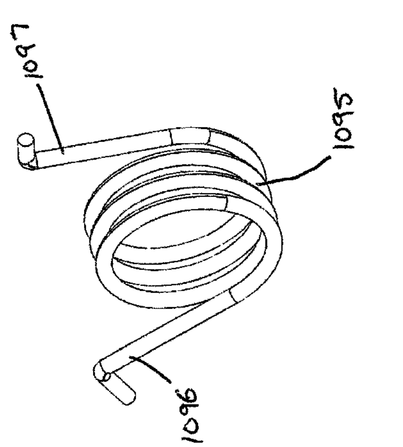

FIG. 152 is a perspective view of the torsion spring member of the collapsing hanger assembly of FIG. 144, in a tightly wound condition.

Figure 153:
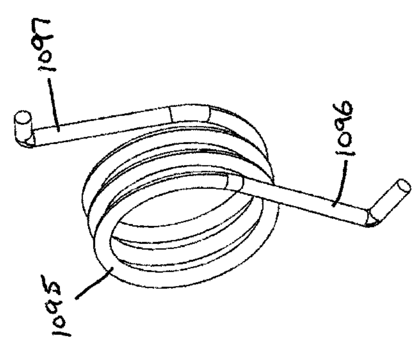

FIG. 153 is a perspective view of the torsion spring member of the collapsing hanger assembly of FIG. 144, in a less wound condition than that of FIG. 152.

Figure 154:
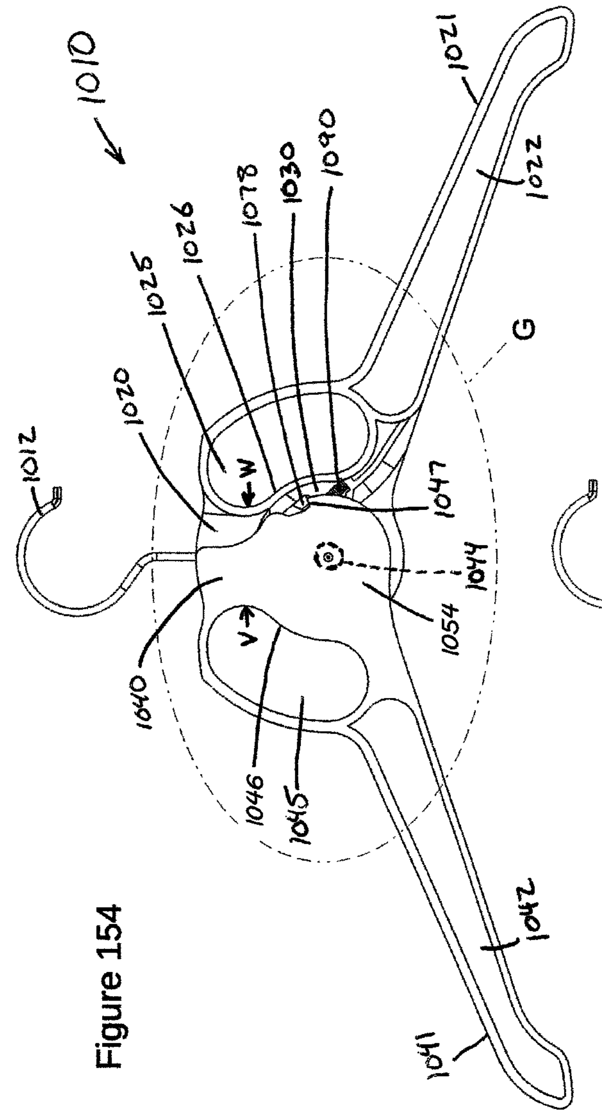

FIG. 154 is a front view of the collapsing hanger assembly of FIG. 144, with the wings extended to an open position.

Figure 155:
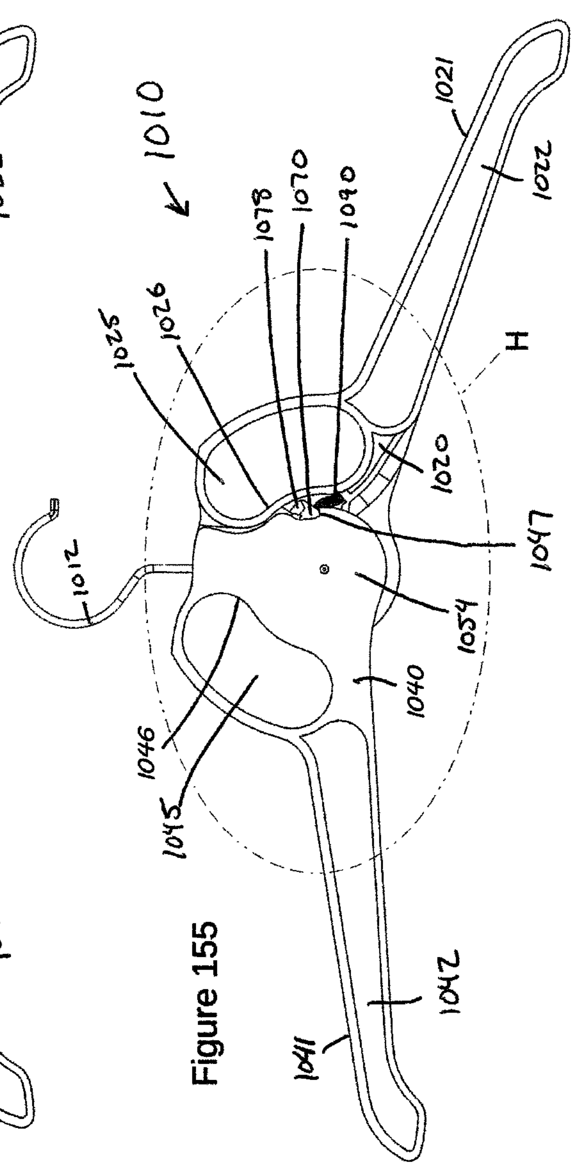

FIG. 155 is a front view of the collapsing hanger assembly of FIG. 144, with the components repositioned to the unlatching configuration.

Figure 156:
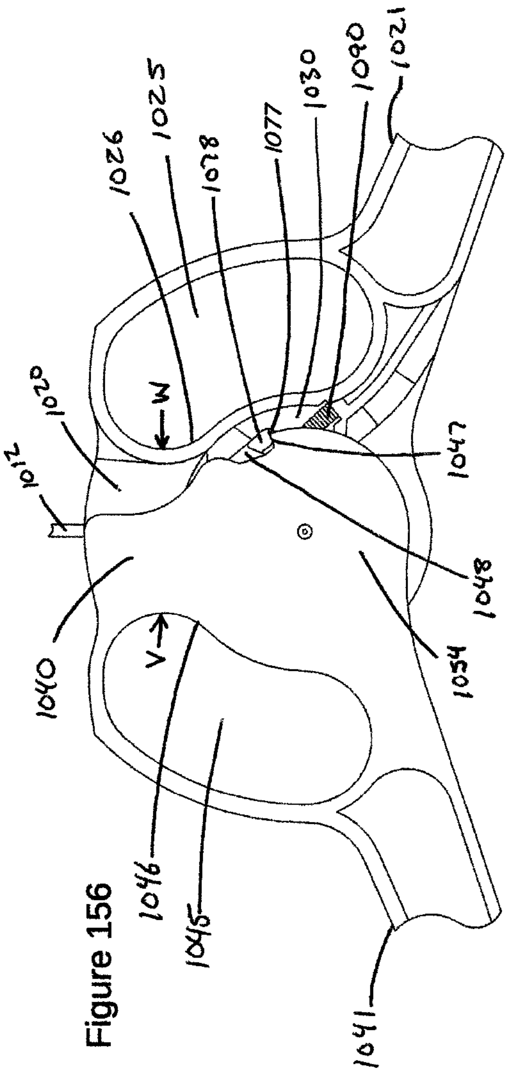

FIG. 156 is a close-up front view of the area generally outlined by the ellipse G in FIG. 154.

Figure 157:
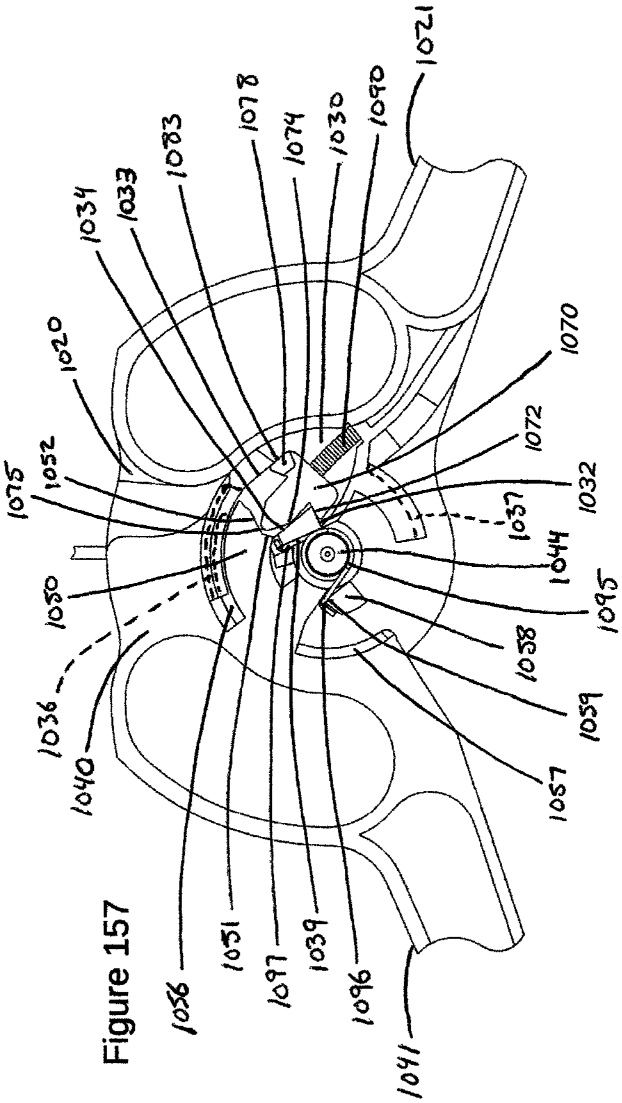

FIG. 157 is a close-up front view of the area generally outlined by the ellipse G in FIG. 154, with the moving wing guard flange removed so as to see the assembly portions behind.

Figure 158:
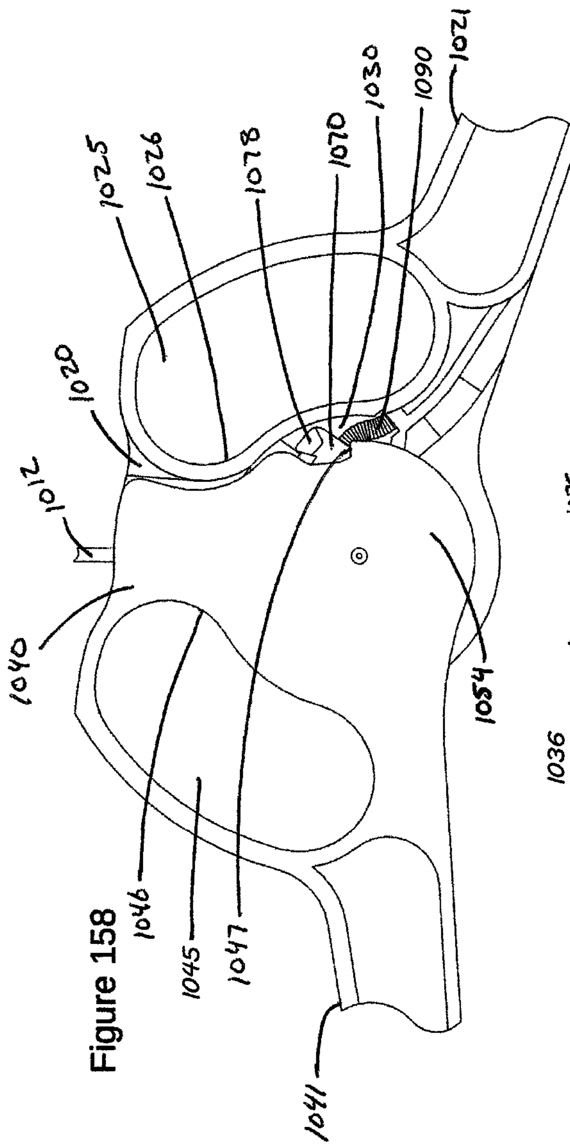

FIG. 158 is a close-up front view of the area generally outlined by the ellipse H in FIG. 155.

Figure 159:
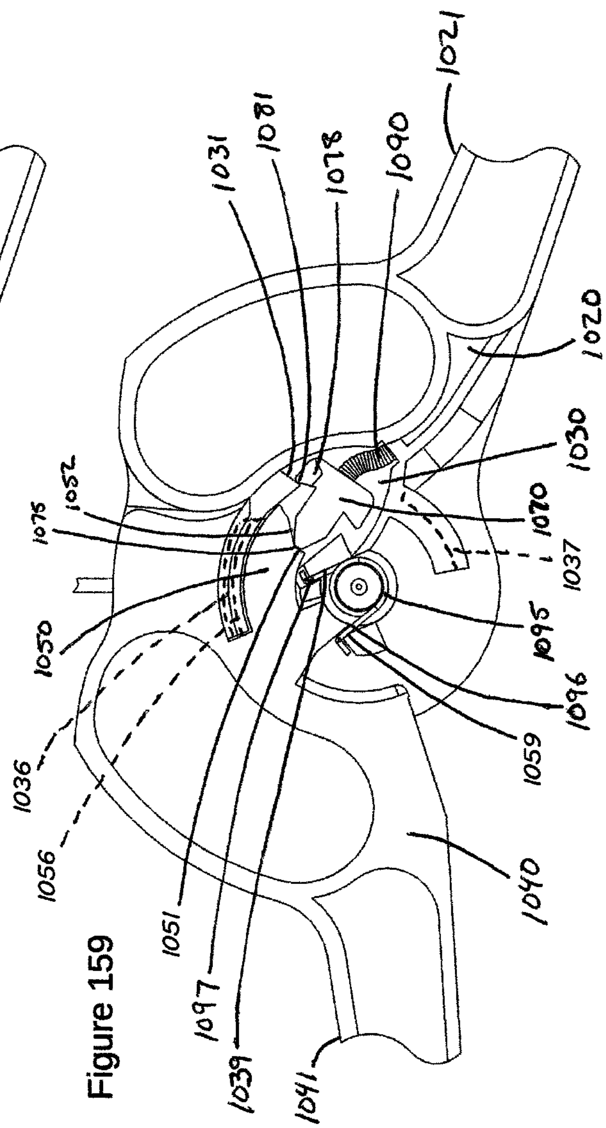

FIG. 159 is a close-up front view of the area generally outlined by the ellipse H in FIG. 155, with the moving wing guard flange removed so as to see the assembly portions behind.

Figure 160:
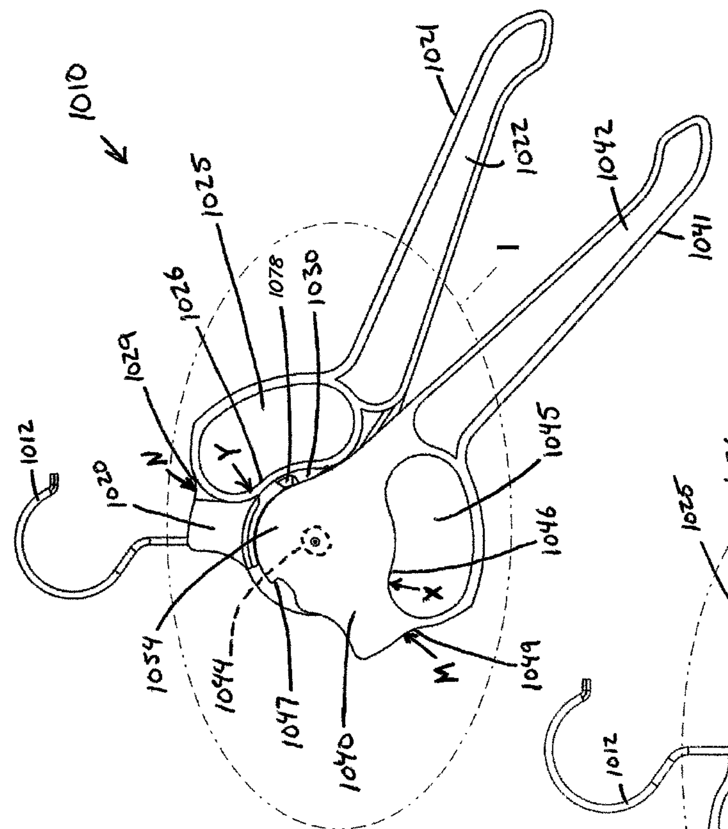

FIG. 160 is a front view of the collapsing hanger assembly of FIG. 144, with the components repositioned to the collapsed configuration.

Figure 161:
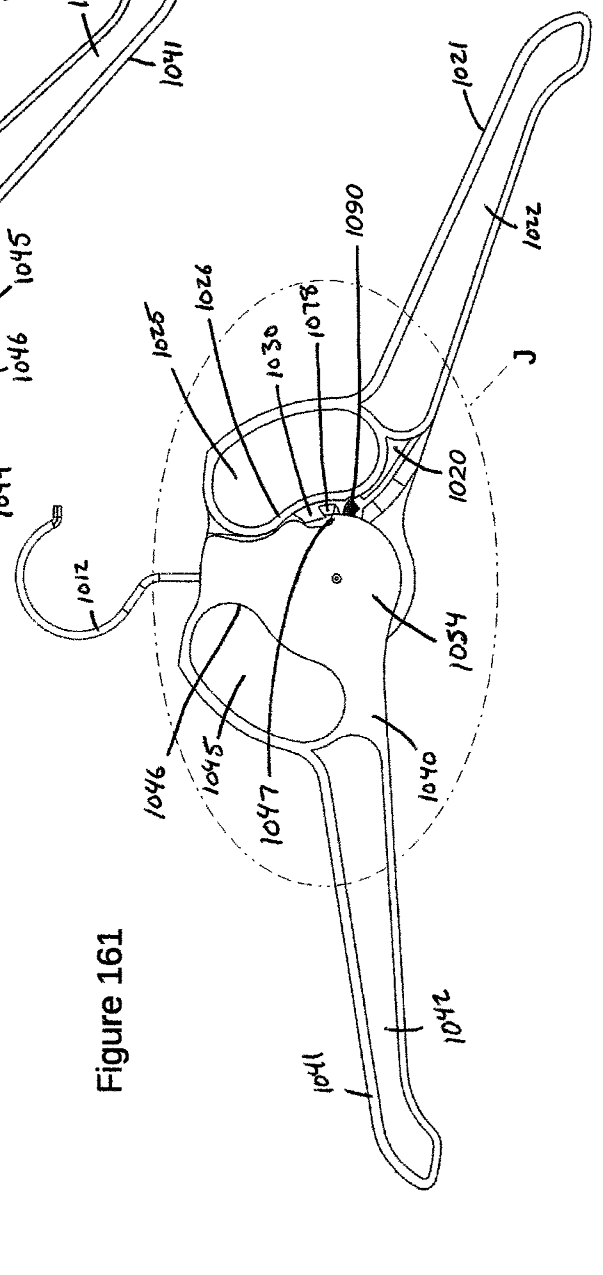

FIG. 161 is a front view of the collapsing hanger assembly of FIG. 144, with the components repositioned to the re-latching configuration.

Figure 162:
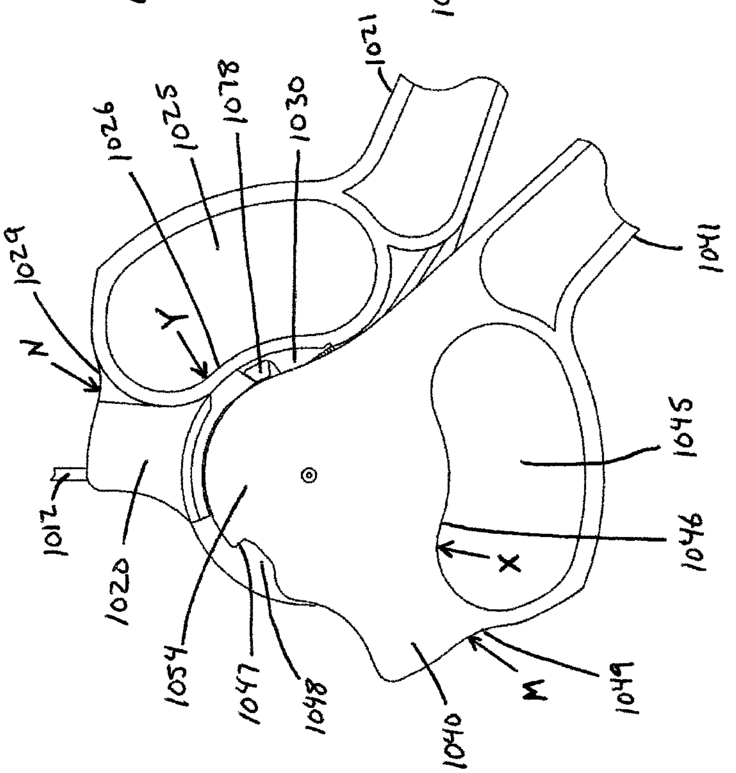

FIG. 162 is a close-up front view of the area generally outlined by the ellipse I in FIG. 160.

Figure 163:
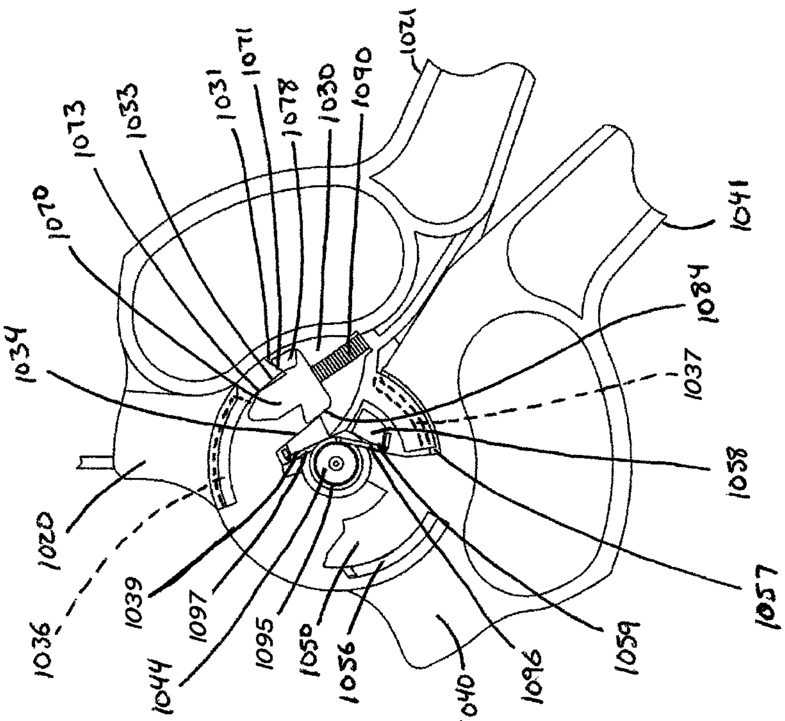

FIG. 163 is a close-up front view of the area generally outlined by the ellipse I in FIG. 160, with the moving wing guard flange removed so as to see the assembly portions behind.

Figure 164:
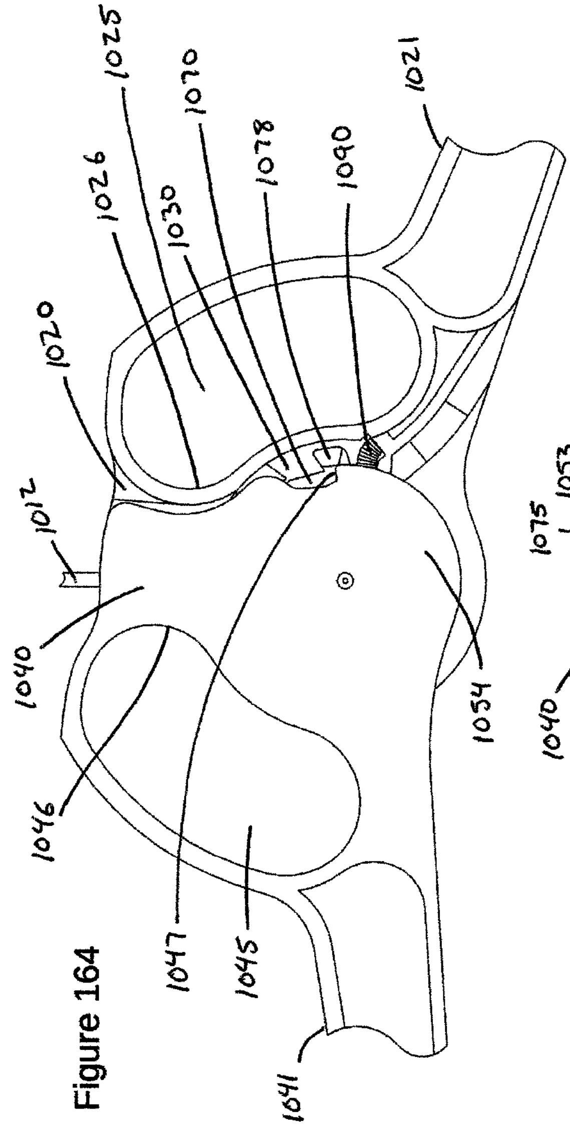

FIG. 164 is a close-up front view of the area generally outlined by the ellipse J in FIG. 161.

Figure 165:
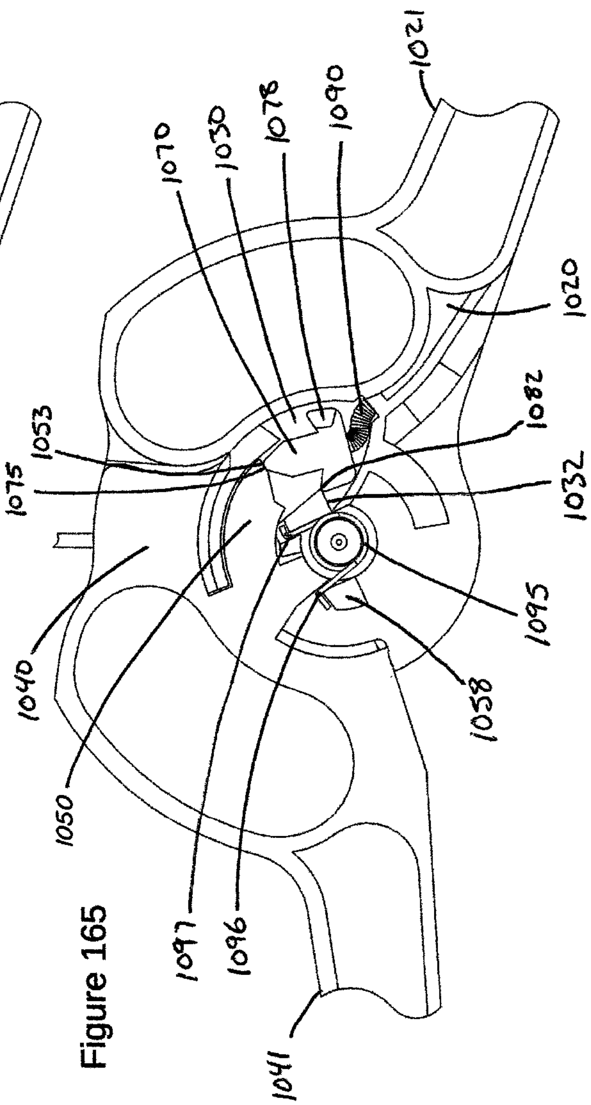

FIG. 165 is a close-up front view of the area generally outlined by the ellipse J in FIG. 161, with the moving wing guard flange removed so as to see the assembly portions behind.

Figure 166A:
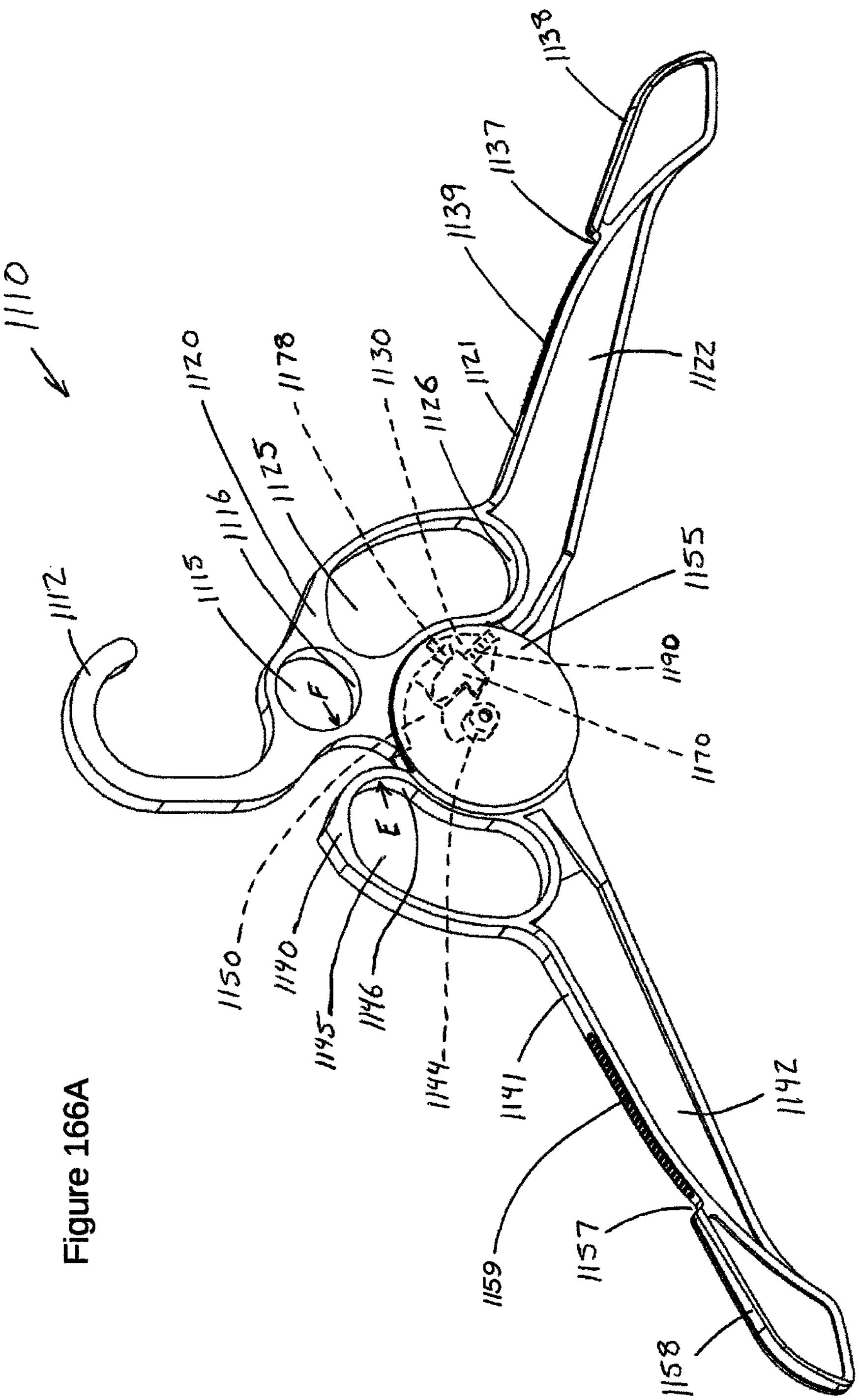

FIG. 166A is a front perspective view of a collapsing hanger assembly with the wings extended to an open position, according to a fifteenth embodiment.

Figures 166B, 166C:
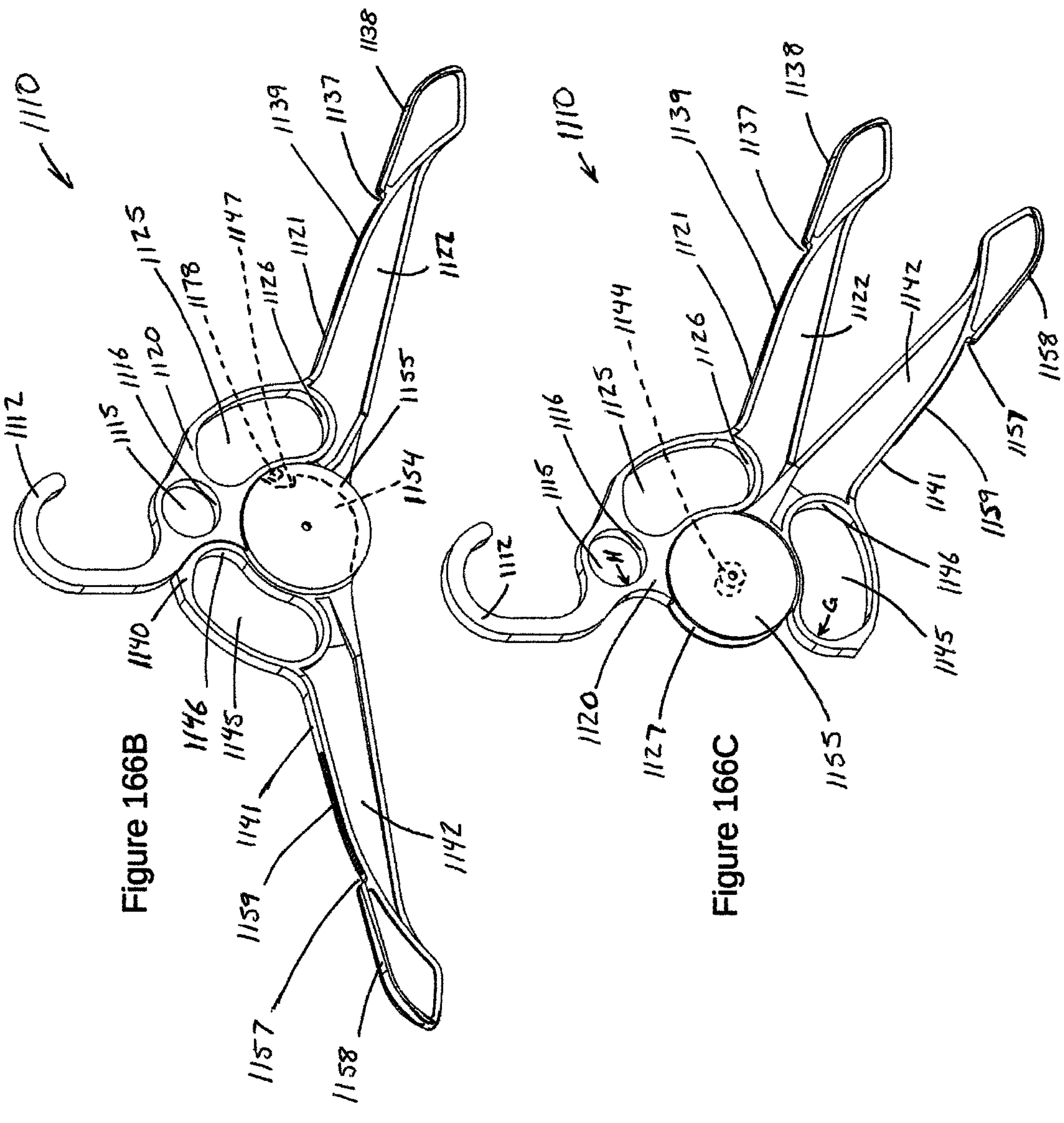

FIG. 166B is a front perspective view of the collapsing hanger assembly of FIG. 166A, with the components repositioned to the unlatching configuration.

FIG. 166C is a front perspective view of the collapsing hanger assembly of FIG. 166A, with the components repositioned to the collapsed configuration.

Figure 167C:
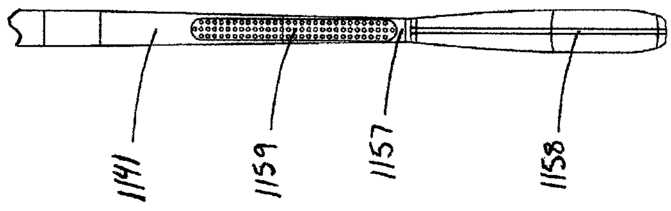
Figure 167A:
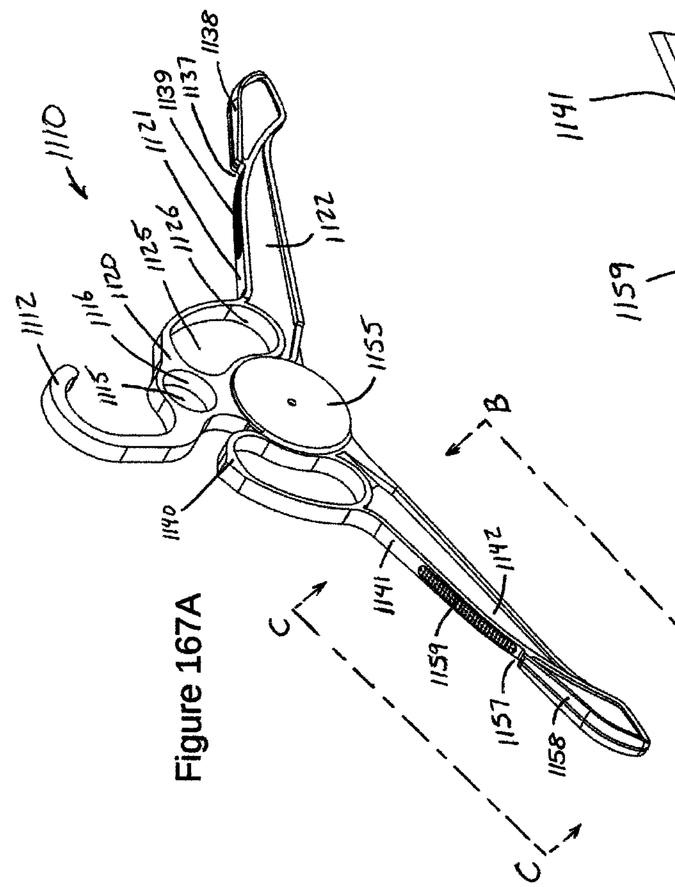

FIG. 167A is a front trimetric view of the collapsing hanger assembly of FIG. 166A, with the wings extended to an open and locked position.

Figure 167B:
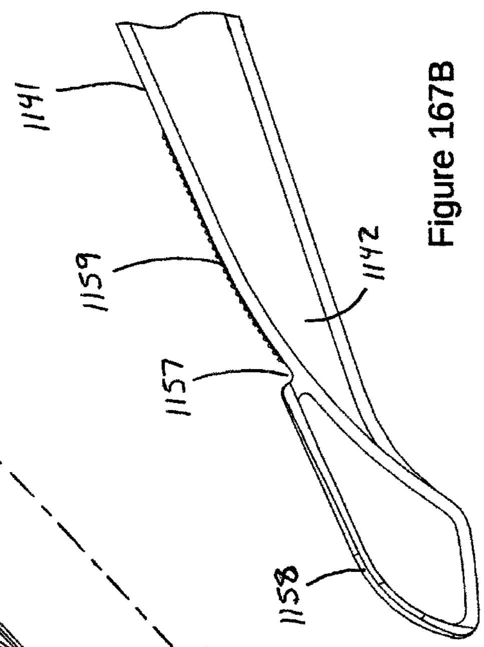

FIG. 167B is a front view of a portion of the moving wing of the collapsing hanger assembly of FIG. 166A, as if seen from the perspective of the section line B-B in FIG. 167A.

FIG. 167C is a top-down view of a portion of the moving wing of the collapsing hanger assembly of FIG. 166A, as if seen from the perspective of the section line C-C in FIG. 167A.

Figure 168A:
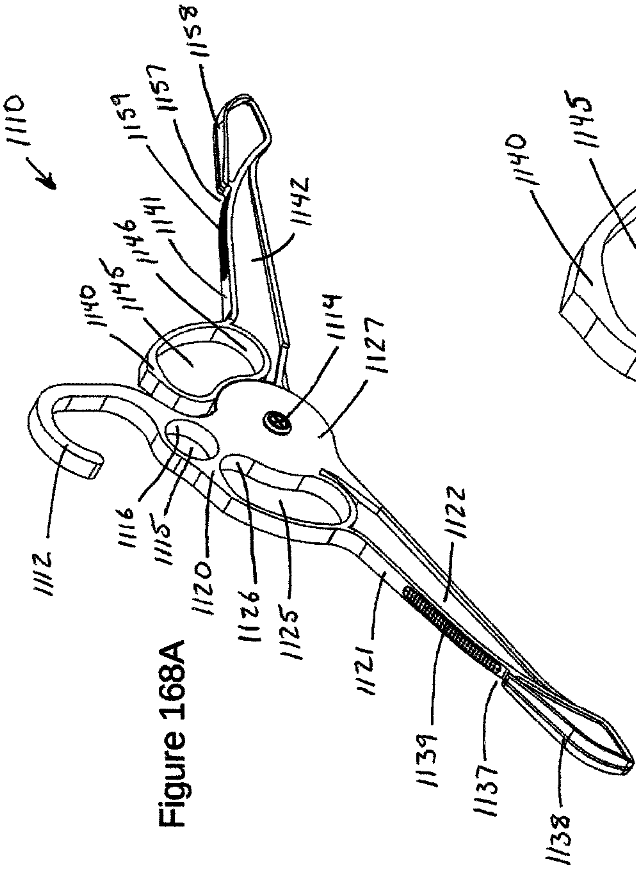

FIG. 168A is a rear trimetric view of the collapsing hanger assembly of FIG. 166A, with the wings extended to an open and locked position.

Figure 168B:
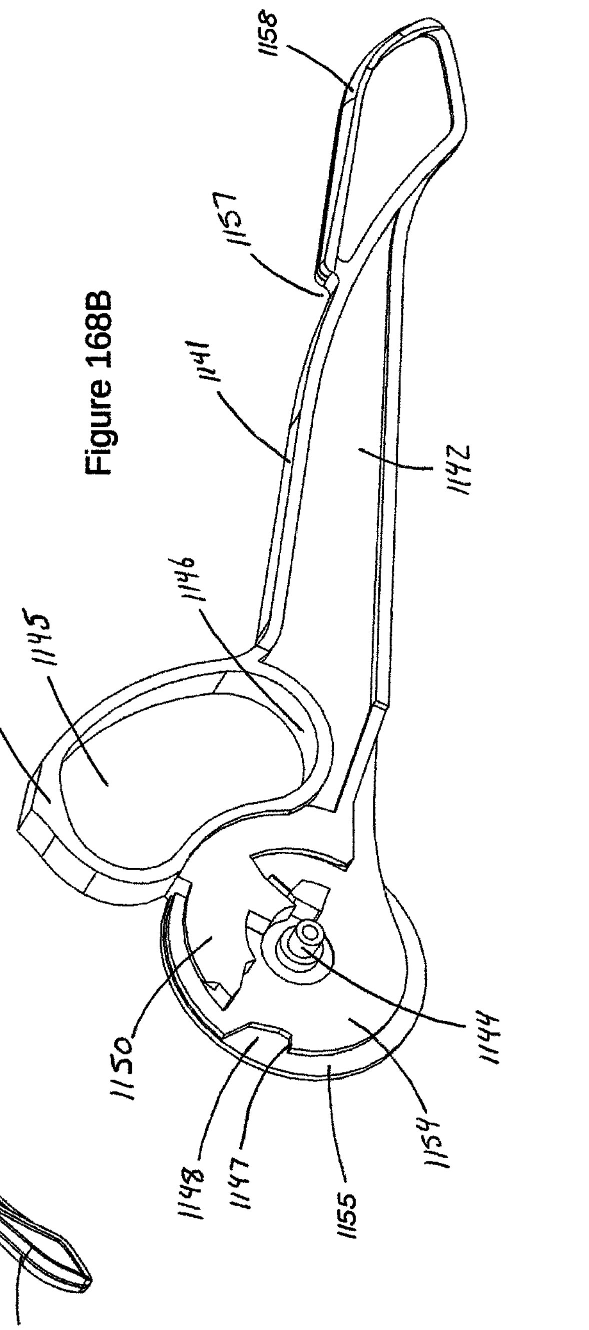

FIG. 168B is a rear perspective view of the moving wing member of the collapsing hanger assembly of FIG. 166A.

Figure 169:
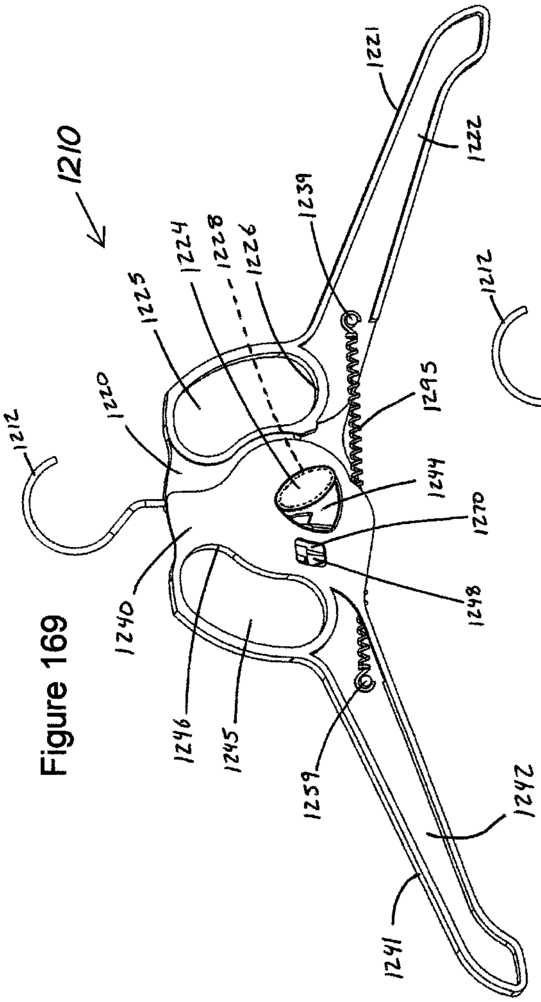

FIG. 169 is a front perspective view of a collapsing hanger assembly with the wings extended to an open position, according to a sixteenth embodiment.

Figure 170:
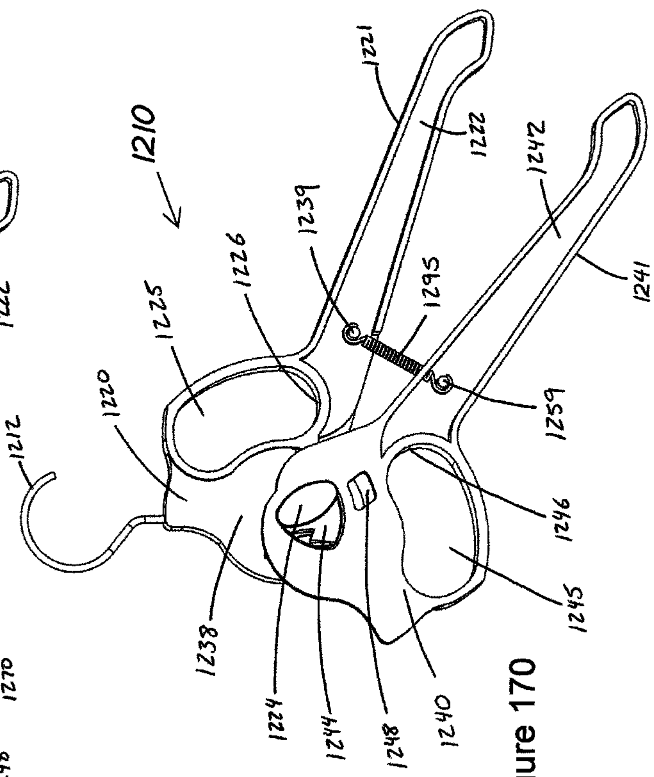

FIG. 170 is a front perspective view of the collapsing hanger assembly of FIG. 169, with the components repositioned to the collapsed configuration.

Figure 171:
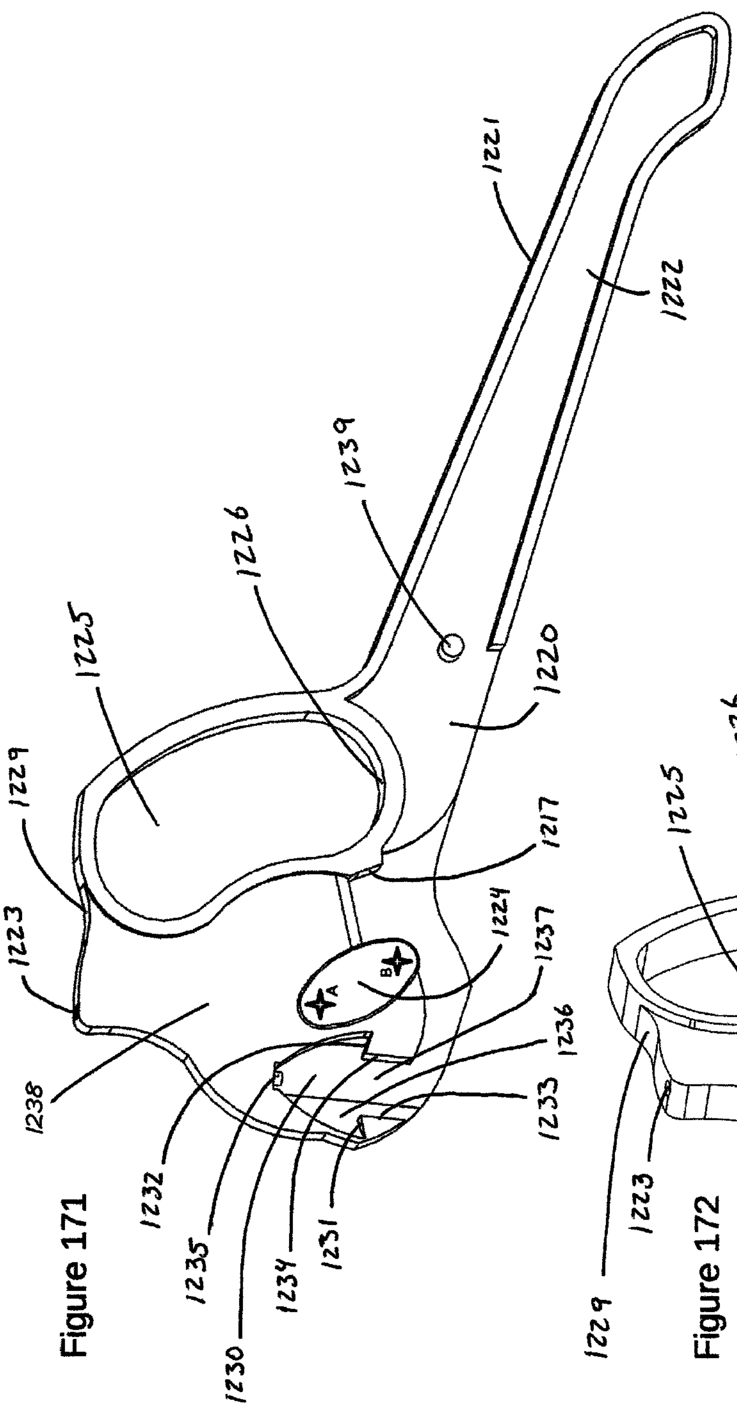

FIG. 171 is a front perspective view of the static wing member of the collapsing hanger assembly of FIG. 169.

Figure 172:
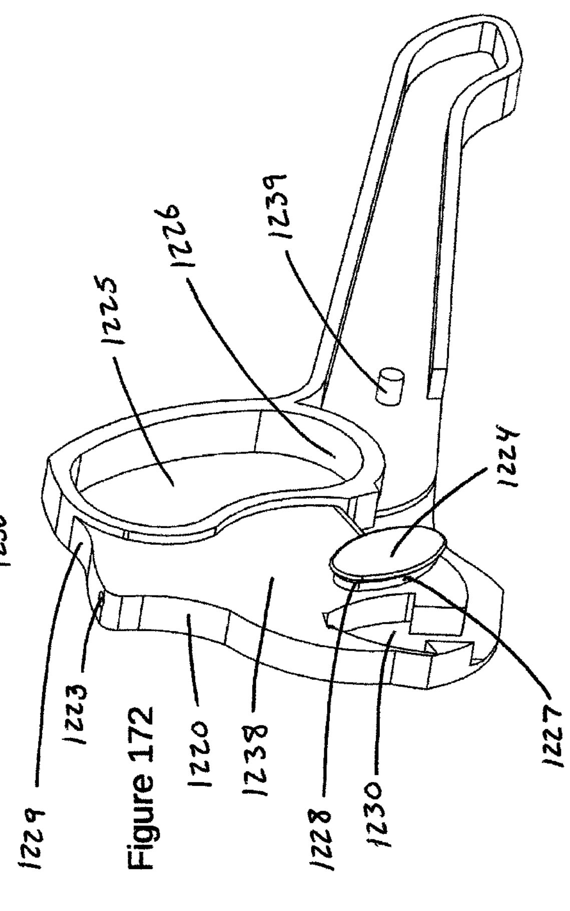

FIG. 172 is a side perspective view of the static wing member of the collapsing hanger assembly of FIG. 169.

Figure 173:
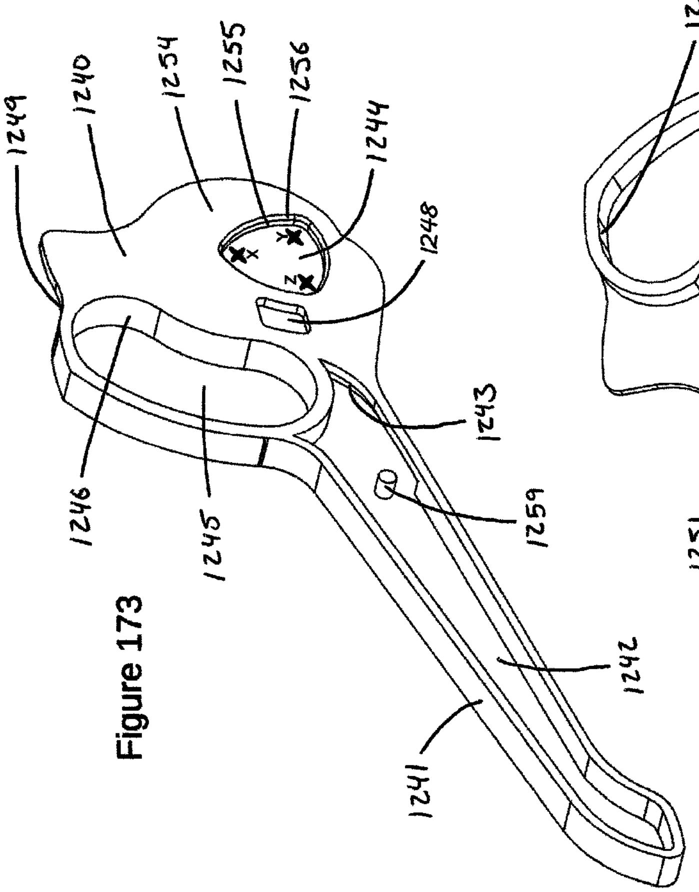

FIG. 173 is a front upper-left perspective view of the moving wing member of the collapsing hanger assembly of FIG. 169.

Figure 174:
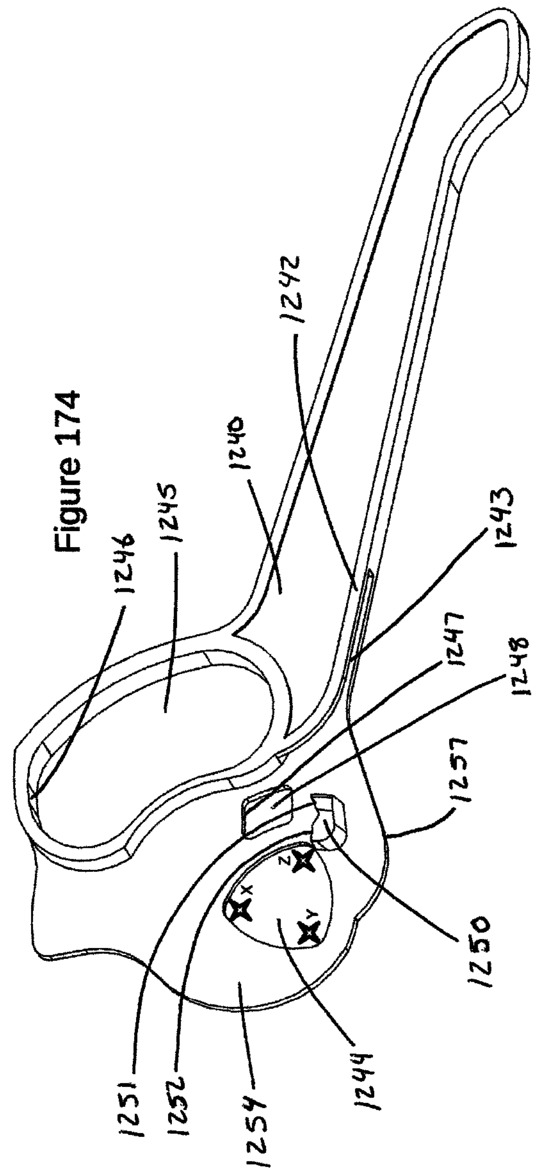

FIG. 174 is a rear lower perspective view of the moving wing member of the collapsing hanger assembly of FIG. 169.

Figure 175:
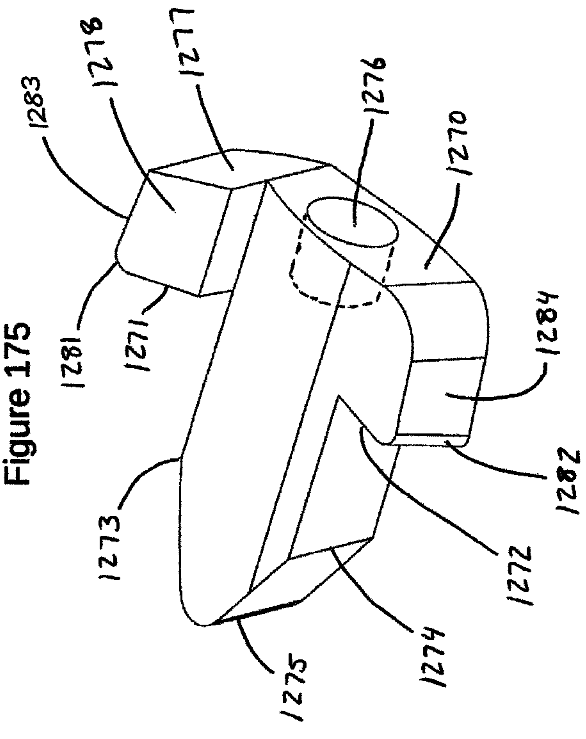

FIG. 175 is a front tail-end perspective view of the latch member of the collapsing hanger assembly of FIG. 169.

Figure 176:
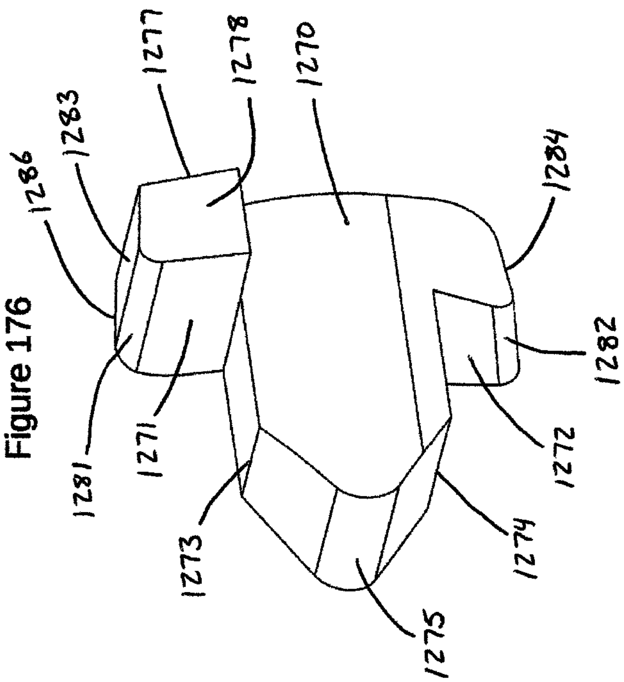

FIG. 176 is a front tip-end perspective view of the latch member of the collapsing hanger assembly of FIG. 169.

Figure 177:
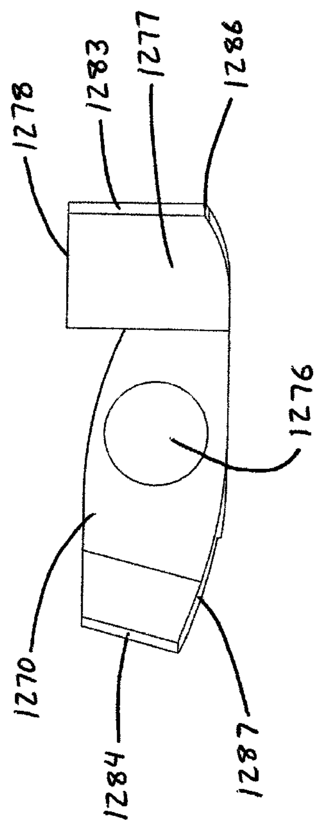

FIG. 177 is a tail-end view of the latch member of the collapsing hanger assembly of FIG. 169.

Figure 178:
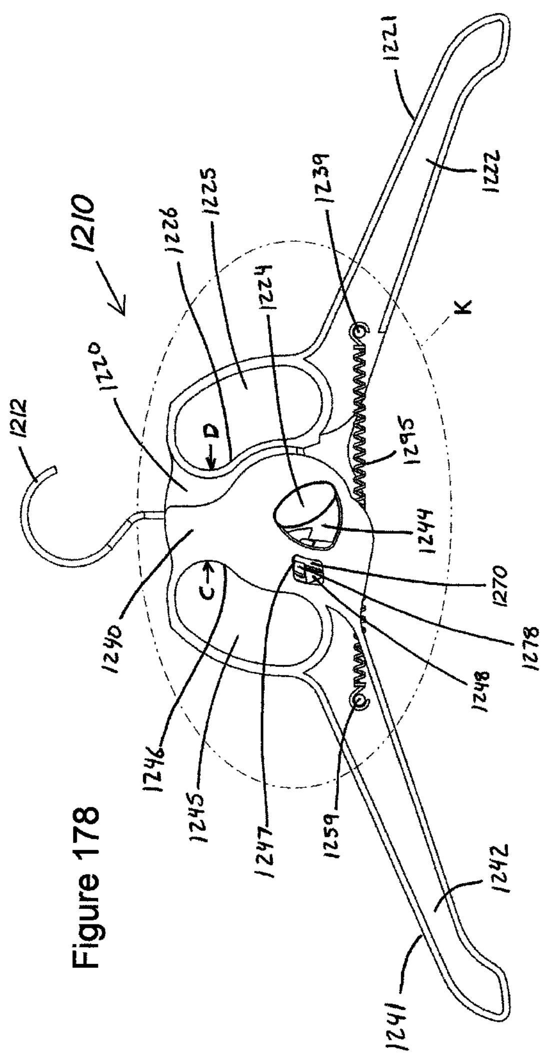

FIG. 178 is a front view of the collapsing hanger assembly of FIG. 169, with the wings extended to an open position.

Figure 179:
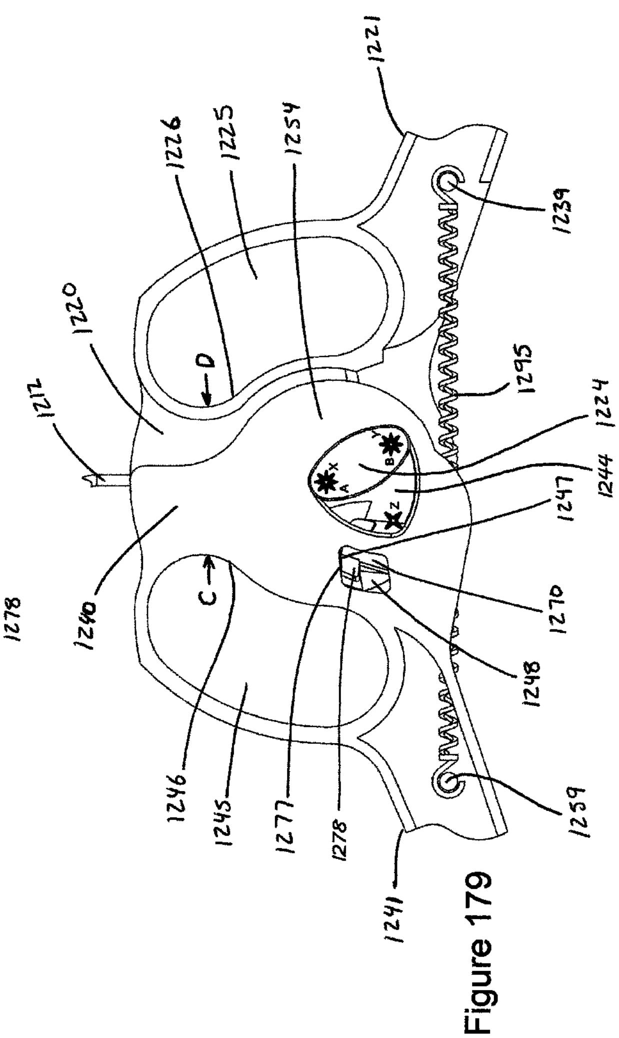

FIG. 179 is a close-up front view of the area generally outlined by the ellipse K in FIG. 178.

Figures 180, 181:
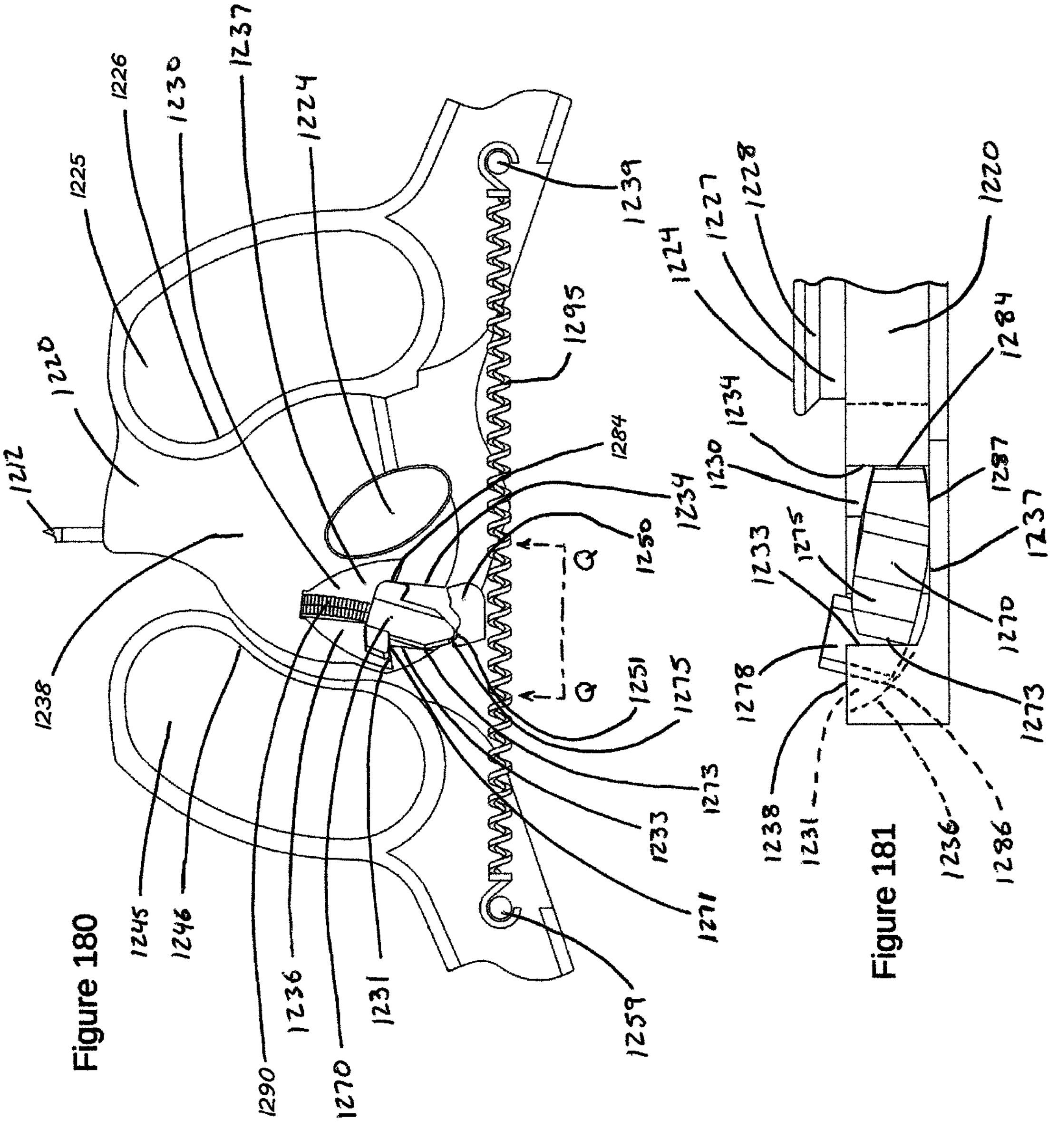

FIG. 180 is a close-up front view of the area generally outlined by the ellipse K in FIG. 178, with the moving wing guard flange removed so as to see the assembly portions behind.

FIG. 181 is a close-up view of the latch member and a portion of the static wing as if seen from the perspective of the section line Q-Q in FIG. 180, with the coil spring and latch plunger removed from view.

Figure 182:
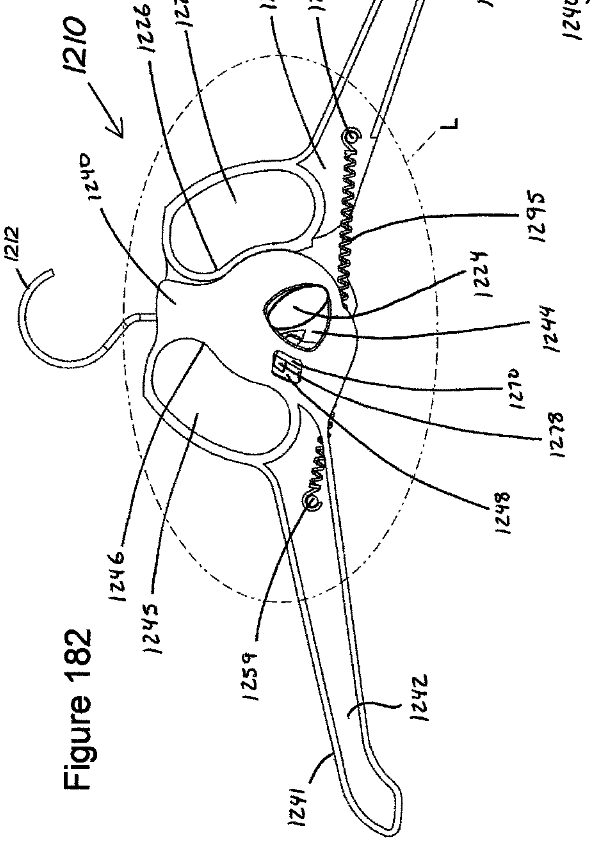

FIG. 182 is a front view of the collapsing hanger assembly of FIG. 169, with the components repositioned to the unlatching configuration.

Figure 183:
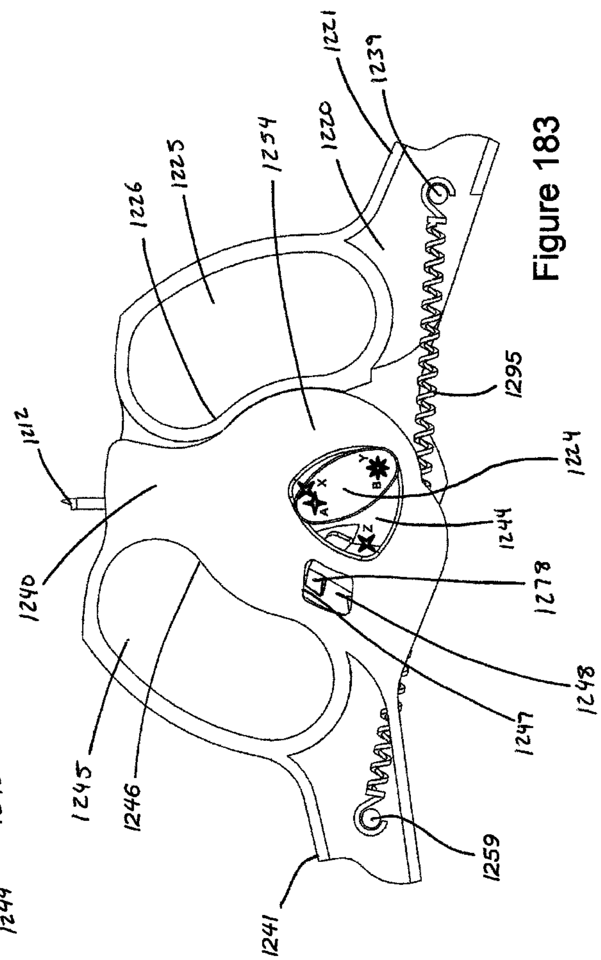

FIG. 183 is a close-up front view of the area generally outlined by the ellipse L in FIG. 182.

Figure 184:
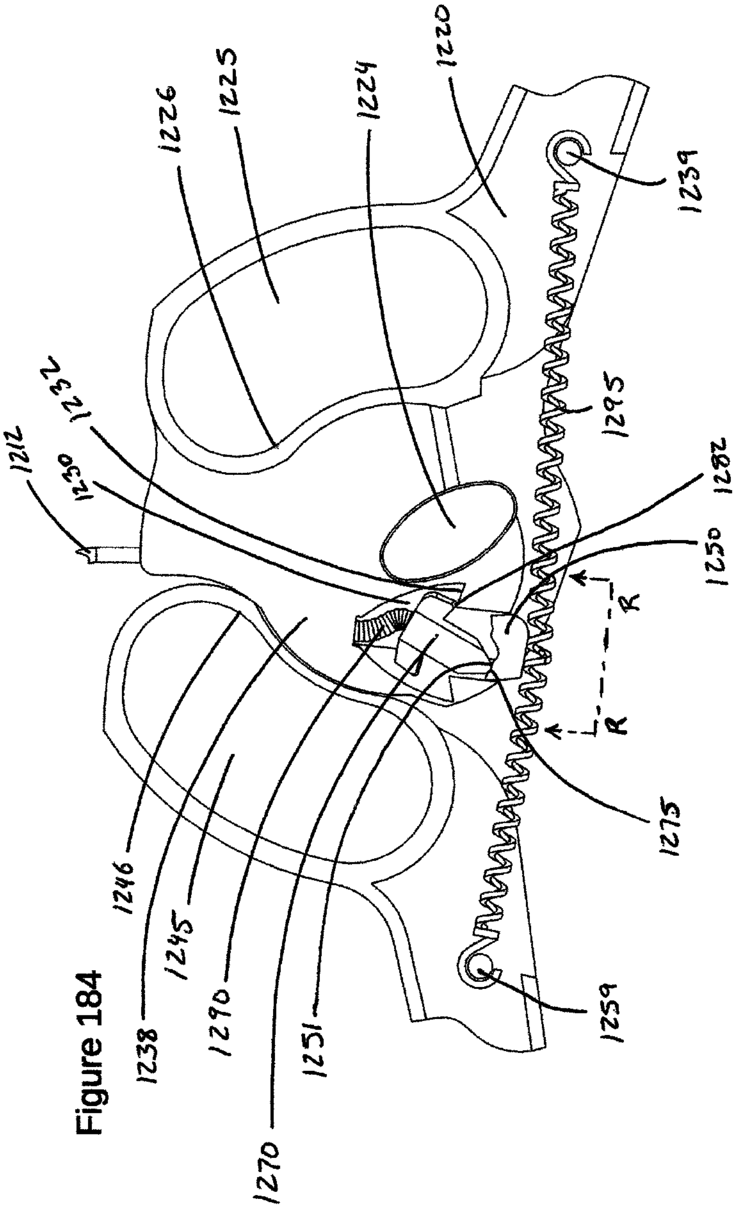

FIG. 184 is a close-up front view of the area generally outlined by the ellipse L in FIG. 182, with the moving wing guard flange removed so as to see the assembly portions behind.

Figure 185:
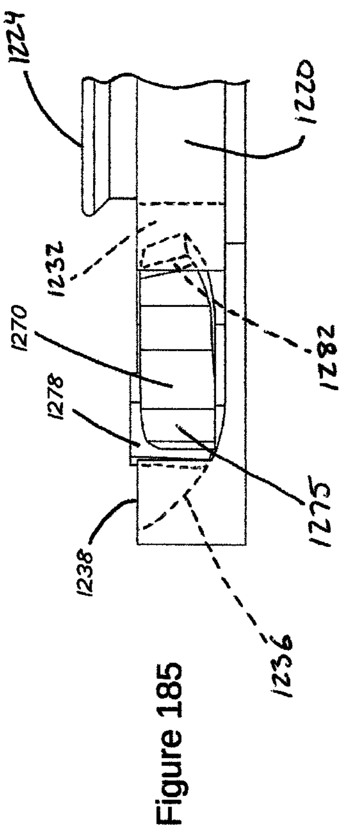

FIG. 185 is a close-up view of the latch member and a portion of the static wing as if seen from the perspective of the section line R-R in FIG. 184, with the coil spring and latch plunger removed from view.

Figure 186:
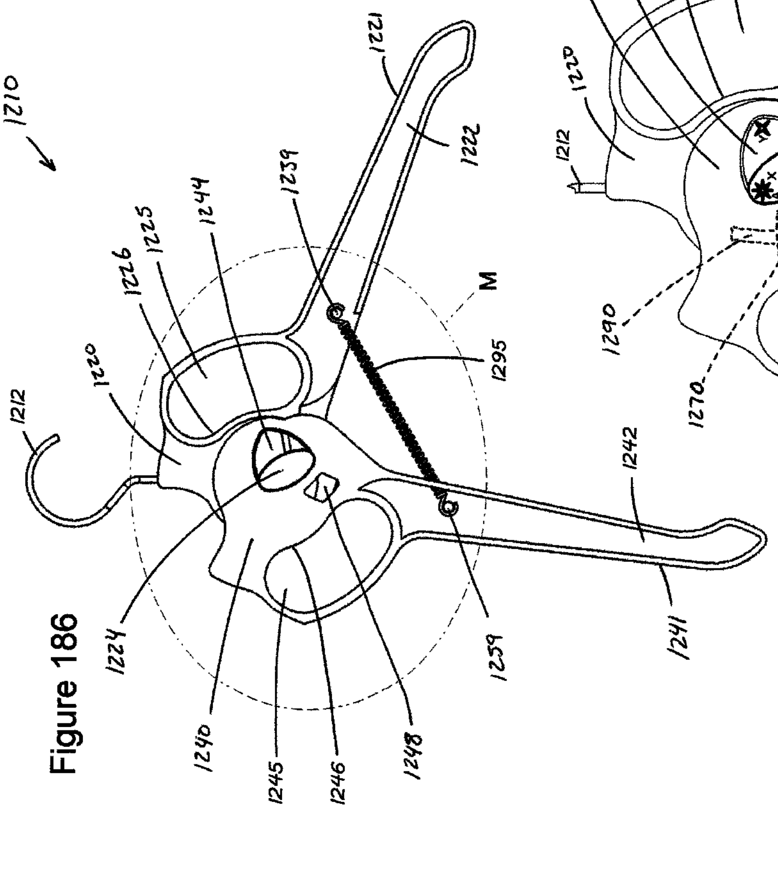

FIG. 186 is a front view of the collapsing hanger assembly of FIG. 169, with the components repositioned to a half-folded configuration.

Figure 187:
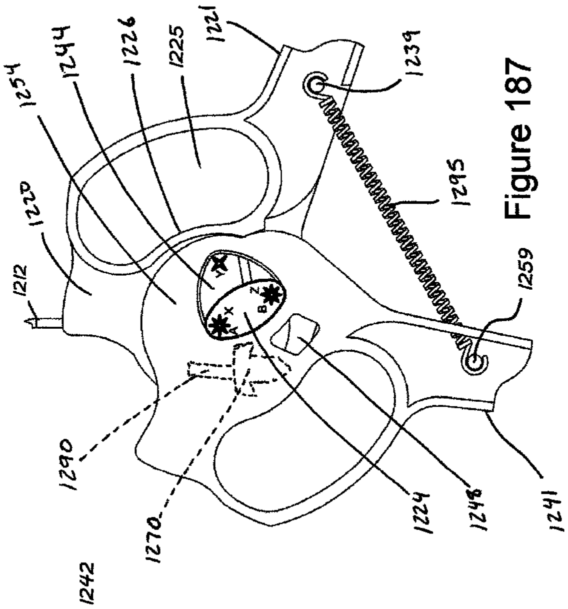

FIG. 187 is a close-up front view of the area generally outlined by the ellipse M in FIG. 186.

Figure 188:
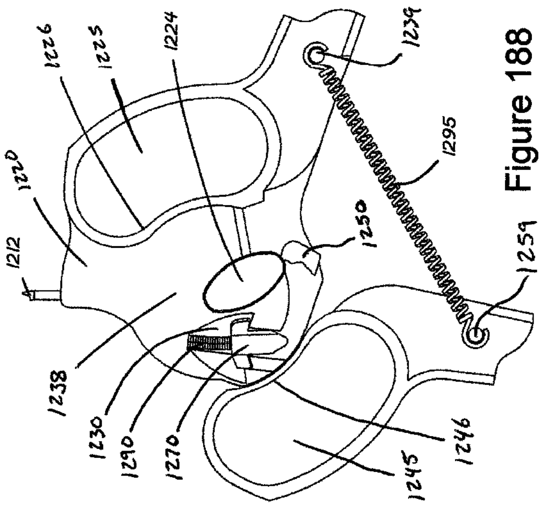

FIG. 188 is a close-up front view of the area generally outlined by the ellipse M in FIG. 186, with the moving wing guard flange removed so as to see the assembly portions behind.

Figure 189:
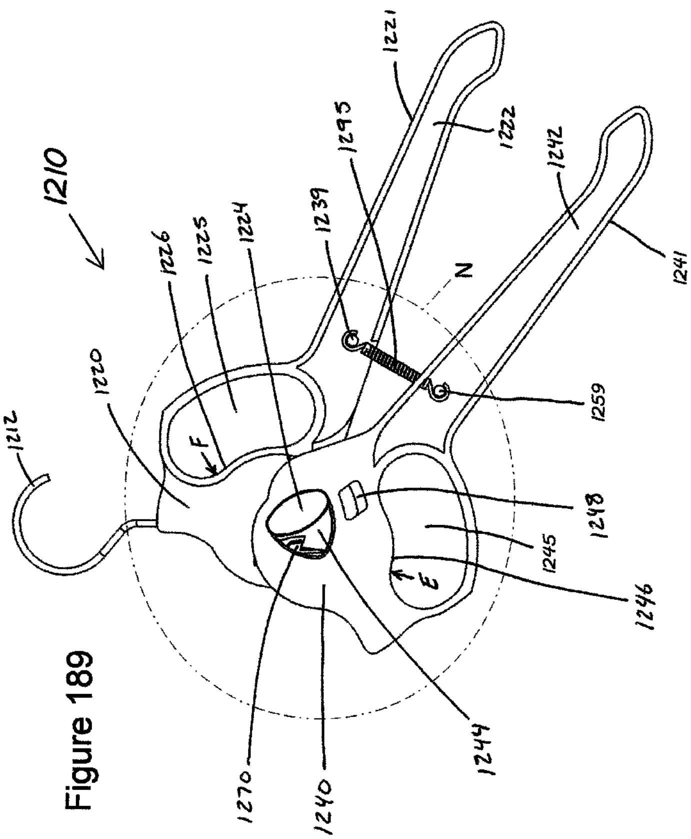

FIG. 189 is a front view of the collapsing hanger assembly of FIG. 169, with the components repositioned to the collapsed configuration.

Figure 190:
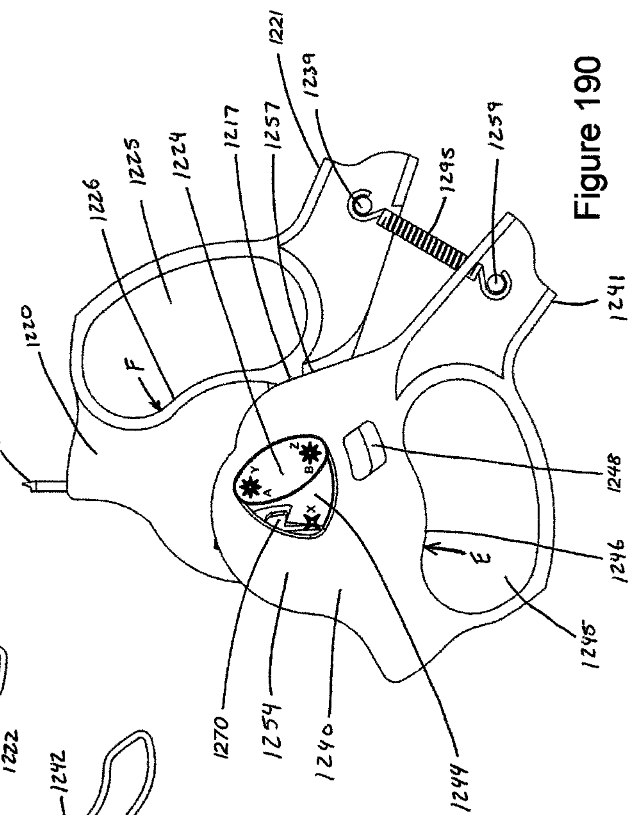

FIG. 190 is a close-up front view of the area generally outlined by the ellipse N in FIG. 189.

Figure 191:
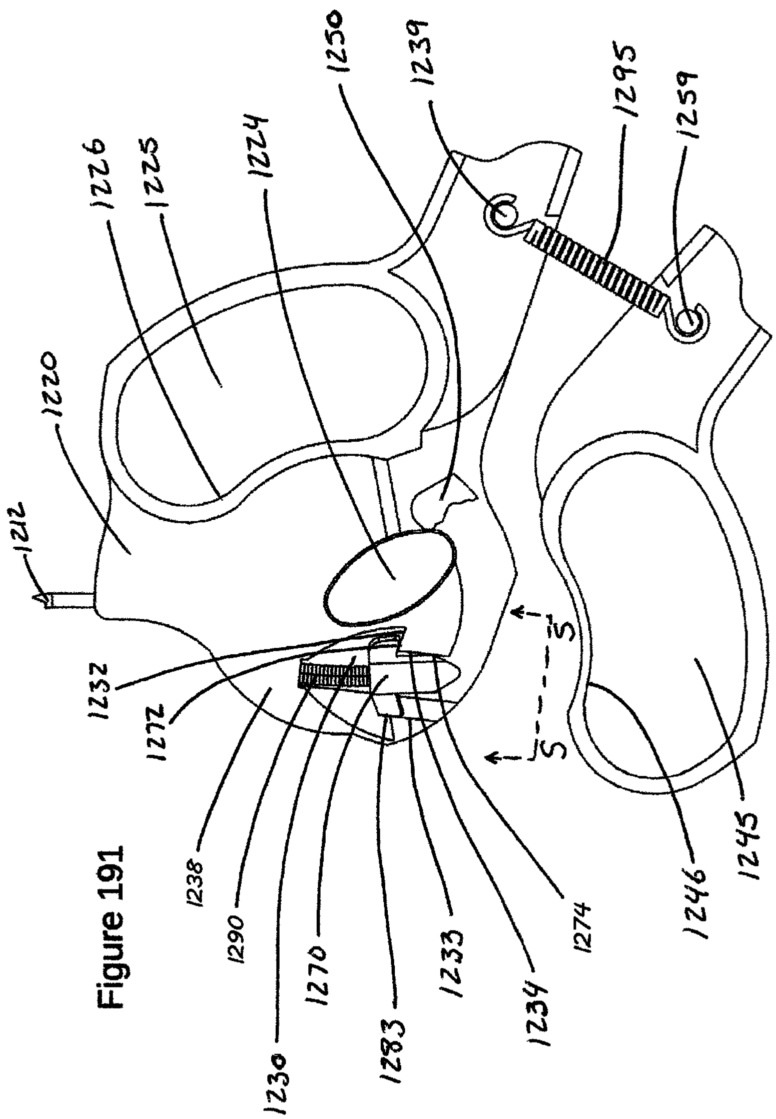

FIG. 191 is a close-up front view of the area generally outlined by the ellipse N in FIG. 189, with the moving wing guard flange removed so as to see the assembly portions behind.

Figure 192:
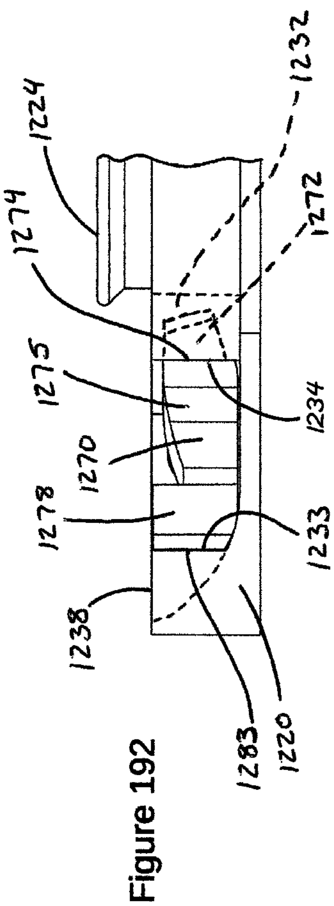

FIG. 192 is a close-up view of the latch member and a portion of the static wing as if seen from the perspective of the section line S-S in FIG. 191.

Figure 193:
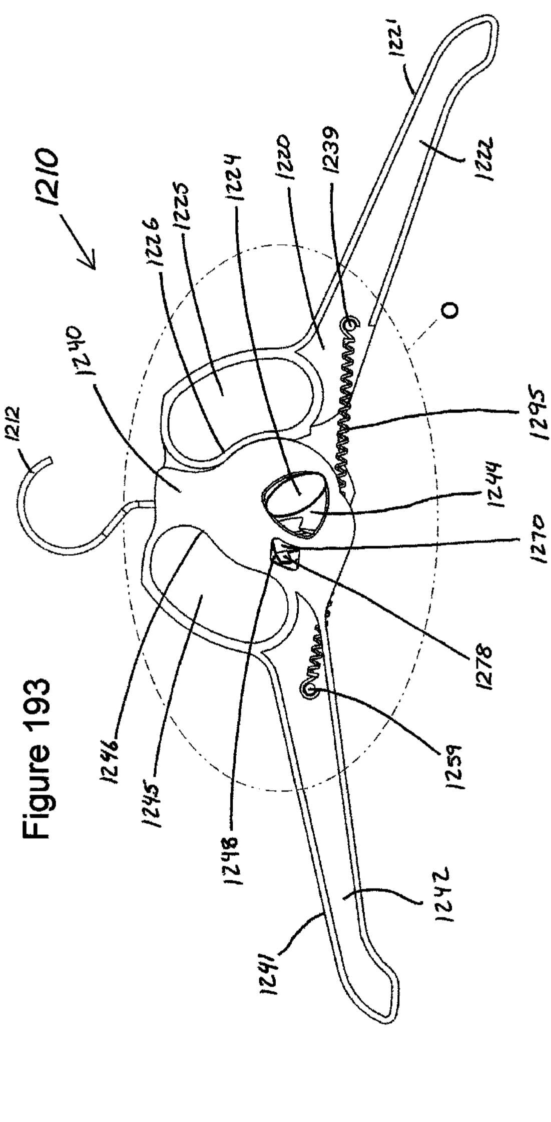

FIG. 193 is a front view of the collapsing hanger assembly of FIG. 169, with the components repositioned to the re-latching configuration.

Figure 194:
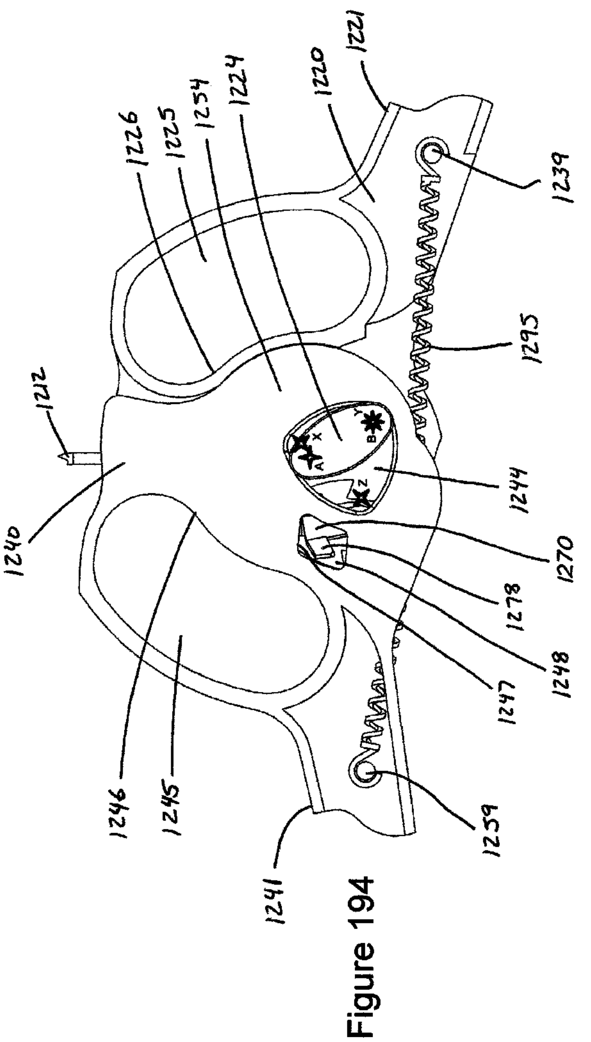

FIG. 194 is a close-up front view of the area generally outlined by the ellipse O in FIG. 193.

Figure 195:
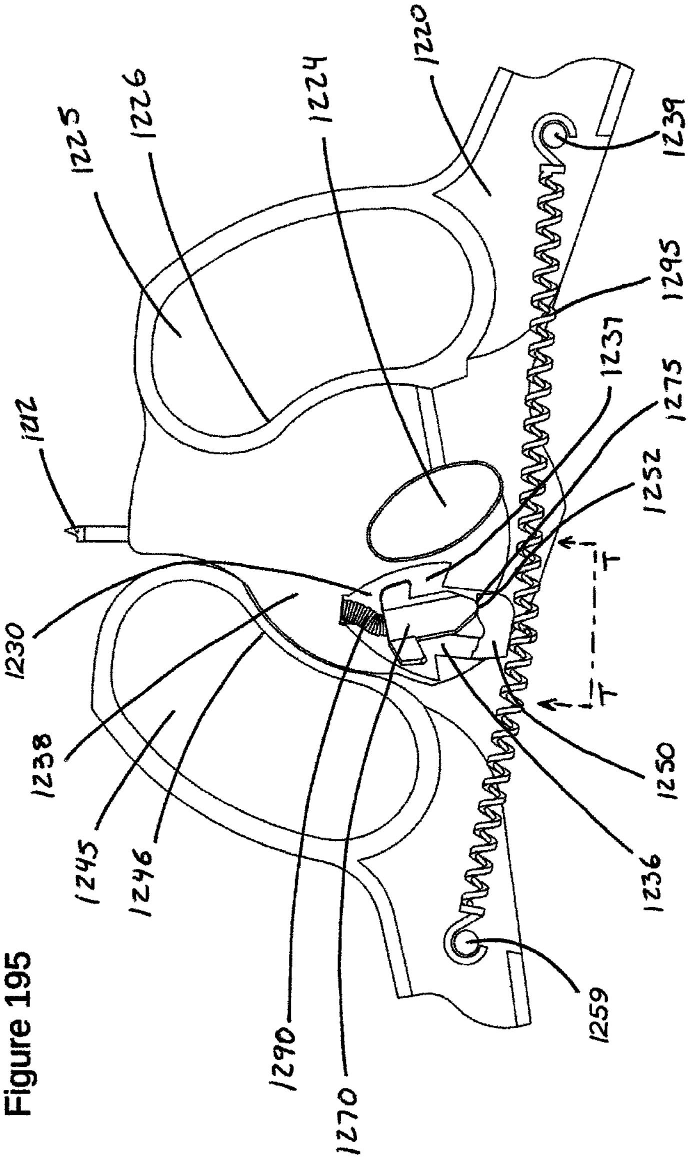

FIG. 195 is a close-up front view of the area generally outlined by the ellipse O in FIG. 193, with the moving wing guard flange removed so as to see the assembly portions behind.

Figure 196:
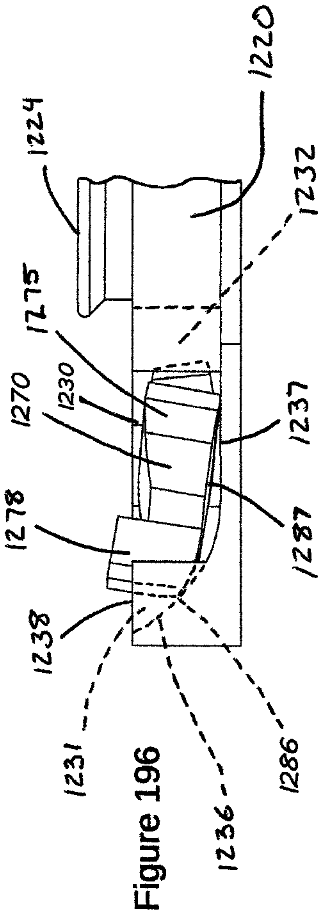

FIG. 196 is a close-up view of the latch member and a portion of the static wing as if seen from the perspective of the section line T-T in FIG. 195, with the coil spring and latch plunger removed from view.

Figure 197:
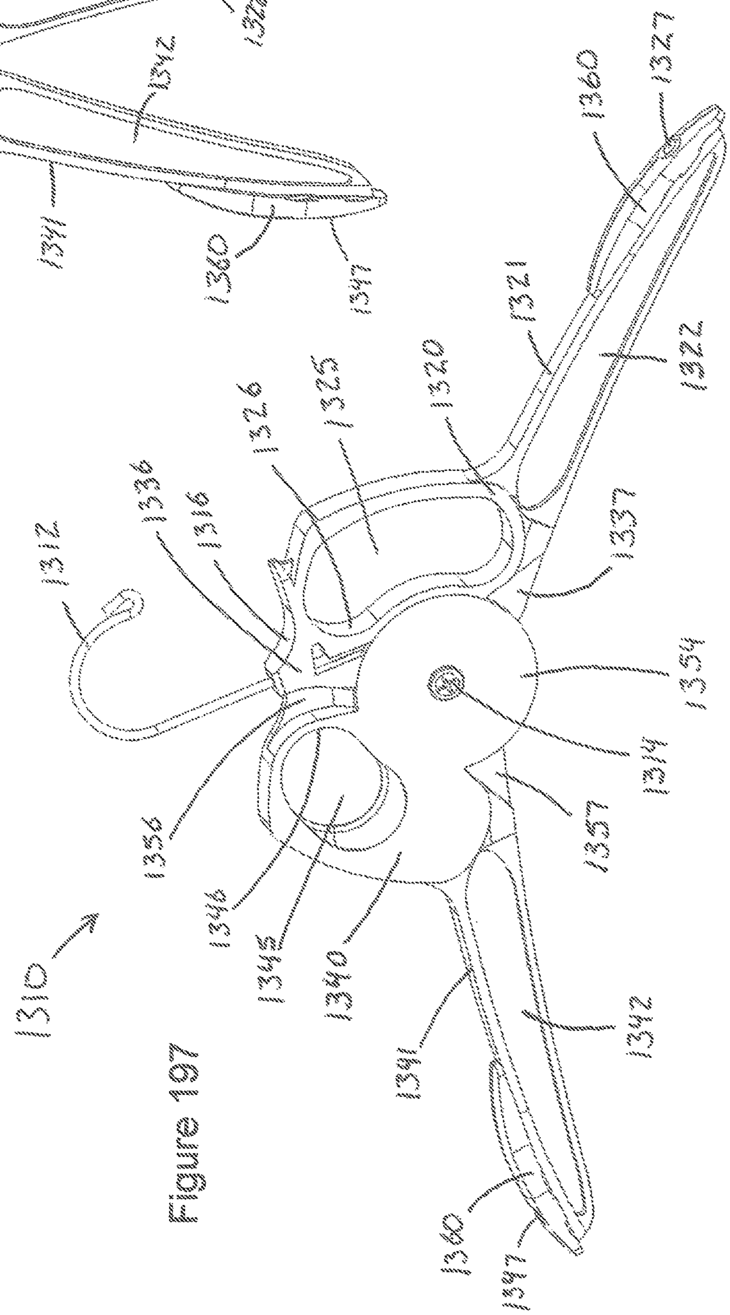

FIG. 197 is a front perspective view of a collapsing hanger assembly with the wings extended to an open position and the shoulder supports in a retracted position, according to a seventeenth embodiment.

Figure 198:
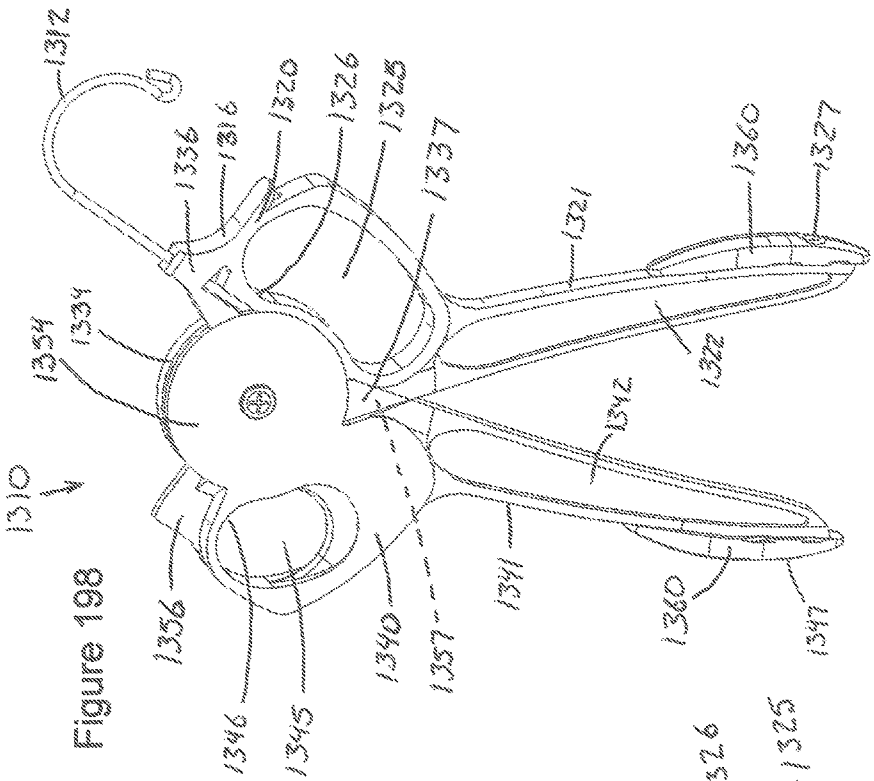

FIG. 198 is a front perspective view of the collapsing hanger assembly of FIG. 197, with the components repositioned to the collapsed configuration and the shoulder supports in a retracted position.

Figure 199:
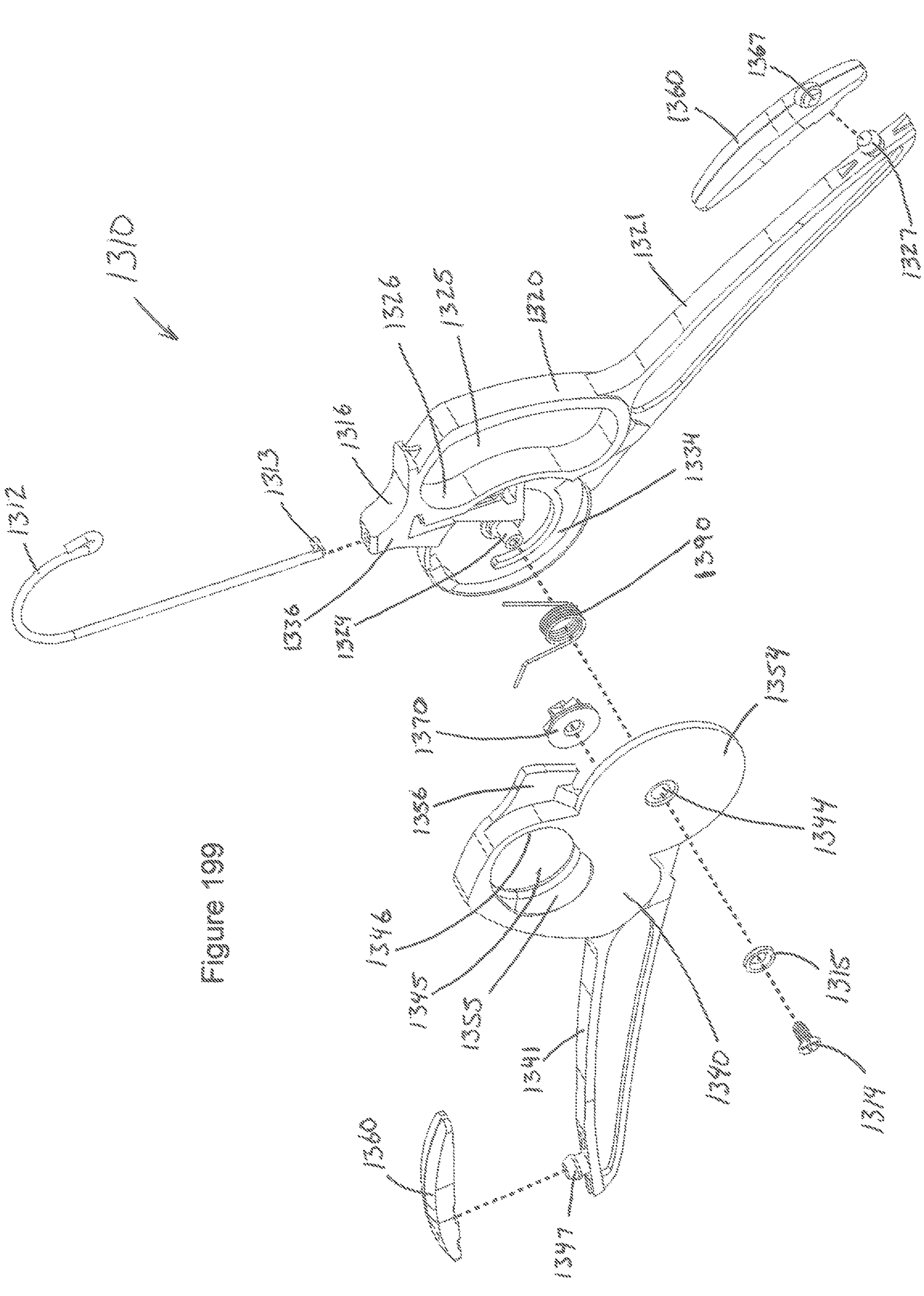

FIG. 199 is an exploded view of the collapsing hanger assembly of FIG. 197, as seen from a front upper perspective.

Figure 200:
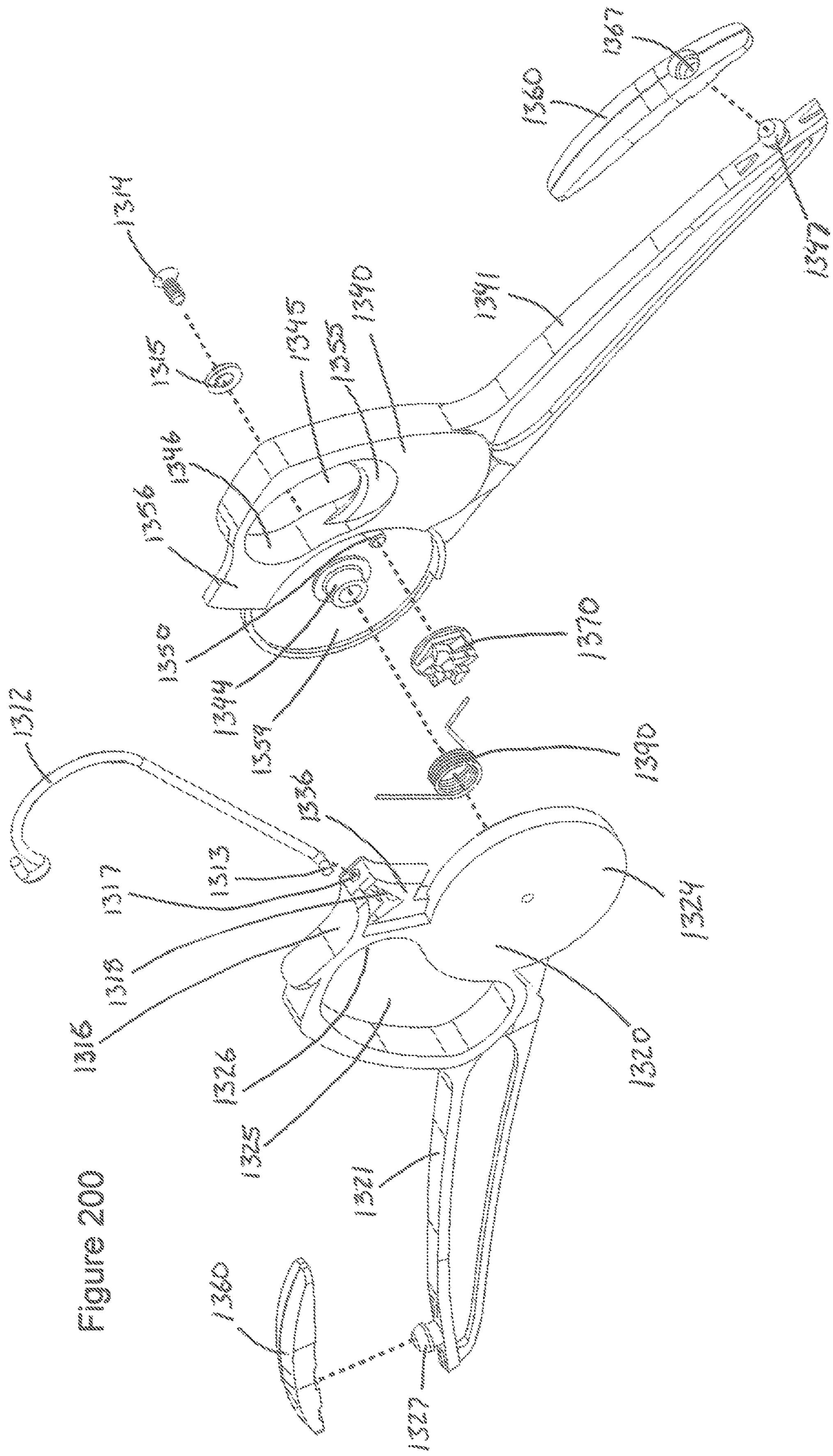

FIG. 200 is an exploded view of the collapsing hanger assembly of FIG. 197, as seen from a rear upper perspective.

Figure 201:
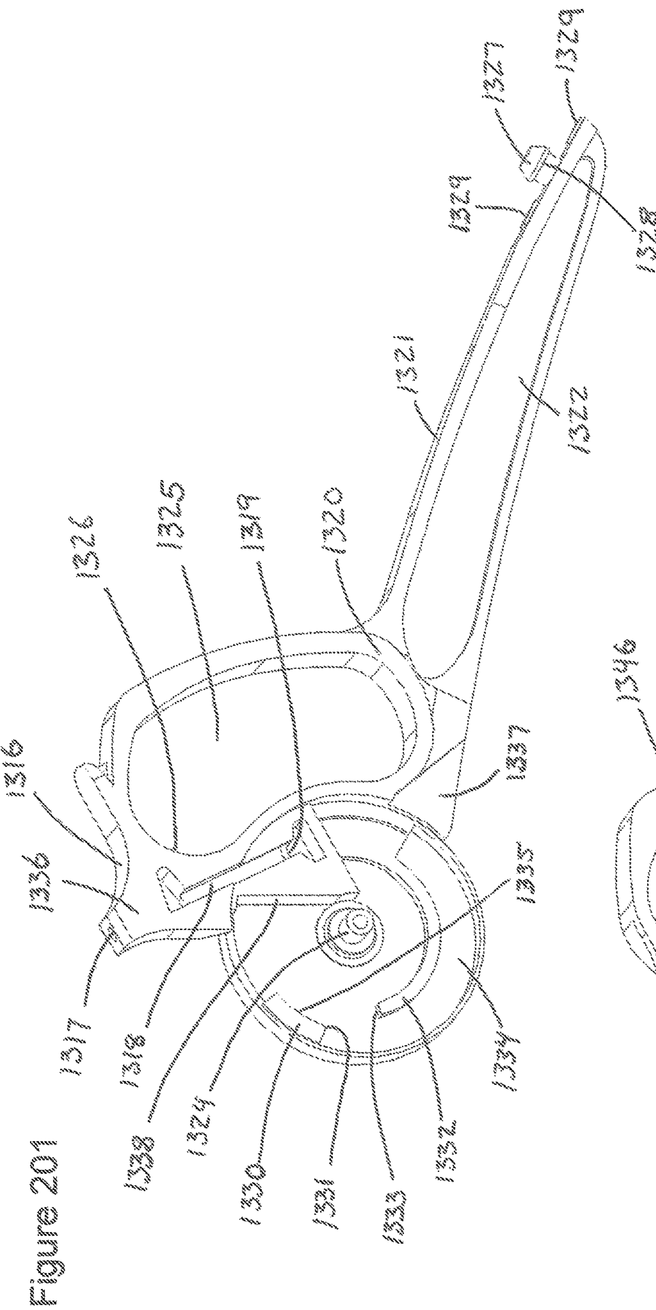

FIG. 201 is a front perspective view of the static wing member of the collapsing hanger assembly of FIG. 197.

Figure 202:
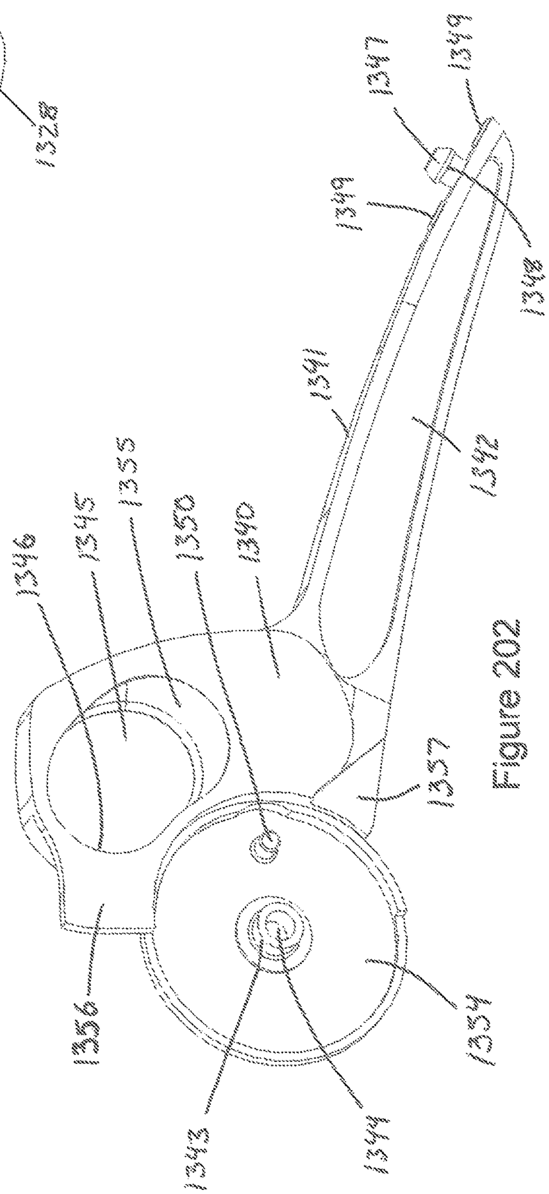

FIG. 202 is a rear perspective view of the moving wing member of the collapsing hanger assembly of FIG. 197.

Figure 203:
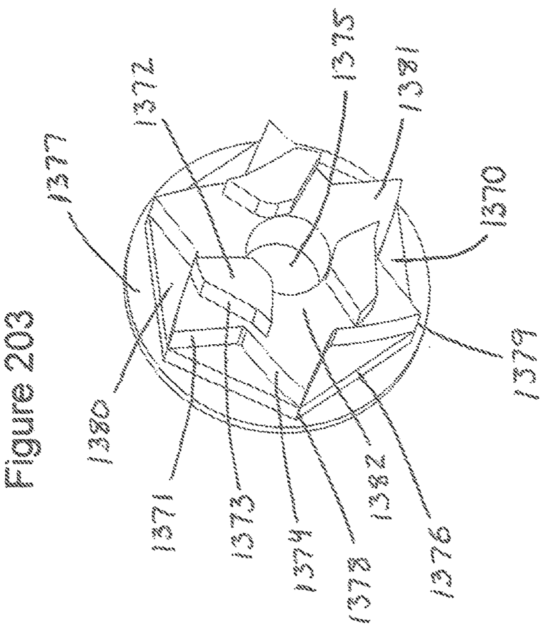

FIG. 203 is a face perspective view of the latch member of the collapsing hanger assembly of FIG. 197.

Figure 204:
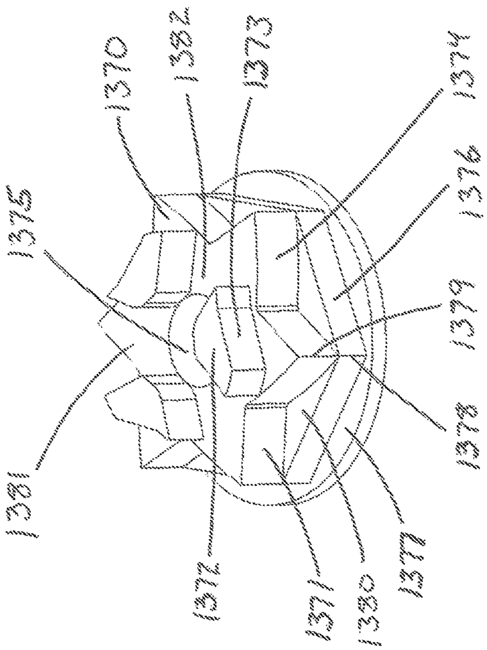

FIG. 204 is a side perspective view of the latch member of the collapsing hanger assembly of FIG. 197.

Figure 205:
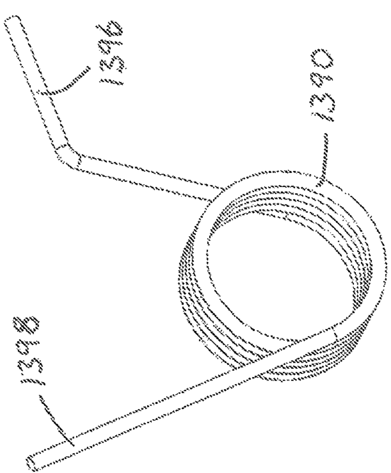

FIG. 205 is a perspective view of the torsion spring member of the collapsing hanger assembly of FIG. 197, in a tightly wound condition.

Figure 206:
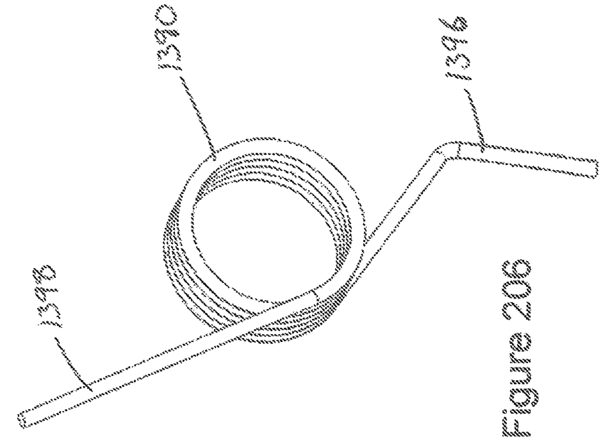

FIG. 206 is a perspective view of the torsion spring member of the collapsing hanger assembly of FIG. 197, in a less wound condition than that of FIG. 205.

Figure 207:
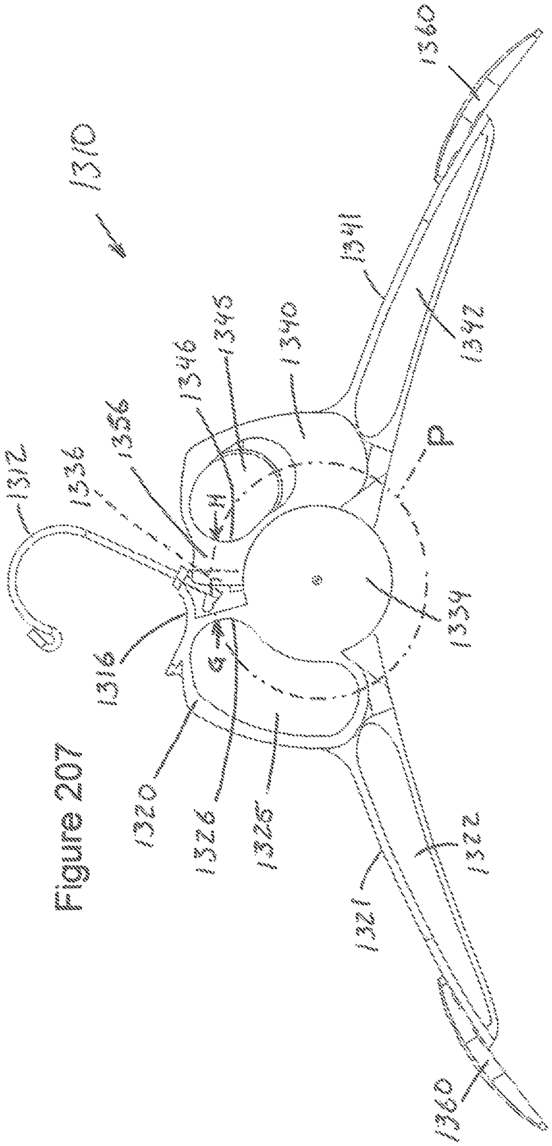

FIG. 207 is a rear view of the collapsing hanger assembly of FIG. 197, with the wings extended to an open position and the shoulder supports in an extended position.

Figure 208:
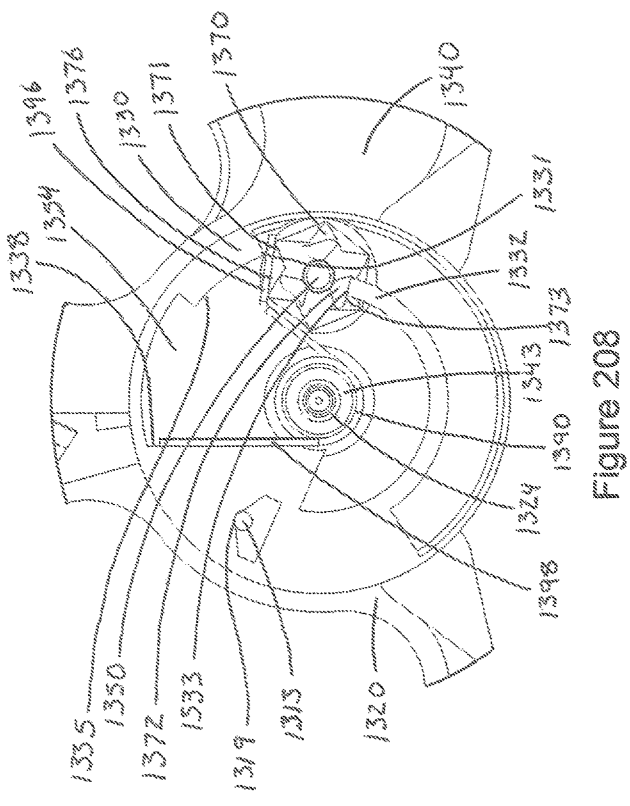

FIG. 208 is a close-up rear view of the area generally outlined by the ellipse P in FIG. 207, with the static wing wall removed so as to see the assembly portions behind.

Figure 209:
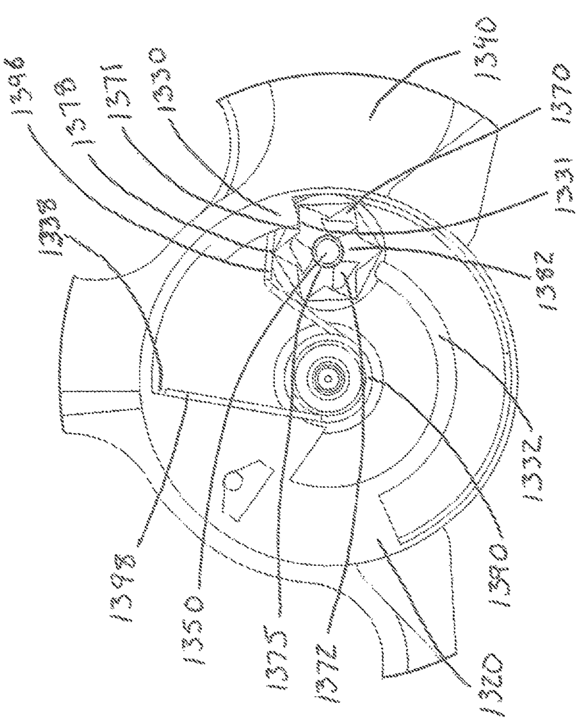

FIG. 209 is a close-up rear view similar to that of FIG. 208, with the hanger components in an intermediate unlatching position.

Figure 210:
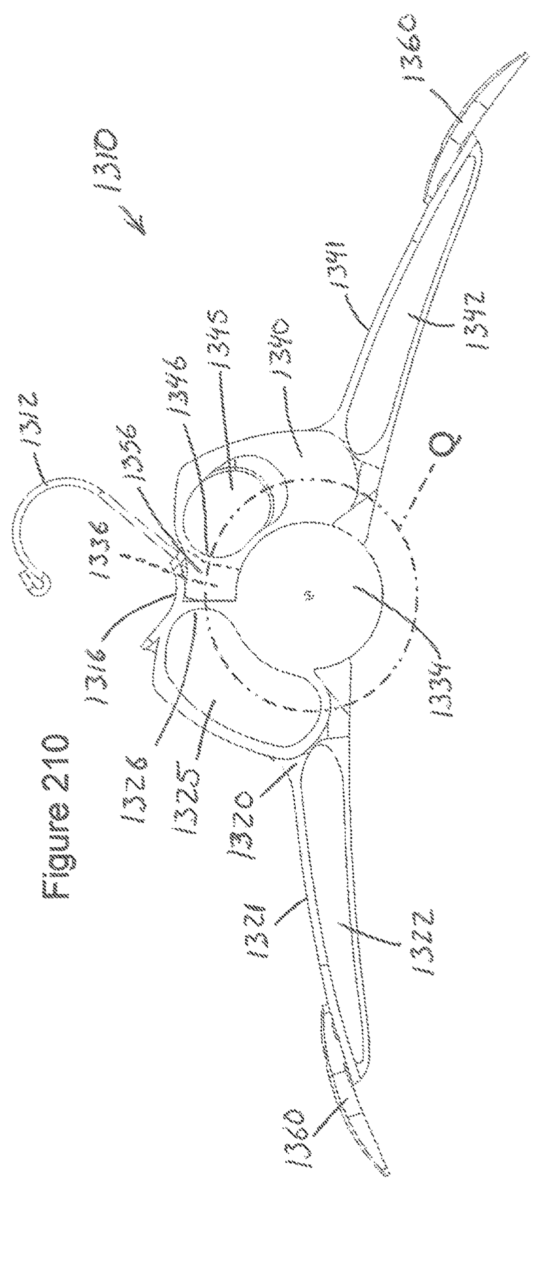

FIG. 210 is a rear view of the collapsing hanger assembly of FIG. 197, with the components repositioned to the unlatching configuration and the shoulder supports in an extended position.

Figure 211:
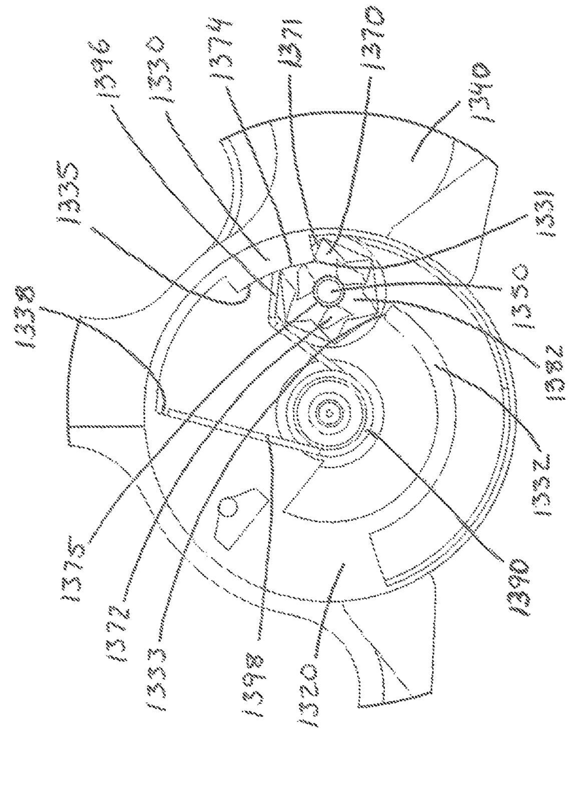

FIG. 211 is a close-up rear view of the area generally outlined by the ellipse Q in FIG. 210, with the static wing wall removed so as to see the assembly portions behind.

Figure 212:
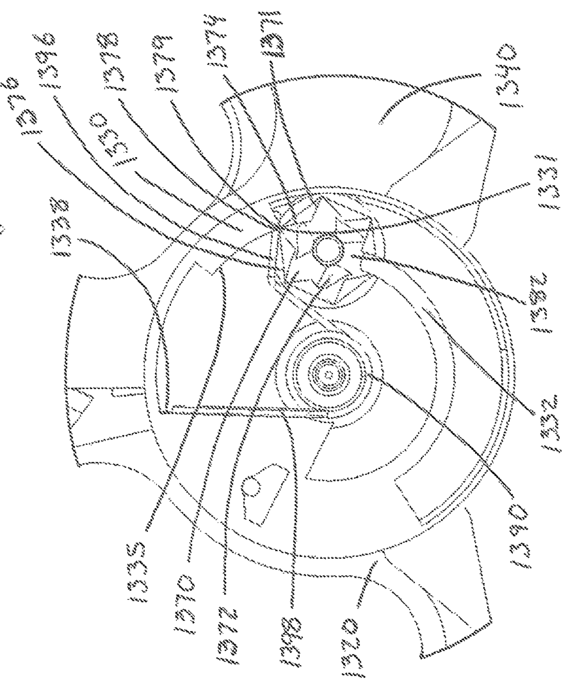

FIG. 212 is a close-up rear view similar to that of FIG. 211, with the hanger components positioned near the end of the unlatching sequence.

Figure 213:
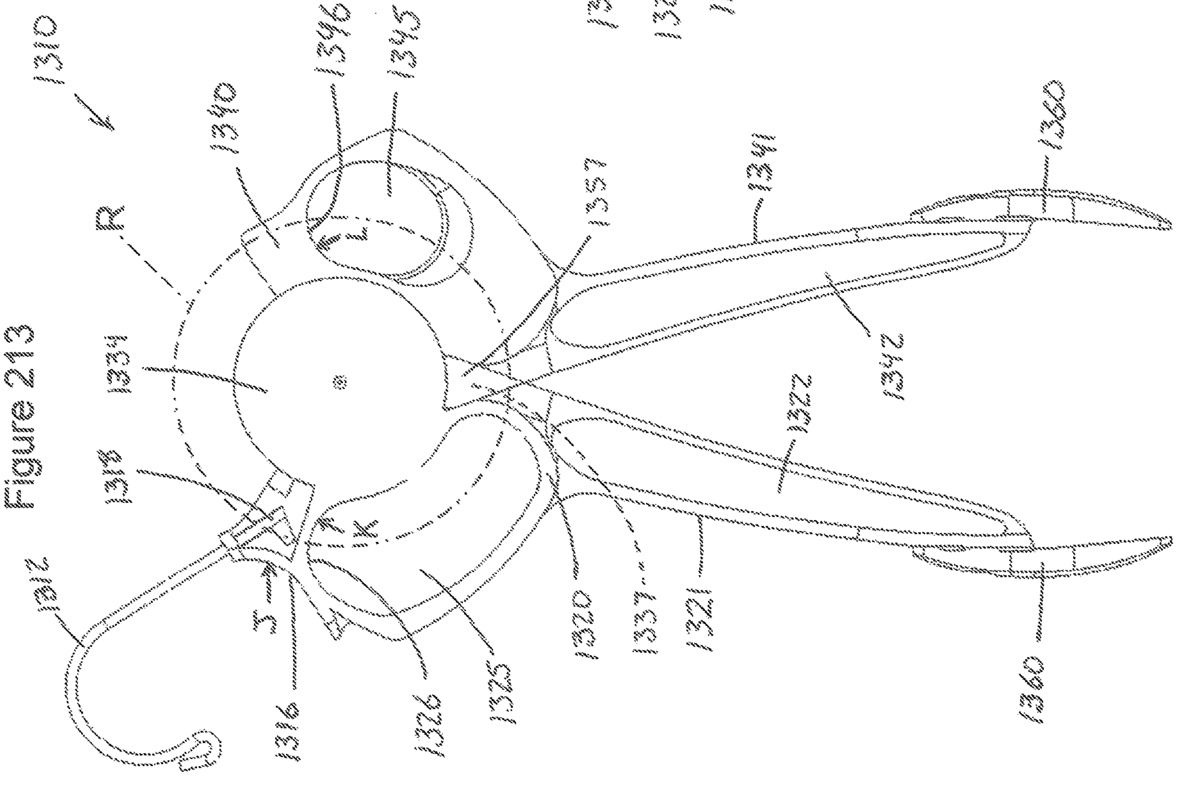

FIG. 213 is a rear view of the collapsing hanger assembly of FIG. 197, with the components repositioned to the collapsed configuration and the shoulder supports in an extended position.

Figure 214:
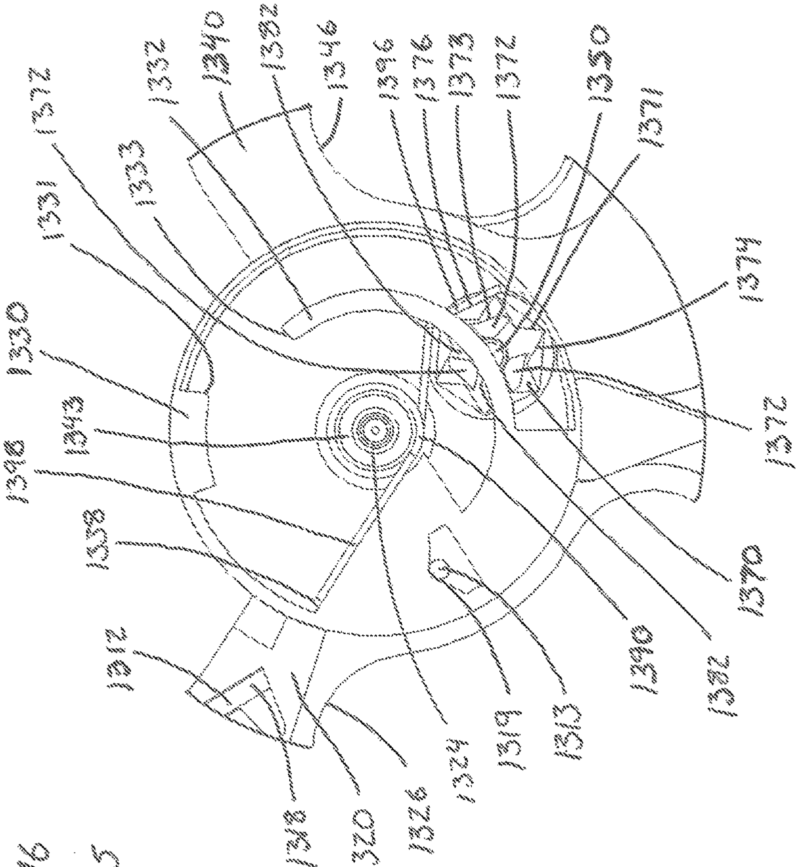

FIG. 214 is a close-up rear view of the area generally outlined by the ellipse R in FIG. 211, with the static wing wall removed so as to see the assembly portions behind.

FIG. 215 is a close-up rear view of the area generally outlined by the ellipse Q in FIG. 210, with the static wing wall removed and the internal components positioned as if in the re-latching configuration.

FIG. 216 is the same view as FIG. 215, with the exception of having the static wing and hook removed from view so as to only show the positioning of the spring and latch member on the moving wing when the hanger is in the re-latching condition.

FIG. 217 is a close-up rear view similar to that of FIG. 215, with the hanger components positioned near the end of the re-latching sequence.

Figures 218, 219, 220, 221, 222, 223:
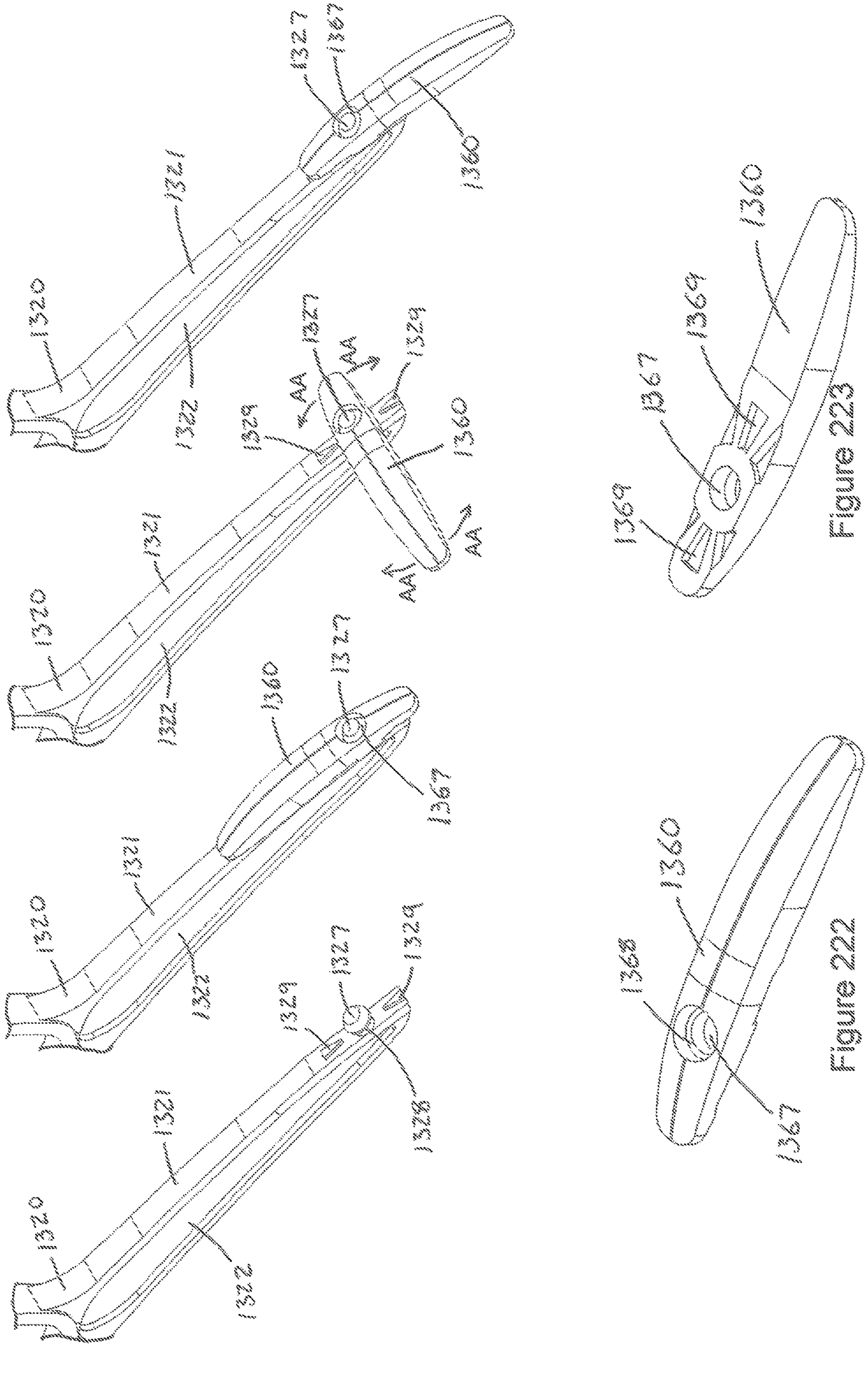

FIG. 218 is an upper perspective view of the tip portions of the static wing of FIG. 197, with the shoulder support removed.

FIG. 219 is an upper perspective view of the tip portions of the static wing of FIG. 197, with the shoulder support in a retracted position.

FIG. 220 is an upper perspective view of the tip portions of the static wing of FIG. 197, with the shoulder support pivoted between the retracted and extends positions.

FIG. 221 is an upper perspective view of the tip portions of the static wing of FIG. 197, with the shoulder support in an extended position.

FIG. 222 is an upper perspective view of the shoulder support of FIG. 197.

FIG. 223 is a lower perspective view of the shoulder support of FIG. 197.

Figure 224:
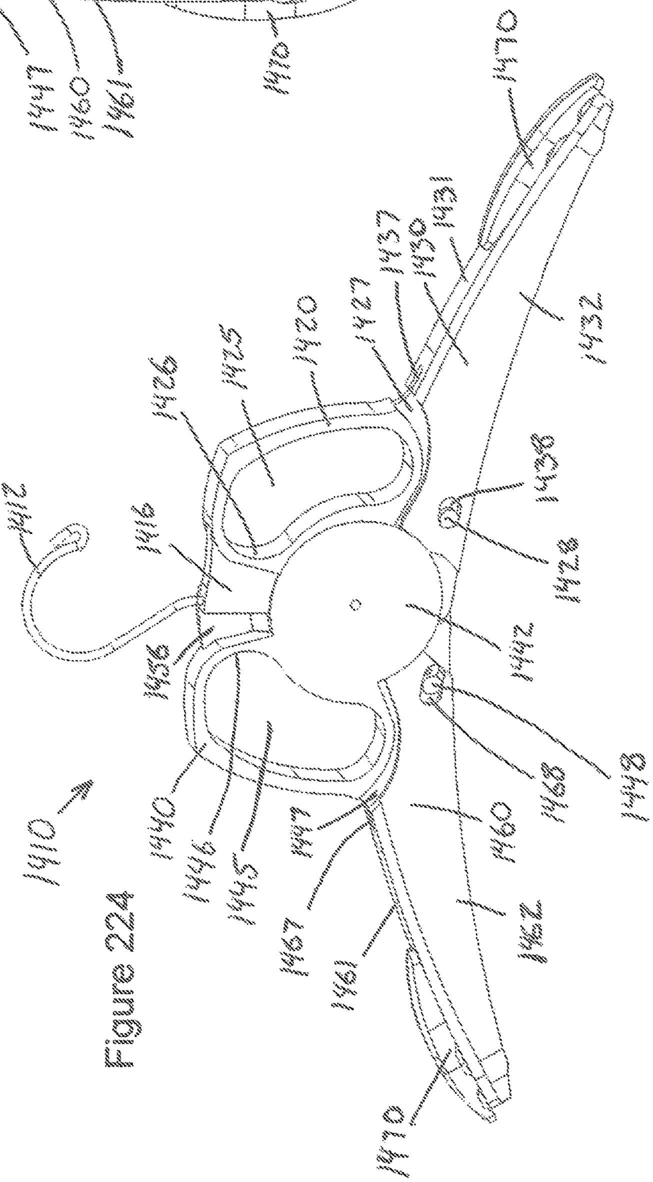

FIG. 224 is a front perspective view of a collapsing hanger assembly with the wings extended to an open position and the shoulder supports in a retracted position, according to an eighteenth embodiment.

Figure 225:
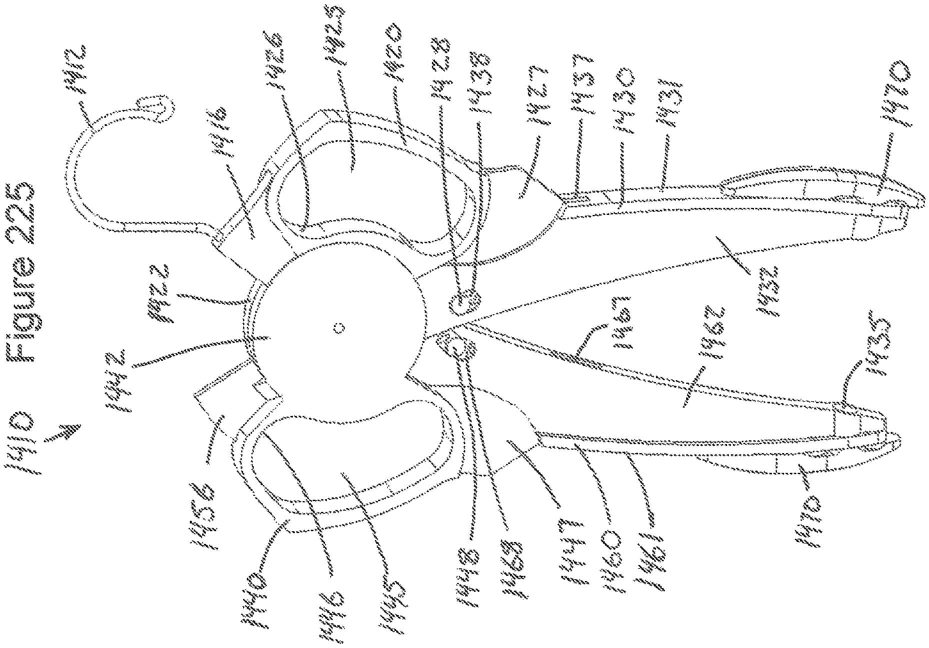

FIG. 225 is a front perspective view of the collapsing hanger assembly of FIG. 224, with the components repositioned to the collapsed configuration and the shoulder supports in a retracted position.

Figure 226:
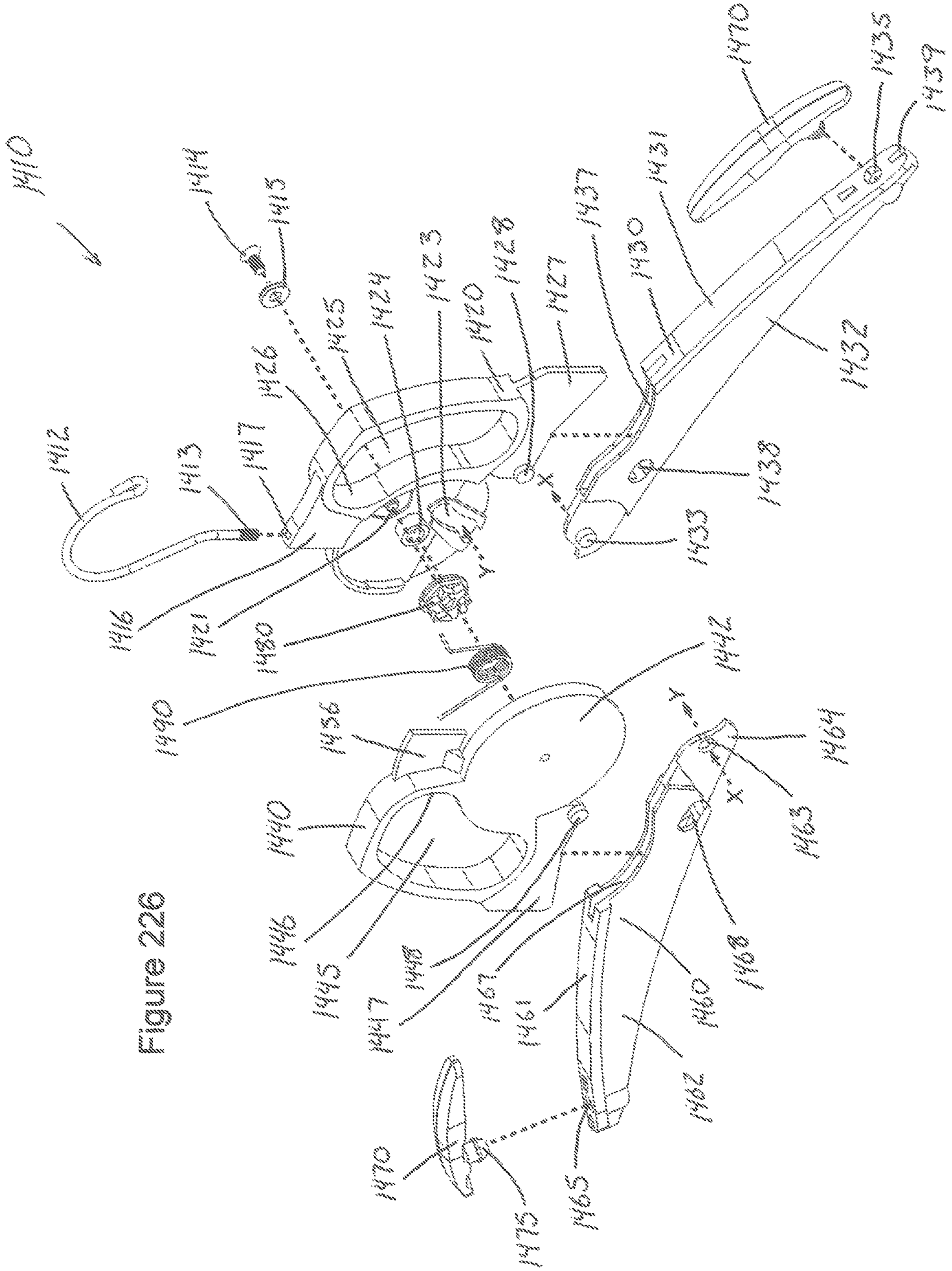

FIG. 226 is an exploded view of the collapsing hanger assembly of FIG. 224, as seen from a front upper perspective.

Figure 227:
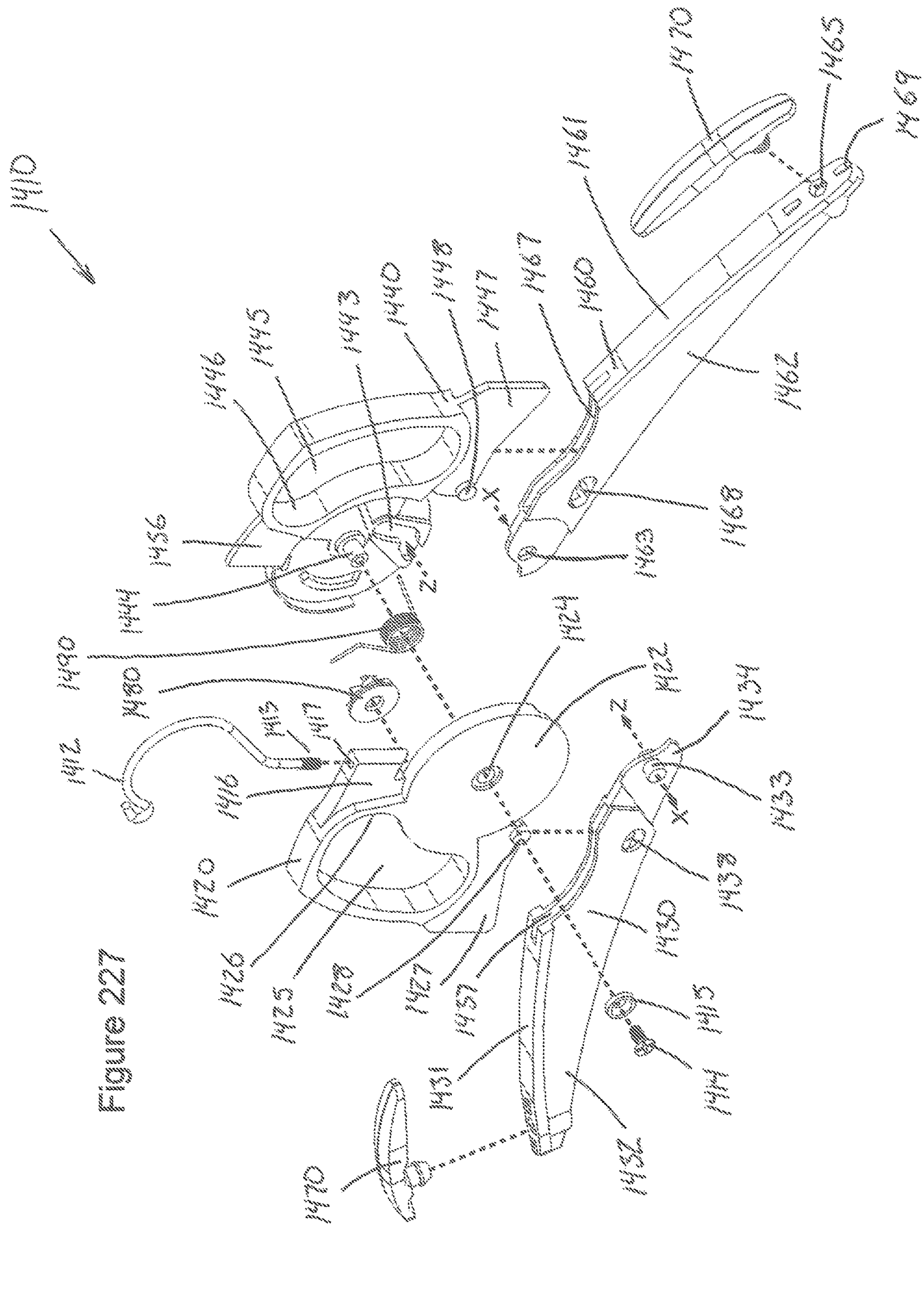

FIG. 227 is an exploded view of the collapsing hanger assembly of FIG. 224, as seen from a rear upper perspective.

Figure 228:
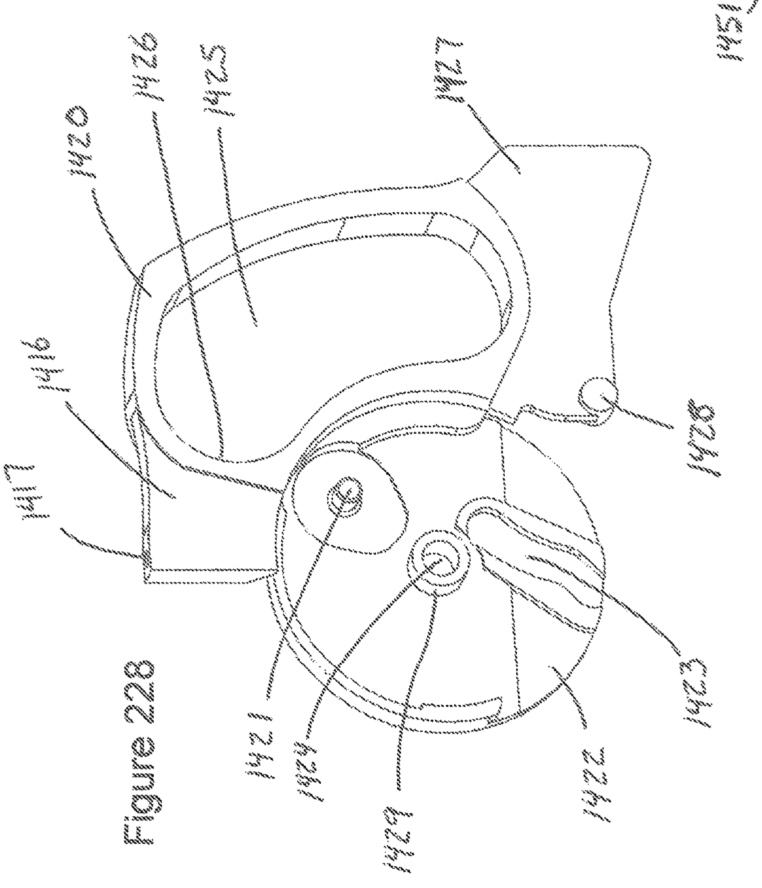

FIG. 228 is a front perspective view of the static hub member of the collapsing hanger assembly of FIG. 224.

Figure 229:
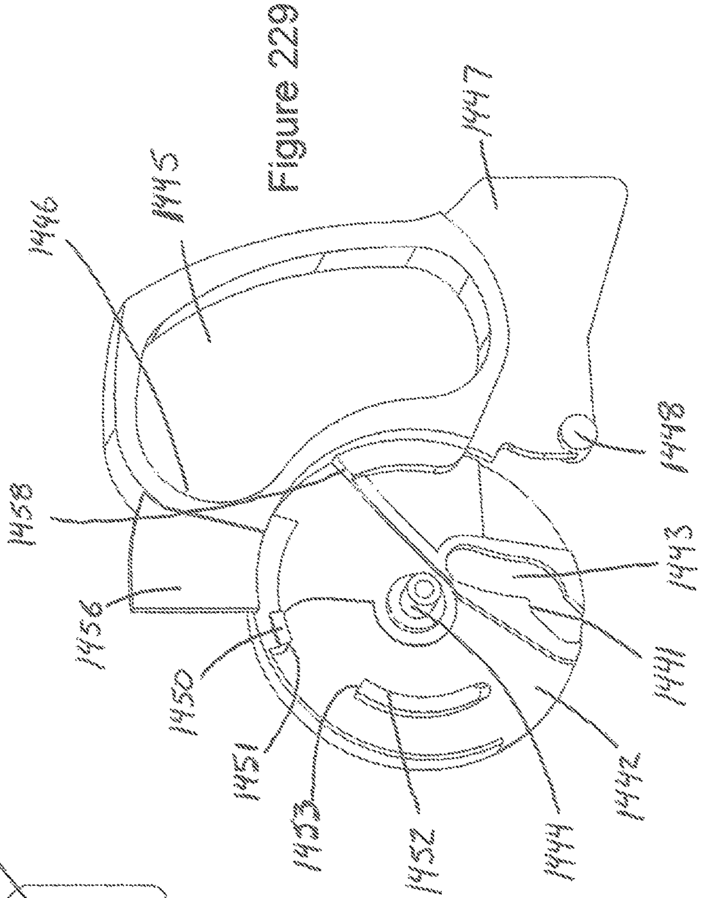

FIG. 229 is a rear perspective view of the moving hub member of the collapsing hanger assembly of FIG. 224.

Figure 230:
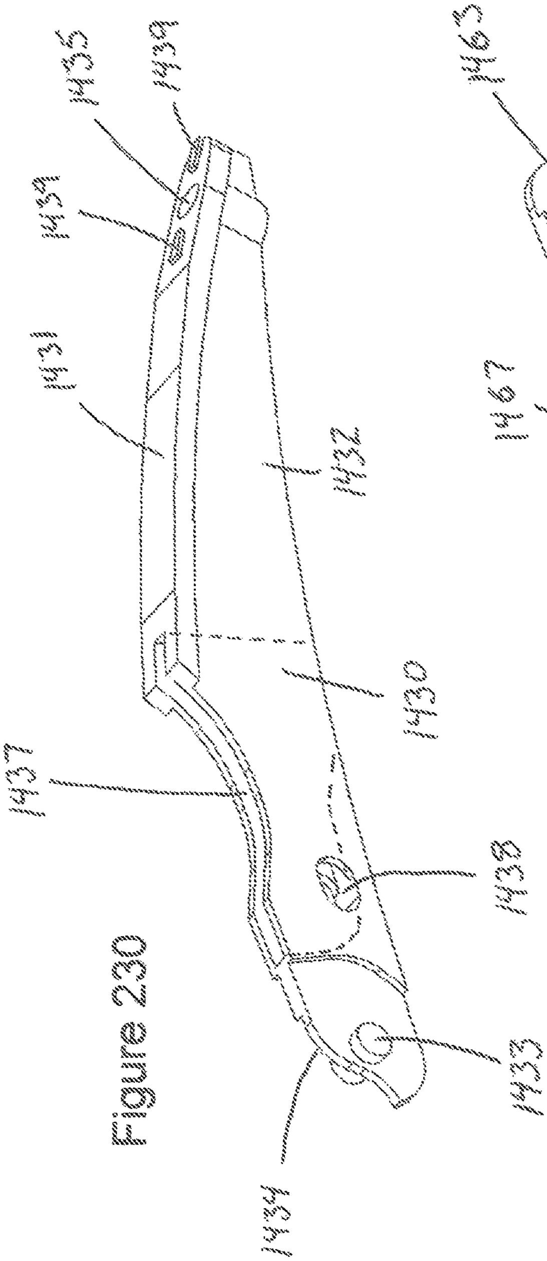

FIG. 230 is a front perspective view of the static side wing member of the collapsing hanger assembly of FIG. 224.

Figure 231:
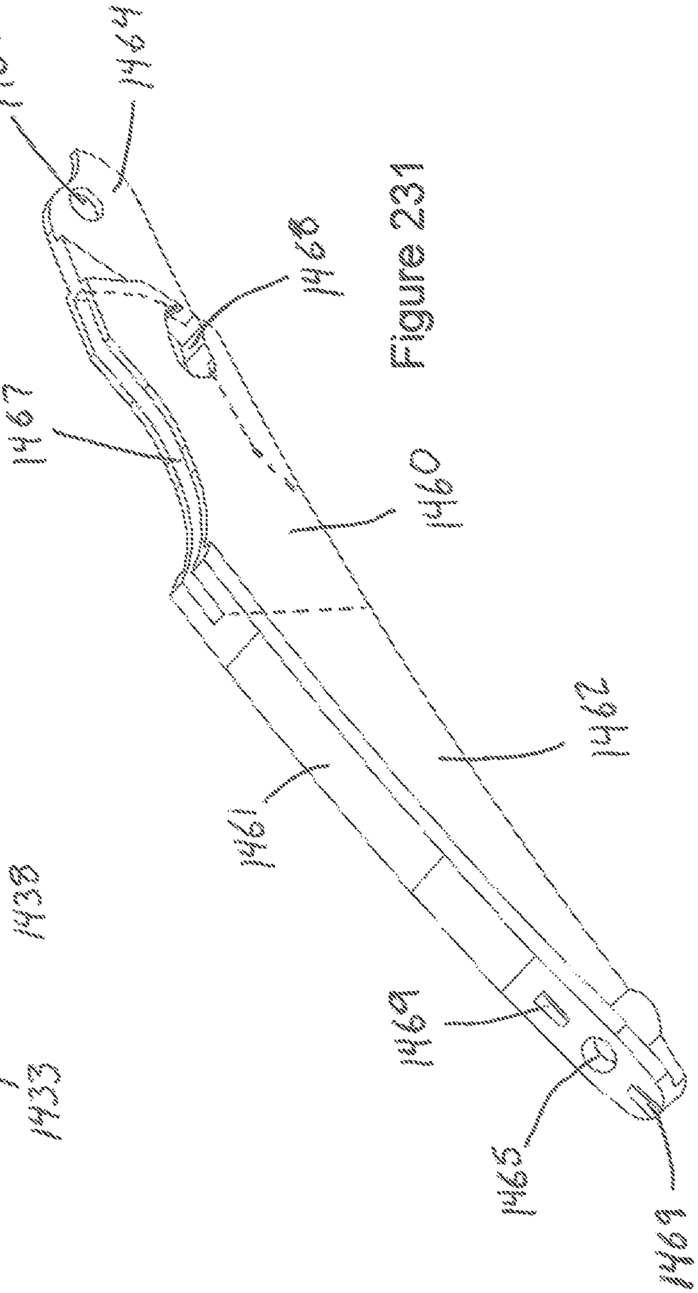

FIG. 231 is a front perspective view of the moving side wing member of the collapsing hanger assembly of FIG. 224.

Figures 232, 233A, 233B:
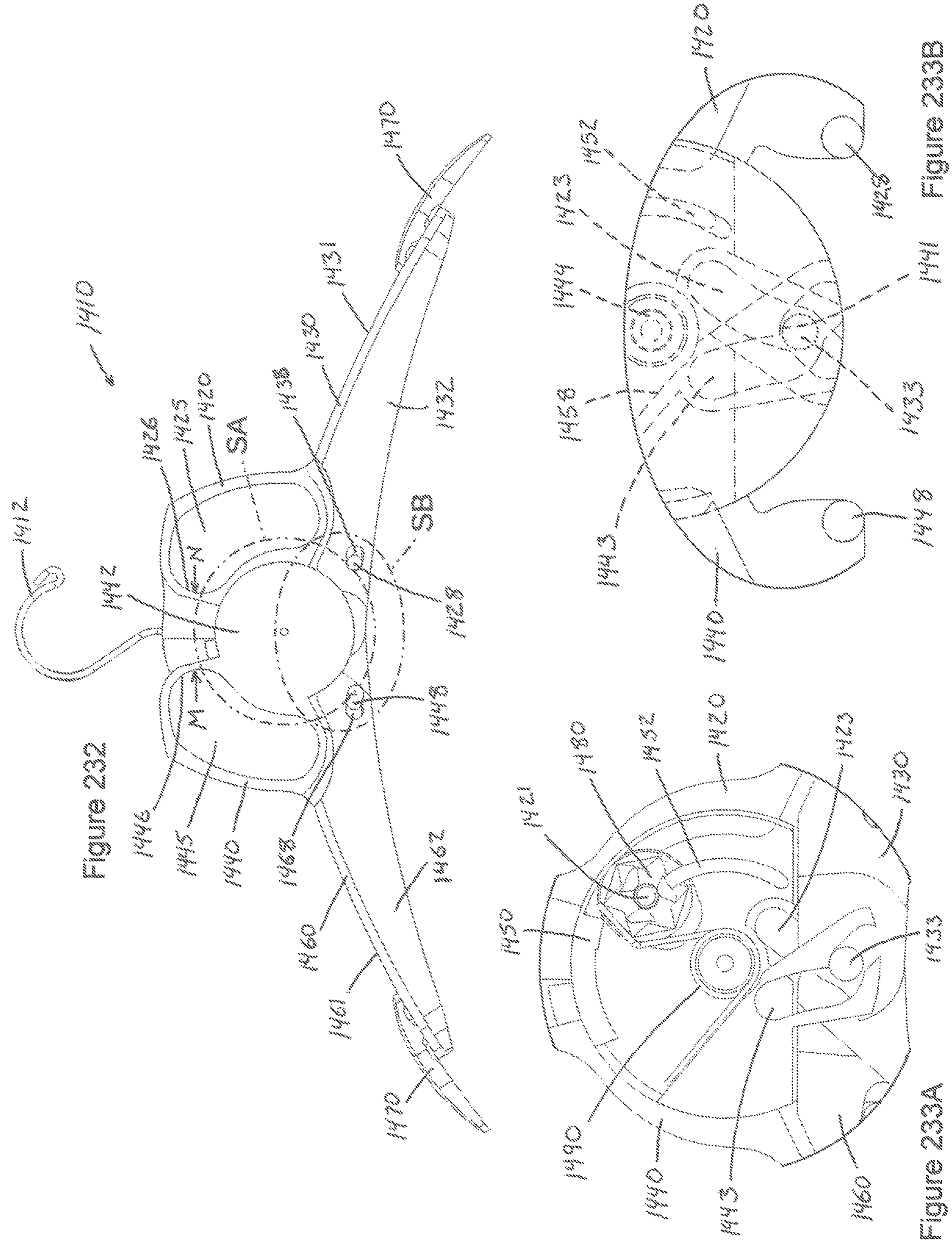

FIG. 232 is a front view of the collapsing hanger assembly of FIG. 224, with the wings extended to an open position and the shoulder supports in an extended position.

FIG. 233A is a close-up front view of the collapsing hanger in the area generally outlined by the circle SA in FIG. 232, with the moving hub wall removed so as to see the assembly portions behind.

FIG. 233B is a close-up front view of the hub members in the area generally outlined by the ellipse SB in FIG. 232, showing the internal features as hidden along with a representation of the position of the wing pivot pin.

Figure 234:
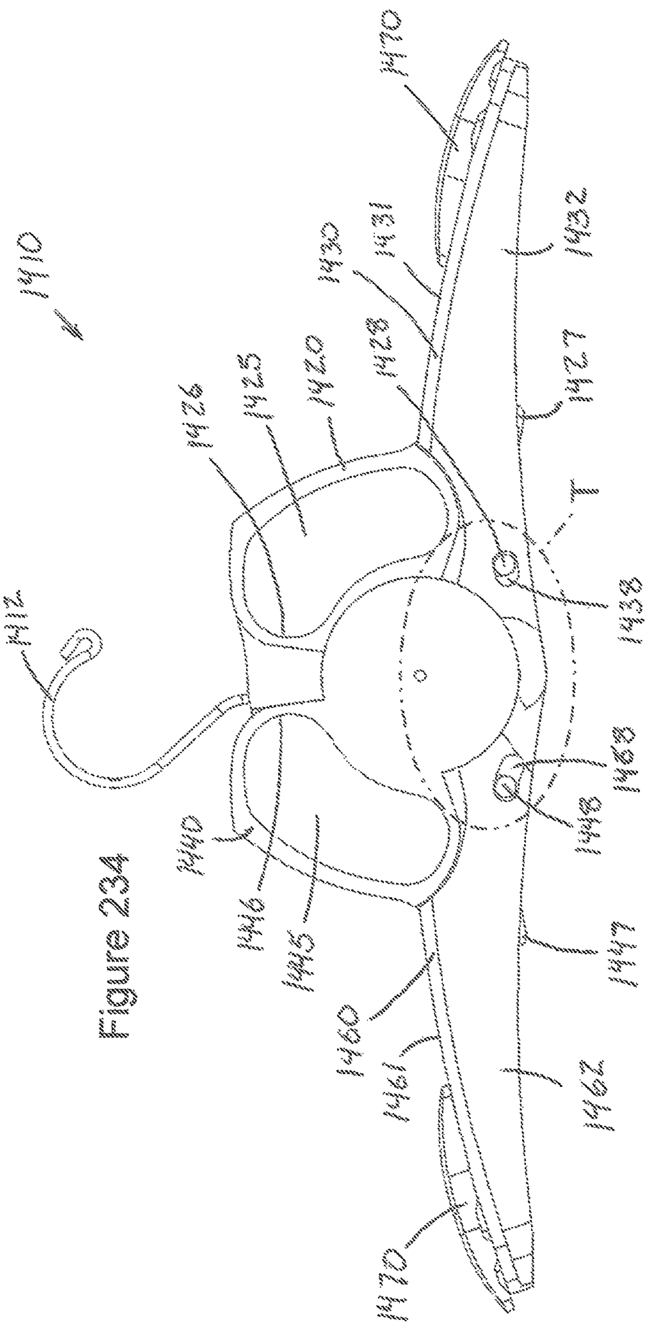

FIG. 234 is a front view of the collapsing hanger assembly of FIG. 224, with the components repositioned to the unlatching configuration and the shoulder supports in a retracted position.

Figure 235:
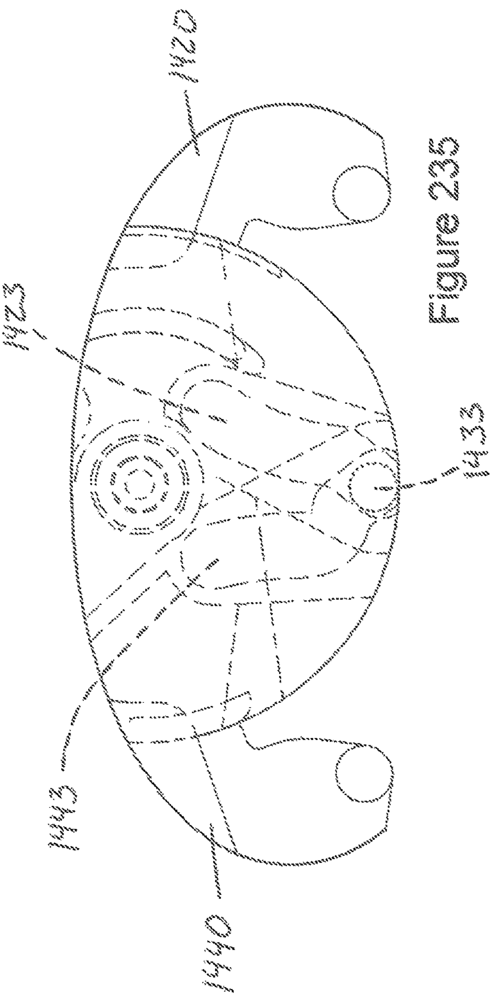

FIG. 235 is a close-up front view of the hub members in the area generally outlined by the ellipse T in FIG. 234, showing the internal features as hidden along with a representation of the position of the wing pivot pin.

Figure 236:
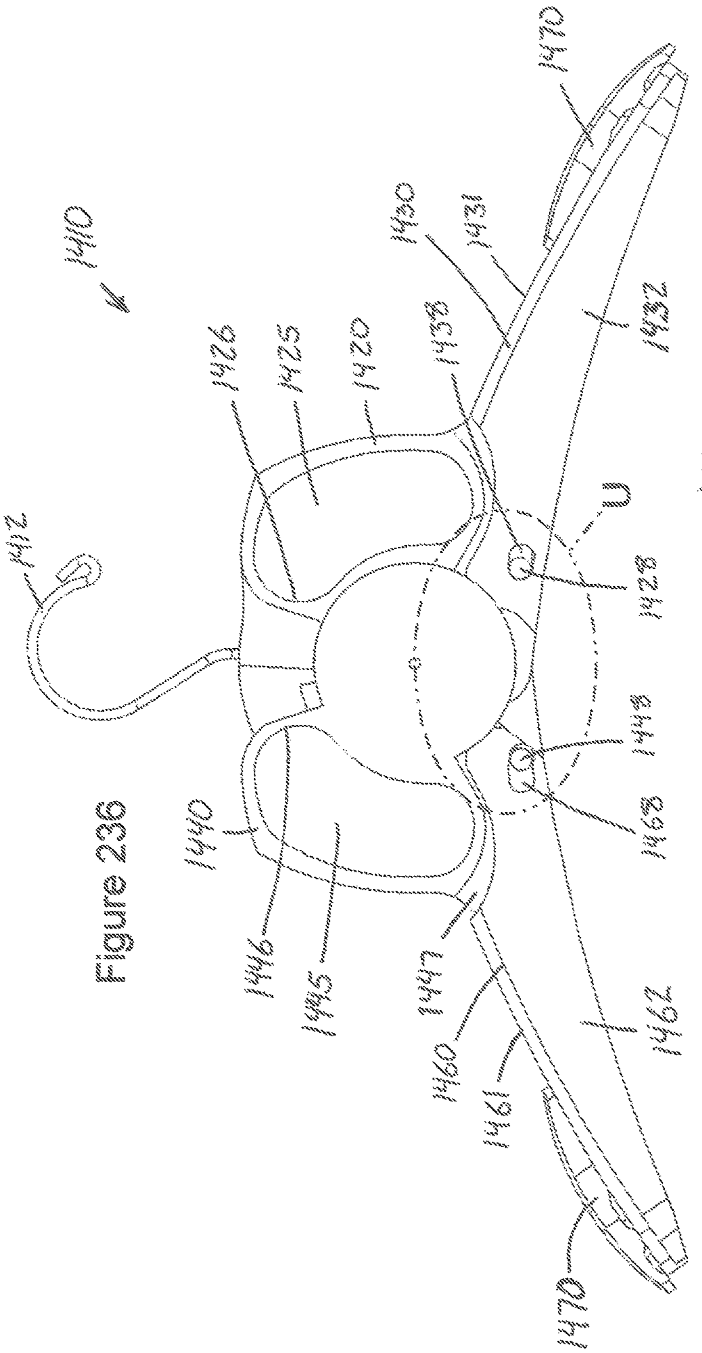

FIG. 236 is a front view of the collapsing hanger assembly of FIG. 224, with the components repositioned to a slightly collapsed configuration and the shoulder supports in a retracted position.

Figure 237:
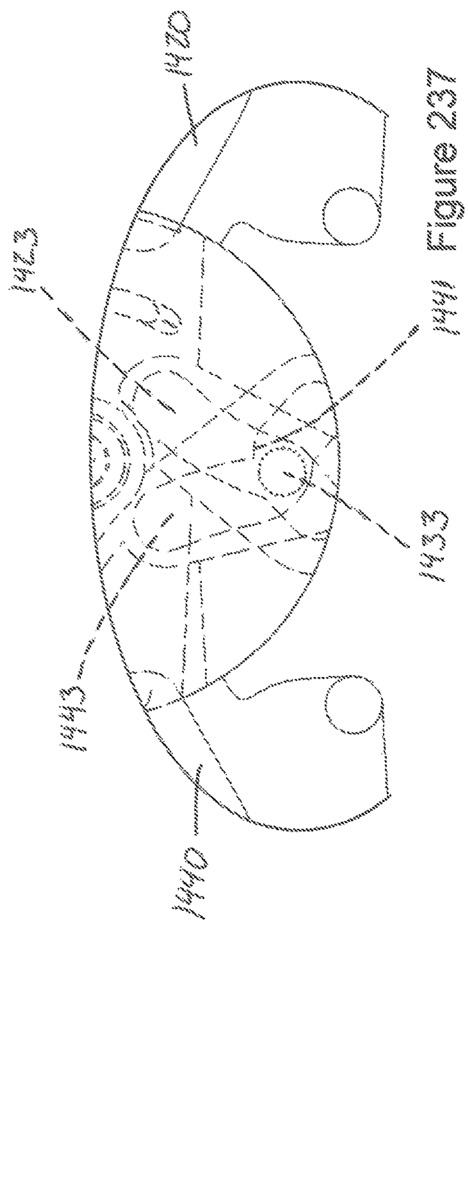

FIG. 237 is a close-up front view of the hub members in the area generally outlined by the ellipse U in FIG. 236, showing the internal features as hidden along with a representation of the position of the wing pivot pin.

Figures 238, 239:
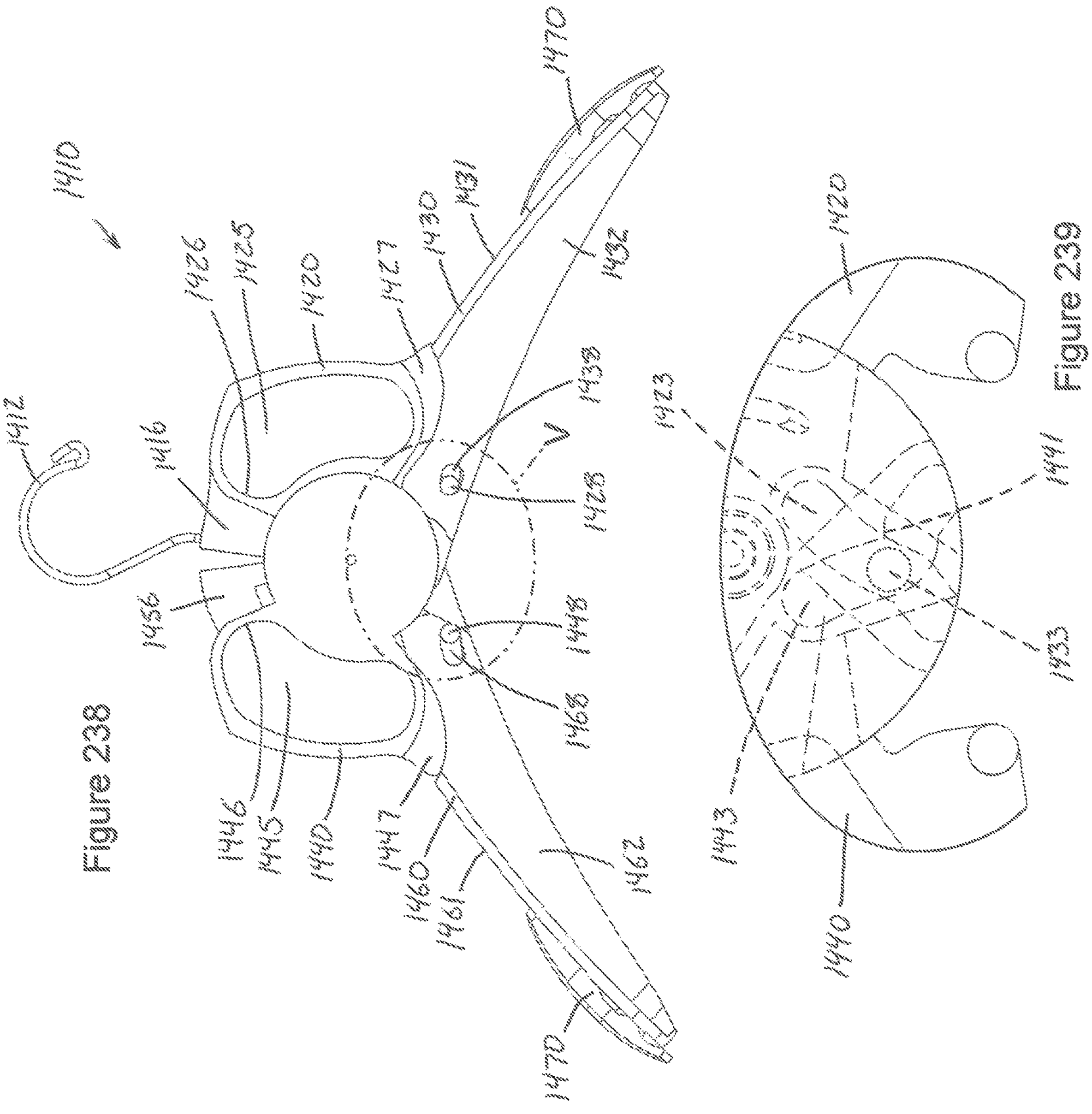

FIG. 238 is a front view of the collapsing hanger assembly of FIG. 224, with the components repositioned to an intermediate configuration and the shoulder supports in a retracted position.

FIG. 239 is a close-up front view of the hub members in the area generally outlined by the ellipse V in FIG. 238, showing the internal features as hidden along with a representation of the position of the wing pivot pin.

Figure 240:
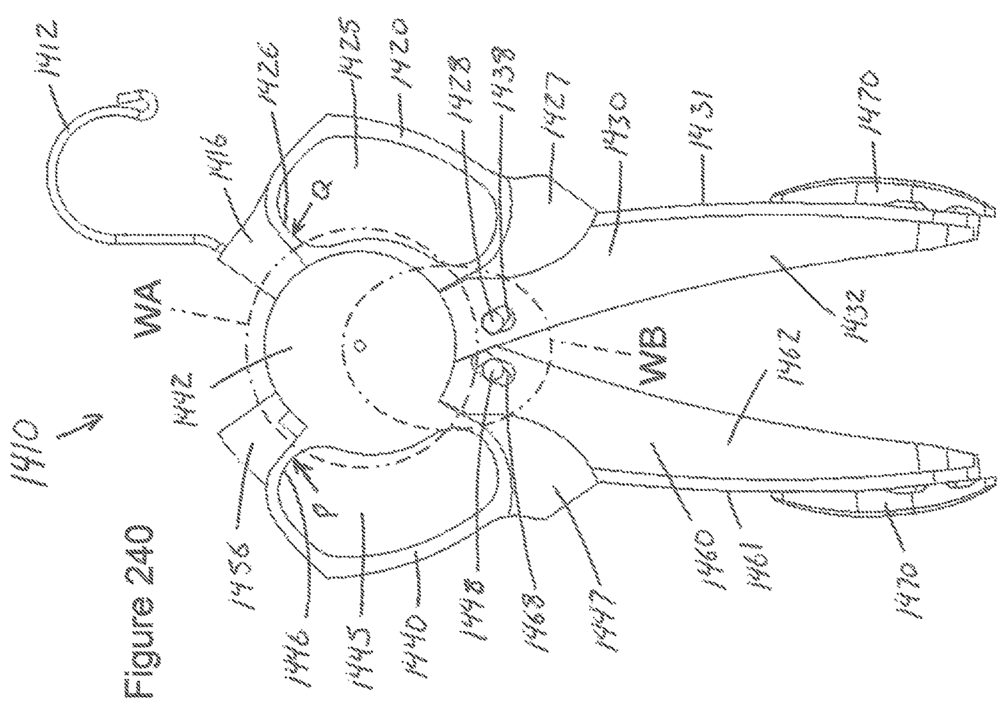

FIG. 240 is a front view of the collapsing hanger assembly of FIG. 224, with the components repositioned to the collapsed configuration and the shoulder supports in a retracted position.

Figure 241A:
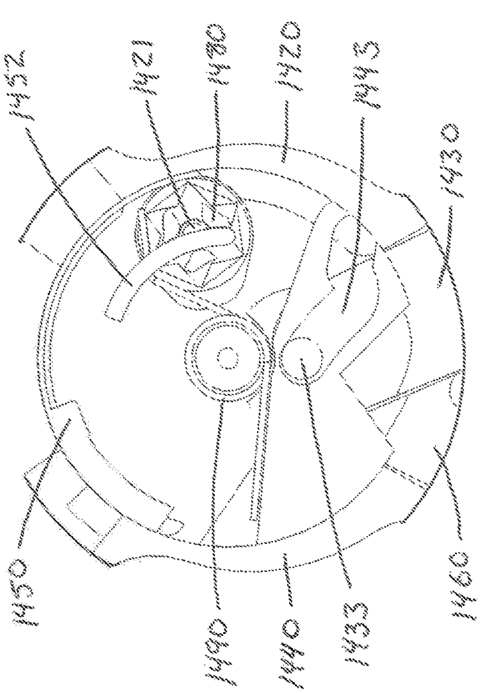

FIG. 241A is a close-up front view of the collapsing hanger in the area generally outlined by the circle WA in FIG. 232, with the moving hub wall removed so as to see the assembly portions behind.

Figure 241B:
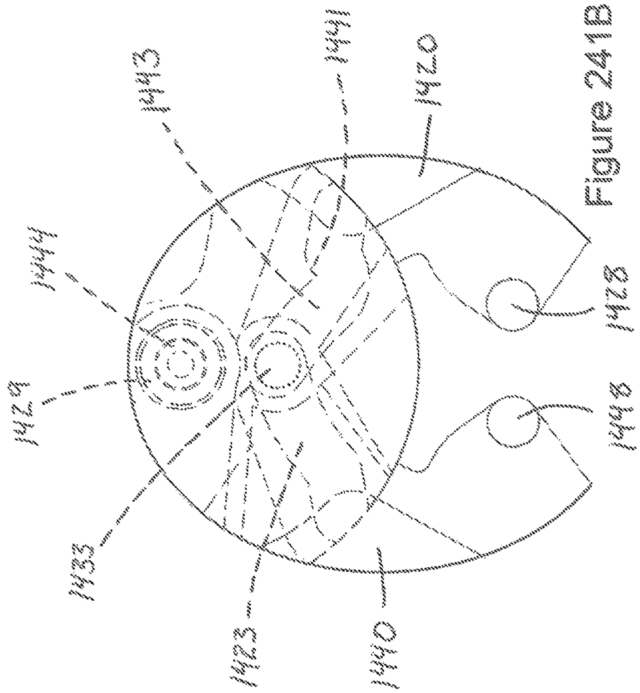

FIG. 241B is a close-up front view of the hub members in the area generally outlined by the ellipse WB in FIG. 240, showing the internal features as hidden along with a representation of the position of the wing pivot pin.

Figures 242, 243, 244, 245, 246, 247:
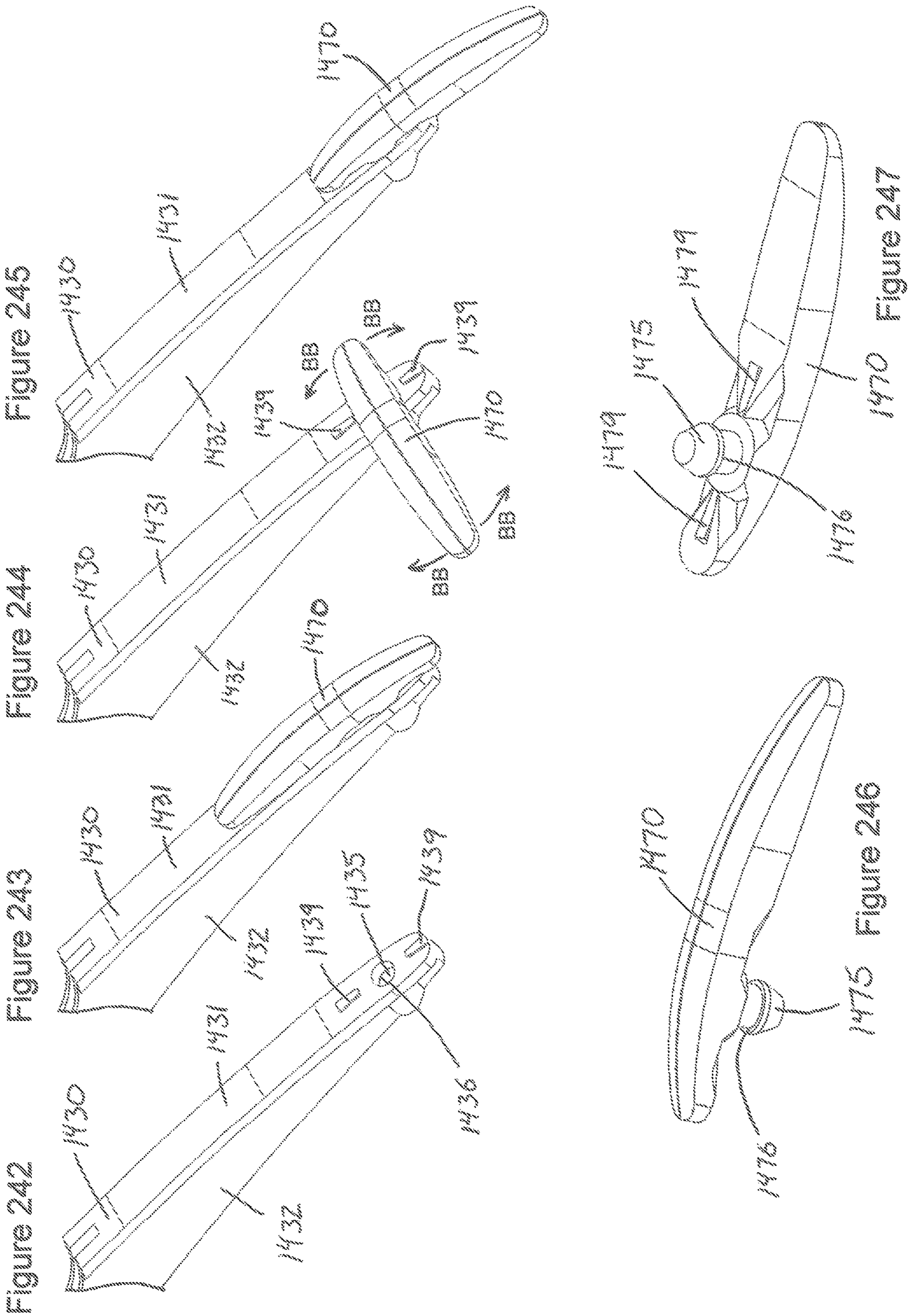

FIG. 242 is an upper perspective view of the tip portions of the static side wing of FIG. 224, with the shoulder support removed.

FIG. 243 is an upper perspective view of the tip portions of the static side wing of FIG. 224, with the shoulder support in a retracted position.

FIG. 244 is an upper perspective view of the tip portions of the static side wing of FIG. 224, with the shoulder support pivoted between the retracted and extends positions.

FIG. 245 is an upper perspective view of the tip portions of the static side wing of FIG. 224, with the shoulder support in an extended position.

FIG. 246 is an upper-side perspective view of the shoulder support of FIG. 224.

FIG. 247 is a lower perspective view of the shoulder support of FIG. 224.

Figure 248:
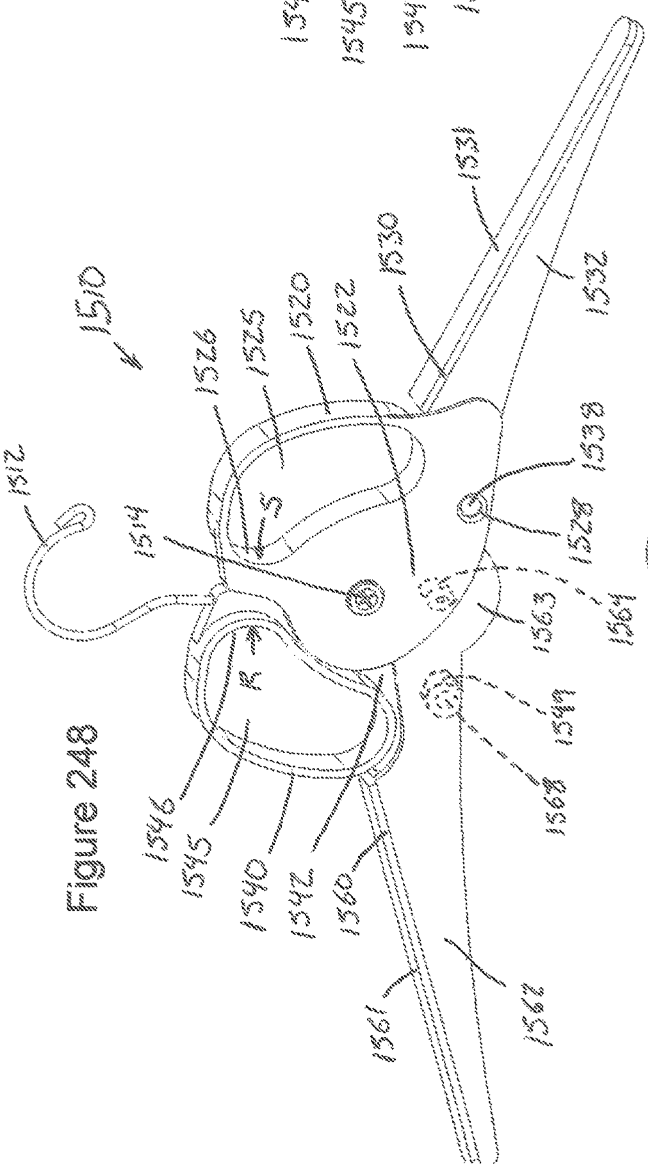

FIG. 248 is a front perspective view of a collapsing hanger assembly with the wings extended to an open position, according to a nineteenth embodiment.

Figure 249:
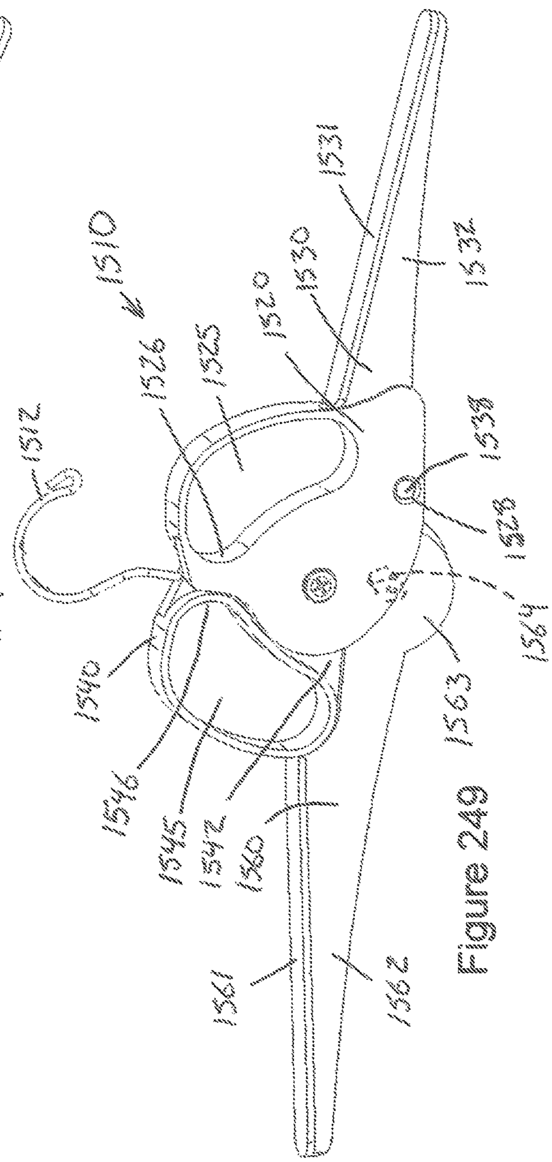

FIG. 249 is a front perspective view of the collapsing hanger assembly of FIG. 248, with the components repositioned to the unlatching configuration.

Figure 250:
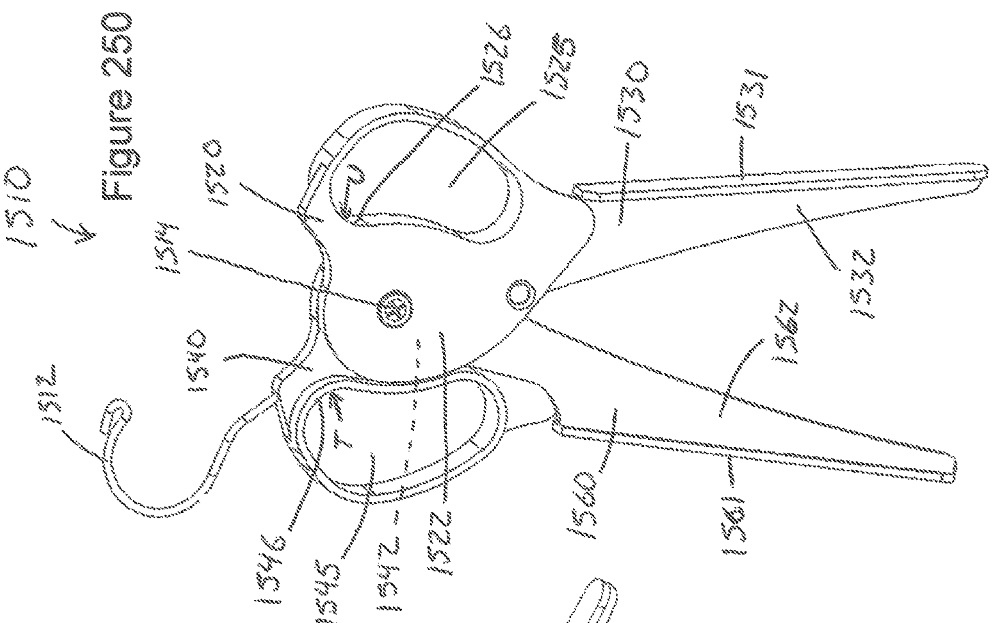

FIG. 250 is a front perspective view of the collapsing hanger assembly of FIG. 248, with the components repositioned to the collapsed configuration.

Figure 251:
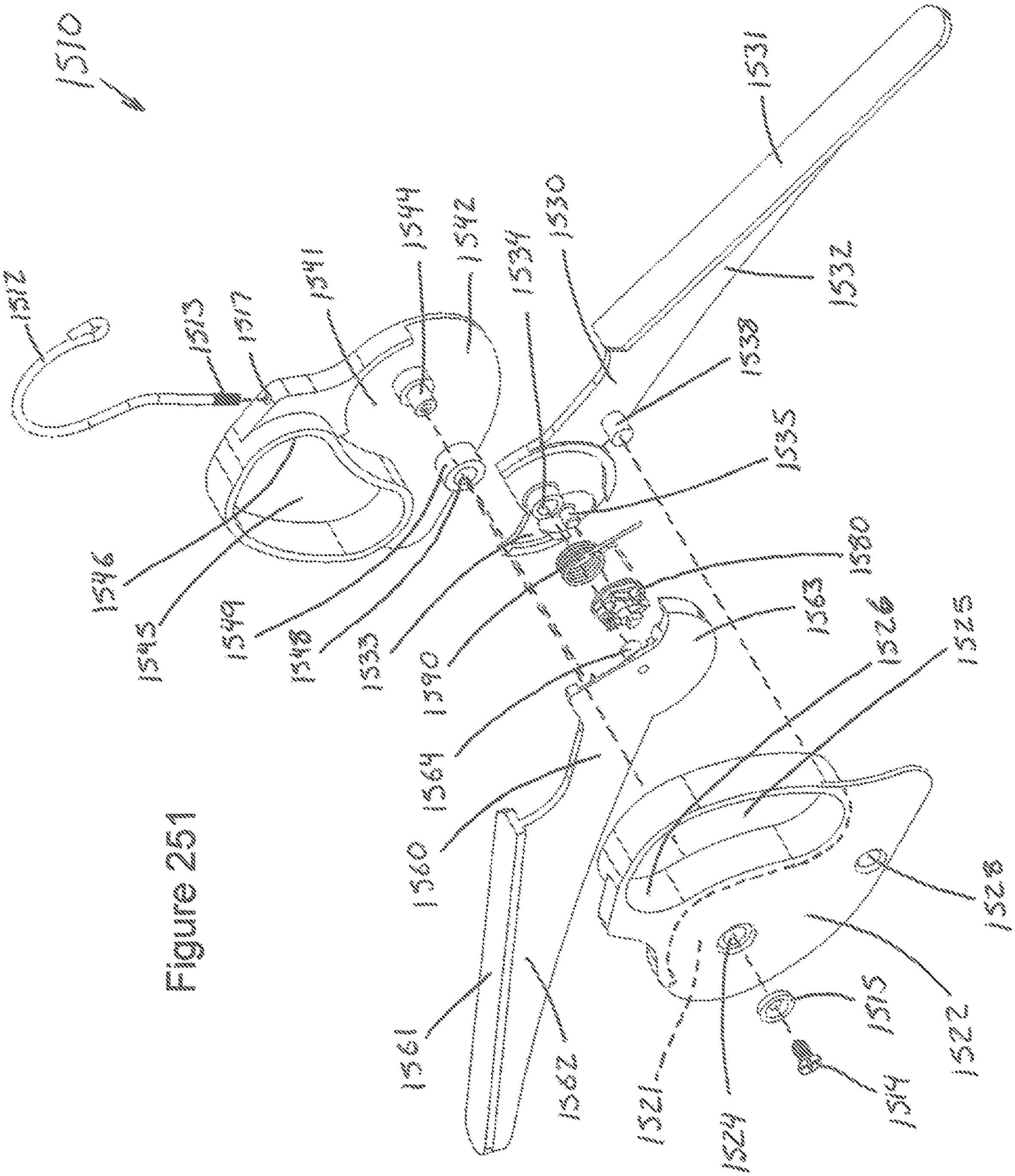

FIG. 251 is an exploded view of the collapsing hanger assembly of FIG. 248, as seen from a front upper perspective.

Figure 252:
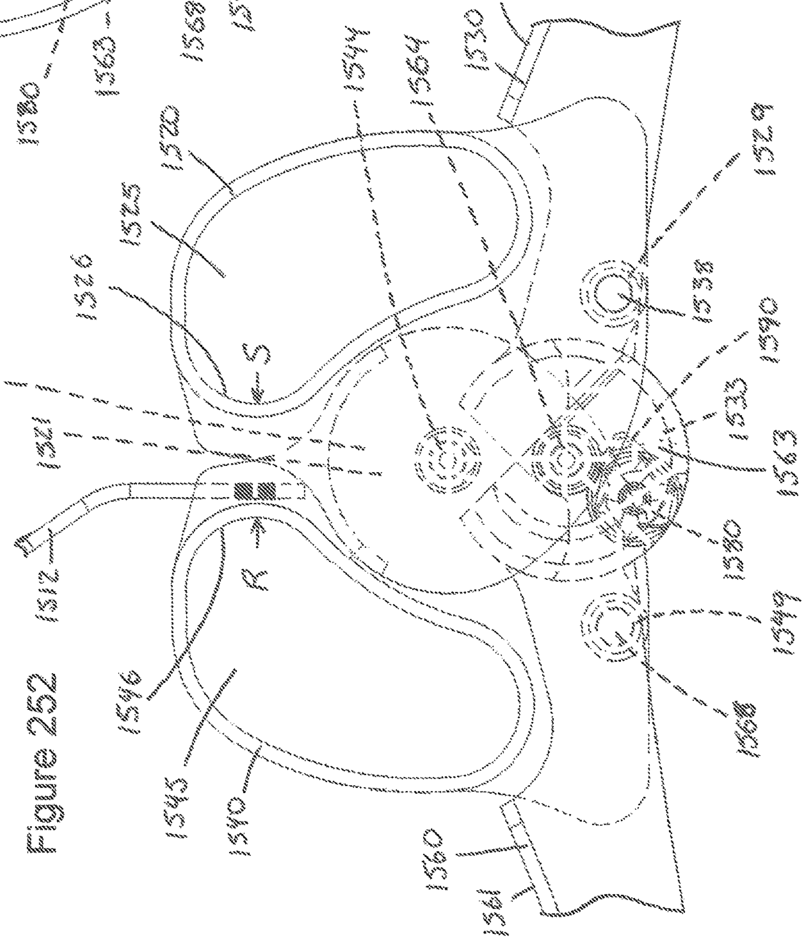

FIG. 252 is a close-up front view of the central portion of the collapsing hanger assembly of FIG. 248 in the wings extended configuration, and many of the internal features shown as hidden.

Figure 253:
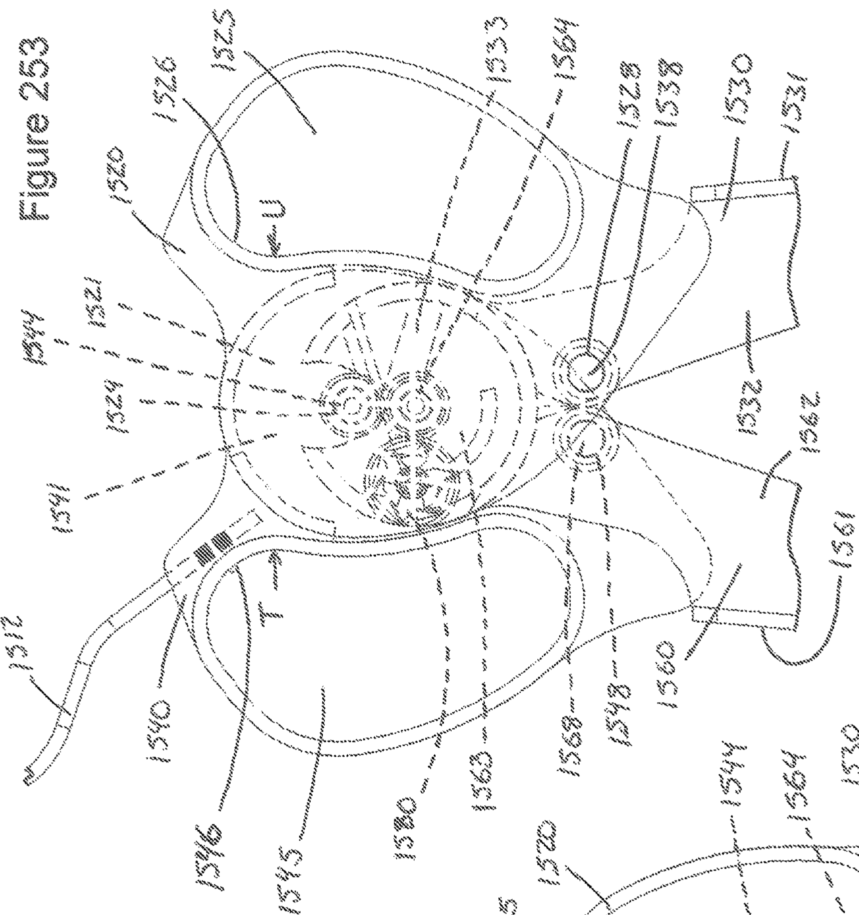

FIG. 253 is a close-up front view of the central portion of the collapsing hanger assembly of FIG. 248 in the wings collapsed configuration, and many of the internal features shown as hidden.

Figure 254:
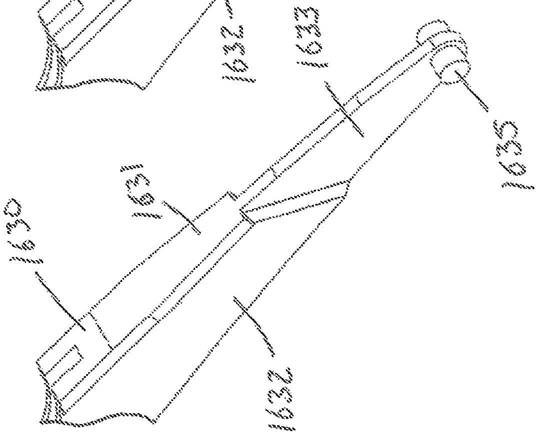

FIG. 254 is an upper perspective view of the tip portions of an example wing and should support according to a twentieth embodiment, with the shoulder support removed.

Figure 255:
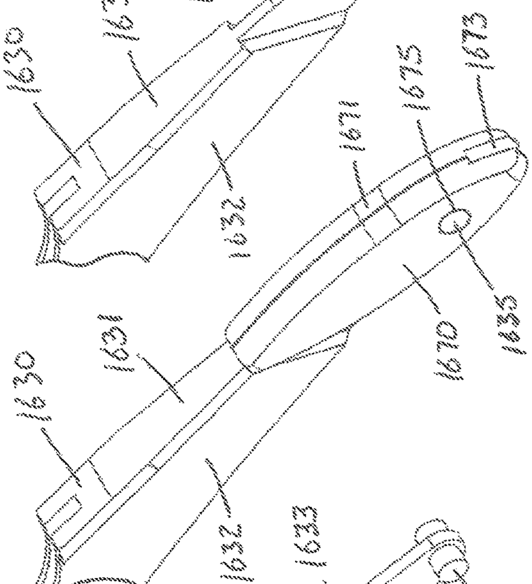

FIG. 255 is an upper perspective view of the tip portions of the wing and shoulder support of FIG. 254, with the shoulder support in a retracted position.

Figure 256:
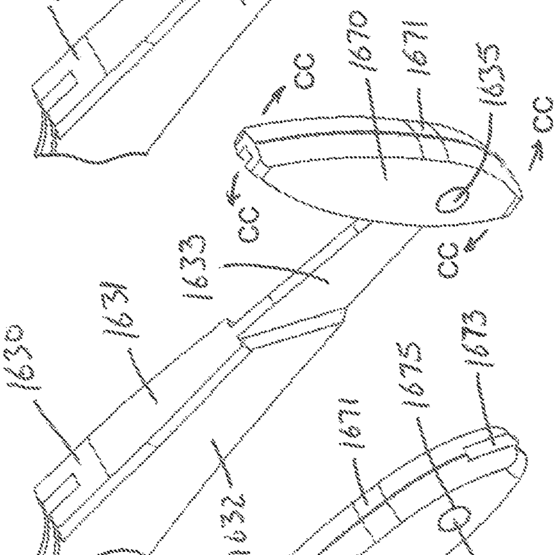

FIG. 256 is an upper perspective view of the tip portions of the wing and shoulder support of FIG. 254, with the shoulder support pivoted between the retracted and extends positions.

Figure 257:
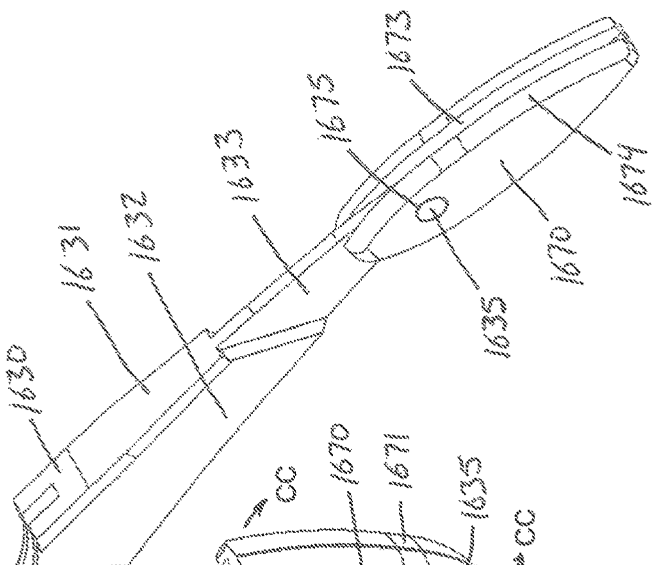

FIG. 257 is an upper perspective view of the tip portions of the wing and shoulder support of FIG. 254, with the shoulder support in an extended position.

Figure 258:
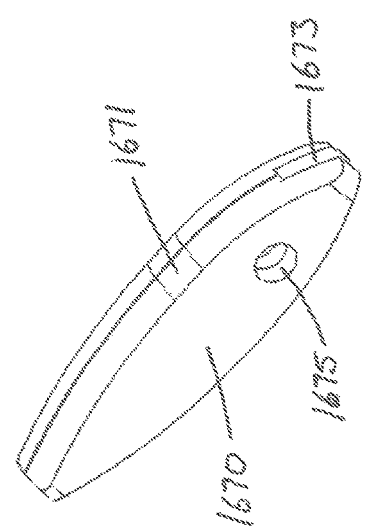

FIG. 258 is a retracted upper-side perspective view of the shoulder support of FIG. 255.

Figure 259:
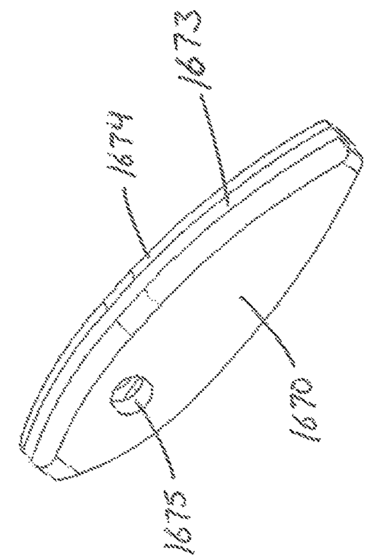

FIG. 259 is an extended upper-side perspective view of the shoulder support of FIG. 257.

DETAILED DESCRIPTION OF EMBODIMENTS OF THE INVENTION

The following are descriptions of form and operation of various embodiments of the single hand operated collapsing hanger. For the purpose of understanding functionality, it should be understood that the terms up, opened, extended, expanded, erected, and raised, etc. in their various tenses are intended to have the same general meaning when referring to the position(s) of the hanger wing(s). Likewise, the terms down, closed, lowered, collapsed, folded, and dropped, etc. in their various tenses are intended to have the same general meaning when referring to the position(s) of the hanger wing(s).

Figure 1:
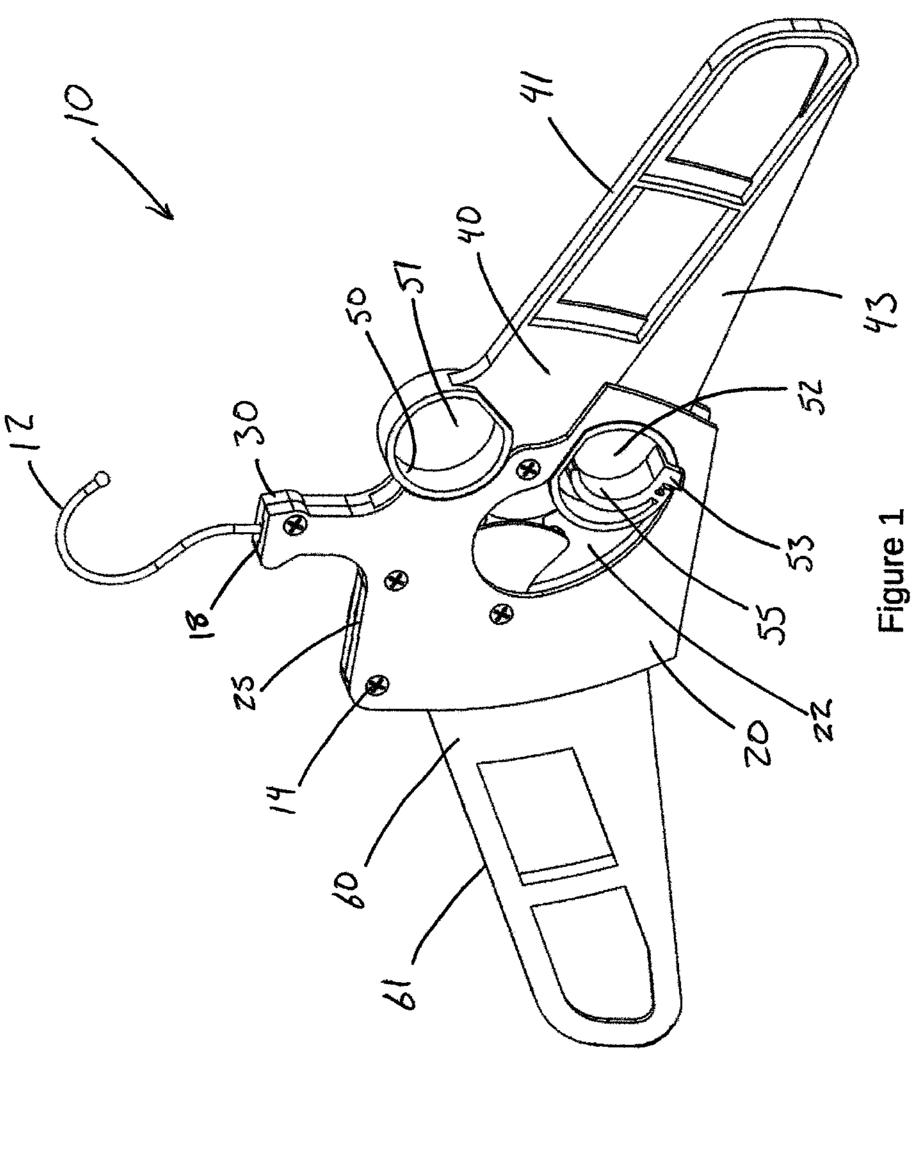
FIG. 1 is a perspective view of the collapsing hanger assembly with the wings extended to an open position.

FIG. 1 is a perspective view of an example single hand operated collapsing hanger 10, in its expanded configuration. The embodiment shown in FIG. 1 generally includes a hanging hook 12, a frame 18, a first wing 40 having a first garment support surface 41, and a second wing 60 having a second garment support surface 61. The wings 40, 60 are pivotably attached to the frame 18. In this example embodiment, the frame 18 is formed of two separate pieces, a front frame section 20 and a rear frame section 30, connected together such as by screws 14 (or adhesive, welding, snap-fit connections, etc). Alternatively, the frame 18 could be formed as one piece.

Figure 2:
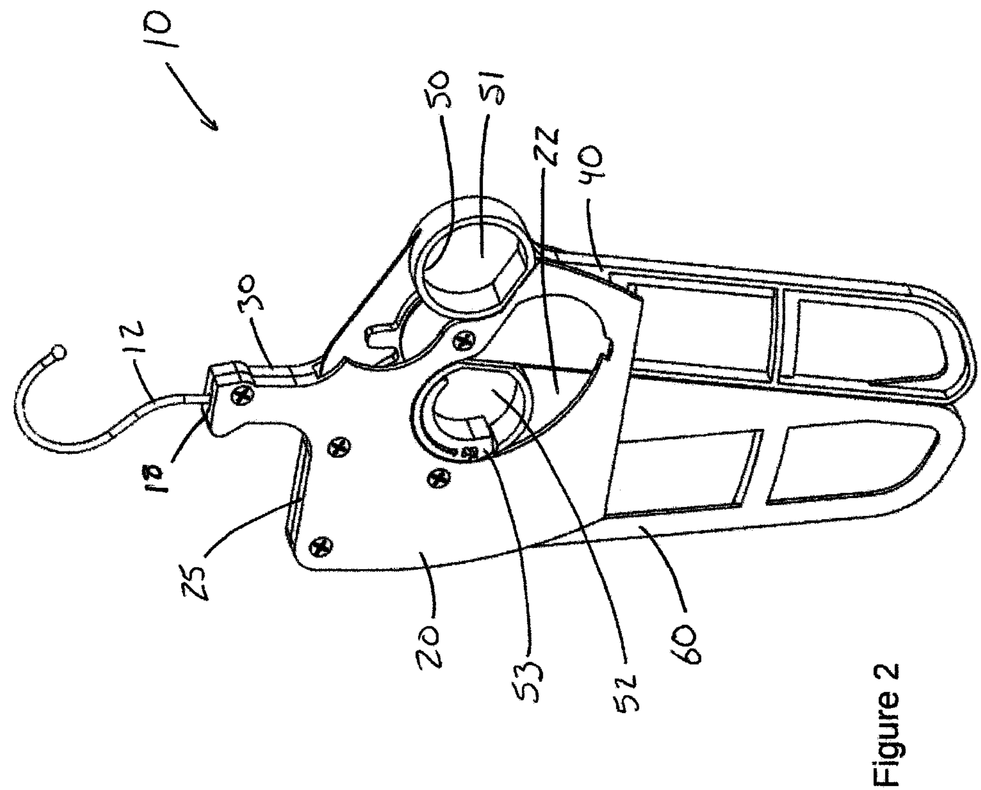
FIG. 2 is a perspective view of the collapsing hanger assembly with the wings folded down to a closed position.

In this embodiment the hook 12 is formed of metal, with the frame sections 20, 30 and the wings 40, 60 formed of polymer, such as thermoplastic. Alternatively, the hook could be integrally formed as part of the frame 18 or one of the wings 40, 60. The first wing 40 includes a lift handle 50, which may be formed integrally therewith. The first wing 40 has an offset lower wing section 43. A palm rest 25 is formed at an upper surface of the frame 18 adjacent the second wing 60. A latch 53 allows for the first wing 40 to be locked into place relative to the frame 18, and a trigger 55 allows for a finger or fingers to be placed thereon and depressed to unlock the first wing 40 from the frame 18. A kidney-shaped latch box clearance channel 22 in the frame 18 provides access to the trigger 55. As will be explained below, openings 51, 52 allow for the placement of fingers in position to raise or lower the wings FIG. 2 is a perspective view of the hanger 10 in the collapsed, or folded, configuration. The wings 40, 60 are pivoted downward around separate axes, relative to their positions in FIG. 1, allowing for the assembly to have a much smaller horizontal span. As shown, the offset lower wing section 43 of the first wing 40 overlaps with a portion of the second wing 60. The latch and finger opening 52 have moved within the channel 22 to a closer position to the palm rest 25. The lift handle 50 and finger opening 51 are in a position further from palm rest 25 relative to their positions in FIG. 1.

Figure 3:
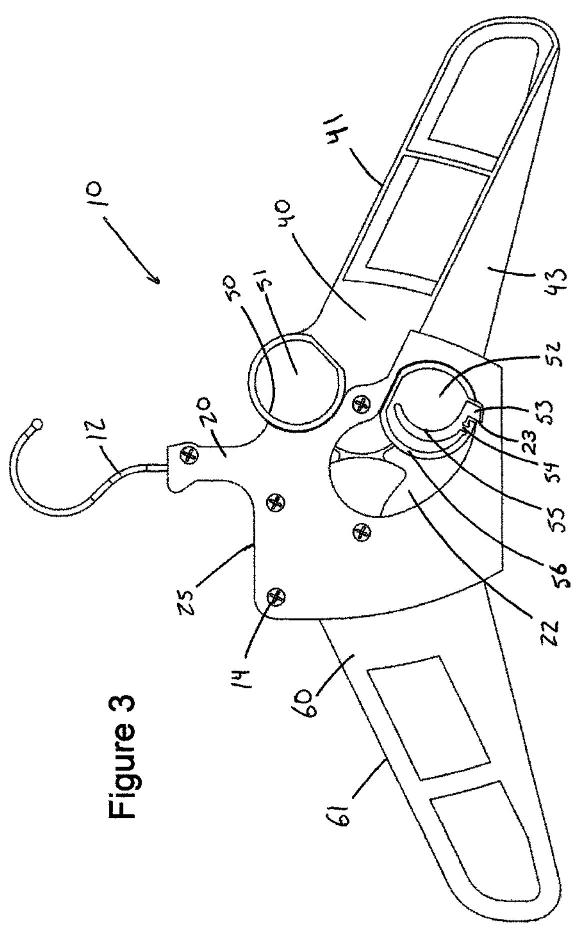
FIG. 3 is a front view of the collapsing hanger assembly.

FIG. 3 is a front view of the hanger 10 in its expanded configuration. The frame 18 has the clearance channel 22 and a latch catch 23 adjacent the trigger 55. The latch box 56, at least partially surrounding the trigger 55, is also integrally formed as part of the first wing 40, and contains the finger opening 52, a latch 53, a flexing member 54, and the trigger 55. The flexing member 54 connects the trigger 55 and permits the trigger 55 and latch 53 to pivot relative to the rest of the first wing 40 within the latch box 56.

When a garment is hanging on the hanger 10 in this configuration, it will exact downward force at the support surfaces 41, 61 which will be offset by the latch 53 being locked into the latch catch 23, thus resisting the tendency for the wings 40, 60 to pivot about their mounts.

Figure 4:
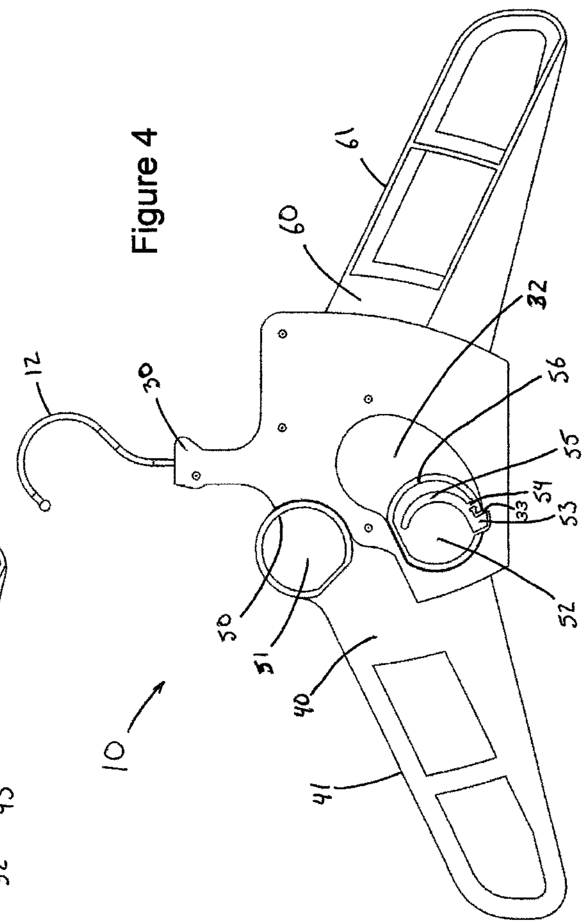
FIG. 4 is a back view of the collapsing hanger assembly.

FIG. 4 is a back view of the hanger 10 in its expanded configuration.

Figure 5:
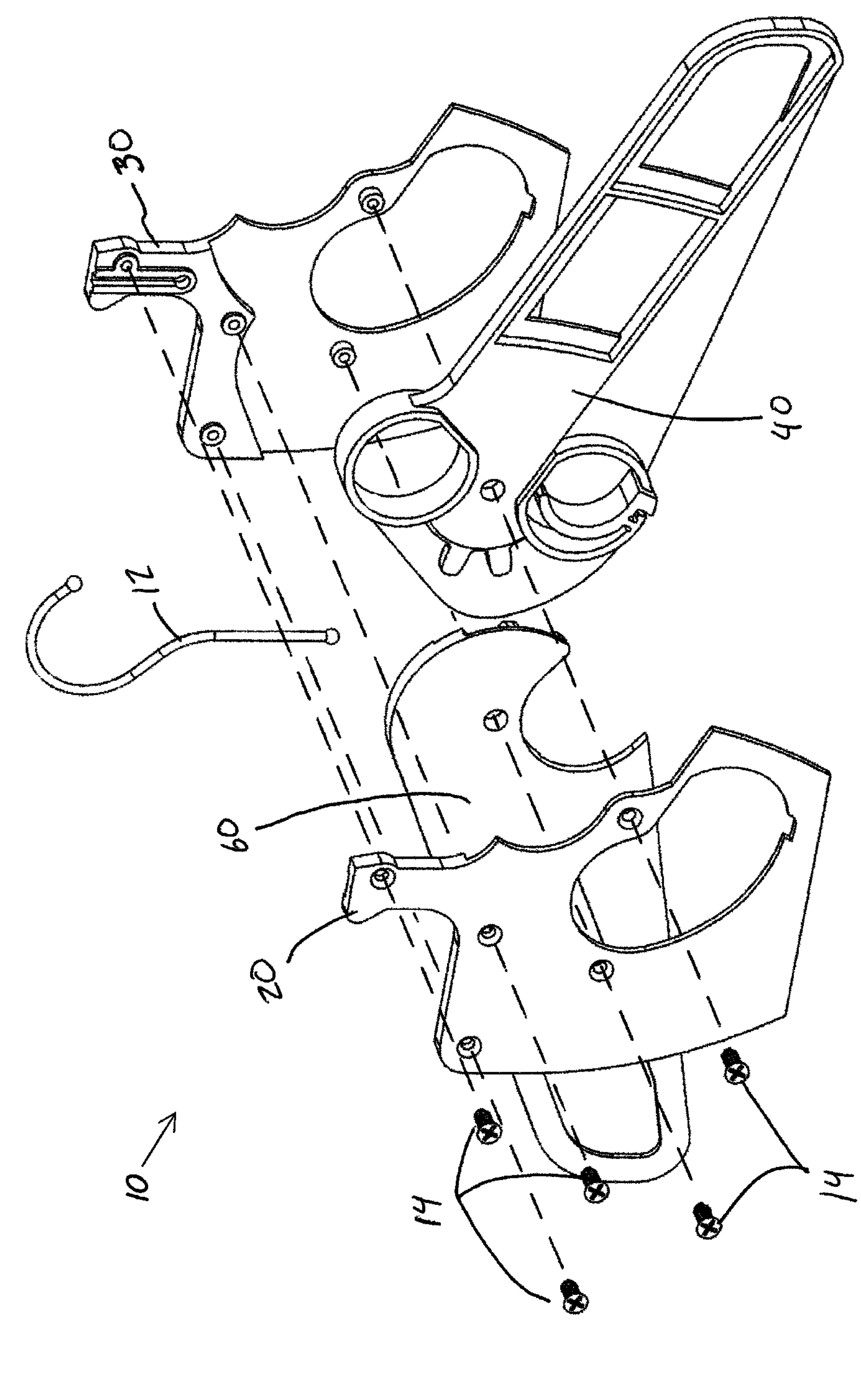
FIG. 5 is an exploded view of the collapsing hanger assembly.

FIG. 5 is an exploded perspective view of the hanger 10 in its expanded configuration. Heavy dashed lines show the alignments of the various components in the assembly. The screws 14 are used to affix the front frame section 20 to the back frame section 30, with the hook 12, first wing 40, and second wing 60 sandwiched in between.

Figure 6:
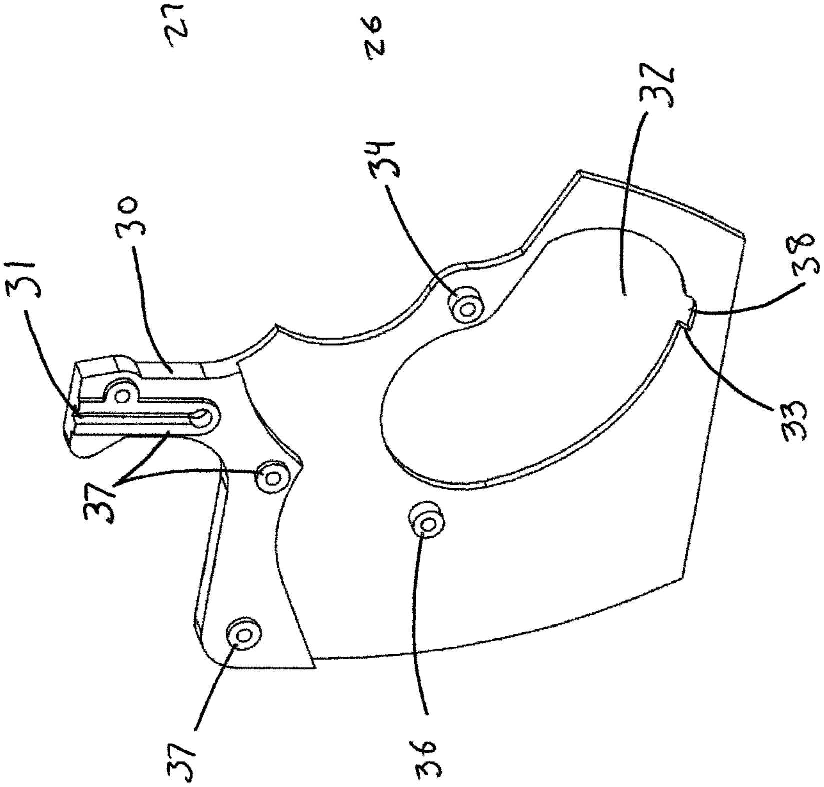
FIG. 6 is a perspective view of the back frame section.

FIG. 6 is a front perspective view of the rear frame section 30. A channel 31 is present to allow for the reception of the hook 12 (FIG. 5). A latch box clearance channel 32 has the latch catch 33 and latch clearance feature 38 formed into its lower surface. A first pivot boss 34 and second pivot boss 36 will align with corresponding features 24, 36 on the front frame section 20 (FIG. 7) to support the wings 40, 60 (FIG. 5). Assembly alignment features 37 are integrally formed into the rear frame section 30.

Figure 7:
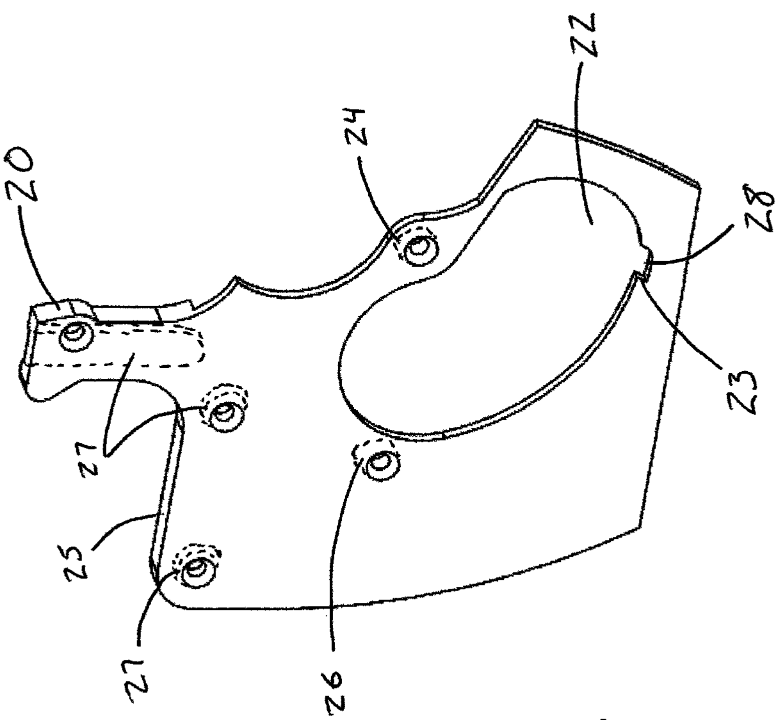
FIG. 7 is a perspective view of the front frame section.

FIG. 7 is a front perspective view of the front frame section 20. A latch box clearance channel 22 has the latch catch 23 and latch clearance feature 28 formed into its lower surface. A first pivot boss 24 and second pivot boss 26 (shown with hidden lines) will align with corresponding features 34, 36 on the rear frame section 30 (FIG. 6) to support the wings 40, 60 (FIG. 5). Assembly alignment pockets 27 are integrally formed into the front frame section 20 (shown with hidden lines).

Figure 8:
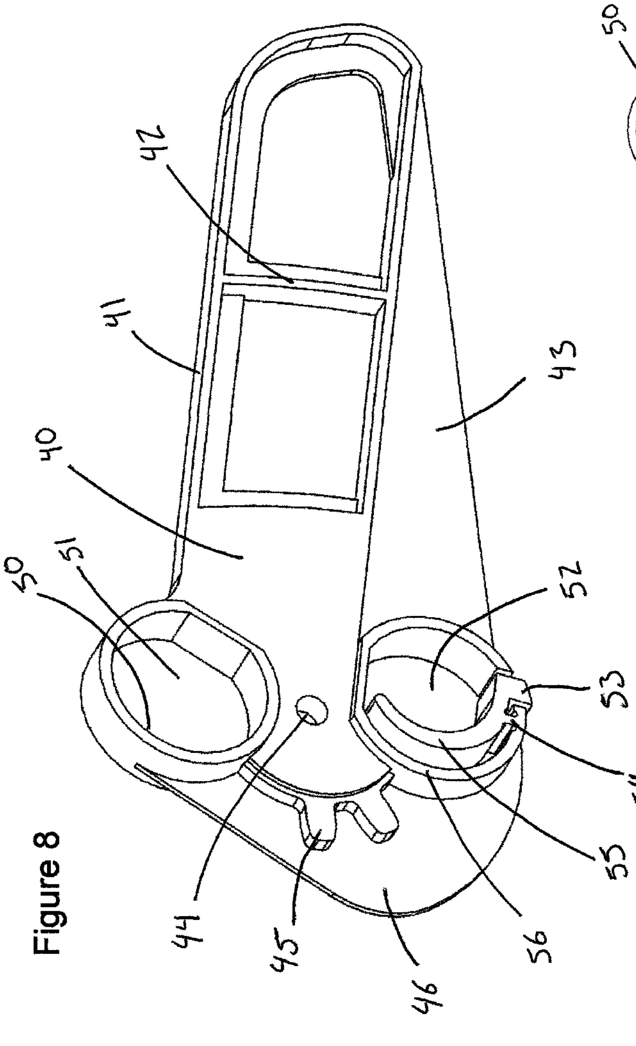
FIG. 8 is a front perspective view of the first wing.
Figure 9:
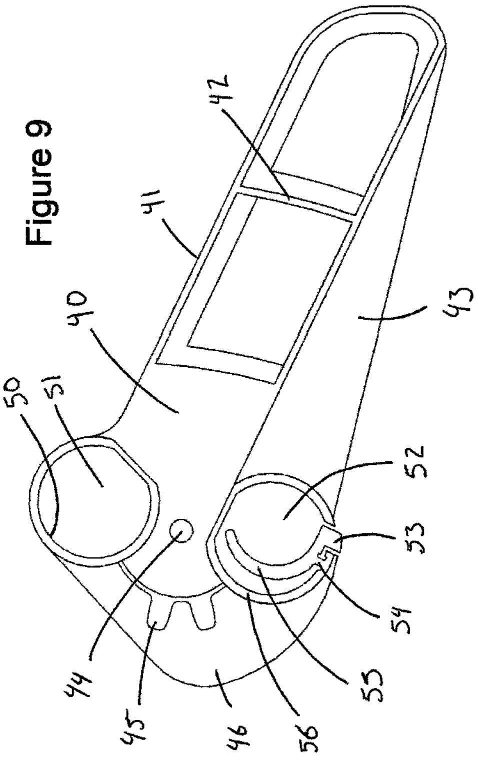
FIG. 9 is a front view of the first wing.

FIG. 8 is a front perspective view of the first wing 40. A garment support surface 41 sits atop a structure 42, and beneath them is a lower wing section 43 which will overlap a portion of the second wing 60 (FIG. 2) when moved into the folded configuration. A pivot hole 44 is formed integrally into the first wing 40, so as to allow fitment over the pivot bosses 24, 34 (FIGS. 7 and 6). Gear teeth 45 are present to mesh with corresponding teeth 65 on the second wing 60 (FIG. 9). A guard surface 46 is present to prevent the ability to stick objects into the gear teeth or in the unintended areas of the latch box clearance channels 22, 32 (FIGS. 1 and 6). The lift handle 50 and finger opening 51 are integrally formed as part of the first wing 40. The latch box 56 is also integrally formed as part of the first wing 40, and contains the components of a finger opening 52, latch 53, flexing member 54, and trigger 55.

Figure 10:
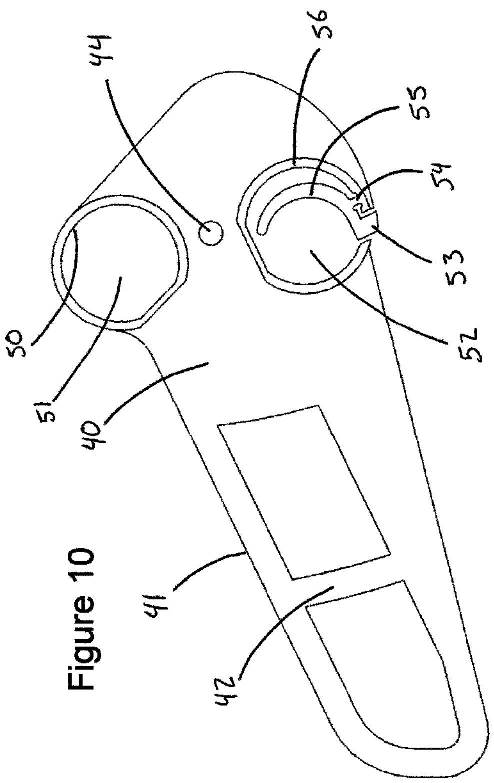
FIG. 10 is a back view of the first wing.

FIG. 9 is a front view of the first wing 40. FIG. 10 is a rear view of the first wing 40.

Figure 11:
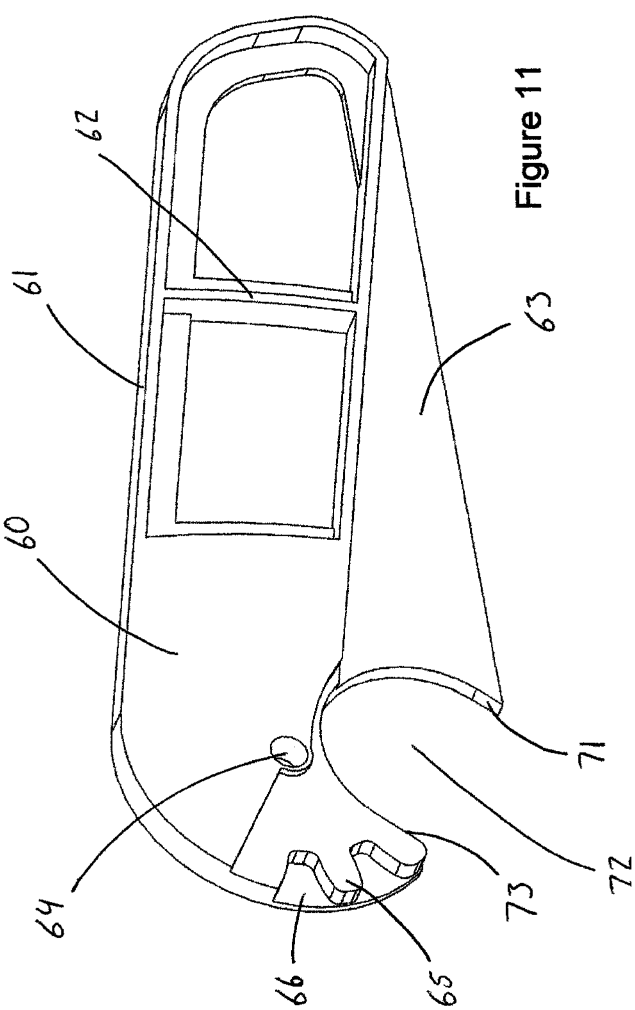
FIG. 11 is a back perspective view of the second wing.

FIG. 11 is a rear perspective view of the second wing 60. A garment support surface 61 sits atop a structure 62, and beneath them is an offset lower wing section 63 which will overlap the lower wing section 43 of the first wing 40 (FIG. 9) when moved into the folded configuration. A pivot hole 64 is formed integrally into the second wing 60, so as to allow fitment over the pivot bosses 26, 36 (FIGS. 7 and 6). Gear teeth 65 are present to mesh with the gear teeth 45 on the first wing 40 (FIG. 9). A guard surface 66 is present to prevent the ability to stick objects into the gear teeth. A latch box receiver opening 72 is integrally formed into the second wing 60, as well as the contact surfaces 71, 73.

Figure 13:
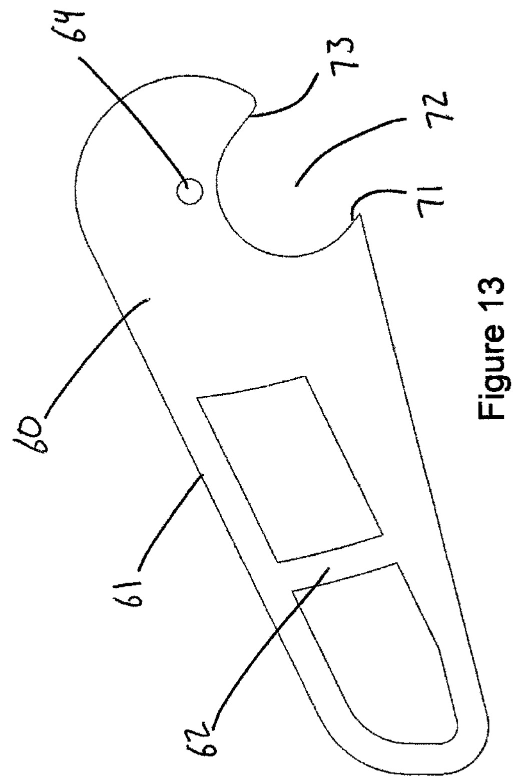
FIG. 13 is a front view of the second wing.
Figure 12:
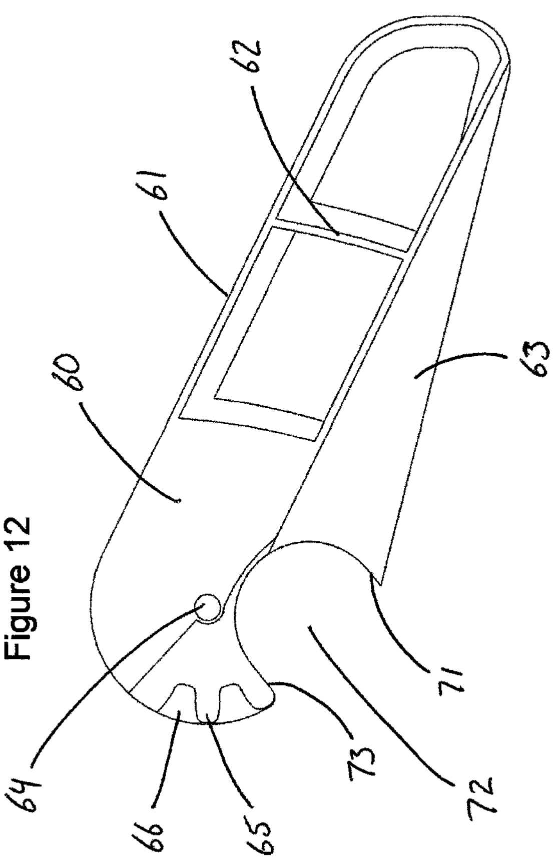
FIG. 12 is a back view of the second wing.

FIG. 12 is a rear view of the second wing 60. FIG. 13 is a front view of the second wing 60.

Figure 14:
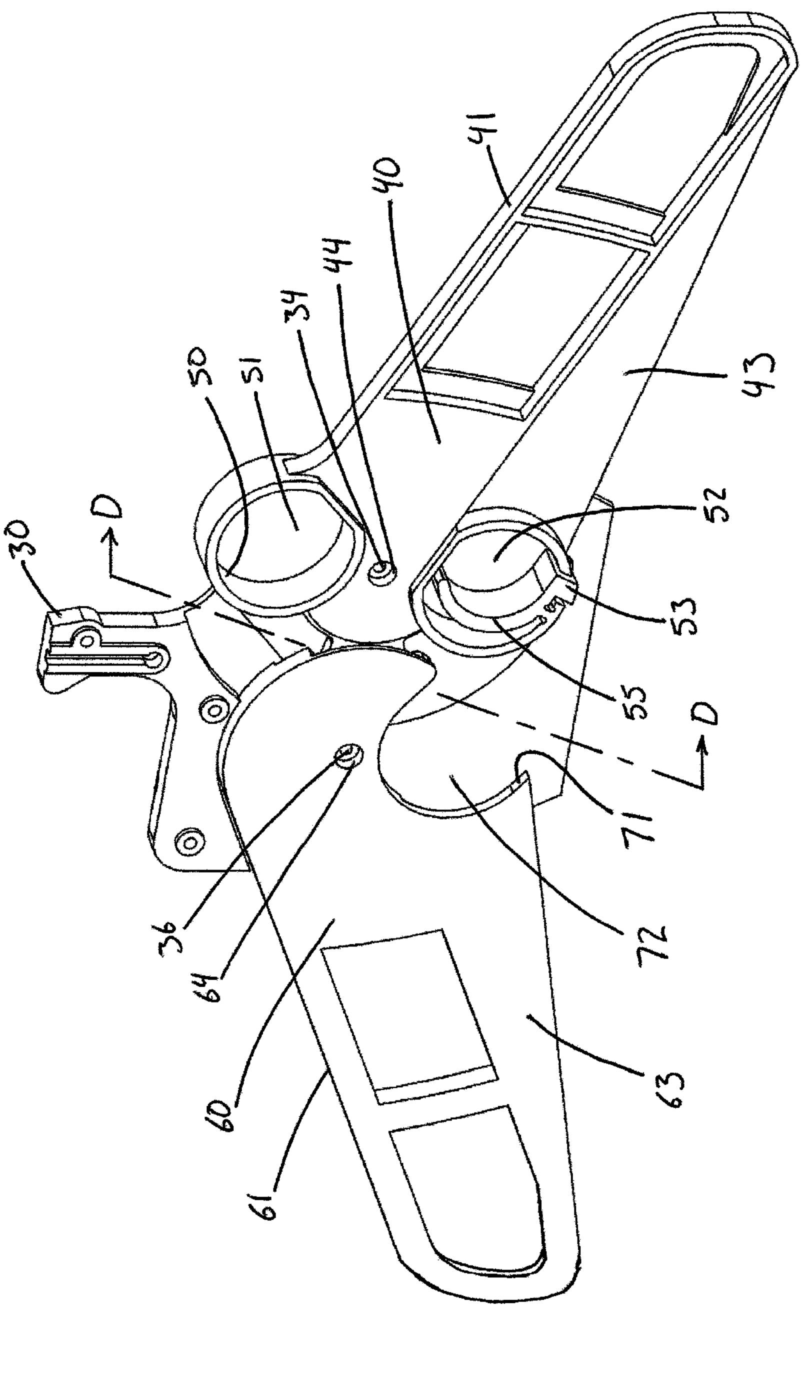
FIG. 14 is a perspective view of a partial collapsing hanger assembly in the expanded configuration, with the first and second wings in place on the pivot mounts of the back frame section.

FIG. 14 is a front perspective view of the rear frame section 30 with the first and second wings 40, 60 placed in location as if of an assembly in the expanded configuration. The first pivot boss 34 can be seen inside the pivot hole 44 of the first wing 40. The second pivot boss 36 can be seen inside the pivot hole 64 of the second wing 60. The lower wing sections 43, 63 are shown on the wings 40, 60 respectively. The latch box receiver opening 72 and the contact surface 71 can be seen clearly in this view.

Figure 15:
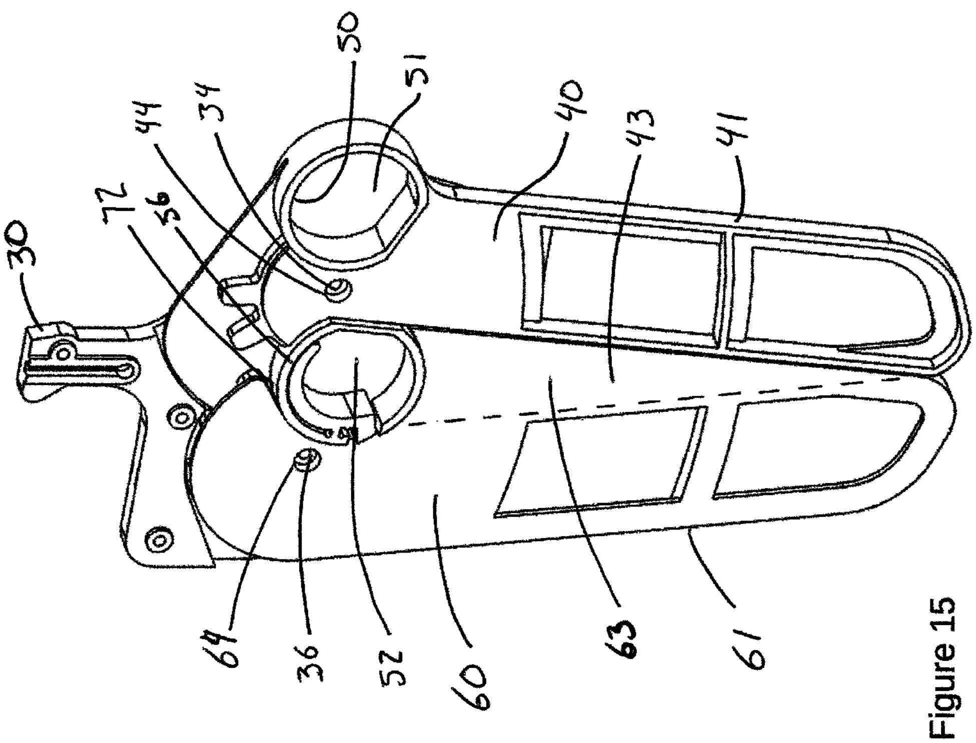
FIG. 15 is a perspective view of a partial collapsing hanger assembly in the collapsed configuration, with the first and second wings in place on the pivot mounts of the back frame section.

FIG. 15 is a front perspective view of the rear frame section 30 with the first and second wings, 40, 60 placed in location as if of an assembly in the folded configuration. The first pivot boss 34 can be seen inside the pivot hole 44 of the first wing 40. The second pivot boss 36 can be seen inside the pivot hole 64 of the second wing 60. The lower wing section 63 of the second wing 60 can be seen overlapping the lower wing section 43 of the first wing 40. The latch box receiver opening 72 can be seen enveloping the latch box 56.

Figure 16:
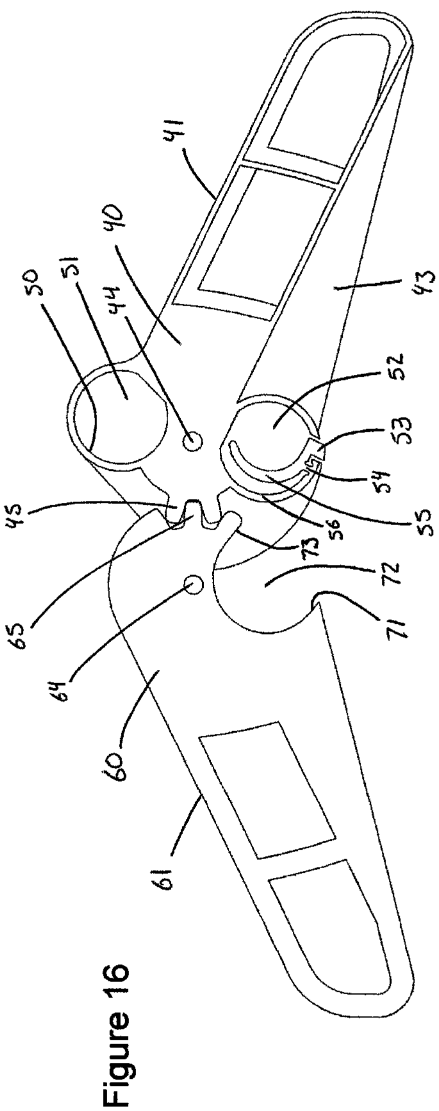
FIG. 16 is a section view of the first and second wings in their extended positions taken along line D-D of FIG. 14.

FIG. 16 is a section view of the first and second wings in their extended positions taken along line D-D of FIG. 14. The gear teeth 45, 65 are inter-meshed so as to ensure that the clockwise rotation of the first wing 40 about an axis passing through the pivot hole 44 will ensure the counter-clockwise rotation of the second wing 60 about an axis passing through the pivot hole 64. When the first wing 40 is locked in the expanded position by virtue of the latch 53 being locked behind the latch catch 23 (FIG. 3), the gear teeth 45 will prevent the travel of the gear teeth 65 and thus the second wing 60, thereby ensuring that both wings remain expanded when the latch 53 is locked.

Figure 17:
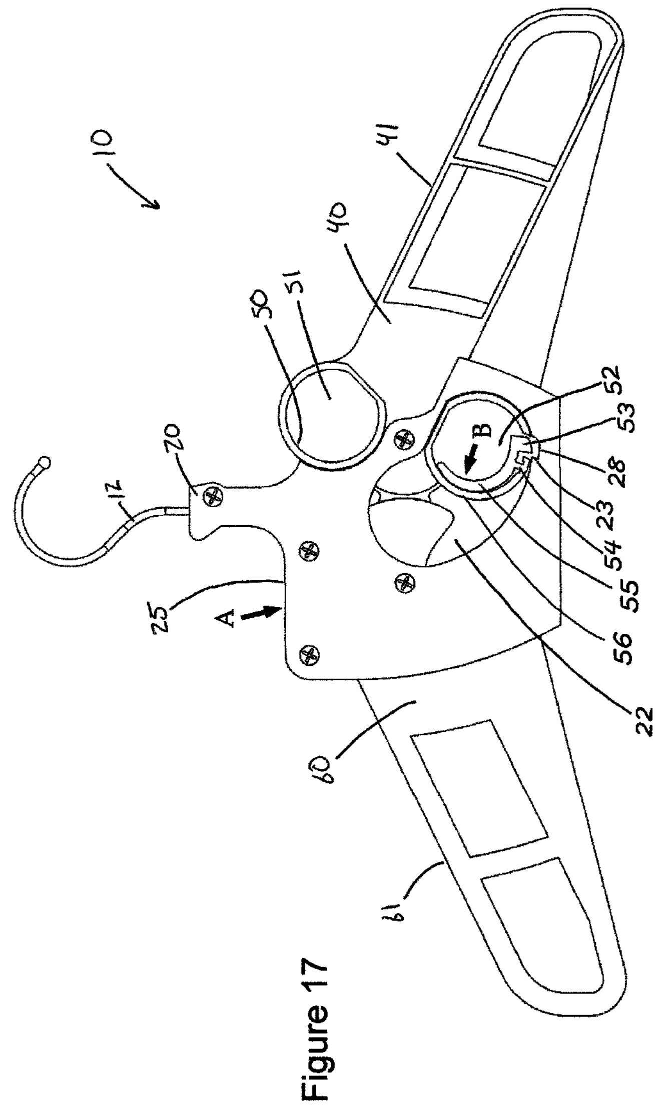
FIG. 17 is a front view of the collapsing hanger assembly with the wings extended to an open position and the latch trigger depressed at the arrow B. Also visible is the palm rest denoted by the arrow A.

FIG. 17 is a front view of the hanger 10 in its expanded configuration. An arrow A shows where the force of the palm of a hand can be applied at the palm rest 25 in opposition to a second force applied to the trigger 55 of the latch box 56 (such as by the user's finger), as denoted by the arrow B. The force applied at the arrow B will cause the trigger 55 and latch 53 to pivot about the flexing member 54 as the flexing member 54 deforms, thus unlocking the latch 53 from the latch catch 23 on the front frame section 20 as well as from the latch catch 33 on the rear frame section 30 (FIG. 6). The trigger and latch are shown is this deformed, unlocked position in FIG. 17. Under the application of force at arrow B the trigger 55 will move to a point where it makes contact with the inner surface of the latch box 56 at which point the continued application of force will cause the first wing 40 to pivot about the axis passing through the pivot hole 44 in a clockwise direction from this point of view. As seen in FIG. 16, the meshing of the gear teeth 45, 65 will cause the second wing 60 to subsequently pivot about the axis passing through the pivot hole 64 in a counter-clockwise position from this point of view. When moved in this fashion, the wings 40, 60 will eventually pivot to a fully closed position, at which point the latch box 56 and trigger 55 features may remain at a distance from the palm rest 25 that is generally comfortable for a human hand to hold.

Figure 18:
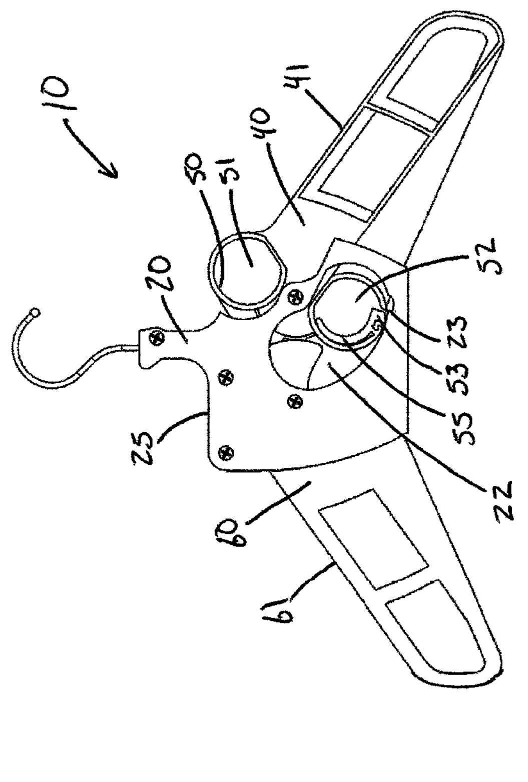
FIG. 18 is a front view of the collapsing hanger assembly with the wings in a partially collapsed position.
Figure 19:
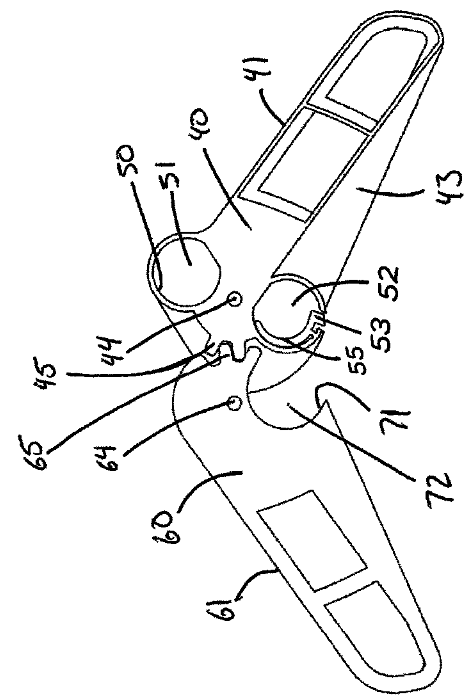
FIG. 19 is a section view of the first and second wings at the position seen in FIG. 17, taken along line D-D of FIG. 14.
Figure 20:
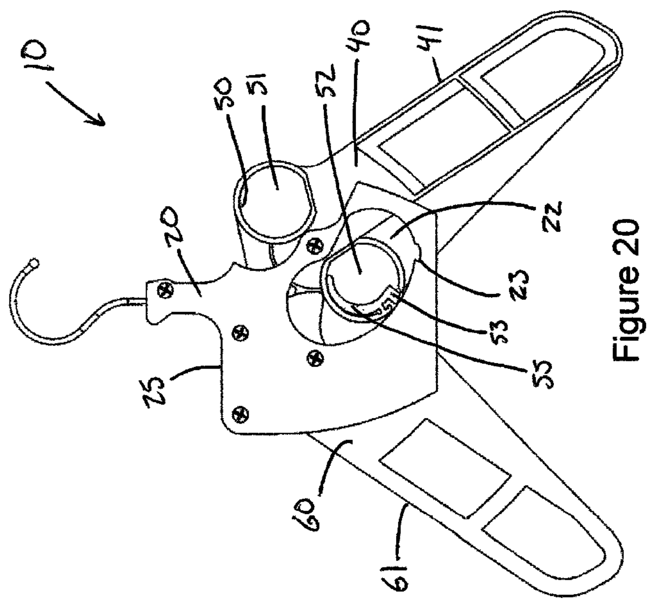
FIG. 20 is a front view of the collapsing hanger assembly with the wings in a partially collapsed position.

FIG. 18 is a front view of the hanger 10 with the wings 40, 60 in a partially collapsed position, subsequent to releasing the latch 53 in FIG. 17. FIG. 19 is a section view of the first and second wings 40, 60 at the position seen in FIG. 17, taken along line D-D of FIG. 14. FIG. 20 is a front view of the hanger 10 with the wings 40, 60 in a partially collapsed position.

Figure 21:
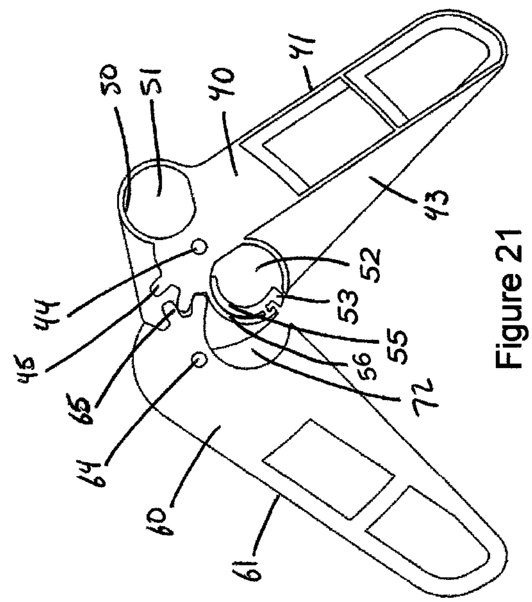
FIG. 21 is a section view of the first and second wings at the position seen in FIG. 19, taken along line D-D of FIG. 14.

FIG. 21 is a view of the first and second wings 40, 60 at the position seen in FIG. 19, taken along line D-D of FIG. 14, with the frame 18 removed for visibility. The latch box 56 on the first wing 40 can be seen partially inside the latch box clearance opening 72 on the second wing 60.

FIG. 22 is a front view of the hanger 10 in its closed configuration. An arrow A shows where the force of the palm of a hand can be applied at the palm rest 25 in opposition to a second force applied to the lift handle 50 (such as with a user's finger), as denoted by the arrow C. The force applied at the arrow C will cause the first wing 40 to pivot about the axis passing through the pivot hole 44 in a counter-clockwise direction from this point of view. As can be seen in FIG. 23, as the first wing 40 pivots in a counter-clockwise direction it will cause the latch box 56 to apply a force to the contact surface 71 on the second wing 60 thus causing the second wing 60 to pivot in a clockwise direction about an axis passing through the pivot hole 64. As these rotations travel through an initial amount of movement the latch box 56 will continue to apply force to the contact surface 71 until the gear teeth 45, 65 begin to inter-mesh. Under the same rotation directions eventually the latch box 56 will continue to rotate out of the latch box receiver opening 72 and the gear teeth 45 on the first wing 40 will apply force to the gear teeth 65 on the second wing 60 for the duration of the rotations. Eventually the first wing 40 and second wing 60 will move into their fully extended positions and the latch 53 will snap back into the latch clearance features 28, 38 and hook upon the latch catches 23, 33 on the frame sections 20, 30 respectively.

The movements described above are easily performed with a single hand having its palm in place at the palm rest 25 and one or more fingers in place at the lift handle 50 at a distance that is generally comfortable for a human hand to hold. A second hand can be used to hold a shirt-type garment by the collar as the hanger 10 is expanded within the interior of the garment. A human hand possess a relatively high capability of force in a squeezing operation, which is more than enough to counteract the typical resistance to expansion that the hanger 10 may encounter. Thus the single hand operated collapsing hanger affords the ability to simply and quickly hang a shirt-type garment upon it, and then easily transfer the hanger and garment to a support device such as a hook or hanger rod.

The exemplary hanger as shown in the drawings is designed as if primarily constructed of plastic resin. Any or all of the components of the hanger could be constructed from alternate materials such as wood or metal. The disclosed latch assembly has the advantages of being releasable with a squeezing motion similar to that which expands the wings 40, 60 and being releasable by feel without looking at it (while it is inside the neck of the garment); however, other latch mechanisms could also be used. It is possible that features present on the frame 18, such as the palm rest 25, latch catch 23, or hook 12, could be alternatively formed into either of the wings 40, 60.

The described embodiment has both the latch features 52, 53, 54, 55, 56 and the lift handle features 50, 51 formed integrally into the first wing 40. Alternatively it is possible that the latch features 52, 53, 54, 55, 56 could be formed as part of the second wing 60. If so constructed, the meshing of the gear teeth will ensure that both wings will fold as intended when the latch box 56 is lifted toward the palm rest 25. With the lift handle 50 still formed as part of the first wing 40, it will remain possible to lift both wings in the manner described previously.

A further embodiment could be made so that the garment support features present in the second wing 60, such as the support surface 61, structure 62, and lower wing section, could be integrally formed into the frame such that a second moving wing is not necessary. Such a design would have a single pivot point for the first wing 40 to rotate about. It is likely that the first wing 40 would travel through a larger angle of motion between the collapsed and extended positions than in the previously described embodiment.

Figure 25:
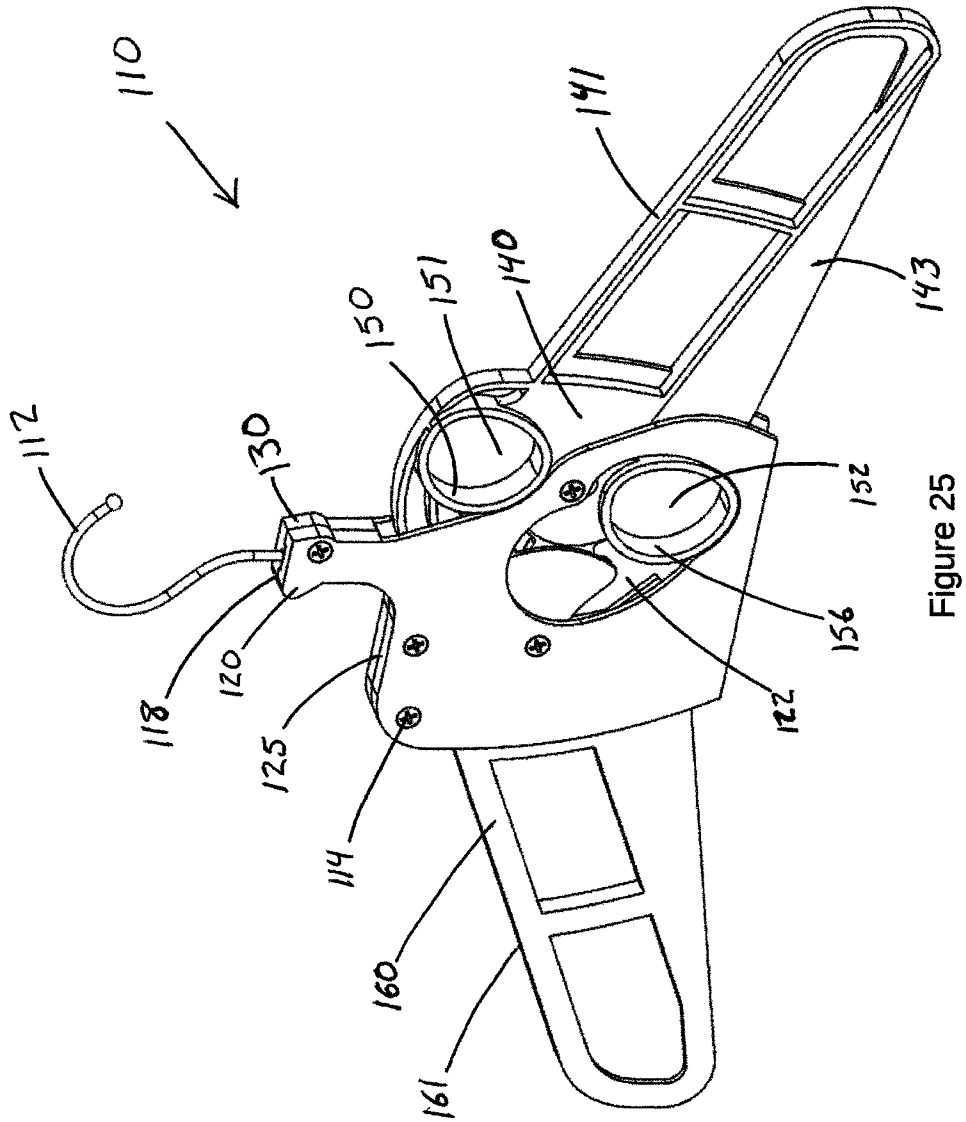
FIG. 25 is a perspective view of a collapsing hanger assembly with the wings extended to an open position, according to a second embodiment.

FIG. 25 is a perspective view of a second example single hand operated collapsing hanger 110, in its expanded configuration. The embodiment shown in FIG. 25 generally includes a hanging hook 112, a frame 118, a first wing 140 having a first garment support surface 141, and a second wing 160 having a second garment support surface 161. The wings 140, 160 are pivotably attached to the frame 118. In this example embodiment, the frame 118 is formed of two separate pieces, a front frame section 120 and a rear frame section 130, connected together such as by screws 114 (or adhesive, welding, snap-fit connections, etc). Alternatively, the frame 118 could be formed as one piece.

In this embodiment the hook 112 is formed of metal, with the frame sections 120, 130, the wings 140, 160, and the spring member 180 (FIG. 29) formed of polymer, such as thermoplastic. Alternatively, the hook could be integrally formed as part of the frame 118 or one of the wings 140, 160. The hook could also be formed in an alternate shape, such as a "T", or other functional shape which allows for the suspended support of the hanger and garments thereon. The first wing 140 includes a lift handle 150, which may be formed integrally therewith. The first wing 140 also includes a fold handle 156, which may be formed integrally therewith. The first wing 140 has an offset lower wing section 143. A palm rest 125 is formed at an upper surface of the frame 118 adjacent the second wing 160. A kidney-shaped latch box clearance channel 122 in the frame 118 provides access to the fold handle 156. As will be explained below, openings 151, 152 allow for the placement of fingers in position to raise or lower the wings.

Figure 26:
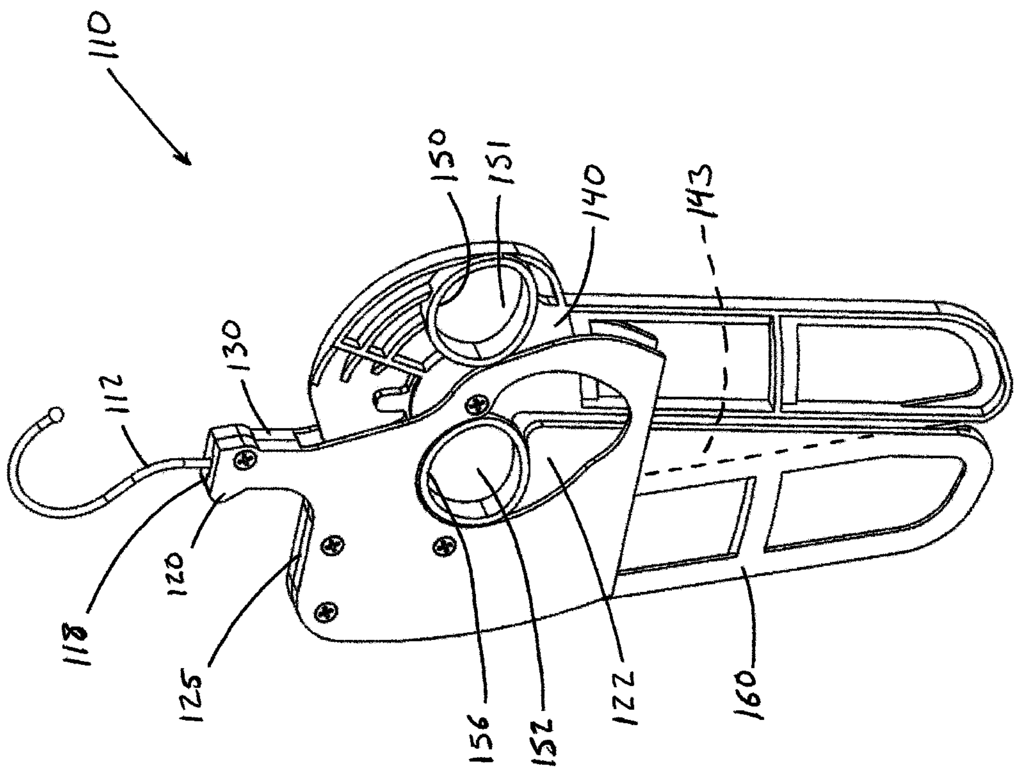
FIG. 26 is a perspective view of the collapsing hanger assembly of FIG. 25, with the wings folded down to a closed position.

FIG. 26 is a perspective view of the hanger 110 in the collapsed, or folded, configuration. The wings 140, 160 are pivoted downward around separate axes, relative to their positions in FIG. 25, allowing for the assembly to have a much smaller horizontal span. As shown, the offset lower wing section 143 of the first wing 140 overlaps with a portion of the second wing 160. The fold handle 156 and finger opening 152 have moved within the channel 122 to a closer position to the palm rest 125. The lift handle 150 and finger opening 151 are in a position further from palm rest 125 relative to their positions in FIG. 25.

FIG. 27 is a front view of the hanger 110 in its expanded configuration. The frame 118 has the clearance channel 122 and the palm rest 125. The lift handle 150 is shown as a portion of a contiguous rib section surrounding the finger opening 151, and is integrally formed as part of the first wing 140. The fold handle 156 is shown as a portion of a contiguous rib section surrounding the finger opening 152, and is also integrally formed as part of the first wing 140.

When a garment is hanging on the hanger 110 in this configuration, it will exact downward force at the support surfaces 141, 161 which will be offset by an internal latch mechanism, to be further described below, thus resisting the tendency for the wings 140, 160 to pivot about their mounts.

FIG. 28 is a back view of the hanger 110 in its expanded configuration. The frame 118 has the clearance channel 132 integrally formed into the rear frame section 130.

Figure 29:
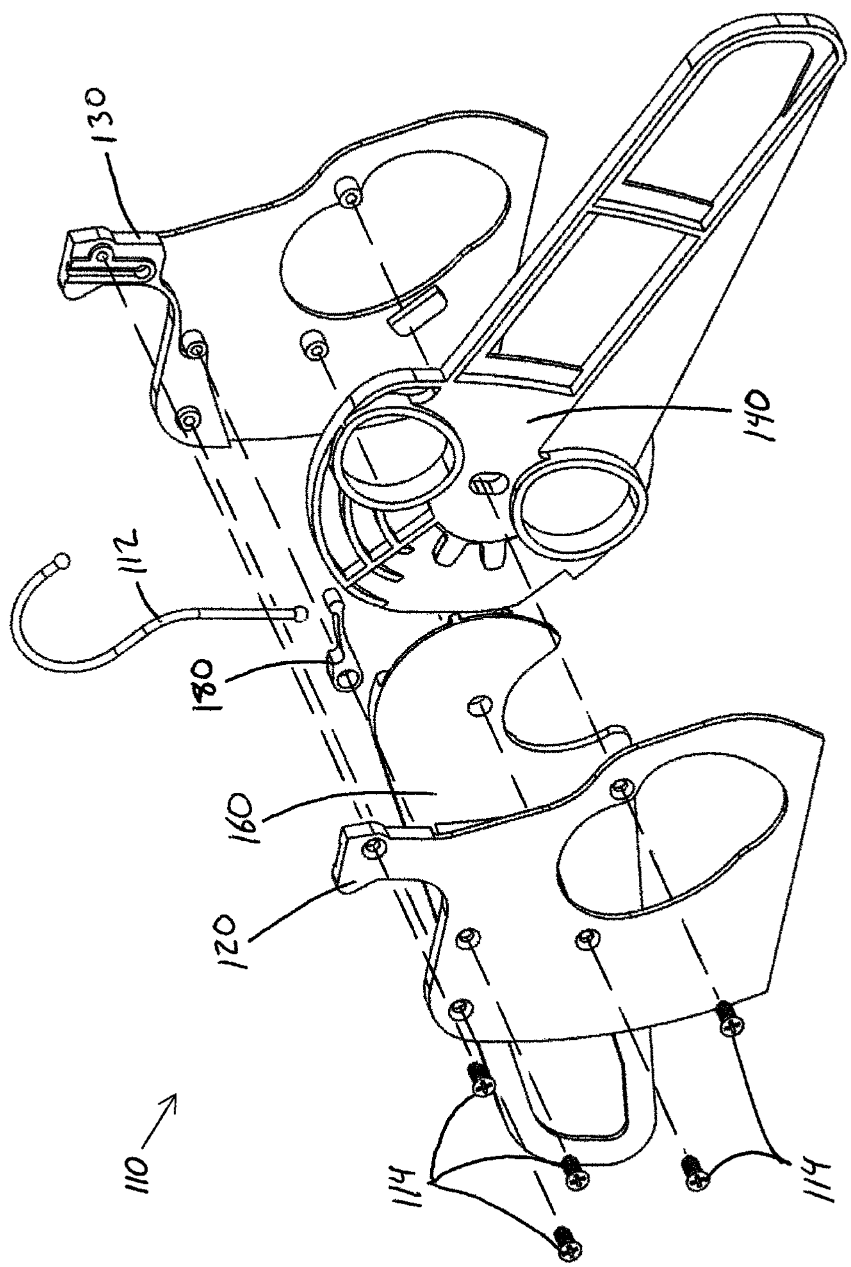
FIG. 29 is an exploded view of the collapsing hanger assembly of FIG. 25.

FIG. 29 is an exploded perspective view of the hanger 110 in its expanded configuration. Heavy dashed lines show the alignments of the various components in the assembly. The screws 114 are used to affix the front frame section 120 to the back frame section 130, with the hook 112, first wing 140, second wing 160, and spring member 180 sandwiched in between.

Figure 30:
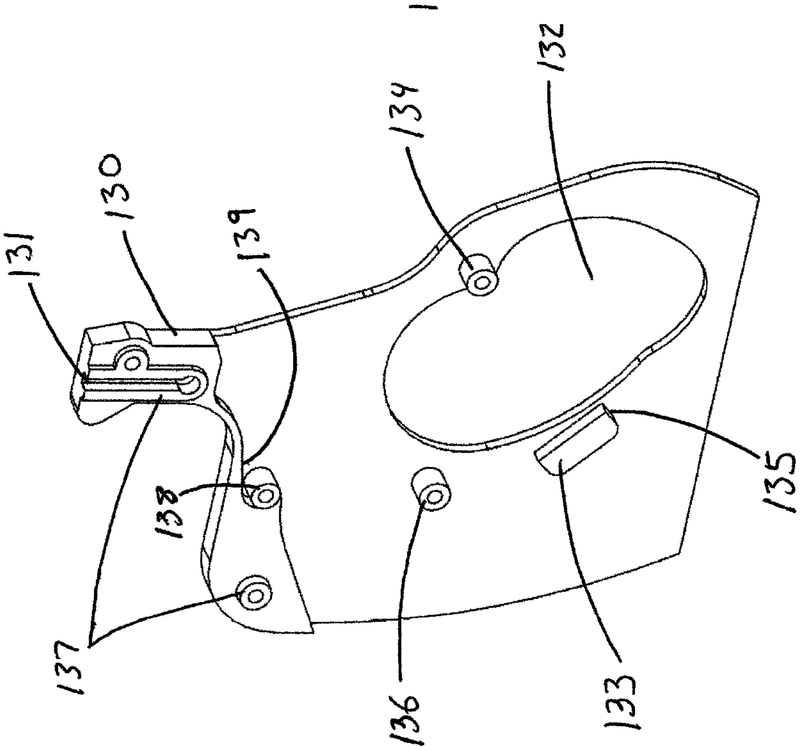
FIG. 30 is a perspective view of the back frame section of FIG. 25.

FIG. 30 is a front perspective view of the rear frame section 130. A channel 131 is present to allow for the reception of the hook 112 (FIG. 29). A fold handle clearance channel 132 is present along with a latch block 133 which has a static latch face 135. A first pivot boss 134 and second pivot boss 136 will align with corresponding features 124, 126 on the front frame section 120 (FIG. 31) to support the wings (FIG. 29). Assembly alignment features 137 are integrally formed into the rear frame section 130. A spring member support boss 138 and spring support face 139 are integrally formed into the rear frame section 130.

Figure 31:
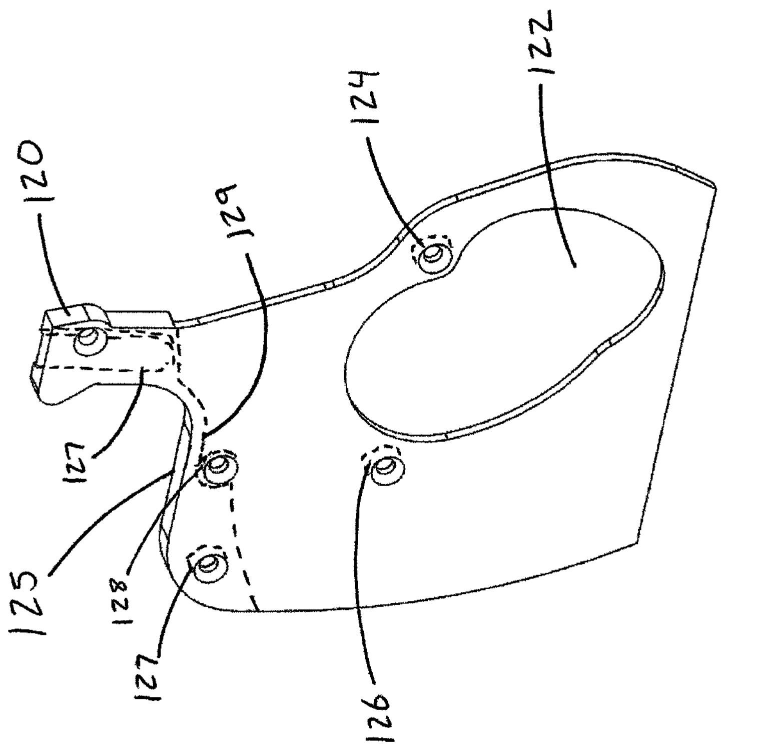
FIG. 31 is a perspective view of the front frame section of FIG. 25.

FIG. 31 is a front perspective view of the front frame section 120. A fold handle clearance channel 122 is present. A first pivot boss 124 and second pivot boss 126 (shown with hidden lines) will align with corresponding features 134, 136 on the rear frame section 130 (FIG. 30) to support the wings (FIG. 29). Assembly alignment pockets 127 (shown with hidden lines) are integrally formed into the front frame section 120. A spring member support boss 128 and spring support face 129 (both shown with hidden lines) will align with corresponding features on the rear frame section (FIG. 30) to firmly support the spring member (FIG. 29).

Figure 32:
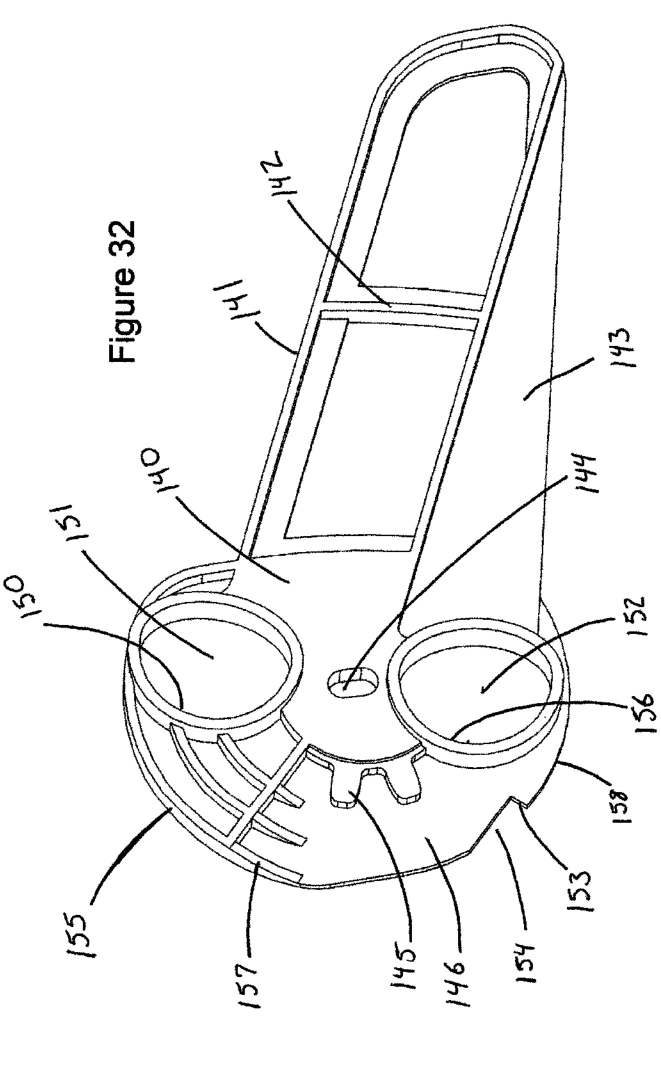
FIG. 32 is a front perspective view of the first wing of FIG. 25.
Figure 35:
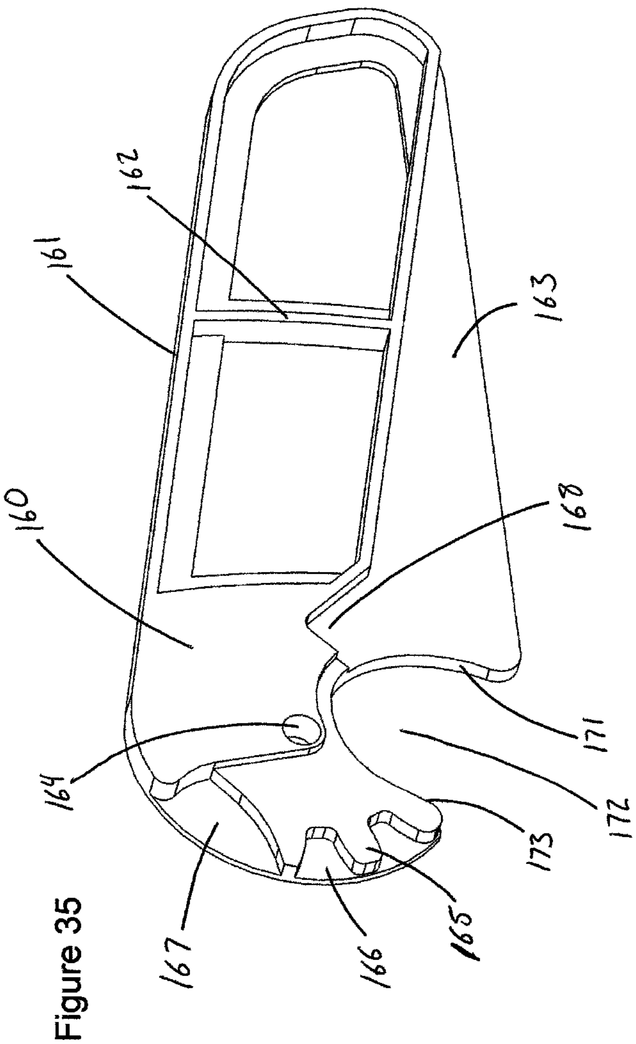
FIG. 35 is a back perspective view of the second wing of FIG. 25.

FIG. 32 is a front perspective view of the first wing 140. A garment support surface 141 sits atop a structure 142, and beneath them is a lower wing section 143 which will overlap a portion of the second wing 160 (FIG. 26) when moved into the folded configuration. A pivot slot 144 is formed integrally into the first wing 140, so as to allow fitment over the pivot bosses 124, 134 (FIGS. 31 and 30). Gear teeth 145 are present to mesh with corresponding teeth 165 on the second wing 160 (FIG. 35). A guard surface 146 is present to prevent the ability to stick objects into the gear teeth or in the unintended areas of the fold handle clearance channels 122, 132 (FIGS. 31 and 30).

The lift handle 150 and finger opening 151 are integrally formed as part of the first wing 140. The fold handle 156 and finger opening 152 are also integrally formed as part of the first wing 140. A latch notch 154 is formed into the perimeter of the guard surface 146, so as to form the moving latch face 153 which will engage with the static latch face 135 (FIG. 30) when the wings are in the locked configuration. A upper contact surface 155 is present along the top surface of a rib formed at the upper perimeter of the first wing 140. The upper contact surface 155 will interact with the spring member contact surface 185 (FIG. 38) as the first wing 140 travels through a portion of its sliding and pivoting movement about the pivot bosses 124, 134 (FIGS. 31 and 30). A rib support section 157 allows for smooth transition between the front face of the guard surface 146 and the rib forming the upper contact surface 155. The lower contact surface 158 will interact with the upper face of the latch block 133 (FIG. 30) as the first wing 140 travels through its pivoting movement about the pivot bosses 124, 134 (FIGS. 31 and 30).

Figure 34:
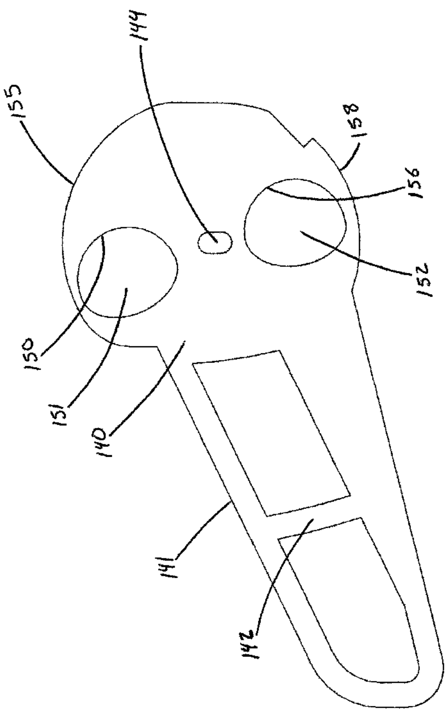
FIG. 34 is a back view of the first wing of FIG. 25.
Figure 33:
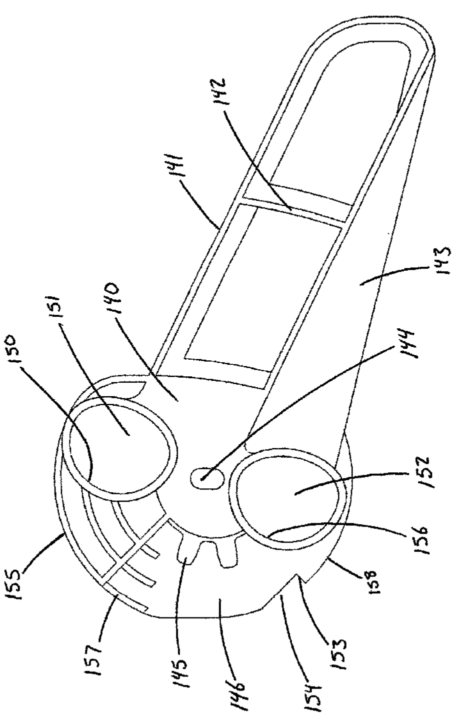
FIG. 33 is a front view of the first wing of FIG. 25.

FIG. 33 is a front view of the first wing 140. FIG. 34 is a rear view of the first wing 140.

FIG. 35 is a rear perspective view of the second wing 160. A garment support surface 161 sits atop a structure 162, and beneath them is an offset lower wing section 163 which will overlap the lower wing section 143 of the first wing 140 (FIG. 33) when moved into the folded configuration. A pivot hole 164 is formed integrally into the second wing 160, so as to allow fitment over the pivot bosses 126, 136 (FIGS. 31 and 30). Gear teeth 165 are present to mesh with the gear teeth 145 on the first wing 140 (FIG. 33). A guard surface 166 is present to prevent the ability to stick objects into the gear teeth. A latch clearance notch 168 is integrally formed to allow for clearance of the latch block 133 (FIG. 30) when the hanger 110 is in the collapsed configuration. A fold handle receiver opening 172 is integrally formed into the second wing 160, as well as the contact surfaces 171, 173.

Figure 37:
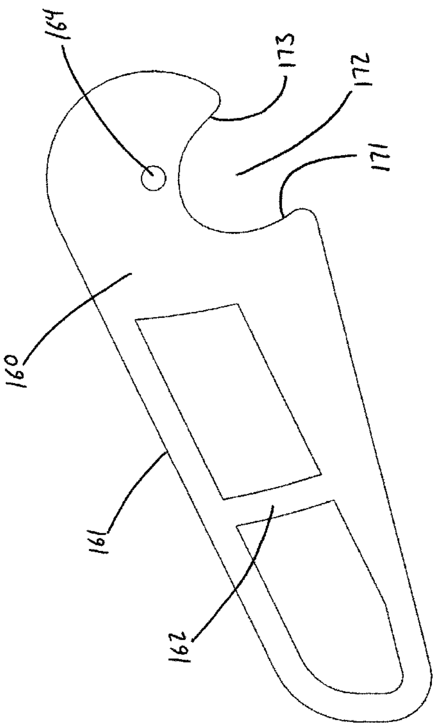
FIG. 37 is a front view of the second wing of FIG. 25.
Figure 36:
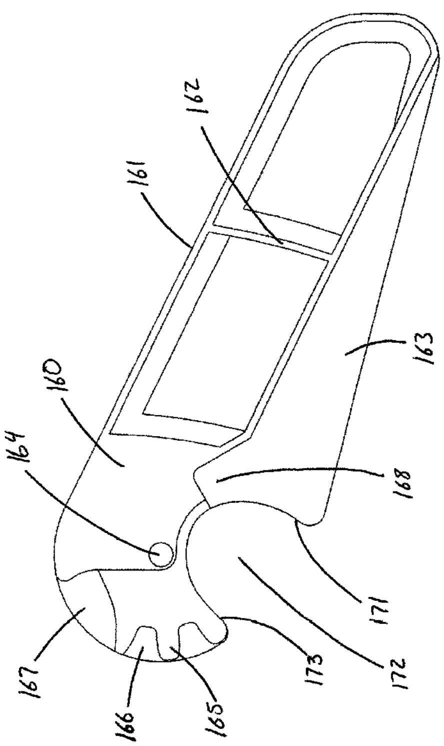
FIG. 36 is a back view of the second wing of FIG. 25.

FIG. 36 is a rear view of the second wing 160. FIG. 37 is a front view of the second wing 160.

Figure 38:
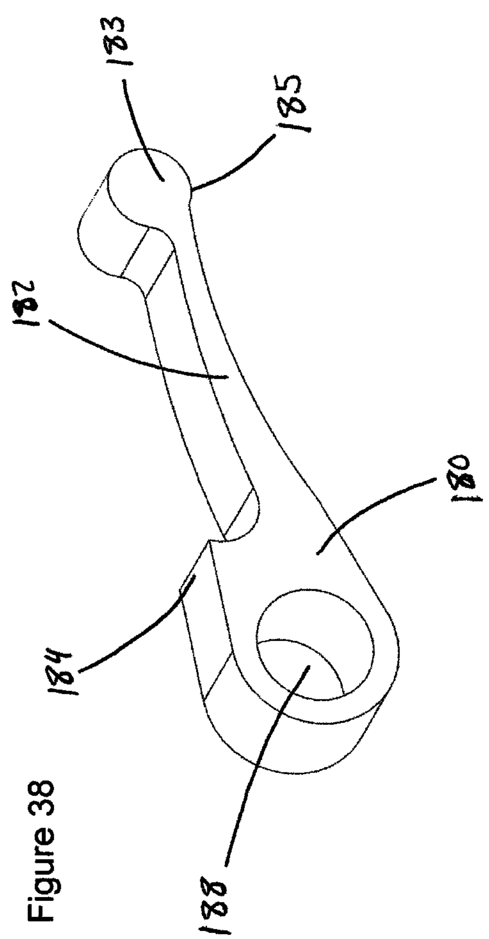
FIG. 38 is a front perspective view of the spring member within the collapsing hanger assembly of FIG. 25.

FIG. 38 is a front perspective view of the spring member 180, which provides resilient bias upon the first arm 140 (FIG. 32) during the latching and unlatching sequences. A flexible beam 182 is integrally formed and is able to withstand non-destructive flexing through the course of ordinary collapsing hanger 110 operation. At the narrow end of the flexible beam 182 a contact bulb 183 provides for the spring member contact surface 185. A mounting hole 188 is present to allow for the spring member 180 to fit about the support bosses 128, 138 (FIGS. 31 and 30), and an anchor surface 184 allows for the needed resistance to movement as it makes contact with the spring support faces 129, 139 (FIGS. 31 and 30).

Figure 39:
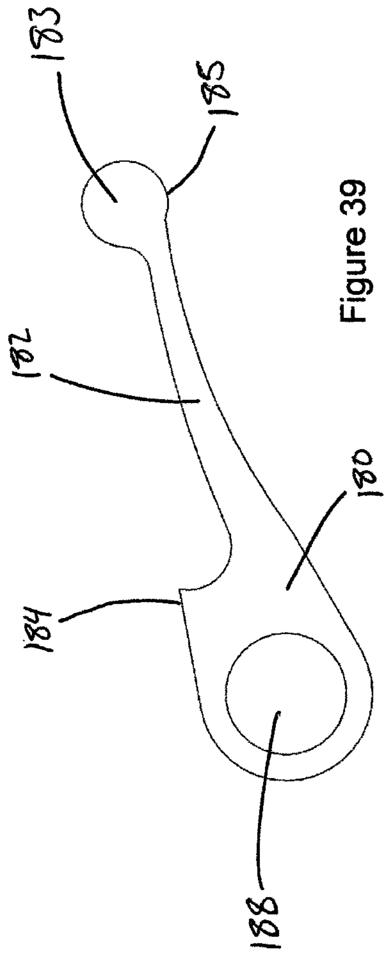
FIG. 39 is a front view of the spring member within the collapsing hanger assembly of FIG. 25.

FIG. 39 is a front view of the spring member 180.

Figure 40:
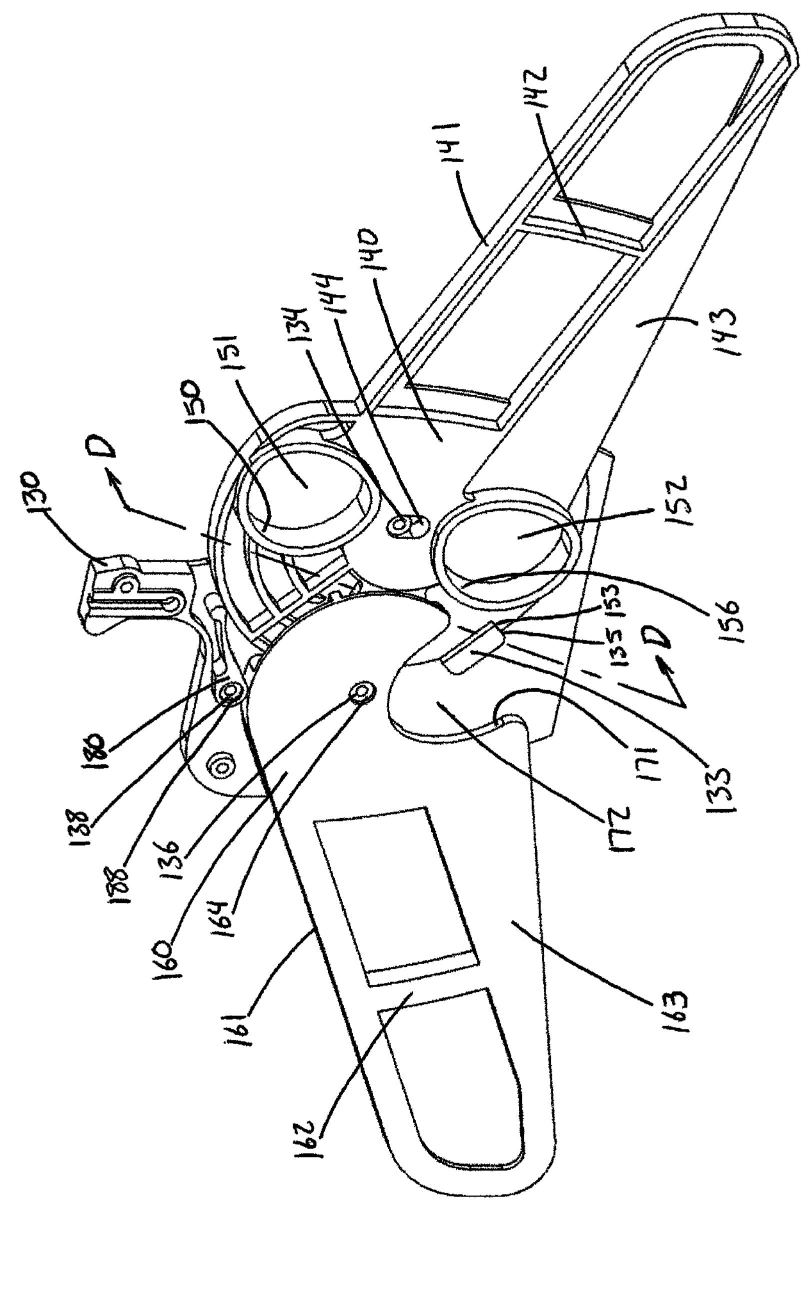
FIG. 40 is a perspective view of the partial collapsing hanger assembly of FIG. 25, in the expanded configuration, with the first and second wings in place on the pivot mounts of the back frame section, and the spring member present on the spring mounting boss of the back frame section.

FIG. 40 is a front perspective view of the rear frame section 130 with the first and second wings 140, 160, as well as the spring member 180 placed in location as if of an assembly in the expanded configuration. The first pivot boss 134 can be seen at the upper reach of the pivot slot 144 of the first wing 140. The second pivot boss 136 can be seen inside the pivot hole 164 of the second wing 160. The lower wing sections 143, 163 are shown on the wings 140, 160 respectively. The fold handle receiver opening 172 and the contact surface 171 can be seen clearly in this view.

Figure 41:
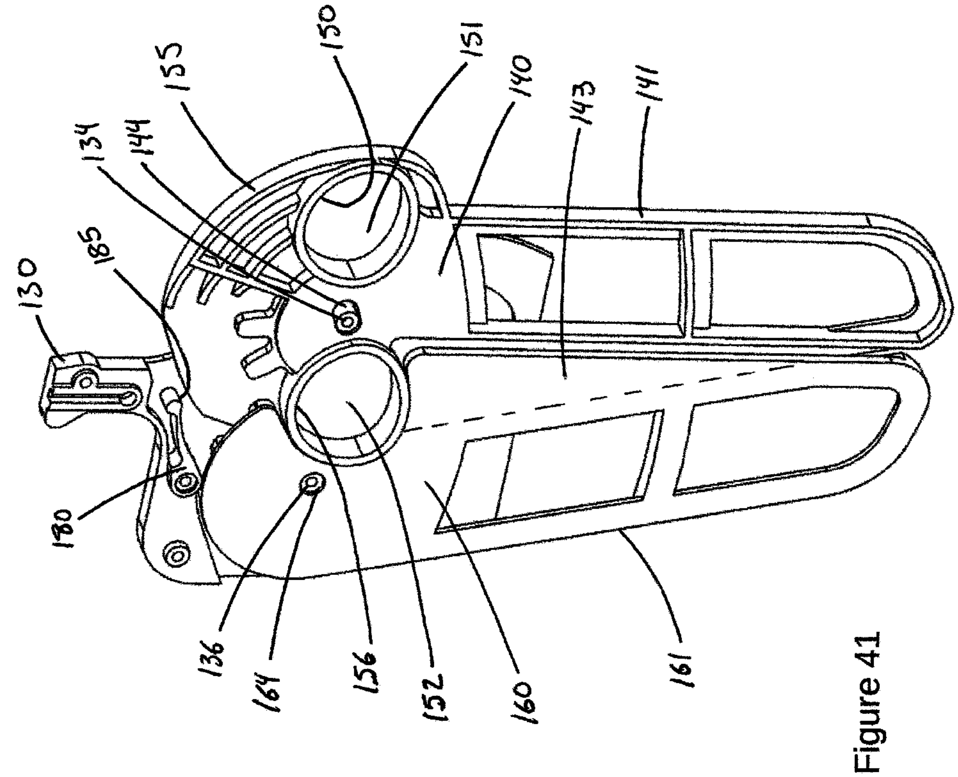
FIG. 41 is a perspective view of the partial collapsing hanger assembly of FIG. 25, in the collapsed configuration, with the first and second wings in place on the pivot mounts of the back frame section, and the spring member present on the spring mounting boss of the back frame section.

FIG. 41 is a front perspective view of the rear frame section 130 with the first and second wings, 140, 160, as well as the spring member 180 placed in location as if of an assembly in the folded configuration. The first pivot boss 134 can be seen at the upper reach the pivot slot 144 of the first wing 140. The second pivot boss 136 can be seen inside the pivot hole 164 of the second wing 160. The lower wing section 163 of the second wing 160 can be seen overlapping the lower wing section 143 of the first wing 140. The fold handle receiver opening 172 can be seen enveloping the fold handle 156 and finger opening 152.

Figure 42:
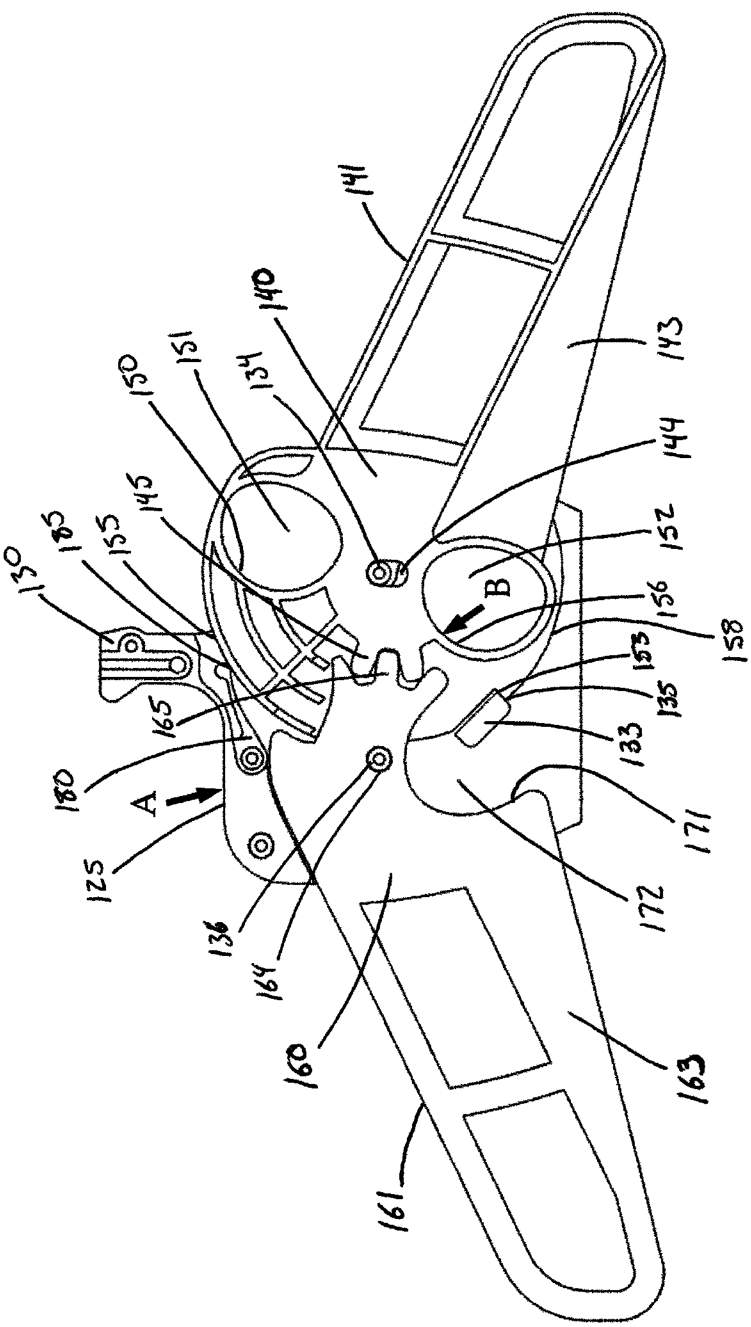
FIG. 42 is a section view of a partial collapsing hanger assembly of FIG. 25, with the first and second wings in their extended positions, as well as the spring member and back frame section present, taken along line D-D of FIG. 40.

FIG. 42 is a section view of the rear frame section 130 with the first and second wings 140, 160, as well as the spring member 180 placed in location as if of an assembly in the expanded configuration, taken along line D-D of FIG. 40. The gear teeth 145, 165 are inter-meshed so as to ensure that the clockwise rotation of the first wing 140 about an axis passing through the pivot slot 144 will ensure the counterclockwise rotation of the second wing 160 about an axis passing through the pivot hole 64. When the first wing 140 is in the locked position by virtue of the moving latch face 153 being held adjacent to the static latch face 135, the gear teeth 145 will prevent the travel of the gear teeth 165 and thus the second wing 160. The spring member 180 applies a downward force at the contact surface 185 upon the upper contact surface 155, which urges the first wing 140 downward about the first pivot boss 134 so that the latch notch 154 and moving latch face 153 are engaged with the latch block 133 and static latch face 135, thereby ensuring that both wings remain expanded and cannot pivot so long as the downward spring force is not overcome. So long as the forces acting downward at the garment support surfaces 141, 161 are generally balanced, the collapsing hanger 110 will remain in the extended position until the unlocking sequence is initiated, as described below.

Figure 43:
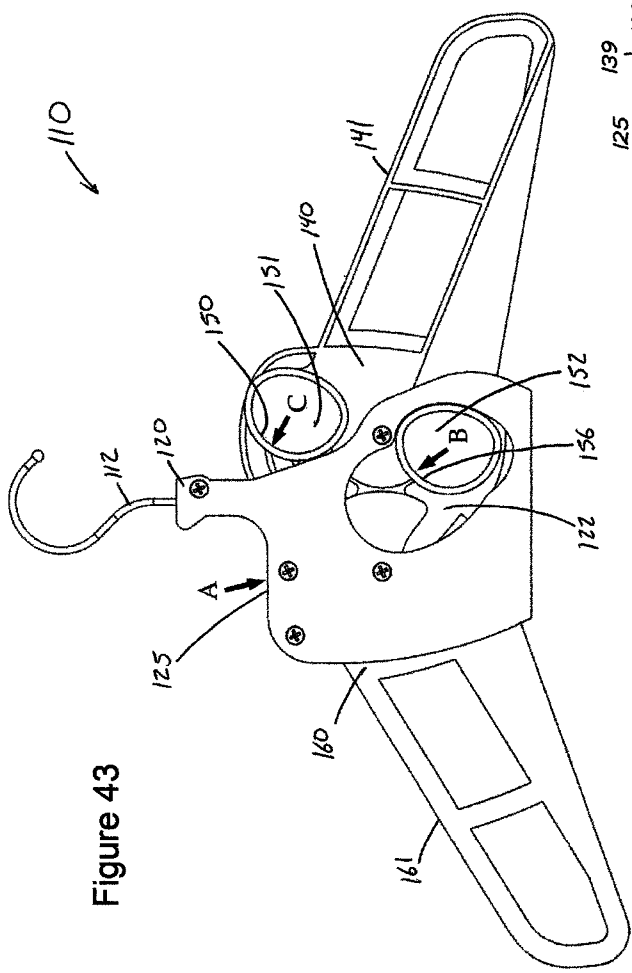
FIG. 43 is a front view of the collapsing hanger assembly of FIG. 25, with the wings positioned so as to be just at the point of latch release.

FIG. 43 is a front view of the hanger 110 in an unlocked configuration. Both wings 140, 160 are rotated slightly counter-clockwise (in this view) about the second pivot boss 136 (FIG. 44), relative to their locked positions as seen in FIG. 27. From this positioning the first wing is free to rotate clockwise as the second wing rotates counter-clockwise (in this view).

Figure 44:
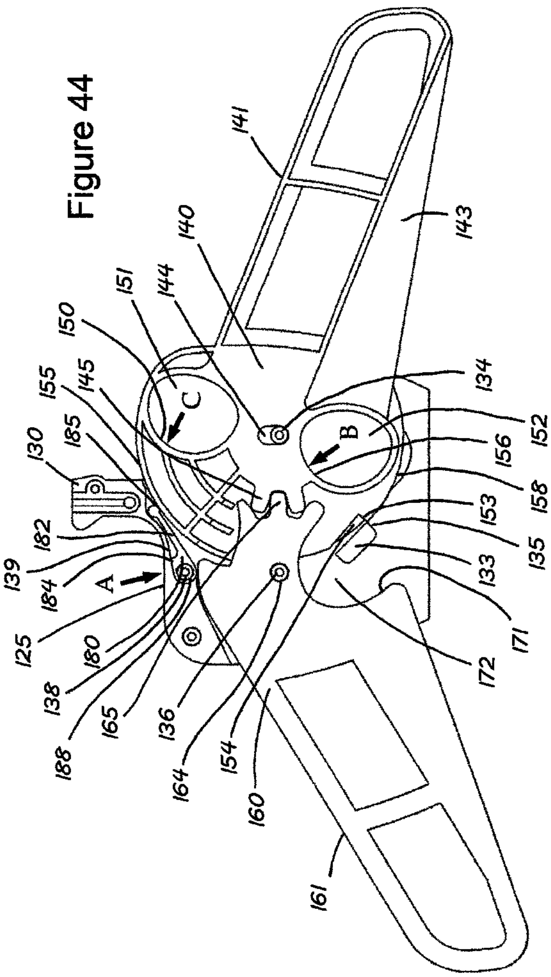
FIG. 44 is a section view of a partial collapsing hanger assembly of FIG. 25, with the wings positioned so as to be just at the point of latch release, as well as the spring member and back frame section present, taken along line D-D of FIG. 40.

FIG. 44 is a section view of the rear frame section 130 with the first and second wings 140, 160, as well as the spring member 180 placed in location as if of an assembly in the configuration seen in FIG. 43, taken along line D-D of FIG. 40. The first pivot boss 134 can be seen at the lower reach the pivot slot 144 of the first wing 140. The moving latch face 153 is disengaged from the static latch face 135 and the latch notch 154 can be seen removed from the latch block 133. The spring member 180 is seen in a deflected condition as the flexible beam 182 has been forced upward by the interaction of the first wing contact surface 155 with the spring member contact surface 185. The interaction of the mounting hole 188 to the support boss 138 along with the anchor surface 184 to the spring support face 139 provides for the needed resistance to movement at the base end of the flexible beam 182 to ensure the deflection of the flexible beam 182, which stores the potential energy to provide an opposing force to that induced by the upward movement of the spring bulb 183 end of the flexible beam 182.

During the unlocking sequence, opposing forces will be applied at the palm rest 125 shown by the arrow A, and at the fold handle 156 shown by the arrow B, to rotate the wings counter-clockwise (in this view) about the second pivot boss 126, 136, to bring the wings from their positions shown in FIG. 42 to those seen in FIG. 44. The continued application of opposing forces at these locations (A and B) will cause the first wing 140 to rotate clockwise (in this view) about the first pivot boss 134 and thus the second wing 160 to pivot counter-clockwise (in this view) about the second pivot boss 136, thus initiating the folding sequence. For the purposes of operating the collapsing hanger 110, the palm rest 125 can be considered a handle surface, as a thumb or other object could be utilized to brace the hanger there.

Near the completion of the extension sequence, opposing forces will have been applied at the palm rest 125 shown by the arrow A, and at the lift handle 150 shown by the arrow C, bringing the wings to their positions seen in FIG. 44. With the release of pressure at the lift handle 150, the potential energy within the spring member 180 will force the first wing 140 back down through the contact surfaces 185, 155, to the positions seen in FIG. 42. The collapsing hanger 110 will thus be locked in the extended position.

Figure 45:
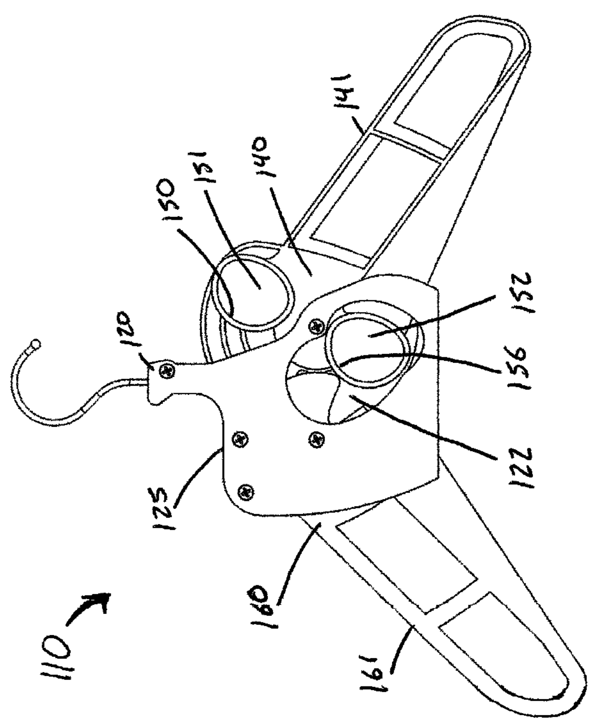
FIG. 45 is a front view of the collapsing hanger assembly of FIG. 25, with the wings in a partially collapsed position.

FIG. 45 is a front view of the hanger 110 in a partially collapsed configuration. The first wing 140 is rotated clockwise (in this view) about the first pivot boss 134 (FIG. 46), relative to its position as seen in FIG. 43. The second wing 160 is rotated counter-clockwise (in this view) about the second pivot boss 136 (FIG. 46), relative to its position as seen in FIG. 43.

Figure 46:
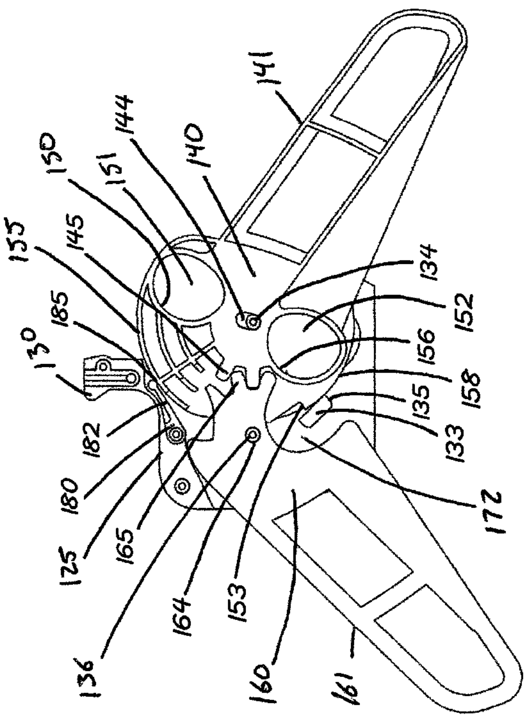
FIG. 46 is a section view of a partial collapsing hanger assembly of FIG. 25, with the wings in a partially collapsed position, as well as the spring member and back frame section present, taken along line D-D of FIG. 40.

FIG. 46 is a section view of the rear frame section 130 with the first and second wings 140, 160, as well as the spring member 180 placed in location as if of an assembly in the configuration seen in FIG. 45, taken along line D-D of FIG. 40. The first pivot boss 134 can be seen at the lower reach of the pivot slot 144 of the first wing 140. The moving latch face 153 can be seen at a position above the latch block 133. The lower contact face 158 is in contact with the upper face of the latch block 133 and it will remain so for the duration of first wing 140 rotation. This contact condition (158 to 133) will provide for resistance to the force imparted by the spring member 180 to the top contact surface 155, and will further ensure that first wing 140 will remain in an upward position with the first pivot boss 134 at the lower reach of the pivot slot 144 through all rotational movements until the wings are back to a lock/unlock position as seen in FIG. 44, at which point the wings can pivot back down to the positions seen in FIG. 42 dependent on forces applied.

Figure 47:
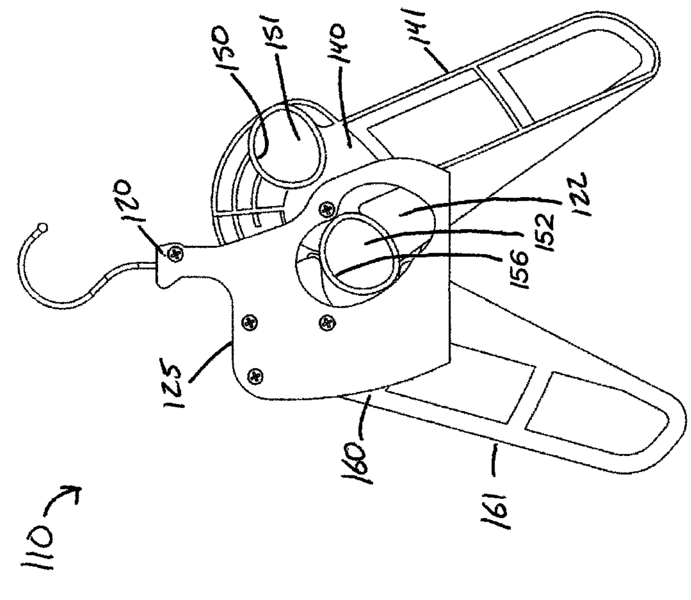
FIG. 47 is a front view of the collapsing hanger assembly of FIG. 25, with the wings in a further collapsed position than shown in FIG. 45.

FIG. 47 is a front view of the hanger 110 in a partially collapsed configuration. The first wing 140 is rotated clockwise (in this view) about the first pivot boss 134 (FIG. 48), relative to its position as seen in FIG. 45. The second wing 160 is rotated counter-clockwise (in this view) about the second pivot boss 136 (FIG. 48), relative to its position as seen in FIG. 45.

Figure 48:
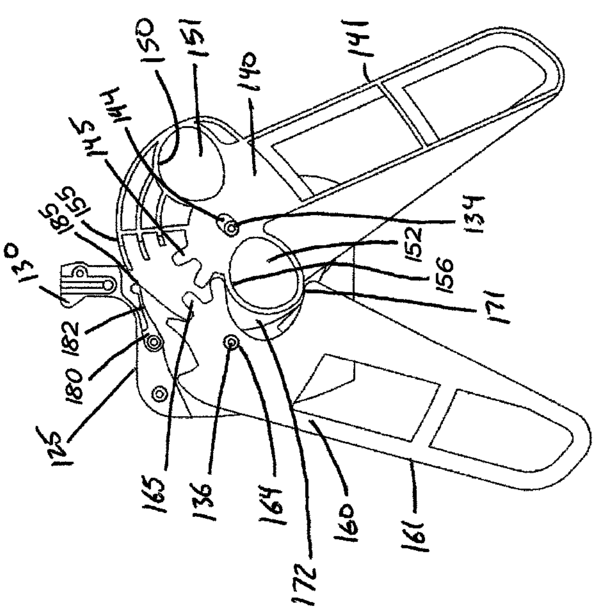
FIG. 48 is a section view of a partial collapsing hanger assembly of FIG. 25, with the wings in a further collapsed position than shown in FIG. 46, as well as the spring member and back frame section present, taken along line D-D of FIG. 40.
Figure 51:
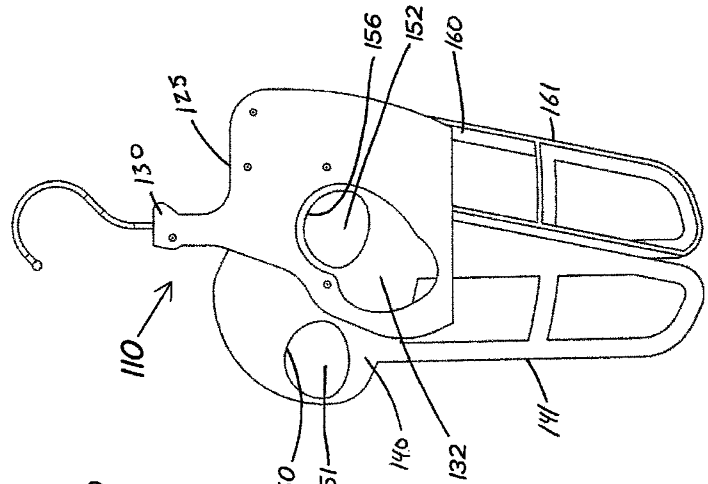
FIG. 51 is a back view of the collapsing hanger assembly of FIG. 25, with the wings in the fully closed position.

FIG. 48 is a section view of the rear frame section 130 with the first and second wings 140, 160, as well as the spring member 180 placed in location as if of an assembly in the configuration seen in FIG. 47, taken along line D-D of FIG. 40. The first pivot boss 134 can be seen at the lower reach of the pivot slot 144 of the first wing 140. The fold handle receiver opening 172 can be seen partially enveloping the fold handle 156 and finger opening 152, and the contact surface 171 can be seen in contact with the outside surface of the rib surrounding the finger opening 152. The spring member 180 can be seen in a less deflected condition than that of FIG. 47, with the spring contact surface 185 still in contact with the upper contact surface 155.

Figure 50:
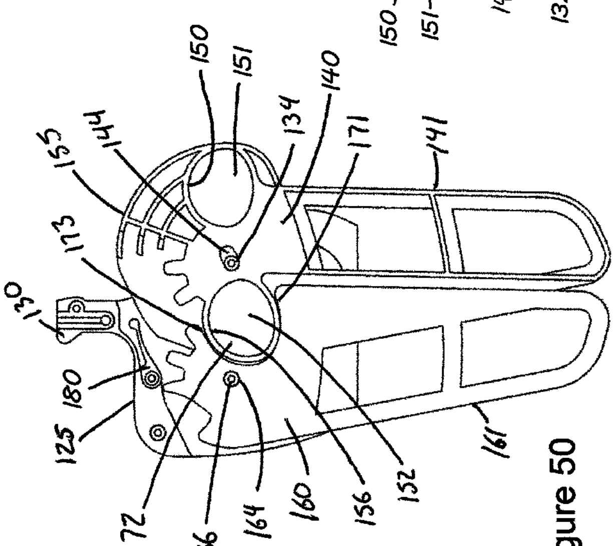
FIG. 50 is a section view of a partial collapsing hanger assembly of FIG. 25, with the wings in the fully collapsed position, as well as the spring member and back frame section present, taken along line D-D of FIG. 40.
Figure 49:
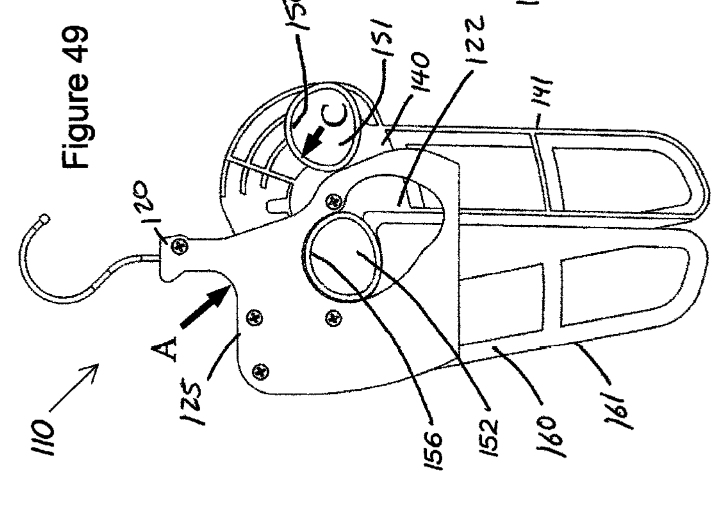
FIG. 49 is a front view of the collapsing hanger assembly of FIG. 25, with the wings in the fully collapsed position.

FIG. 49 is a front view of the hanger 110 in the fully collapsed, or folded, position. An arrow A shows where the force of the palm of a hand can be applied at the palm rest 125 in opposition to a second force applied to the lift handle 150 (such as with a user's finger), as denoted by the arrow C. Such forces would cause to initiate the folding sequence of the hanger by forcing the first wing 140 to pivot counter-clockwise (in this view) about the first pivot boss 134 (FIG. 50), in turn forcing the second wing 160 to pivot clockwise (in this view) about the second pivot boss 136 (FIG. 50). Continued application of forces at A and C will move the wings to positions as seen in FIG. 43, at which point the releasing of the forces will allow the spring member 180 (FIG. 50) to push the first wing 140 down into the locked position.

FIG. 50 is a section view of the rear frame section 130 with the first and second wings 140, 160, as well as the spring member 180 placed in location as if of an assembly in the fully collapsed position, taken along line D-D of FIG. 40. The first pivot boss 134 can be seen at the lower reach of the pivot slot 144 of the first wing 140. The fold handle receiver opening 172 can be seen fully enveloping the fold handle 156 and finger opening 152, and the contact surfaces 171 and 173 can be seen in contact with the outside surfaces of the rib surrounding the finger opening 152. The spring member 180 can be seen in an undeflected condition and not making contact with the first wing 140.

The movements described above are easily performed with a single hand having its palm in place at the palm rest 125 and one or more fingers in place at either the lift handle 150 or the fold handle 156, and at a distance that is generally comfortable for a human hand to hold. A second hand can be used to hold a shirt-type garment by the collar as the hanger 110 is expanded within the interior of the garment. A human hand possess a relatively high capability of force in a squeezing operation, which is more than enough to counteract the spring force holding the wings in the locked position, or the typical resistance to expansion that the hanger 110 may encounter when being expanded inside a garment. Thus the single hand operated collapsing hanger affords the ability to simply and quickly hang a shirt-type garment upon it, and then easily transfer the hanger and garment to a support device such as a hook or hanger rod.

The hanger as shown in the drawings is designed as if primarily constructed of plastic resin. Any or all of the components of the hanger could be constructed from alternate materials such as wood or metal. The disclosed latch assembly has the advantages of being releasable with a squeezing motion similar to that which expands the wings 140, 160 and being releasable by feel without looking at it (while it is inside the neck of the garment); however, other latch mechanisms could also be used. It is possible that features present on the frame 118, such as the palm rest 125 or the hook 112, could be alternatively formed into either of the wings 140, 160.

The second embodiment has both the fold handle features 156, 152 and the lift handle features 150, 151 formed integrally into the first wing 40. Alternatively it is possible that the fold handle features 156, 152 could be formed as part of the second wing 160. If so constructed, the moving latch surface 153 and the latch notch 154 would need to be present on the second wing 160 as well, and the pivot hole 164 would need to be slotted to allow for necessary movements. It would also be necessary to reconfigure the latch block 133, static latch face 135, and the lift handle clearance pocket 122 to allow for necessary interactions. With the lift handle 50 still formed as part of the first wing 40, it will remain possible to lift both wings in the manner described previously.

The second embodiment shows a spring member 180 that is formed separately of the other hanger components. It is conceivable that the needed spring force could be provided by another type of spring (such as coil) or even be formed integrally into the frame 118 or one of the frame components 120, 130. It is also possible to configure the hanger components so that the required spring force is applied directly to the second wing 160 versus the first wing 140. A further embodiment may include a spring mechanism connected to or integrally formed within one of the wings 140, 160. For example, a spring mechanism could be formed in leau of the upper contact surface 155, so as to interact directly with the spring support face 129, 139.

A further embodiment could be made so that the garment support features present in the second wing 160, such as the support surface 161, structure 162, and lower wing section, could be integrally formed into the frame 118 such that a second moving wing is not necessary. Such a design would have a single pivot point for the first wing 140 to translate and rotate about. It is likely that the first wing 140 would travel through a larger angle of motion between the collapsed and extended positions than in the previously described embodiment.

Figure 52:
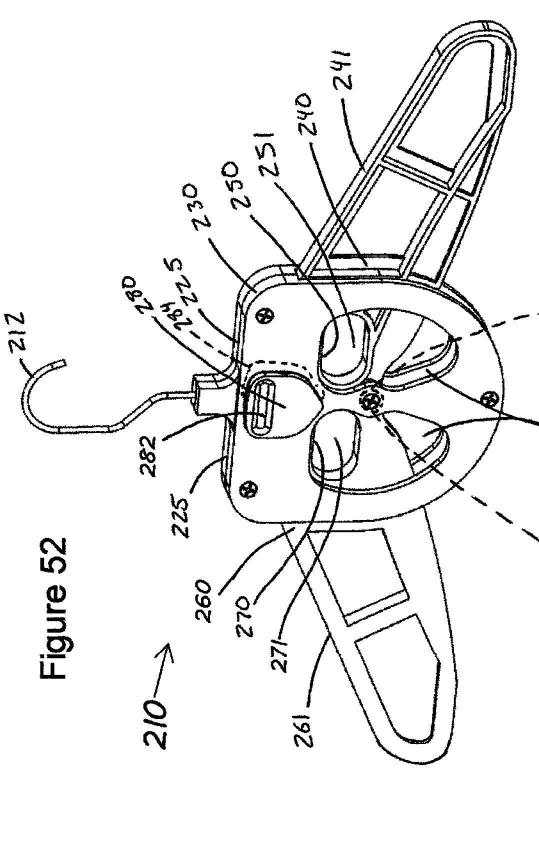
FIG. 52 is a perspective view of a collapsing hanger assembly with the wings extended to an open position, according to a third embodiment.

FIG. 52 is a perspective view of a third example single hand operated collapsing hanger 210, in its expanded configuration. The embodiment shown in FIG. 52 generally includes a hanging hook 212, a frame 230, a first wing 240 having a first garment support surface 241, a second wing 260 having a second garment support surface 261, and latches 280 and 284 (shown as hidden). In this example embodiment, the frame 230 is constructed of two separate pieces, a front and a back, connected together such as by screws (or adhesive, welding, snap-fit connections, etc). Alternatively, the frame 230 could be formed as one piece.

The latches 280 and 284, are identical in design and mounted to the front and rear faces of the hanger frame 230. The latches 280, 284 can pivot about separate horizontal axes, and contain resilient biasing features that urge them to wing locking positions. By squeezing the upper faces of the latches 280, 284 together toward the central plane of the hanger 210, they will pivot about their respective axes, moving internal hook features 285 (FIG. 57) in such a way that the wings 240, 260 are allowed to drop and pivot about a central pivot mount 234 (shown as hidden).

Figure 53:
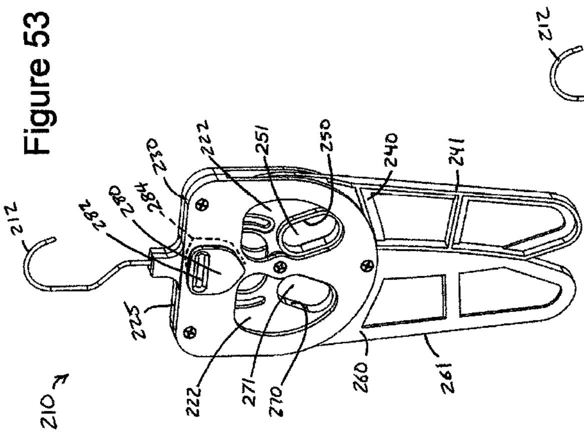
FIG. 53 is a perspective view of the collapsing hanger assembly of FIG. 52, with the wings folded down to a closed position.

FIG. 53 is a perspective view of the hanger 210, in its collapsed, or folded, configuration. The wings 240, 260 can be seen with their free (or distal) ends pointing downward, and the overall horizontal dimension of the hanger 210 is greatly reduced from that seen in FIG. 52.

To expand the wings 240, 260 of hanger 210 back to their extended positions, a single hand can be placed so that the palm will rest on a palm contact surface 225, and extend fingers can be placed in the lift openings 251, 271. Upward force can be applied by the fingers upon the lifting surfaces 250, 270, such as in a squeezing motion in opposition to the palm, so that the wings 240, 260 can rotate upward about the central pivot mount 234 (FIG. 54), until they reach a position where the latches 280, 284 re-engage with the wings. Clearance slots 222 in the frame 230 allow for the unimpeded movement of fingers as they raise the wings 240, 260 up to their extended positions.

Figure 54:
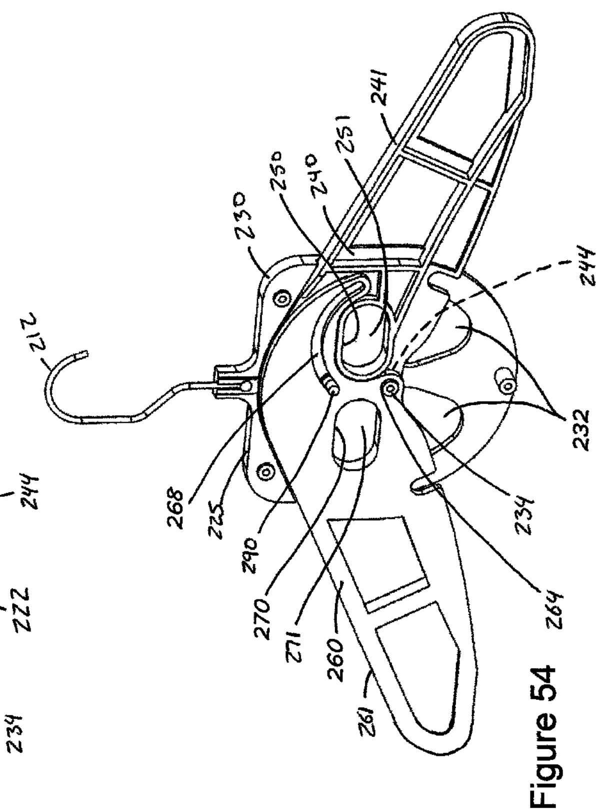
FIG. 54 is a perspective view of the partial collapsing hanger assembly of FIG. 52, in the expanded configuration, with the first and second wings in place on the pivot mount of the back frame section, and the guide pin present within the wing guide slots.

FIG. 54 is a front perspective view of the back portion of the frame 230 with the wings 240, 260 as well as the guide pin 290 in location as if of an assembly in the expanded configuration. The pivot mount 234 can be seen projecting through the wing pivot holes 264 and 244 (shown as hidden). Also shown is the second wing guide slot 268. Clearance slots 232 in the back portion of the frame 230 allow for the unimpeded projection of fingers through the openings 251, 271 during expanding or collapsing.

Figure 55:
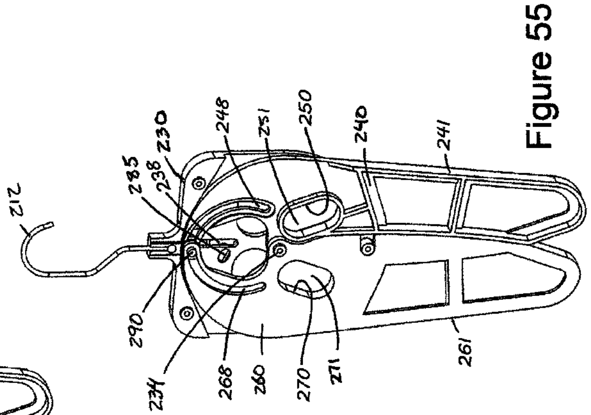
FIG. 55 is a perspective view of the partial collapsing hanger assembly of FIG. 52, in the collapsed configuration, with the first and second wings in place on the pivot mount of the back frame section, and the guide pin present within the wing guide slots. Features belonging to the back latch are also visible through openings within the back frame section.

FIG. 55 is a front perspective view of the back portion of the frame 230 with the wings 240, 260 as well as the guide pin 290 in location as if of an assembly in the collapsed configuration. A latch hook feature 285 can be seen projecting from the rear latch 284 through a hole in the back portion of the frame. Also shown is a vertical guide slot 238 which is formed into the back portion of the frame 230. As the wings 240, 260 rotate through their range of movements about the pivot mount 234, the guide pin 290 travels within the vertical guide slot 238 and the wing guide slots 248, 268 in such a manner that the wings 240, 260 are held at equivalent degrees of collapse throughout their range of motions. More simply, the wings 240, 260 are forced to rotate up and down the same amount by virtue of a cam action as the guide pin 290 moves within the various guide slots 248, 268, 238, and a matching vertical guide slot in the front portion of the frame 230 (not shown).

Figure 56:
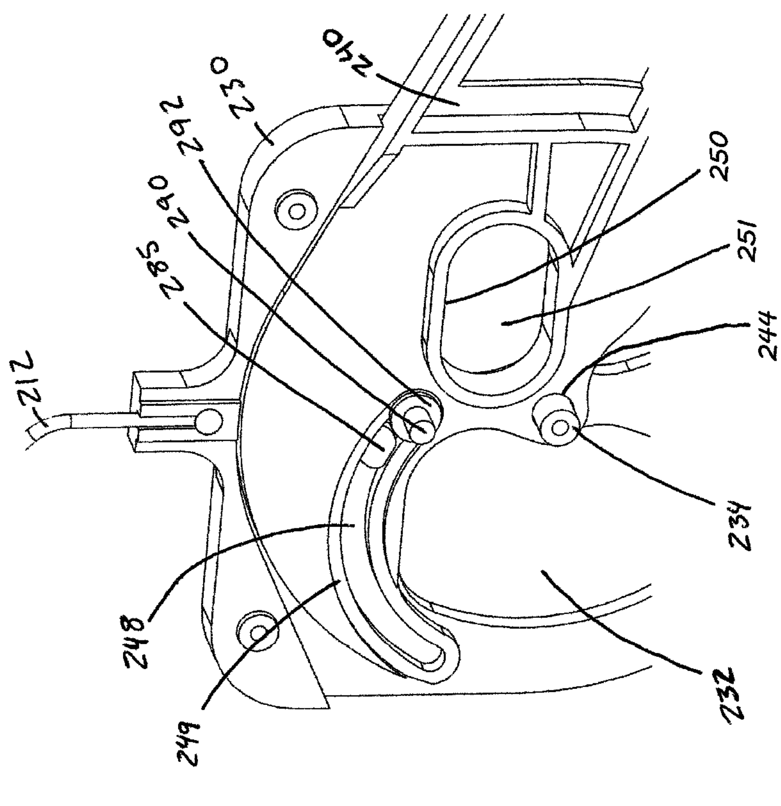
FIG. 56 is a closeup perspective view of a portion of the collapsing hanger assembly of FIG. 52, in the expanded configuration, with the first wing in place on the pivot mount of the back frame section, and the guide pin present in the first wing guide slot. The back latch hook feature is also visible within the first wing guide slot.

FIG. 56 is a close up view of some features of the back portion of the frame 230 and the first wing 240 in the expanded position. The guide pin 290 can be seen as including a flange surface portion 292 which prevents axial movement of the pin, and moves through a clearance portion 249 of the wing guide slot 248 in wing 240. Also visible is the latch hook 285 projecting into the wing guide slot 248 as if in the latched position, and thus not allowing the first wing to pivot about the pivot mount 234.

Figure 57:
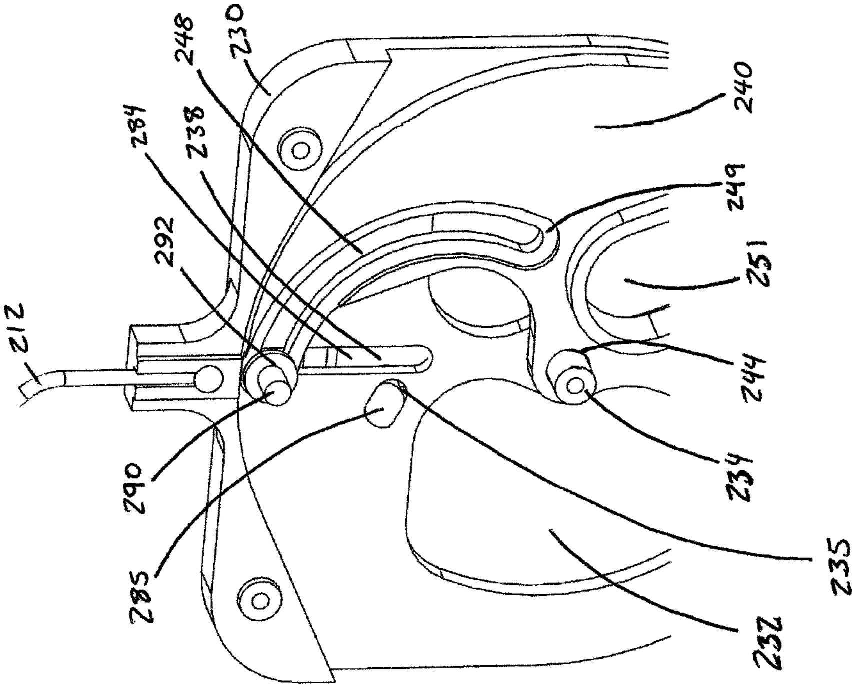
FIG. 57 is a closeup perspective view of a portion of the collapsing hanger assembly of FIG. 52, in the collapsed configuration, with the first wing in place on the pivot mount of the back frame section, and the guide pin present in the first wing guide slot. Features belonging to the back latch are also visible through openings within the back frame section.

FIG. 57 is a close up view of some of the features of the back portion of the frame 230 and the first wing 240 in the collapsed position. The latch hook 285 can be seen projecting though a clearance hole 235 in the back portion of the frame 230. A clearance hole matching the hole 235 is also present in the front portion of the frame 230 (not shown), thus allowing for the function of the front latch 280.

Figure 58:
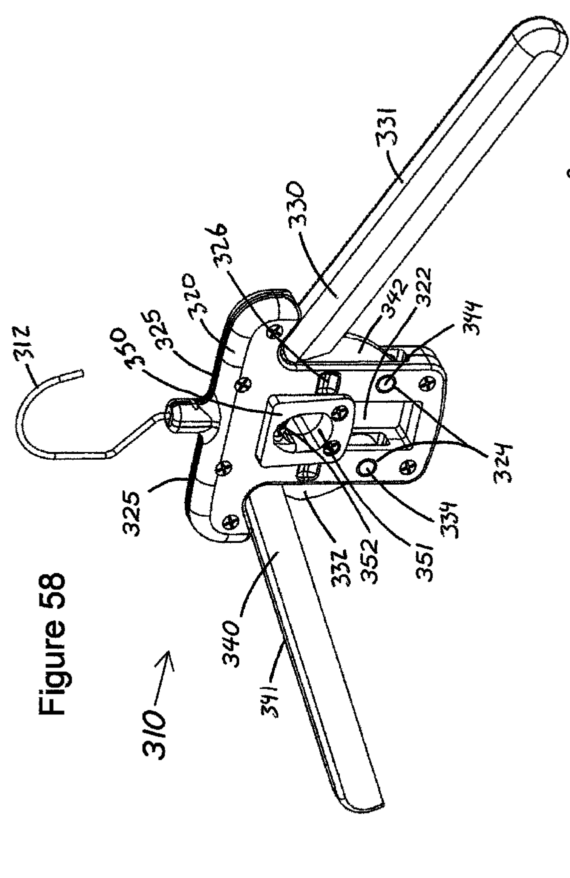
FIG. 58 is a perspective view of a collapsing hanger assembly with the wings extended to an open position, according to a forth embodiment.

FIG. 58 is a perspective view of a fourth example single hand operated collapsing hanger 310, in its expanded configuration. The embodiment shown in FIG. 58 generally includes a hanging hook 312, a frame 320, a first wing 330 having a first garment support surface 331, a second wing 340 having a second garment support surface 341, and a shuttle 350. In this example embodiment, the frame 320 is constructed of two separate pieces, a front and a back, connected together such as by screws (or adhesive, welding, snap-fit connections, etc). Alternatively, the frame 320 could be formed as one piece. Additionally in this example embodiment, the shuttle 350 is constructed of two separate pieces, a front and a back, connected together such as by screws (or adhesive, welding, snap-fit connections, etc). Alternatively, the shuttle 350 could be formed as one piece.

The inboard upper surface 356 (FIG. 61) of the shuttle 350 is formed so as to make contact with the wing cam surfaces 336 and 346 (FIG. 60) of the wings 330 and 340, respectively. The wings 330, 340 are further supported by pivot shafts 334, 344, which fit inside pivot holes 324 formed into the front and back sections of the frame 320. To collapse the hanger 310, the frame 320 is grasped firmly and the shuttle 350 is pushed downward so as to overcome detent features 355 internal to the hanger (FIG. 61), thereby allowing the shuttle 350 to travel downward within the clearance slot 322. Subsequently the wing cam surfaces 336, 246 will slide along the inboard upper surface 356 of the shuttle 350 as the wings 330, 340 pivot downward about the axes of their pivot shafts 334, 344 until the shuttle 350 reaches its lowest position within the slot 322.

Figure 59:
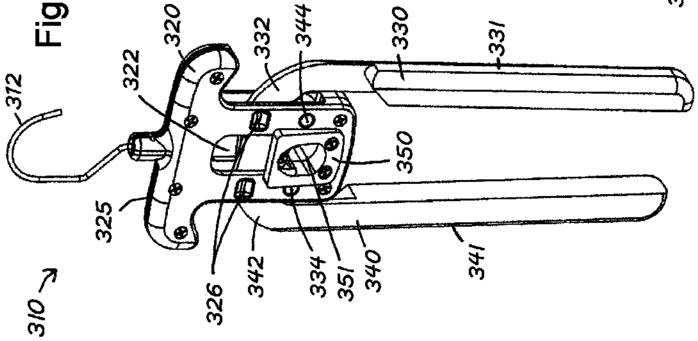
FIG. 59 is a perspective view of the collapsing hanger assembly of FIG. 58, with the wings folded down to a closed position.

FIG. 59 is a perspective view of the hanger 310, in its collapsed, or folded, configuration. The shuttle 350 is seen in its lower position within the clearance slot 322. The wings 330, 340 can be seen with their free ends pointing downward, and the overall horizontal dimension of the hanger 310 is greatly reduced from that seen in FIG. 58.

To expand the wings 330, 340 of hanger 310 back to their extended positions, a single hand can be placed so that the palm will rest on a palm contact surface 325, and one or more extend fingers can be placed in the lift opening 351 within the shuttle 350. Upward force can be applied by the finger(s) upon the lifting surface 352, such as in a squeezing motion toward the palm, so that the shuttle 350 moves upward in the clearance slot 322 thereby urging the wings 330, 340 to rotate back up to their extended positions as the inboard upper surface 356 (FIG. 61) of the shuttle 350 applies an upward force to the wing cam surfaces 336, 346 (FIG. 60) as they slide along that surface 356. Once the shuttle 350 reaches its upper position within the clearance slot 322, it will snap back into a locked position as the shuttle detent features 355 (FIG. 61) re-engage with the wing detent features 335, 345 (FIG. 60).

Figure 60:
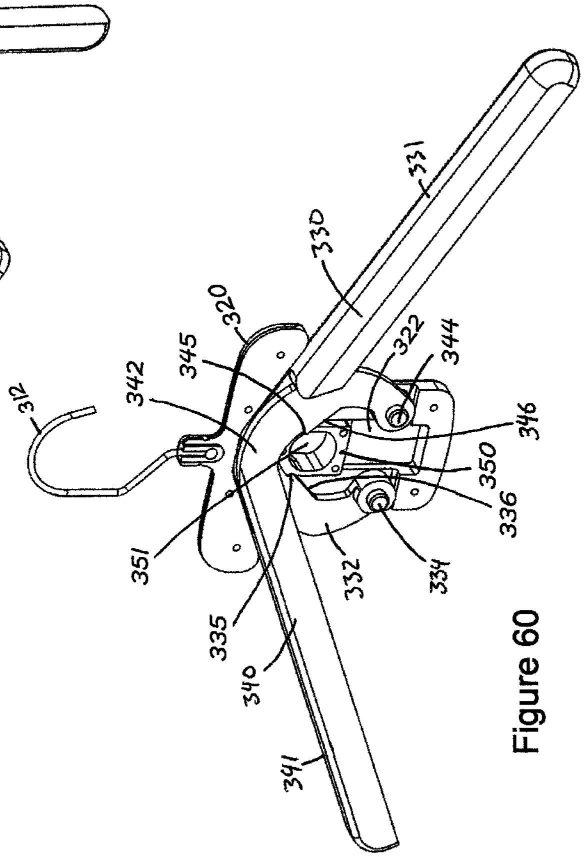
FIG. 60 is a perspective view of the partial collapsing hanger assembly of FIG. 58, in the expanded configuration, with the first and second wings in place on the pivot holes of the back frame section, and a back portion of the shuttle shown in the upper locked position.

FIG. 60 is a front perspective view of the back portion of the frame 320 with the wings 330, 340 as well as the back portion of the shuttle 350 in location as if of an assembly in the expanded configuration. The wing pivot shafts 334, 344 can be clearly seen projecting from the inboard ends of the wings 330, 340. The wing cam surfaces 336, 346 of the wings 330, 340 are visible along with the respective detent features 335, 345. The rear portion of the clearance slot 322 can also be seen enveloping the back shuttle portion 350.

Figure 61:
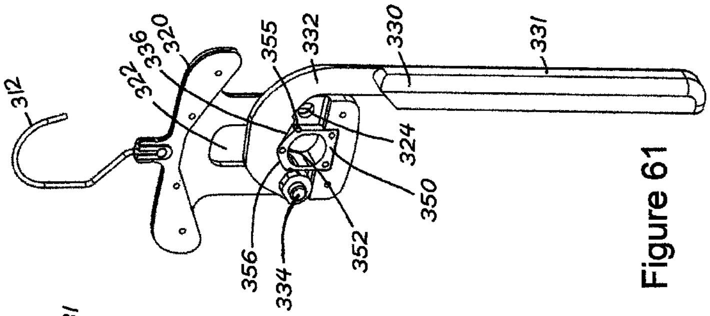
FIG. 61 is a perspective view of the partial collapsing hanger assembly of FIG. 58, in the collapsed configuration, with the first wing in place on a pivot hole of the back frame section, and a back portion of the shuttle shown in the lower position.

FIG. 61 is a front perspective view of the back portion of the frame 320 with just the first wing 330 as well as the back portion of the shuttle 350 in location as if of an assembly in the collapsed configuration. The inboard upper surface 356 of the shuttle 350 is identified along with one of the two shuttle detent features 355 which are formed into the inboard side surfaces of the shuttle 350. The shuttle 350 can be seen in it lowest most position and enveloped by the clearance slot 322.

Figure 62:
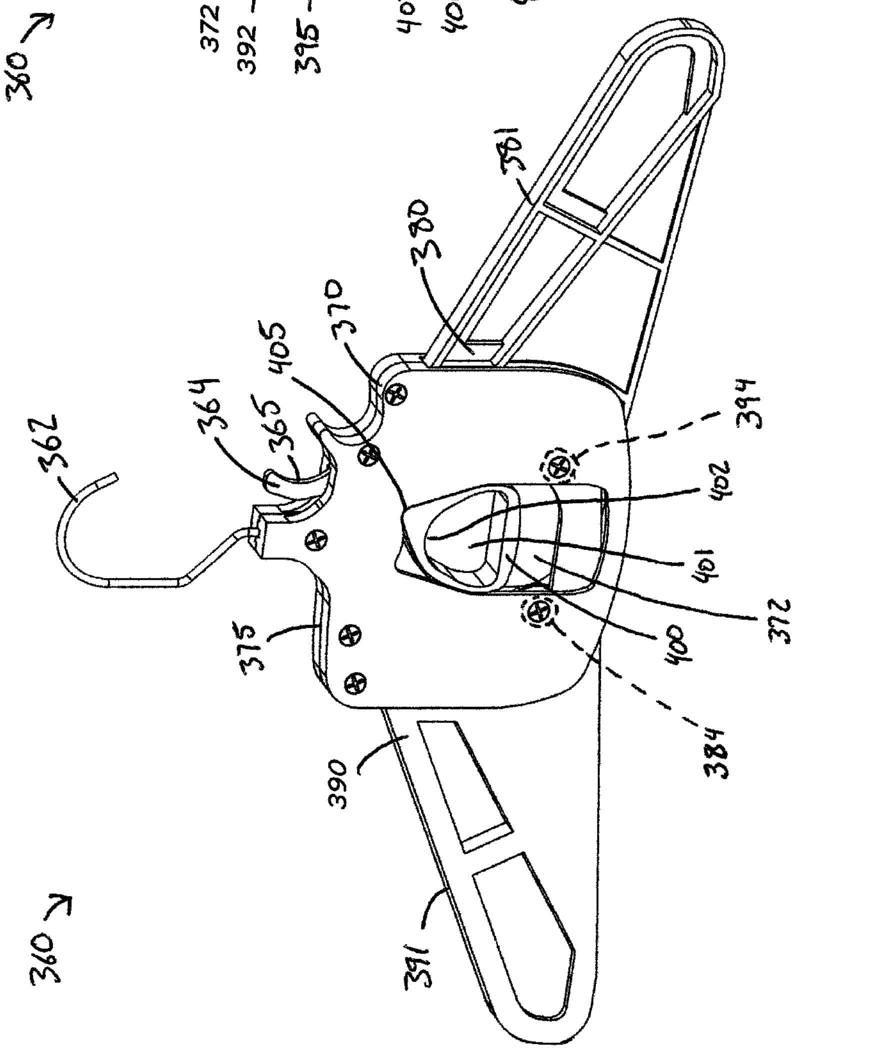
FIG. 62 is a perspective view of a collapsing hanger assembly with the wings extended to an open position, according to a fifth embodiment.

FIG. 62 is a perspective view of a fifth example single hand operated collapsing hanger 360, in its expanded configuration. The embodiment shown in FIG. 62 generally includes a hanging hook 362, a frame 370, a first wing 380 having a first garment support surface 381, a second wing 390 having a second garment support surface 391, a shuttle 400, and a trigger 364. In this example embodiment, the frame 370 is constructed of two separate pieces, a front and a back, connected together such as by screws (or adhesive, welding, snap-fit connections, etc). Alternatively, the frame 370 could be formed as one piece.

The cam surface 405 of the shuttle 400 is formed so as to make contact with the wing cam surfaces 385 (FIG. 65) and 395 (FIG. 64) of the wings 380 and 390, respectively. The wings 380, 390 are further supported at integrally formed pivot holes 384, 394 (shown as hidden) which fit upon pivot bosses 376, 374 (FIG. 64) formed into the front and back sections of the frame 370. To collapse the hanger 360, the frame 370 is grasped firmly with the palm of one hand resting on the palm support surface 375, and at least one finger of the same hand is used to pull on the trigger surface 365 to rotate the trigger 364 about an axis passing through the trigger shaft 366 (FIG. 65) which in turn unlocks the shuttle 400 from an upper position and allows it to fall to a lower position under the force of gravity. The weight of the free ends of the wings 380, 390 along with any garment weight acting upon their support surfaces 381, 391, will urge the wings 380, 390 to pivot downward about their pivot mounts 384, 394 as a subsequent force is transferred downward via the wing cam surfaces 385 (FIG. 65) and 395 (FIG. 64) to the shuttle cam surface 405.

Figure 63:
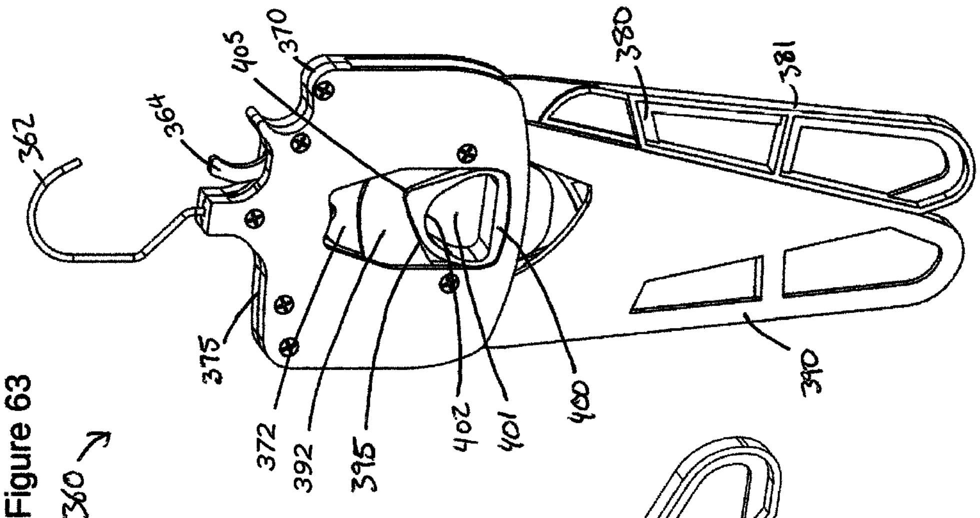
FIG. 63 is a perspective view of the collapsing hanger assembly of FIG. 62, with the wings folded down to a closed position.

FIG. 63 is a perspective view of the hanger 360, in its collapsed, or folded, configuration. The shuttle 400 is seen in its lower position within the clearance slot 372. The wings 380, 390 can be seen with their free ends pointing downward, and the overall horizontal dimension of the hanger 360 is greatly reduced from that seen in FIG. 62.

To expand the wings 380, 390 of hanger 360 back to their extended positions, a single hand can be placed so that the palm will rest on a palm contact surface 375, and one or more extend fingers can be placed in the lift opening 401 within the shuttle 400. Upward force can be applied by the finger(s) upon the lifting surface 402, such as in a squeezing motion in opposition to the palm, so that the shuttle 400 moves upward in the clearance slot 372 thereby urging the wings 380, 390 to rotate back up to their extended positions as the cam surface 405 of the shuttle 400 applies an upward force to the wing cam surfaces 385 (FIG. 65) and 395 (FIG. 64) as they slide along that surface 405. Once the shuttle 400 reaches its upper position within the clearance slot 372, it will re-engage with the trigger 364 so as to latch it in place.

Figure 64:
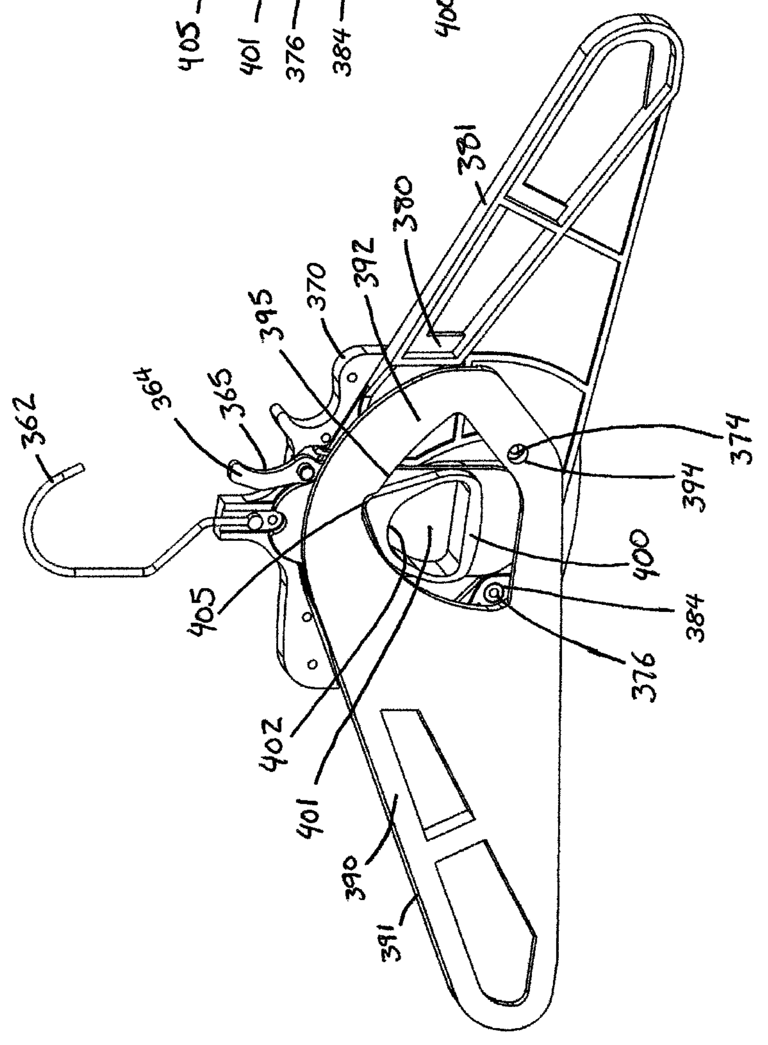
FIG. 64 is a perspective view of the partial collapsing hanger assembly of FIG. 62, in the expanded configuration, with the first and second wings in place on the pivot mounts of the back frame section, and the shuttle shown in the upper locked position. An upper portion of the latch is also visible, with its lower section sandwiched between wings.

FIG. 64 is a front perspective view of the back portion of the frame 370 with the wings 380, 390 as well as the shuttle 400 and trigger 364 in location as if of an assembly in the expanded configuration. The wing pivot holes 384, 394 can be clearly seen along with the pivot bosses 376, 374. The wing cam surface 395 can be seen formed along the inner edge of an inboard bracing section 392 of the second wing 390.

Figure 65:
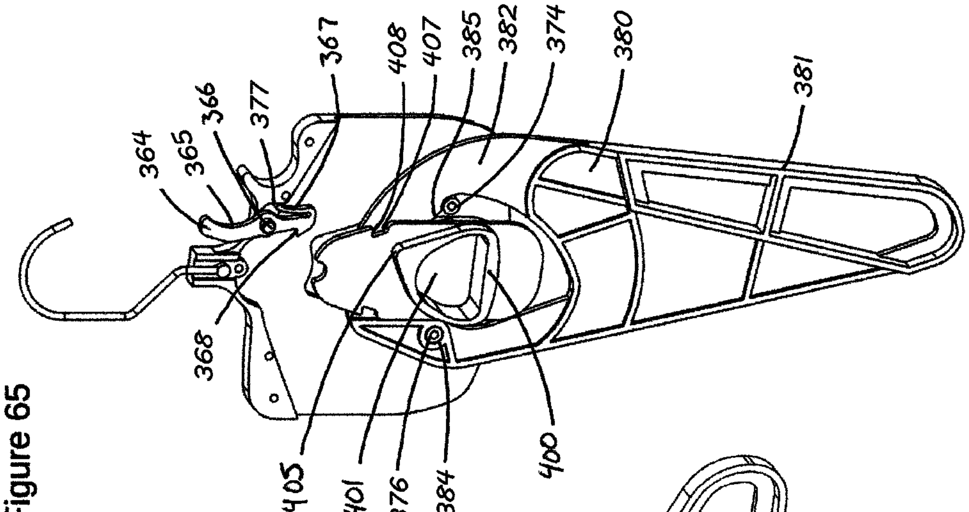
FIG. 65 is a perspective view of the partial collapsing hanger assembly of FIG. 62, in the collapsed configuration, with the first wing in place on a pivot mount of the back frame section, and a the shuttle shown in the lower position. An unobstructed view of the latch is also shown.

FIG. 65 is a front perspective view of the back portion of the frame 370 with just the first wing 380 as well as the shuttle 400 and trigger 364 in location as if of an assembly in the collapsed position. The full profile of the trigger 364 can be seen with its features including the trigger pull surface 365, the pivot shaft 366, the trigger spring 377, and the trigger hook 368. The shuttle 400 is seen in its lower position and the shuttle hook 408 and hook clearance notch 407 are identified. When the shuttle 400 is placed in the upper locked position, the trigger hook 368 is urged by the trigger spring 377 so as to nest inside the hook clearance notch 407 and engage with the shuttle hook 408. The wing cam surface 385 can be seen formed along the inner edge of an inboard bracing section 382 of the first wing 380.

Figure 66:
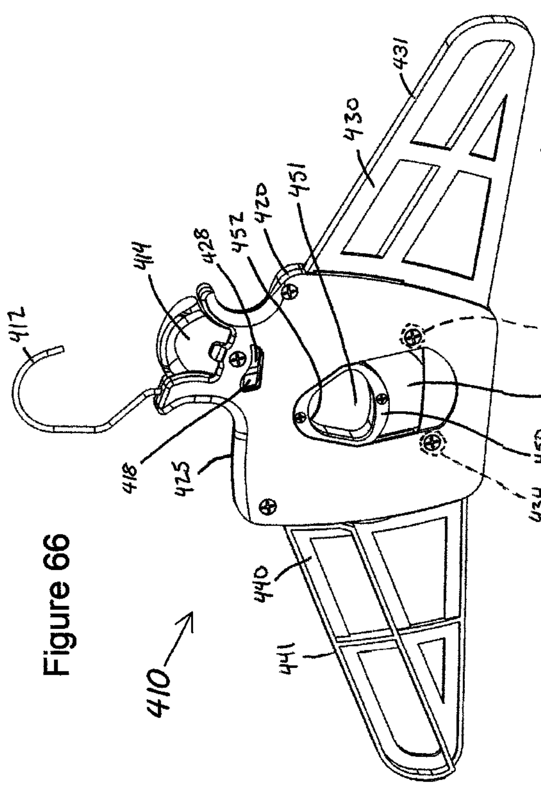
FIG. 66 is a perspective view of a collapsing hanger assembly with the wings extended to an open position, according to a sixth embodiment.

FIG. 66 is a perspective view of a sixth example single hand operated collapsing hanger 410, in its expanded configuration. The embodiment shown in FIG. 66 generally includes a hanging hook 412, a frame 420, a first wing 430 having a first garment support surface 431, a second wing 440 having a second garment support surface 441, a shuttle 450, and a trigger 414. In this example embodiment, the frame 420 is constructed of two separate pieces, a front and a back, connected together such as by screws (or adhesive, welding, snap-fit connections, etc). Alternatively, the frame 420 could be formed as one piece. Additionally in this example embodiment, the shuttle 450 is constructed of two separate pieces, a front and a back, connected together such as by screws (or adhesive, welding, snap-fit connections, etc). Alternatively, the shuttle 450 could be formed as one piece.

Figure 69:
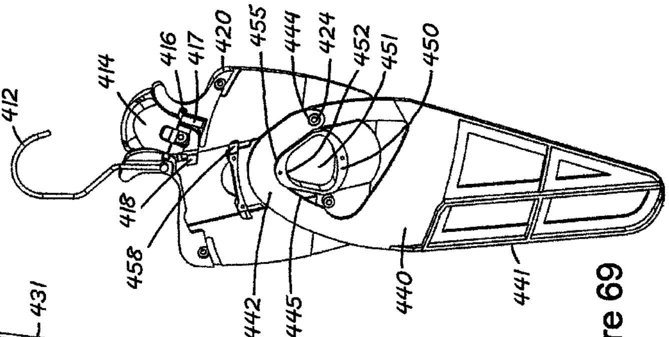
FIG. 69 is a perspective view of the partial collapsing hanger assembly of FIG. 66, in the collapsed configuration, with the second wing in place on a pivot mount of the back frame section, and the back portion of the shuttle shown in the lower position. An unobstructed view of the latch is also shown.

The inboard cam surface 455 (FIG. 69) of the shuttle 450 is formed so as to make contact with the wing cam surfaces 435 (FIG. 68) and 445 (FIG. 69) of the wings 430 and 440, respectively. The wings 430, 440 are further supported at integrally formed pivot holes 434, 444 (shown as hidden) which fit upon pivot bosses 426, 424 (FIG. 68) formed into the front and back sections of the frame 420. To collapse the hanger 410, the frame 420 is grasped firmly with the palm of one hand resting on the palm support surface 425, and at least one finger of the same hand is used to move the trigger 414 about an axis passing through the trigger shaft 416 (FIG. 68) which in turn unlocks the shuttle 450 from an upper position and allows it to fall to a lower position under the force of gravity. The weight of the free ends of the wings 430, 440 along with any garment weight acting upon their support surfaces 431, 441, will urge the wings 430, 440 to pivot downward about their pivot mounts 434, 444 as a subsequent force is transferred downward via the wing cam surfaces 435 (FIG. 68) and 445 (FIG. 69) to the shuttle cam surface 455 (FIG. 69).

Figure 67:
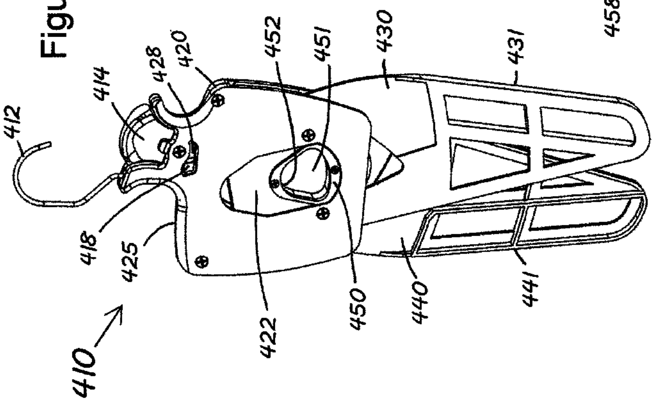
FIG. 67 is a perspective view of the collapsing hanger assembly of FIG. 66, with the wings folded down to a closed position.

FIG. 67 is a perspective view of the hanger 410, in its collapsed, or folded, configuration. The shuttle 450 is seen in its lower position within the clearance slot 422. The wings 430, 440 can be seen with their free ends pointing downward, and the overall horizontal dimension of the hanger 410 is greatly reduced from that seen in FIG. 66.

To expand the wings 430, 440 of hanger 410 back to their extended positions, a single hand can be placed so that the palm will rest on a palm contact surface 425, and one or more extend fingers can be placed in the lift opening 451 within the shuttle 450. Upward force can be applied by the finger(s) upon the lifting surface 452, such as in a squeezing motion in opposition to the palm, so that the shuttle 450 moves upward in the clearance slot 422 thereby urging the wings 430, 440 to rotate back up to their extended positions as the cam surface 455 (FIG. 69) of the shuttle 450 applies an upward force to the wing cam surfaces 435 (FIG. 68) and 445 (FIG. 69) as they slide along that surface 455. Once the shuttle 450 reaches its upper position within the clearance slot 422, it will re-engage with the trigger 414 so as to latch it in place.

Figure 68:
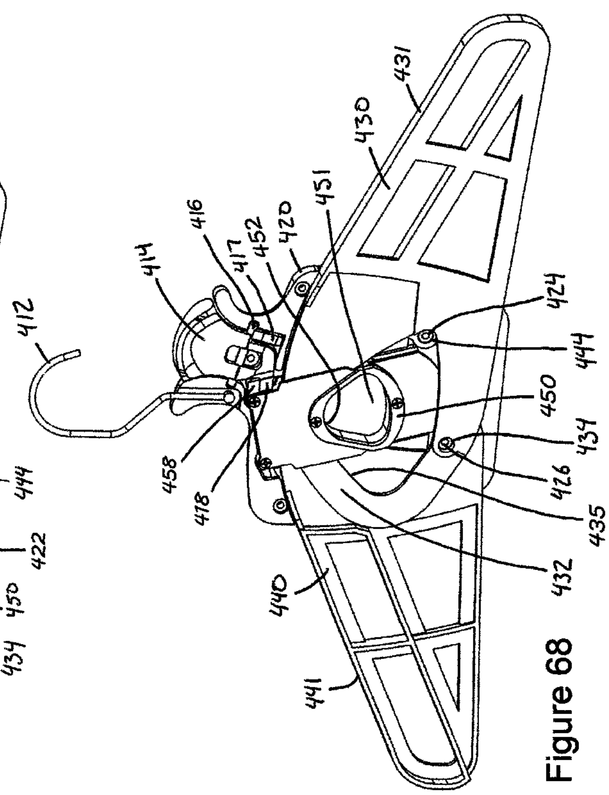
FIG. 68 is a perspective view of the partial collapsing hanger assembly of FIG. 66, in the expanded configuration, with the first and second wings in place on the pivot mounts of the back frame section, the shuttle shown in the upper locked position, and the latch visible.

FIG. 68 is a front perspective view of the back portion of the frame 420 with the wings 430, 440 as well as the shuttle 450 and trigger 414 in location as if of an assembly in the expanded configuration. The trigger hook 418 can be seen positioned beneath the shuttle hook 458, so as to hold the shuttle 450 (and thereby the wings 430, 440) in the upper locked position. The trigger shaft 416 can be seen with its axis generally in line with the upper support surface 431 of the first wing 430. The trigger spring 417 can be seen in its undeformed position so as to urge trigger 414 to this locked orientation. The wing pivot holes 434, 444 can be clearly seen along with the pivot bosses 426, 424. The wing cam surface 435 can be seen formed along the inner edge of an inboard bracing section 432 of the first wing 430.

FIG. 69 is a front perspective view of the back portion of the frame 420 with just the second wing 440 as well as the back portion of the shuttle 450 and trigger 414 in location as if of an assembly in the collapsed position. The trigger 414 is shown in a deflected (unlocking) position as if it has pivoted about the trigger shaft 416 axis as the upper portion of the trigger has been pushed toward the back side of the hanger 410. In this condition, the trigger hook 418 will have moved toward the front side of the hanger 410 so as to release the shuttle hook 458, allowing the shuttle 450 to slide downward. Alternately, the hanger could be collapsed by gripping the frame 420 and pushing the upper portion of the trigger 414 toward the front side of the hanger 410. In this condition, the trigger hook 418 will have moved toward the back side of the hanger 410 so as to release the shuttle hook 458. The back portion of the shuttle 450 is shown in the lower position in this view, and the inboard shuttle cam surface 455 can be seen making contact with the second wing cam surface 445 which is formed along the inner edge of an inboard bracing section 422 of the second wing 440.

Figure 70:
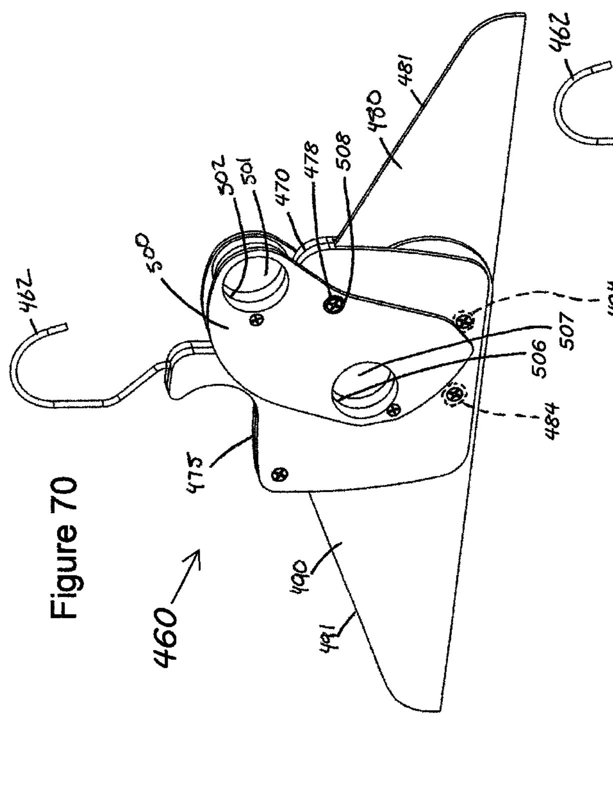
FIG. 70 is a perspective view of a collapsing hanger assembly with the wings extended to an open position, according to a seventh embodiment.

FIG. 70 is a perspective view of a seventh example single hand operated collapsing hanger 460, in its expanded configuration. The embodiment shown in FIG. 70 generally includes a hanging hook 462, a frame 470, a first wing 480 having a first garment support surface 481, a second wing 490 having a second garment support surface 491, and a rotating carriage 500. In this example embodiment, the frame 470 is constructed of two separate pieces, a front and a back, connected together such as by screws (or adhesive, welding, snap-fit connections, etc). Alternatively, the frame 470 could be formed as one piece. Additionally in this example embodiment, the rotating carriage 500 is constructed of two separate pieces, a front and a back, connected together such as by screws (or adhesive, welding, snap-fit connections, etc). Alternatively, the rotating carriage 500 could be formed as one piece.

The carriage cam surface 505 (FIG. 73) of the rotating carriage 500 is formed so as to make contact with the wing cam surfaces 485 (FIG. 73) and 495 (FIG. 72) of the wings 480 and 490, respectively. The wings 480, 490 are further supported at integrally formed pivot holes 484, 494 (shown as hidden) which fit upon pivot bosses 476, 474 (FIG. 72) formed into the front and back sections of the frame 470. The rotating carriage 500 is pivotably mounted to the frame 470 by virtue of pivot holes 508 formed in the carriage 500 which fit over pivot bosses 478 formed on the frame 470. To collapse the hanger 460, the frame 470 is grasped firmly with the palm of one hand resting on the palm support surface 475, and at least one finger of the same hand is placed through the fold clearance hole 501 and used to pull in a squeezing motion on the fold handle 502 which subsequently rotates counter-clockwise (in this view) about its pivot mount 508 and causes the carriage cam surface 505 (FIG. 73) to move downward. The weight of the free ends of the wings 480, 490 along with any garment weight acting upon their support surfaces 481, 491, will urge the wings 480, 490 to pivot downward about their pivot mounts 484, 494 as a subsequent force is transferred downward via the wing cam surfaces 485 (FIG. 73) and 495 (FIG. 72) to the shuttle cam surface 505.

Figure 71:
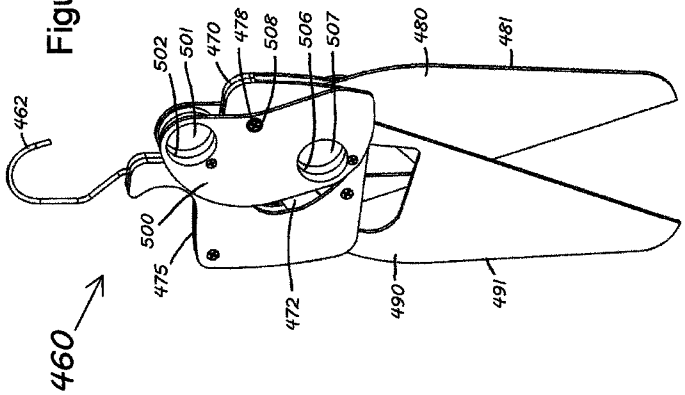
FIG. 71 is a perspective view of the collapsing hanger assembly of FIG. 70, with the wings folded down to a closed position.

FIG. 71 is a perspective view of the hanger 460, in its collapsed, or folded, configuration. The rotating carriage 500 is seen in its wings folded position. The wings 480, 490 can be seen with their free ends pointing downward, and the overall horizontal dimension of the hanger 460 is greatly reduced from that seen in FIG. 70.

To expand the wings 480, 490 of hanger 460 back to their extended positions, a single hand can be placed so that the palm will rest on a palm contact surface 475, and one or more extend fingers can be placed in the lift opening 507 within the rotating carriage 500. Upward force can be applied by the finger(s) upon the lifting handle 506, such as in a squeezing motion in opposition to the palm, so that the rotating carriage rotates clockwise (in this view) about its pivot mount 508 and causes the carriage cam surface 505 (FIG. 73) to move upward within the clearance slot 472 formed into the frame 470. As the carriage cam surface 505 moves upward it urges up on the wing cam surfaces 485 (FIG. 73) and 495 (FIG. 72), allowing them to slide about it (505) as the wings 480, 490 rotate about their pivot mounts 484, 494 back to their extended positions.

Figure 72:
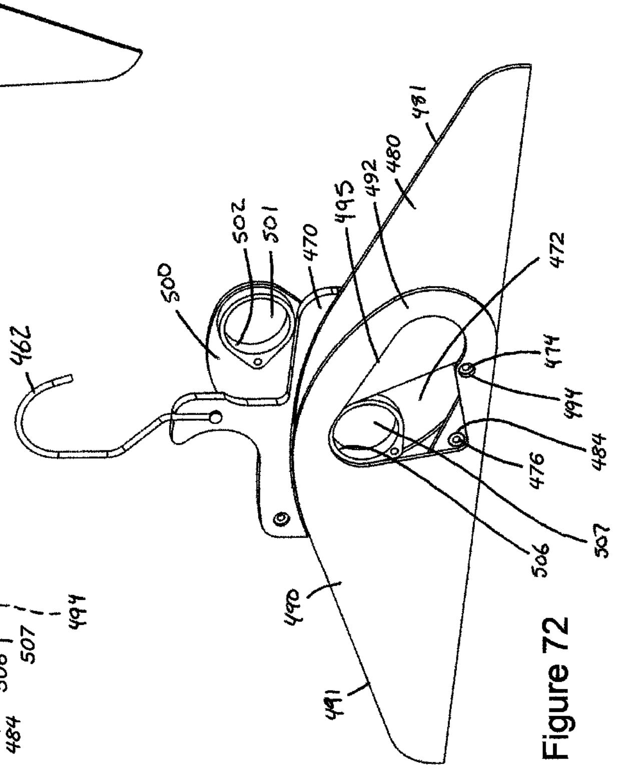
FIG. 72 is a perspective view of the partial collapsing hanger assembly of FIG. 70, in the expanded configuration, with the first and second wings in place on the pivot mounts of the back frame section, and the back portion of the rotating carriage shown in the wings extended position.

FIG. 72 is a front perspective view of the back portion of the frame 470 with the wings 480, 490 as well as the back portion of the rotating carriage 500 in location as if of an assembly in the expanded configuration. The wing pivot holes 484, 494 can be clearly seen along with the pivot bosses 476, 474. The wing cam surface 495 can be seen formed along the inner edge of an inboard bracing section 492 of the second wing 490.

Figure 73:
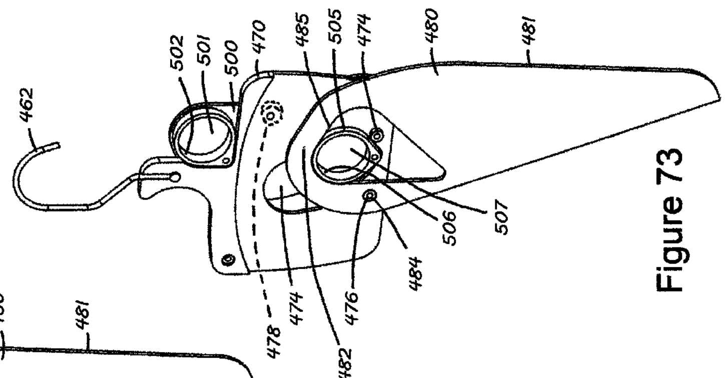
FIG. 73 is a perspective view of the partial collapsing hanger assembly of FIG. 70, in the collapsed configuration, with the first wing in place on a pivot mount of the back frame section, and the back portion of the rotating carriage shown in the wings folded position.

FIG. 73 is a front perspective view of the back portion of the frame 470 with just the first wing 480 as well as the back portion of the rotating carriage 500 in location as if of an assembly in the collapsed position. A pivot boss 478 is shown as hidden as if formed on the back side of the back frame section. The rotating carriage is seen in the wings folded position, and the carriage cam surface 505 is identified. The wing cam surface 485 can be seen formed along the inner edge of an inboard bracing section 482 of the first wing 480.

Figure 74:
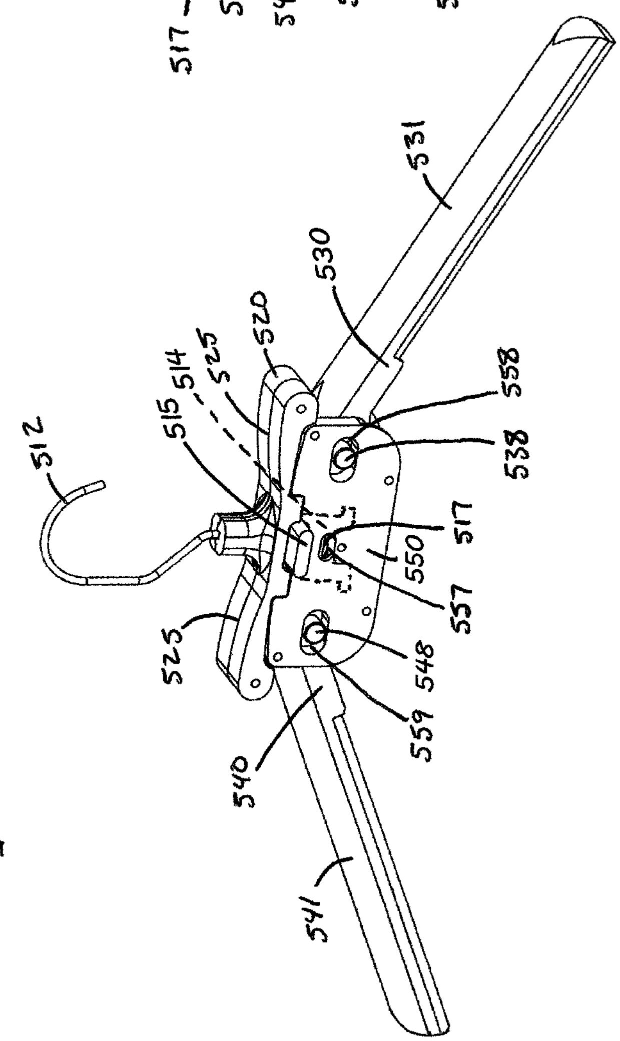
FIG. 74 is a perspective view of a collapsing hanger assembly with the wings extended to an open position, according to an eighth embodiment.

FIG. 74 is a perspective view of an eighth example single hand operated collapsing hanger 510, in its expanded configuration. The embodiment shown in FIG. 74 generally includes a hanging hook 512, a frame 520, first wing 530 having a first garment support surface 531, a second wing 540 having a second garment support surface 541, a carriage 550, and a latch 514. In this example embodiment, the frame 520 is constructed of two separate pieces, a front and a back, connected together such as by screws (or adhesive, welding, snap-fit connections, etc). Alternatively, the frame 520 could be formed as one piece. Additionally in this example embodiment, the carriage 550 is constructed of two separate pieces, a front and a back, connected together such as by screws (or adhesive, welding, snap-fit connections, etc). Alternatively, the carriage 550 could be formed as one piece.

The latch 514 is formed so as to have a latch button 515 and a latch hook 517, and is mounted within the frame 520 so as to be able to pivot about a horizontal axis. The latch hook 517 fits into a catch opening 557 formed into the carriage 550, and is urged into this position by a resilient biasing means. To collapse the hanger 510, the frame 520 is grasped by one hand and fingers of the same hand can be used to depress the latch button 515, thereby pushing the latch hook 517 out of the catch opening 557 and allowing the carriage 550 to drop. The weight of the free ends of the wings 530, 540 along with any garment weight acting upon their support surfaces 531, 541, will urge the wings 530, 540 to pivot downward about their pivot mounts 534, 544 (FIG. 76) as a subsequent force is transferred downward via the wing cam bosses 538, 548 to the carriage cam slots 558, 559.

Figure 75:
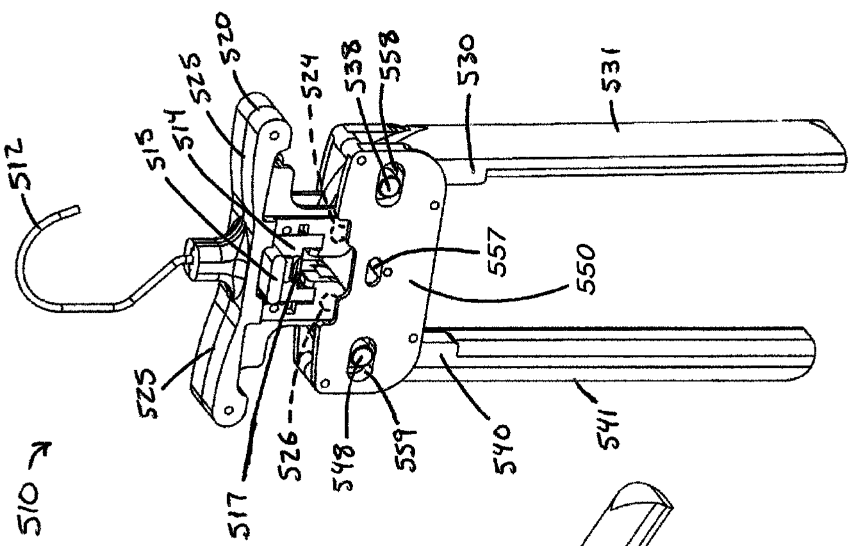
FIG. 75 is a perspective view of the collapsing hanger assembly of FIG. 74, with the wings folded down to a closed position.

FIG. 75 is a perspective view of the hanger 510, in its collapsed, or folded, configuration. The wings 530, 540 can be seen with their free ends pointing downward, and the overall horizontal dimension of the hanger 510 is greatly reduced from that seen in FIG. 74. The carriage 550 is also seen in its lower position.

To expand the wings 530, 540 of hanger 510 back to their extended positions, a single hand can be placed so that the palm will rest on one of the palm contact surfaces 525, and extend fingers can be placed under the bottom surface of the carriage 550. Upward force can be applied by the fingers upon the carriage 550, such as in a squeezing motion in opposition to the palm, thereby imparting resultant forces upward through the carriage cam slots 558, 559 to the wing cam bosses 538, 548. As the carriage moves upward the wing cam bosses 538, 548 are allowed to slide within the carriage cam slots 558, 559 as the wings 530, 540 rotate upwards about the wing pivot bosses 534, 544 (FIG. 76) which are supported within pivot pockets 524, 526 (shown as hidden) formed within the frame 520. As the carriage 550 is pulled back into its upper position, the latch hook 517 deflects inboard against the resilient biasing means until it aligns with the catch opening 557, at witch point it will re-latch and lock the carriage 550 and wings 530, 540 in the wings extended positions.

Figure 76:
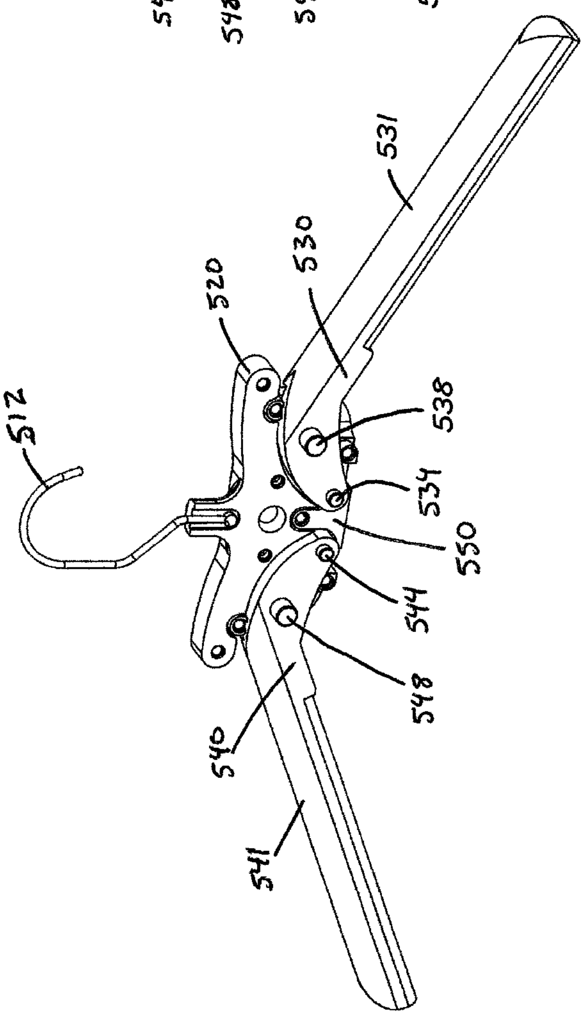
FIG. 76 is a perspective view of the partial collapsing hanger assembly of FIG. 74, in the expanded configuration, with the first and second wings in place on the pivot mounts of the back frame section, and the back portion of the lifting carriage shown in its upper position.

FIG. 76 is a front perspective view of the back portion of the frame 520 with the wings 530, 540 as well as the back portion of the carriage 550 in location as if of an assembly in the expanded configuration. The wing pivot bosses 534, 544 as well as the wing cam bosses 538, 548 are clearly visible.

Figure 77:
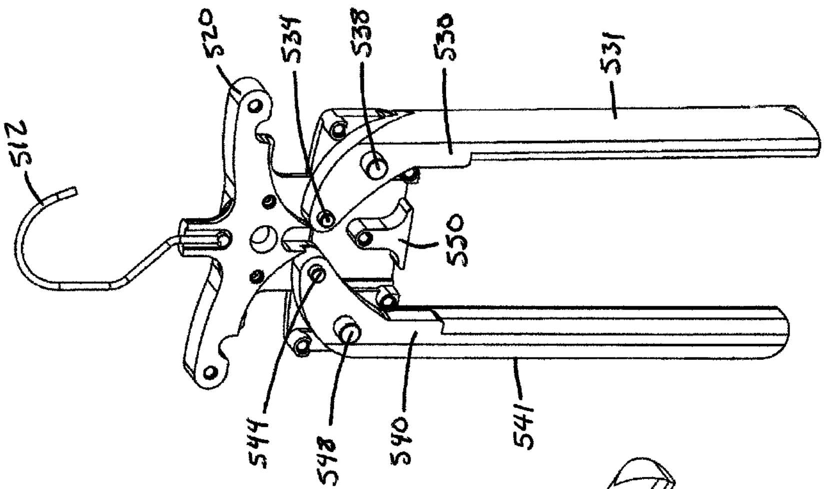
FIG. 77 is a perspective view of the partial collapsing hanger assembly of FIG. 74, in the collapsed configuration, with the first and second wings in place on the pivot mounts of the back frame section, and the back portion of the lifting carriage shown in its lower position.

FIG. 77 is a front perspective view of the back portion of the frame 520 with the wings 530, 540 as well as the back portion of the carriage 550 in location as if of an assembly in the collapsed configuration.

Figures 78, 79, 80, 81:
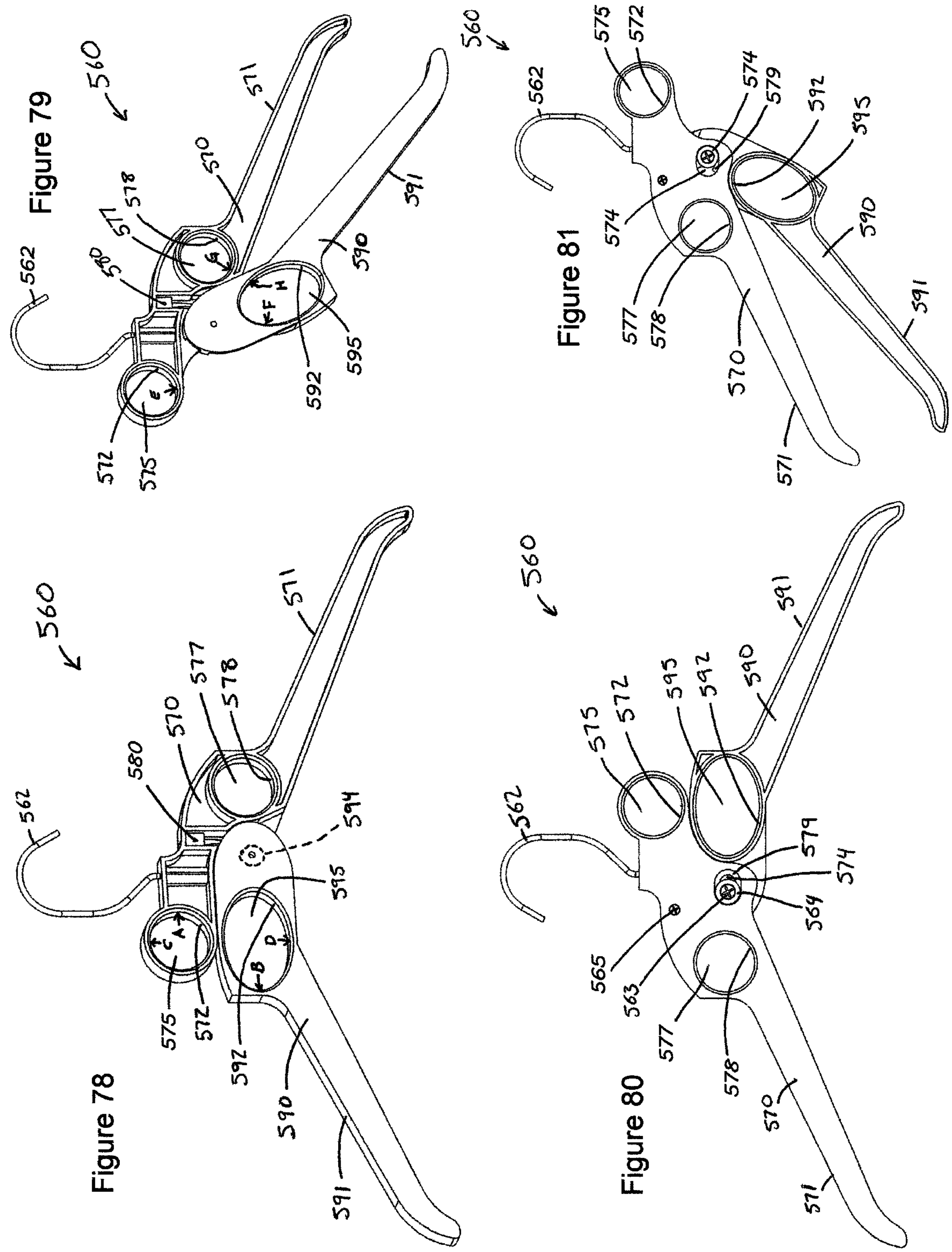
FIG. 78 is a front perspective view of a collapsing hanger assembly with the wings extended to an open position, according to a ninth embodiment.
FIG. 79 is a front perspective view of the collapsing hanger assembly of FIG. 78, with the moving wing repositioned to the collapsed configuration.
FIG. 80 is a back view of the collapsing hanger assembly of FIG. 78, with the wings extended to an open position.
FIG. 81 is a back view of the collapsing hanger assembly of FIG. 78, with the moving wing repositioned to the collapsed configuration.

FIG. 78 is a front perspective view of a ninth example single hand operated collapsing hanger 560, in its expanded configuration. The embodiment shown in FIG. 78 generally includes a hanging hook 562, a first static wing 570 having a first garment support surface 571, a second moving wing 590 having a second garment support surface 591, and a spring member 580. In this example embodiment, the hanging hook 562 is formed of metal and is interference press fit into the static wing 570, which is shown as constructed of plastic. Alternatively, any of the hanger components could be constructed of alternate materials, and the hanging hook 562 could be affixed to the static wing 570 by some alternate method, or integrally formed as part of the static wing 570. Additionally in this example embodiment, the spring member 580 is shown as if constructed of plastic and rigidly attached to the static wing 570. Alternatively, the spring member 580 could be integrally formed as part of either the static wing 570 or the moving wing 590.

The moving wing 590 is mounted to the static wing 570 by way of a pivot shaft 594 (shown as hidden) formed as part of the moving wing 590, which fits within a pivot slot 574 (FIG. 80) formed as part of the static wing 570. The spring member 580 creates a resilient bias which urges the moving wing 590 into a locked position with the static wing 570 when in the extended configuration. To collapse the hanger 560, a thumb from one hand can be placed within the clearance opening 575 and positioned on the static handle surface 572 so as to push in the direction shown by the arrow denoted as A. To continue the collapsing operation, one or more other fingers from the same hand can be placed within the clearance opening 595 and positioned on the moving handle surface 592 so as to push in the direction shown by the arrow denoted as B. The actions described will cause to the moving wing 590 to slide in the direction B as the pivot shaft 594 moves within the extents of the pivot slot 574 (FIG. 80), thus causing the locking features 576 (FIG. 82) and 596 (FIG. 83) within the hanger to separate from one another and allow the moving wing to rotate about the axis of the pivot shaft 594. To complete the collapsing operation, the thumb and fingers already positioned within the clearance openings 575, 595 are spread apart so as to apply opposing forces in the directions of the arrows denoted as C and D, thus forcing the moving wing 590 to rotate counterclockwise (in this view) to the collapsed position.

FIG. 79 is a front perspective view of the hanger 560, in its collapsed, or folded, configuration. The wings 570, 590 can be seen with their free ends positioned very close to one another so as to create a small insertion profile. As the hanger collapsing operation is performed, one or more fingers of the operating hand can be inserted into the clearance opening 577. Once the collapsing operation is complete, opposing forces can be applied by the fingers already in place, in the directions shown by the arrows denoted as G and H. Holding the hanger in this manner allows for easy manipulation of the entire hanger assembly as it is removed from or inserted into the neck opening of a garment.

To expand the wings 570, 590 of hanger 560 back to their extended positions, a thumb from one hand can be placed within the clearance opening 575 and positioned on the static handle surface 572 as one or more fingers of the same hand are placed within the clearance opening 595 and positioned on the moving handle surface 592. Once in position, the thumb and fingers of the hand can be squeezed together applying forces in the directions of the arrows denoted by E and F, as if closing a pair of scissors. These forces will cause the moving wing 590 to rotate clockwise (in this view) until it reaches the upper rotation limit at which point the spring member 580 will impose a force on the contact surface 597 (FIG. 83) urging the moving wing 590 back into a locked position relative to the static wing 570.

FIG. 80 is a back view of the hanger 560, in its expanded and locked configuration. A pivot cap 564 is attached to the pivot shaft 594 (FIG. 83) with a screw 563, and can be seen positioned at the locked extent of the pivot slot 574. A slot flange 579 is formed integrally to the static wing 570 and is sandwiched between the pivot cap 564 and the body of the moving wing 590 so as to create the needed sliding-pivot connection between the wings 570, 590. A spring member connection screw 563 is also visible. Although the fore mentioned connections are detailed to be screw fitments, they could alternately be made by other connection means (rivets, glue, etc.).

FIG. 81 is a back view of the hanger 560 in its collapsed, or folded position. The pivot cap 574 is aligned with the pivot shaft (FIG. 83) and can be seen at the unlocked extent of the pivot slot 574, which is appropriate for the rotated condition of the moving wing 590.

Figure 82:
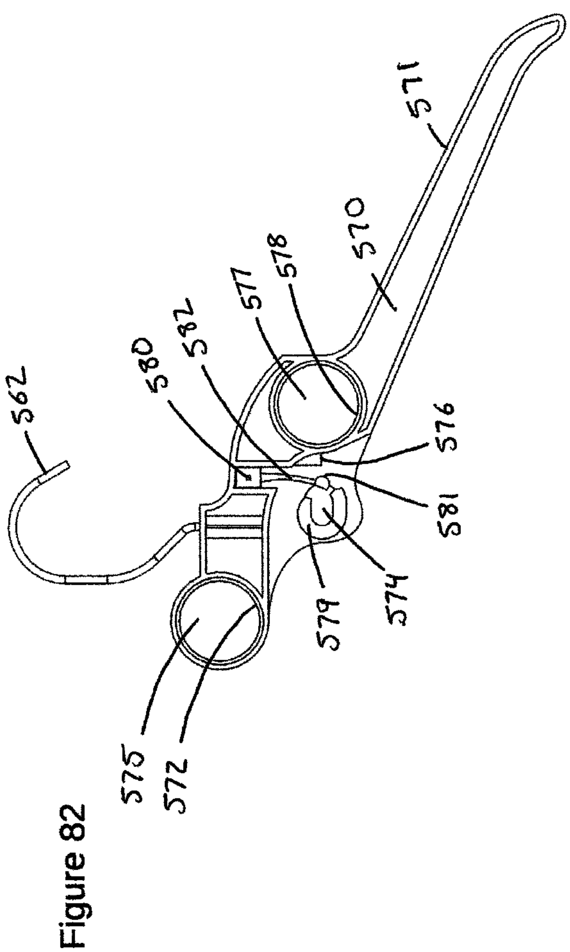
FIG. 82 is a front view of the static wing of the hanger assembly of FIG. 78 with the locking spring attached.

FIG. 82 is a front view of the static wing 570 with the hanging hook 562 and the spring member 580 attached. The spring member 580 includes a deformable arm 582 which provides the necessary bias to urge the moving wing 590 (FIG. 83) into the locked position. A contact surface 581 is formed at the end of the deformable arm 582, so as to transfer the necessary forces to the moving wing 590. A static lock feature 576 is present to provide the needed resistance to rotation when the wings 570, 590 are in a locked configuration.

Figure 83:
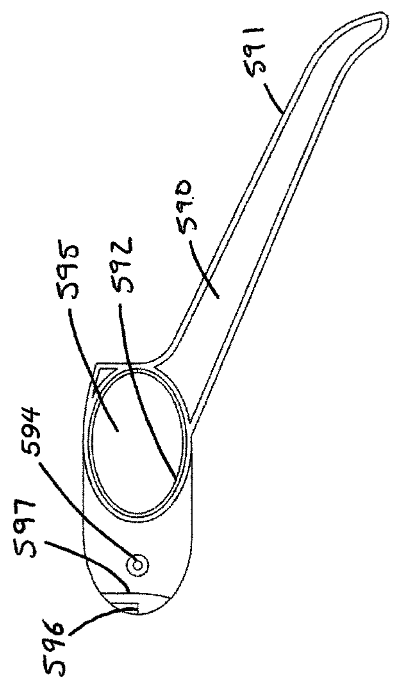
FIG. 83 is a back view of the moving wing of the hanger assembly of FIG. 78.

FIG. 83 is a back view of the moving wing 590. The integrally formed pivot shaft 594 is visible. A contact surface 597 is present so as to be acted upon by the spring contact surface 581 when urging the moving wing 590 into the locked configuration. A moving lock feature 596 is present to provide the needed resistance to rotation for wing locking, and is formed so as to allow for a sliding movement across the static lock feature 576 (FIG. 82) when moving into or out of the locked position.

In this described embodiment, the various handle surfaces 572, 578, 592 are presented as interior surfaces of generally ring-shaped features. Alternatively, the handle surfaces used to manipulate this design could be of various size, shape, and number so long as they allow for the effective locking, collapsing, and extending of the wings 570, 590.

Figure 84:
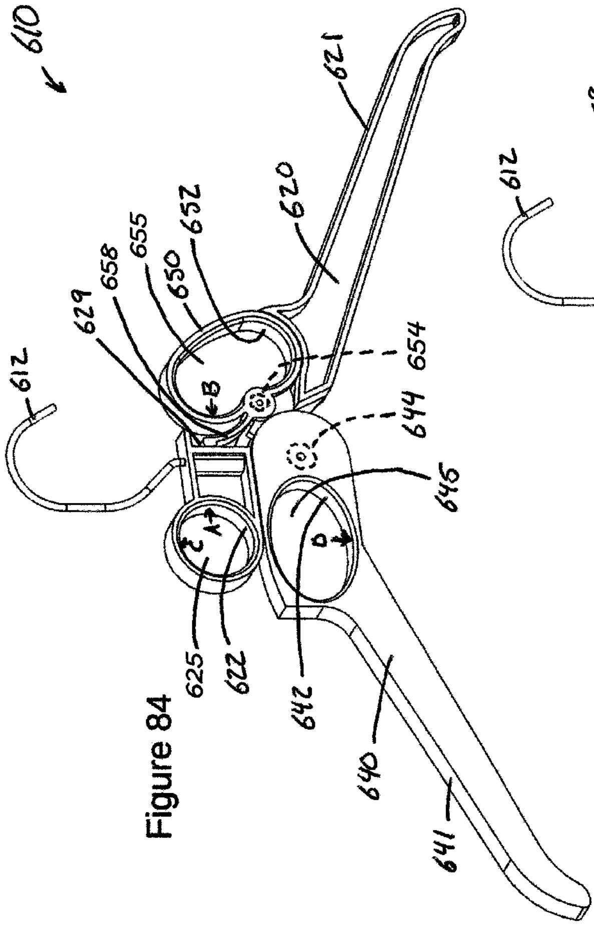
FIG. 84 is a front perspective view of a collapsing hanger assembly with the wings extended to an open position, according to a tenth embodiment.

FIG. 84 is a front perspective view of a tenth example single hand operated collapsing hanger 610, in its expanded configuration. The embodiment shown in FIG. 84 generally includes a hanging hook 612, a first static wing 620 having a first garment support surface 621, a second moving wing 640 having a second garment support surface 641, and a latch 650. In this example embodiment, the hanging hook 612 is formed of metal and is interference press fit into the static wing 620, which is shown as constructed of plastic. Alternatively, any of the hanger components could be constructed of alternate materials, and the hanging hook 612 could be affixed to the static wing 620 by some alternate method, or integrally formed as part of the static wing 620.

The moving wing 640 is pivotably mounted to the static wing 620 by way of a pivot shaft 644 (shown as hidden) formed as part of the moving wing 640, which fits within a pivot hole 624 (FIG. 86) formed as part of the static wing 620. The latch 650 is pivotably mounted to the static wing 620 by way of a pivot shaft 654 (shown as hidden) formed as part of the latch 650, which fits within a pivot hole 626 (FIG. 86) formed as part of the static wing 620. A spring member 658 is integrally formed into the latch 650 and presses against a contact surface 629 formed onto the static wing 620, so as to urge the latch 650 into a locked position where locking surfaces 656, 646 (FIG. 87) belonging to the latch 650 and the moving wing 640 interact with one another so as to prevent the moving wing 640 from rotating about the pivot axis.

To collapse the hanger 610, a thumb from one hand can be placed within the clearance opening 625 and positioned on the static handle surface 622 so as to push in the direction shown by the arrow denoted as A. To continue the collapsing operation, one or more other fingers from the same hand can be placed within the clearance opening 655 and positioned on the latch handle surface 652 so as to pull in the direction shown by the arrow denoted as B. The actions described will cause to the latch 650 to rotate counter-clockwise (in this view) as nudge features 657, 647 (FIG. 89) will cause the moving wing 640 to unlock from the extended position and rotate slightly counter-clockwise (in this view) so as to allow the moving wing 640 to remain unlocked even if the squeezing pressure applied in the directions of the arrows denoted as A and B is released. To complete the collapsing operation, the thumb remains in the clearance opening 625 and one or more of the remaining fingers of the same hand are placed in the clearance opening 645, then the fingers are spread so as to apply forces to the handle surfaces 622 and 642 in the directions of the arrows denoted by C and D, thus forcing the moving wing 640 to rotate counter-clockwise (in this view) to the collapsed position.

Figure 85:
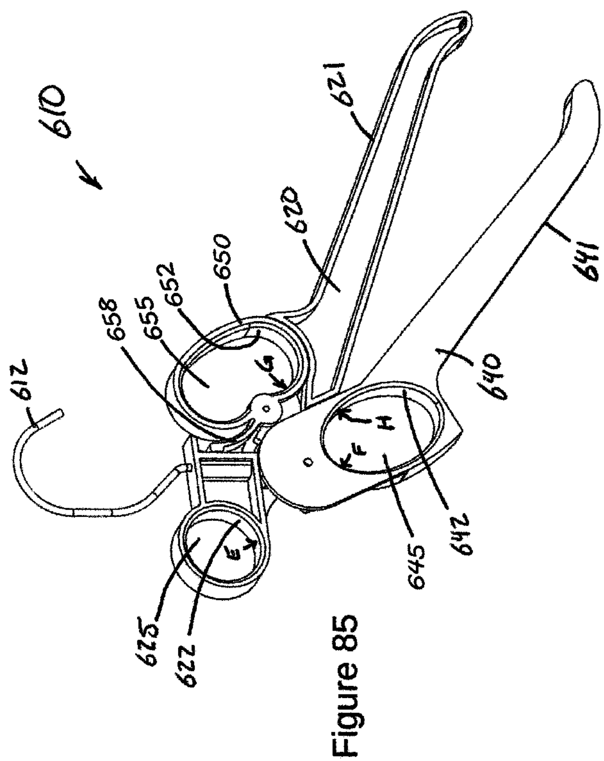
FIG. 85 is a front perspective view of the collapsing hanger assembly of FIG. 84, with the moving wing repositioned to the collapsed configuration.

FIG. 85 is a front perspective view of the hanger 610, in its collapsed, or folded, configuration. The wings 620, 640 can be seen with their free ends positioned very close to one another so as to create a small insertion profile. As the hanger collapsing operation is performed, one or more fingers of the operating hand can remain in the clearance opening 655. Once the collapsing operation is complete, opposing forces can be applied by the fingers already in place, in the directions shown by the arrows denoted as G and H. Holding the hanger in this manner allows for easy manipulation of the entire hanger assembly as it is removed from or inserted into the neck opening of a garment.

To expand the wings 620, 640 of hanger 610 back to their extended positions, a thumb from one hand can be placed within the clearance opening 625 and positioned on the static handle surface 622 as one or more fingers of the same hand are placed within the clearance opening 645 and positioned on the moving handle surface 642. Once in position, the thumb and fingers of the hand can be squeezed together applying forces in the directions of the arrows denoted by E and F, as if closing a pair of scissors. These forces will cause the moving wing 640 to rotate clockwise (in this view) until the locking surfaces 656, 646 (FIG. 87) interact and lock the moving wing 640 in the extended position as it reaches the upper rotation limit.

Figure 86:
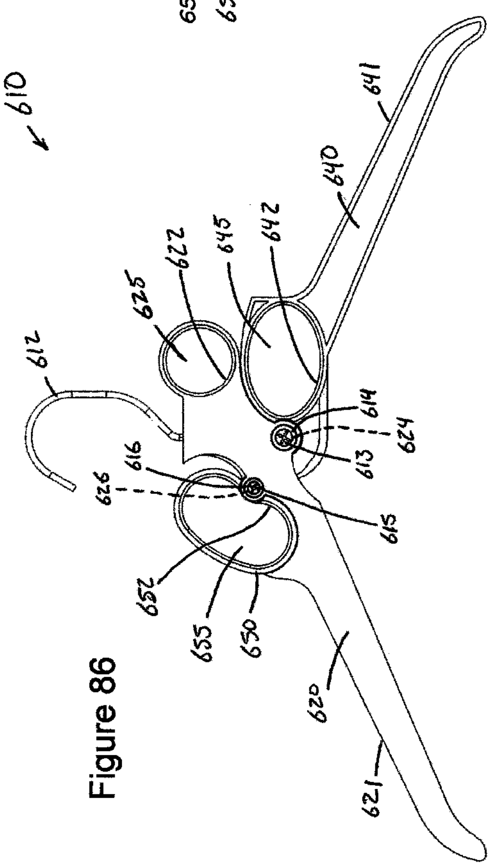
FIG. 86 is a back view of the collapsing hanger assembly of FIG. 84, with the wings extended to an open position and the latch in the wing locked position.

FIG. 86 is a back view of the hanger 610, in its expanded and locked configuration. A pivot cap 614 is attached to the pivot shaft 644 (FIG. 87) with a screw 613, and is positioned over the pivot hole 624 (shown as hidden) sandwiching a portion of the static wing 620 between the pivot cap 614 and the body of the moving wing 640 so as to create the needed pivot connection between the wings 620, 640. A pivot cap 616 is attached to the pivot shaft 654 (FIG. 87) with a screw 615, and is positioned over the pivot hole 626 (shown as hidden) sandwiching a portion of the static wing 620 between the pivot cap 616 and the body of the latch 650 so as to create the needed pivot connection between the latch 650 and the static wing 620. Although the fore mentioned connections are detailed to be screw fitments, they could alternately be made by other connection means (rivets, glue, etc.).

Figure 87:
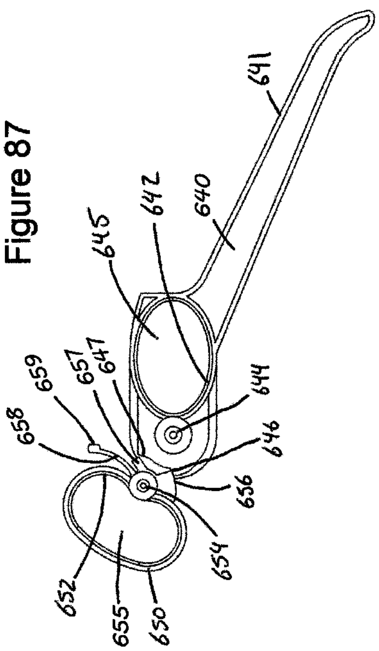
FIG. 87 is a back view of the moving wing and latch as if in position on the hanger assembly of FIG. 86.

FIG. 87 is a back view of the latch 650 and moving wing 640 as if in the positions shown in FIG. 86. The pivot shafts 644, 654 are clearly visible and the latch spring member 658 can be seen in a generally undeformed condition. The spring contact surface 658 is positioned as if making touching the contact surface 629 (FIG. 84). The latch locking surface 656 is in contact with the moving wing locking surface 646, so as to prevent the moving wing 640 from rotating clockwise (in this view) about the axis of the pivot shaft 644. The latch nudge block 657 is formed integrally into the latch and can be seen hovering above and separated from the moving wing nudge surface 647.

Figure 88:
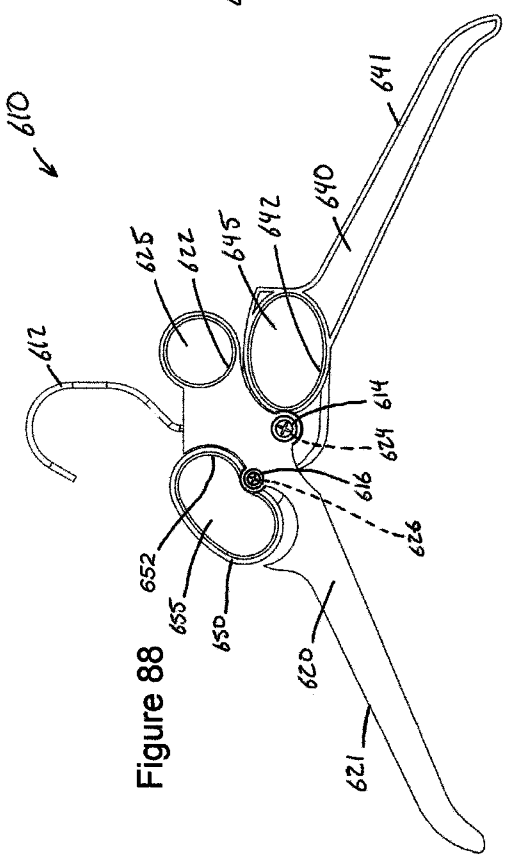
FIG. 88 is a back view of the collapsing hanger assembly of FIG. 84, with the latch in the wing unlock position, and the moving wing rotated slightly about its pivot axis.

FIG. 88 is a back view of the hanger 610, in its unlocked configuration. The latch is shown at it the limit of its clockwise rotation (in this view), and the moving wing 640 is shown as rotated slightly clockwise (in this view) from that as shown in FIG. 86.

Figure 89:
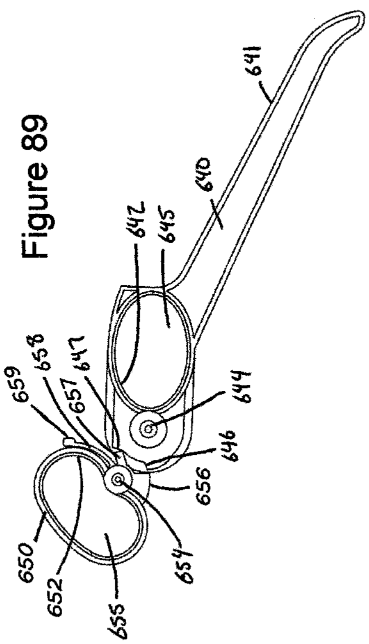
FIG. 89 is a back view of the moving wing and latch as if in position on the hanger assembly of FIG. 88.

FIG. 89 is a back view of the latch 650 and moving wing 640 as if in the positions shown in FIG. 88. The latch spring member 658 can be seen in a deformed condition and the spring contact surface 658 is positioned as if still touching the contact surface 629 (FIG. 84). The latch locking surface 656 is shown rotated out of position from contacting the moving wing locking surface 646. The latch nudge block 657 is shown in contact with the moving wing nudge surface 647, as if it has already pushed back on that surface to cause the moving wing 640 to rotate slightly clockwise (in this view) from that as shown in FIG. 87. If finger pressure is released from the latch handle surface 652 with the components in location as shown, then the latch will not return to the fully unlocked position as the latch locking surface 656 is out of plane with the moving wing contact surface 646. Having the components designed in this manner allows for the unlocking action to remain separate from the wing folding action, which will allow for simpler operation as a user can first pull and release the latch 650 to unlock the components and then use a separate finger expanding action to rotate and collapse the moving wing 640.

In this described embodiment, the various handle surfaces 622, 642, 652 are presented as interior surfaces of generally ring-shaped features. Alternatively, the handle surfaces used to manipulate this design could be of various size, shape, and number so long as they allow for the effective locking, collapsing, and extending of the wings 620, 640.

Figures 90, 91:
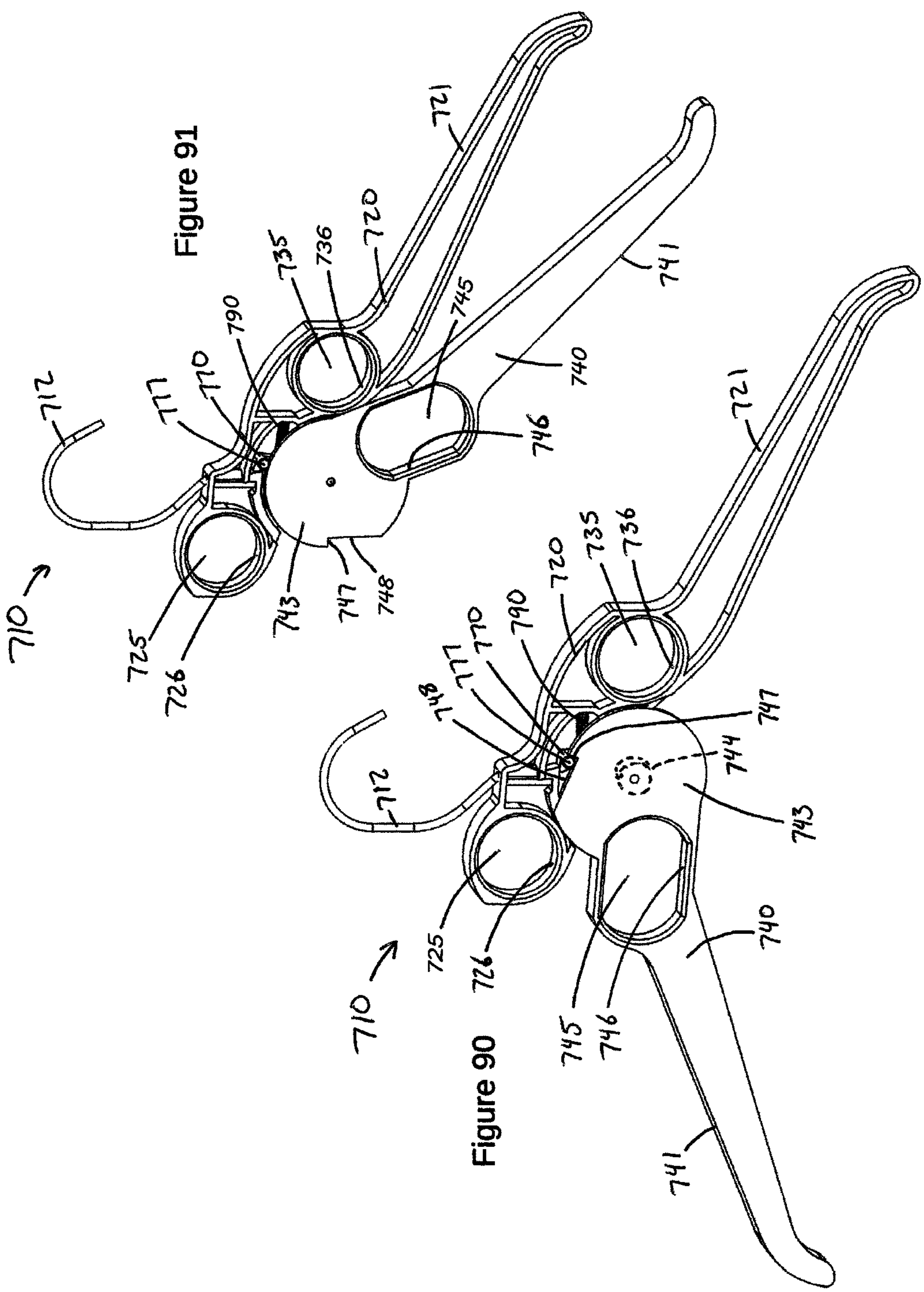
FIG. 90 is a front perspective view of a collapsing hanger assembly with the wings extended to an open position, according to an eleventh embodiment.
FIG. 91 is a front perspective view of the collapsing hanger assembly of FIG. 90, with the components repositioned to the collapsed configuration.

FIG. 90 is a front perspective view of an eleventh example single hand operated collapsing hanger 710, in its expanded configuration. The embodiment shown in FIG. 90 generally includes a hanging hook 712, a first static wing 720 having a first garment support surface 721, a second moving wing 740 having a second garment support surface 741, a latch member 770, and a spring 790. In this example embodiment, the hanging hook 712 is formed of metal and is interference press fit into the static wing 720, which is shown as constructed of plastic. Alternatively, any of the hanger components could be constructed of alternate materials, and the hanging hook 712 could be affixed to the static wing 720 by some alternate method, or integrally formed as part of the static wing 720. The moving wing 740 is pivotably mounted to the static wing 720 by way of a pivot boss 744 (shown as hidden).

FIG. 91 is a front perspective view of the hanger 710, in its collapsed, or folded, configuration. In this view the moving wing 740 has been pivoted about its mount to the static wing 720. The wings 720, 740 can be seen with their free ends positioned very close to one another so as to create a small insertion profile.

Figure 92:
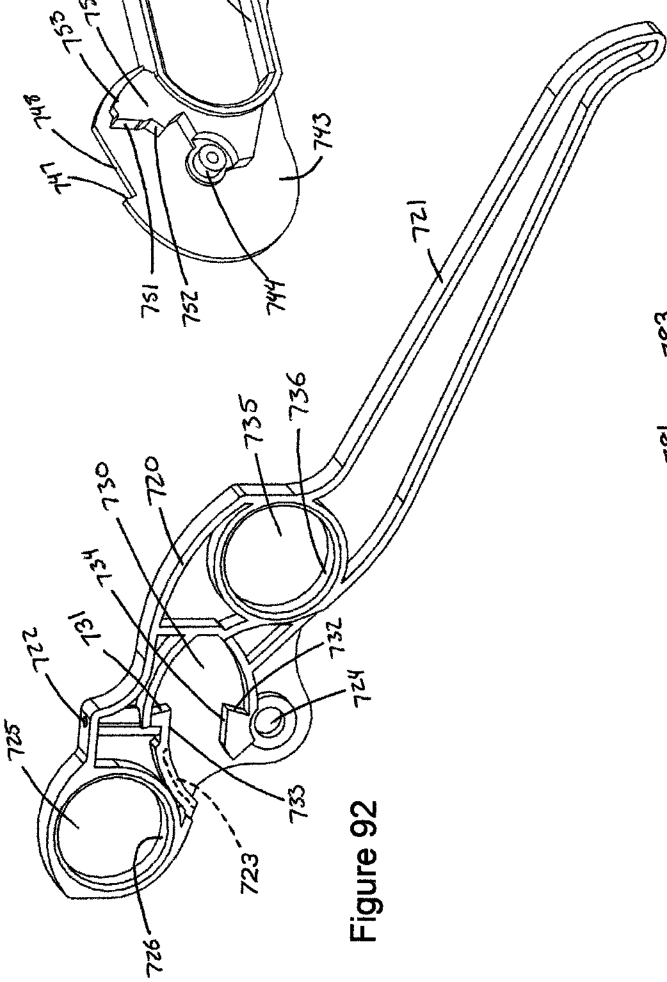
FIG. 92 is a front perspective view of the static wing member of the collapsing hanger assembly of FIG. 90.

FIG. 92 is a front perspective view of the static wing 720. A hook connection hole 722 can be seen on the top surface of the static wing 720. Below the hook connection hole 722 is an arrow shaped formation of ribs that surround the latch chamber 730 and which form the latch chamber surfaces 731, 732, 733, 734. Below the latch chamber 730 is the pivot hole 724, through which the moving wing pivot boss 744 (FIG. 93) fits. Flanking the latch chamber 730 to each side are the finger clearance openings 725 and 735, the perimeter of each forming their respective handle surfaces 726 and 736. The garment support surface 721 can be seen on the right end (in this view) of the static wing 720, with an appropriate structure below it.

Figure 93:
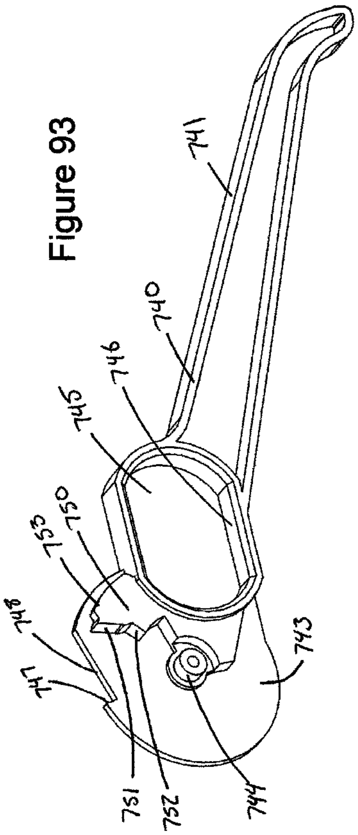
FIG. 93 is a rear perspective view of the moving wing member of the collapsing hanger assembly of FIG. 90.

FIG. 93 is a rear perspective view of the moving wing 740. Near the center of the moving wing 740 the finger clearance opening 745 can be seen, the perimeter of which forms the moving wing handle surface 746. The garment support surface 741 can be seen to the right (in this view) of the clearance opening 745, with an appropriate structure below it. Left (in this view) of the clearance opening 745 is the pivot boss 744 projecting from the center of the guard flange 743. Formed into the top of the guard flange 743 are the latch clearance notch 748 and the latch catch 747. Formed onto the visible side (in this view) of the guard flange 743 is the latch plunger 750, with its contact surfaces 751, 752 and the gib rib 753 formed on top. The latch plunger 750 is formed so as to be able to pass between the latch chamber surfaces 733 and 734 (FIG. 92) as the gib rib 753 moves through the gib channel 723 (shown as hidden in FIG. 92) when performing the unlatching and re-latching operations of the hanger.

Figure 94:
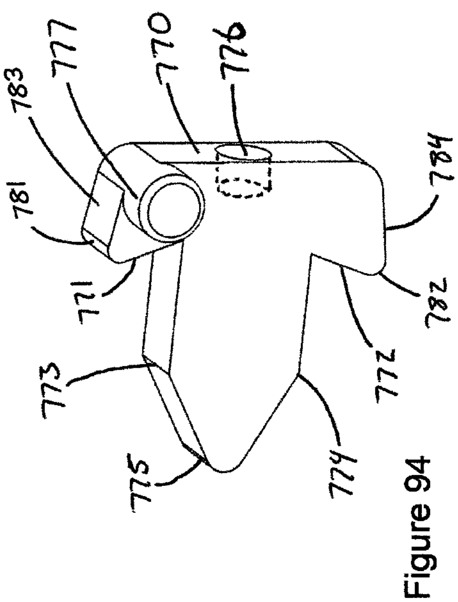
FIG. 94 is a front upper-right view of the latch member of the collapsing hanger assembly of FIG. 90.
Figure 99:
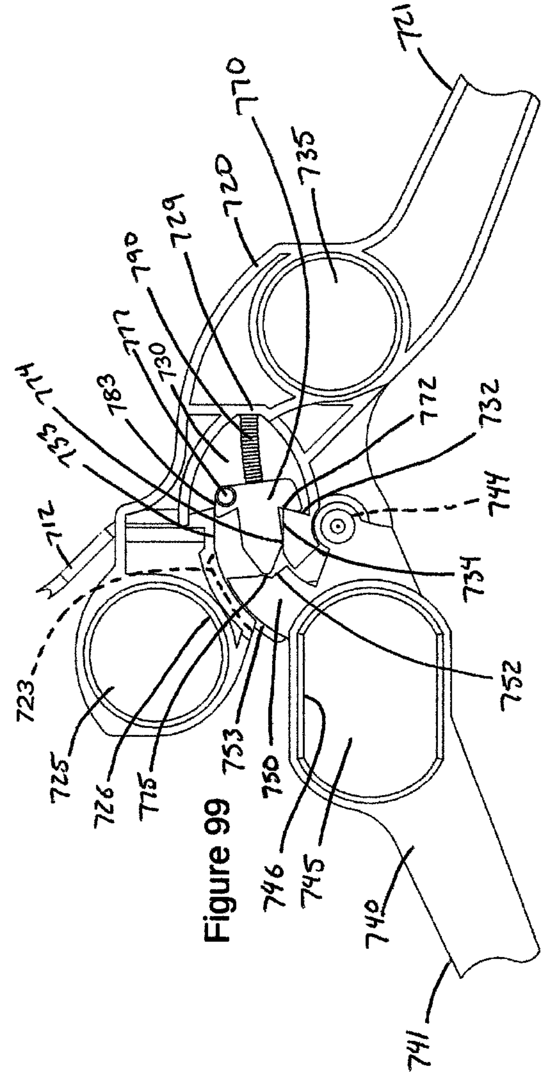
FIG. 99 is a close-up front view of the area generally outlined by the ellipse P in FIG. 96, with the moving wing guard flange removed so as to see the assembly portions behind.

FIG. 94 shows an upper-right front view of the latch member 770, which is generally formed as a "T" shape with a latch boss 777 projecting out from its primary structure. At the larger end of the latch member 770, there is a latch spring attachment pocket 776 (shown as partially hidden) which provides for firm attachment to one end of the latch spring 790 (FIG. 99). Around the perimeter of the latch member 770, the various latch contact faces 771, 772, 783, 784 and latch contact edges 773, 774, 781, 782 can be seen.

Figure 95:
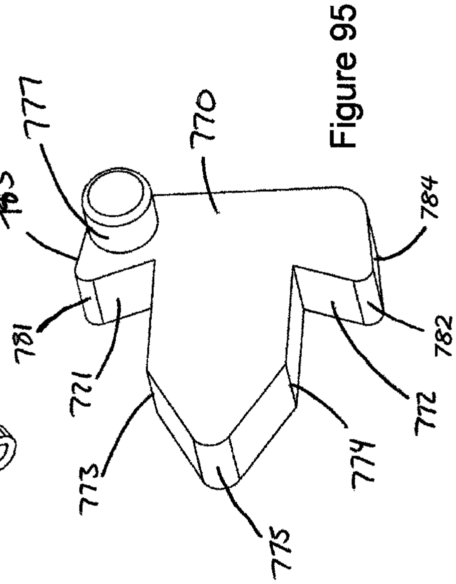
FIG. 95 is a front lower-left view of the latch member of the collapsing hanger assembly of FIG. 90.

FIG. 95 shows a lower-left front view of the latch member 770. The smaller end of the latch member 770 narrows to an acute edge, which is the latch tip 775. The contact edges 781 and 782, as well as the latch tip 775, are shown to be formed as small radiused surfaces which will aid in friction reduction as the latch member 770 moves through its operational paths.

Figure 96:
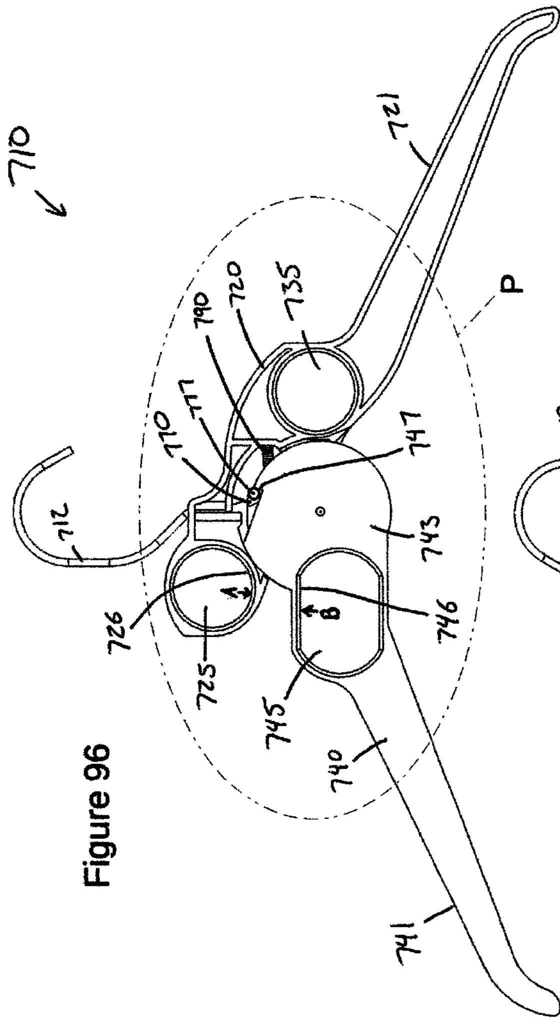
FIG. 96 is a front view of the collapsing hanger assembly of FIG. 90, with the wings extended to an open position.

FIG. 96 is a front view of the present embodiment of the collapsing hanger assembly 710, in its locked and expanded condition. If the hanging hook 712 were adequately supported (as if hanging on a bar) and downward forces, such as garment weight, were applied to the garment support surfaces 721, 741, the hanger will retain its extended shape barring a structural failure.

Figure 97:
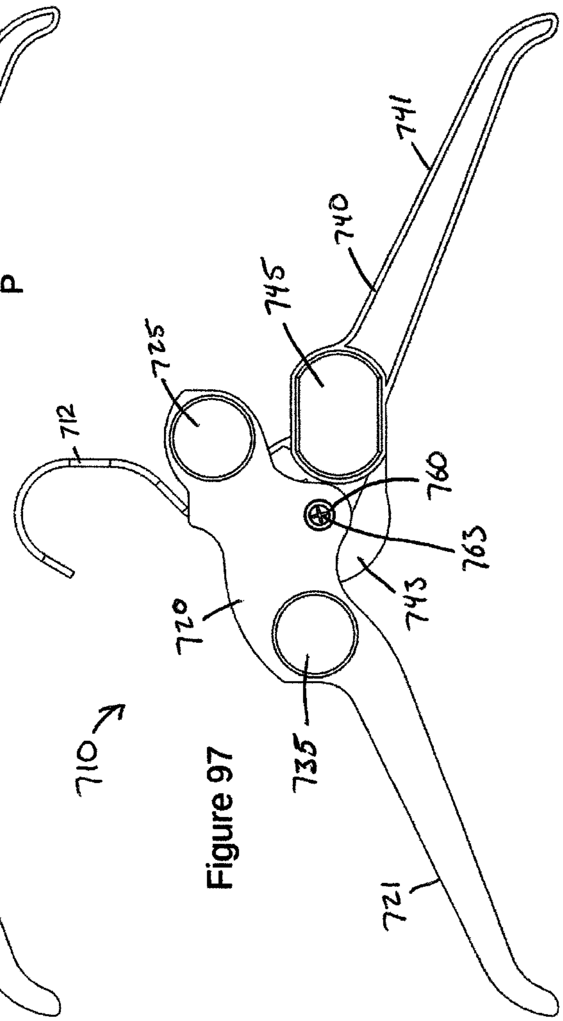
FIG. 97 is a rear view of the collapsing hanger assembly of FIG. 90, with the wings extended to an open position.

FIG. 97 is a rear view of the present embodiment of the collapsing hanger assembly 710, in its locked as expanded condition. Near the center of the hanger assembly 710 is the pivot cap 760 which is attached to the pivot boss 744 (FIG. 93) with a screw 763 so as to sandwich a portion of the static wing structure around the pivot hole 724 (FIG. 92) with enough clearance to allow for an easily pivotable connection between the static wing 720 and moving wing 740. Although a screw is used to create the connection in this example, it is possible that an alternate method could be used to pivotably connect the wings 720, 740, such as a rivet, a snap-fit, or the like.

Figure 98:
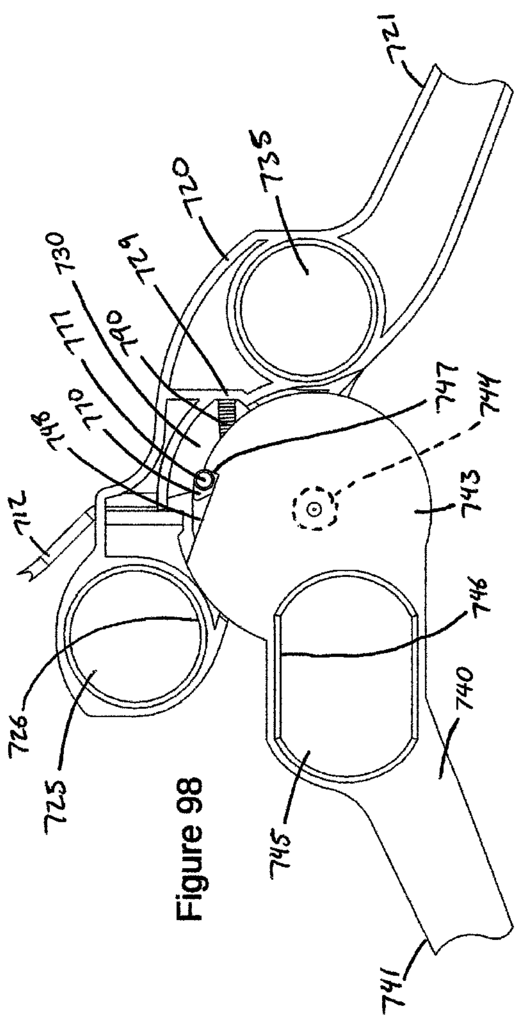
FIG. 98 is a close-up front view of the area generally outlined by the ellipse P in FIG. 96.

FIG. 98 is a close-up view of the central components of the collapsing hanger 710 when in the extended configuration. In this example the latch clearance notch 748 can be seen formed into the upper portion of the generally disc shaped guard flange 743. Abutting the latch catch 747 is the latch boss 777, which projects from the latch member 770 into the latch clearance notch 748. The latch member 770 is positioned within the latch chamber 730 in such a way as to be prevented from moving to the left (in this view), thereby preventing the moving wing 740 from pivoting counter-clockwise (in this view) about the axis of the pivot boss 744 (shown as hidden) by virtue of its hold on the latch catch 747. Therefore, a garment applying downward forces on the garment support surfaces 721, 741 will be firmly supported by the present embodiment collapsing hanger 710 when in this locked and extended condition.

FIG. 99 is an identical view to that of FIG. 98, with the exception of having the guard flange 743 removed so as to show the components behind. The latch member 770 is positioned within the latch chamber 730 along with the latch spring 790 which has one end attached to the latch member 770 and the other end firmly attached to a spring support structure 729 on the static wing 720. The latch member 770 is canted toward the lower region of the latch chamber 730 and its faces 772, 783 and edge 774 abut the latch chamber surfaces 732, 733, and 734 respectively. The positional relationships and contact conditions of these specific surfaces and edges, 772 to 732, 783 to 733, and 774 to 734, are what hold the latch member 770 down in the clearance notch 748 and engaged with the latch catch 747. This positioning also prevents the latch member 770 from moving any further left (in this view) within the latch chamber 730. The gib rib 753 is seen with a portion projecting into the gib channel 723 (shown as hidden in this view), which adds support to the pivot boss 744 connection by resisting forces parallel to the pivot axis.

To initiate the collapsing sequence a thumb of one hand can be placed through the clearance opening 725 so as to rest on the handle surface 726 with one or more fingers from the same hand placed through the clearance opening 745 so as to rest on the handle surface 746. The thumb and fingers can then be squeezed together in the directions denoted by the arrows A and B in FIG. 96, in an action much like closing a pair of scissors. Under these forces the moving wing 740 will be caused to rotate clockwise (in this view) about the axis of the pivot boss 744 with respect to the static wing 720, and as this happens the latch catch 747 will release its pressure on the latch boss 777 allowing the latch member 770 to be repositioned. Shortly after the wing movement begins the latch plunger contact surface 752 will make contact with the latch tip 775, seen in FIG. 99, and will continue to push the latch member 770 to the right (in this view) against the resistive force of the latch spring 790 until the moving wing 740 has reached the extent of its unlatching motion. When that point has been reached, structural components of the wings 720, 740 will prevent further squeezing motion, and the collapsing hanger 710 will reach the unlatching configuration as seen in FIG. 100.

Figure 101:
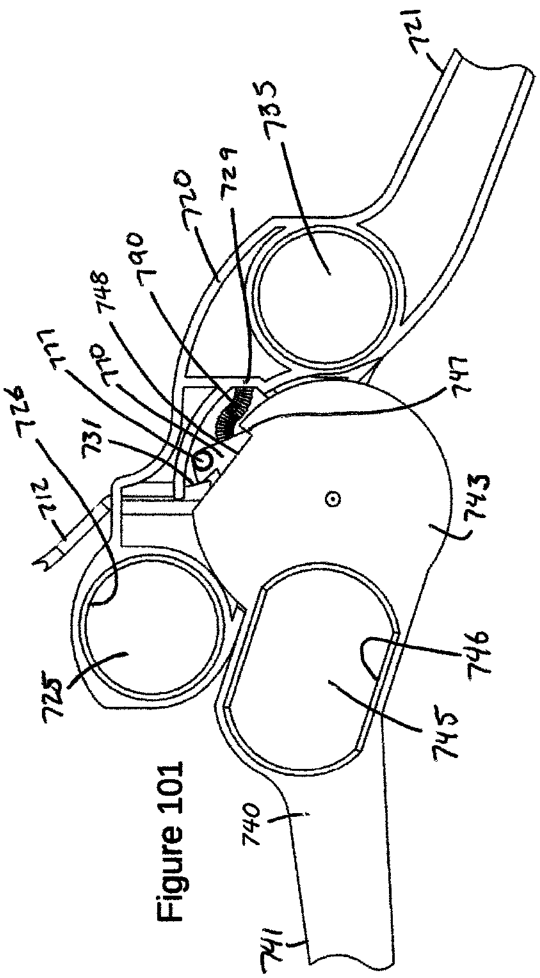
FIG. 101 is a close-up front view of the area generally outlined by the ellipse Q in FIG. 100.

FIG. 101 is a close-up view of the central components of the collapsing hanger 710 when in the unlatching configuration. The latch catch 747 can be seen thoroughly removed from the latch boss 777.

Figure 102:
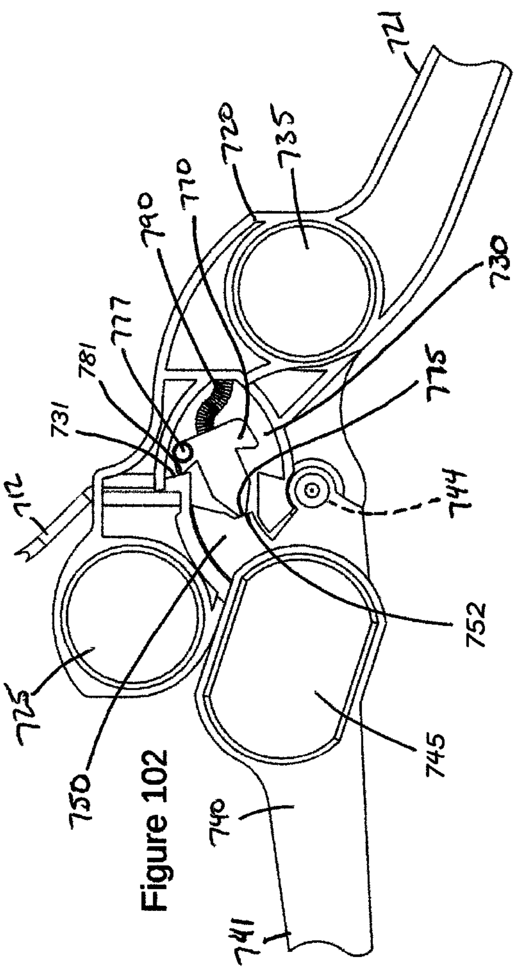
FIG. 102 is a close-up front view of the area generally outlined by the ellipse Q in FIG. 100, with the moving wing guard flange removed so as to see the assembly portions behind.

FIG. 102 is an identical view to that of FIG. 101, with the exception of having the guard flange 743 removed so as to show the components behind. The latch spring 790 can be seen in a deformed condition as it continues to apply a moderate pressure on the latch member 770 in opposition to the force applied by the latch plunger contact surface 752 to the latch tip 775. Through the course of the unlatching sequence the latch contact face 783 moved in plane with the latch chamber surface 733, as seen in FIG. 99, until the latch contact edge 781 moved beyond the chamber surface 733 after which the latch member 770 pivoted about the latch tip 775 allowing the latch contact edge 781 to rest upon the latch chamber surface 731, as seen in FIG. 102.

Figure 100:
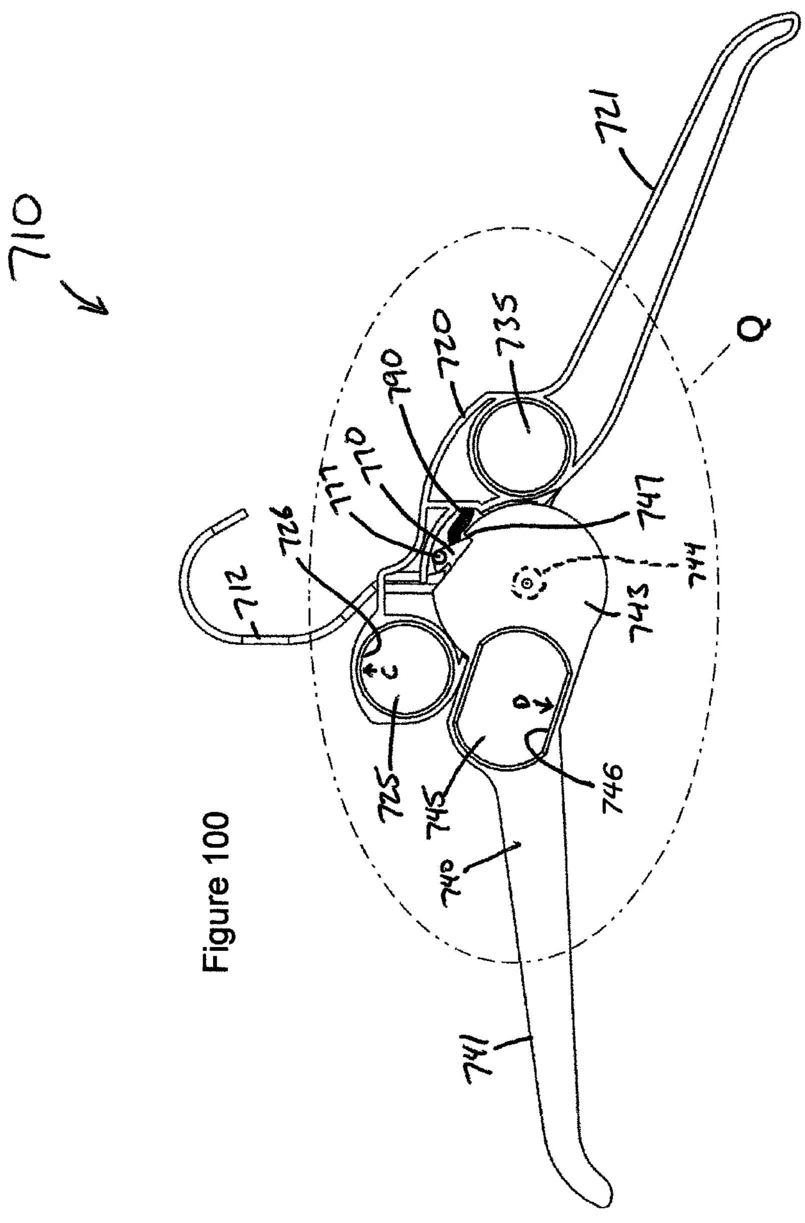
FIG. 100 is a front view of the collapsing hanger assembly of FIG. 90, with the components repositioned to the unlatching configuration.

To continue the collapsing sequence the previously applied hand forces are released and the thumb and fingers of the same hand are used to apply directionally opposing forces as shown by the arrows C and D upon the handle surfaces 726 and 746 respectively, as seen in FIG. 100. The forces will cause the moving wing 740 to rotate counter-clockwise (in this view) about the axis of the pivot boss 744 (shown as hidden) with respect to the static wing 720, much like the opening of a pair of scissors. As this motion is initiated the latch plunger contact surface 752 will release its force upon the latch tip 775 allowing the latch spring 790 to push leftward (in this view) upon the latch member 770 causing it to pivot and slide about the latch edge 781 along the chamber surface 731, as seen in FIG. 102. An alternate design of the present embodiment could utilize a resilient biasing means (such as a torsion spring) to urge the moving wing 740 into the collapsed position once the latching mechanism is released.

Figure 103:
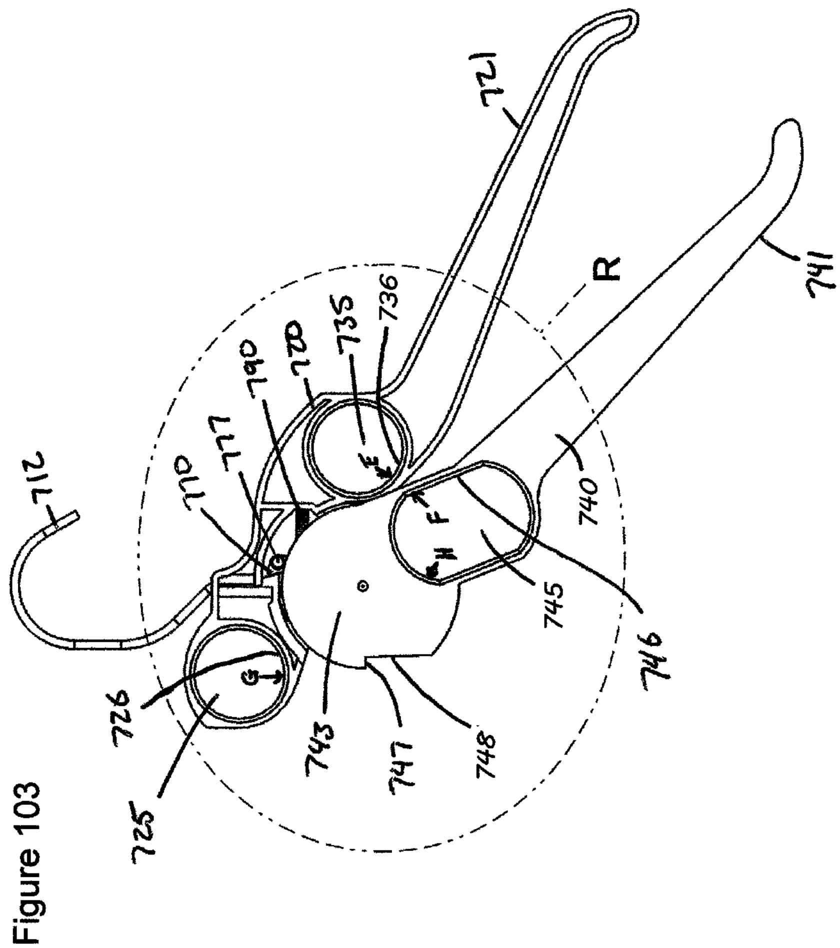
FIG. 103 is a front view of the collapsing hanger assembly of FIG. 90, with the components repositioned to the collapsed configuration.

FIG. 103 shows the collapsing hanger 710 in the fully collapsed position. During the course of the collapsing sequence one or more of the fingers of the operative hand can be repositioned so as to fit through the clearance opening 735. Squeezing forces can then be applied by the fingers of the operative hand in the directions denoted by the arrows E and F, upon the surfaces 736 and 746 respectively. These forces will assist with the completion of the collapsing sequence, and once the fully collapsed condition is met, holding the collapsing hanger 710 with just the operative hand in this manner will allow for its easy positioning into the neck opening of a garment, as a second hand is used to hold the garment itself.

Figure 104:
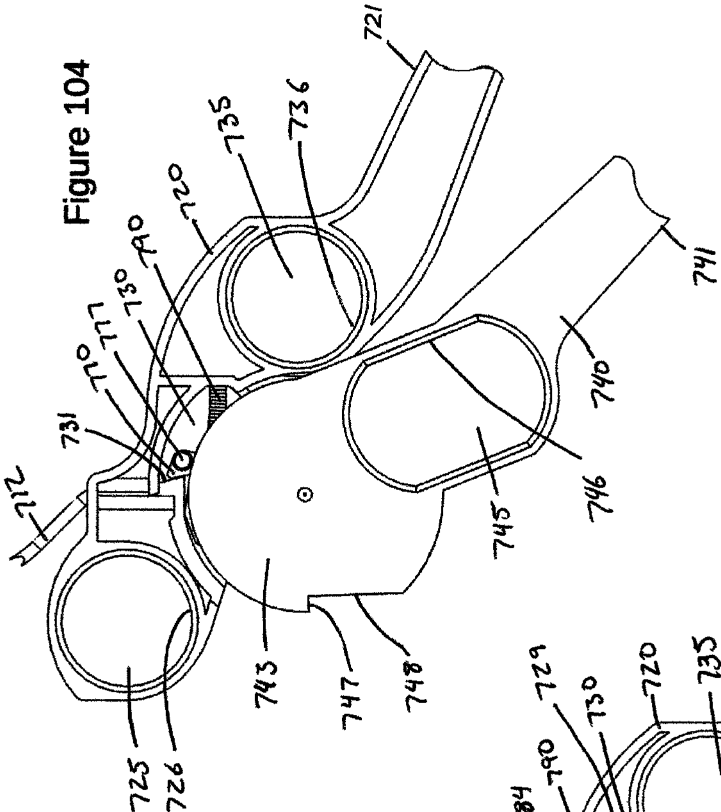
FIG. 104 is a close-up front view of the area generally outlined by the ellipse R in FIG. 103.

FIG. 104 is a close-up view of the central components of the collapsing hanger 710 when in the collapsed configuration. The latch boss 777 can be seen positioned adjacent to the guard flange 743, and thus offering no resistance to the rotational movement of the moving wing 740.

Figure 105:
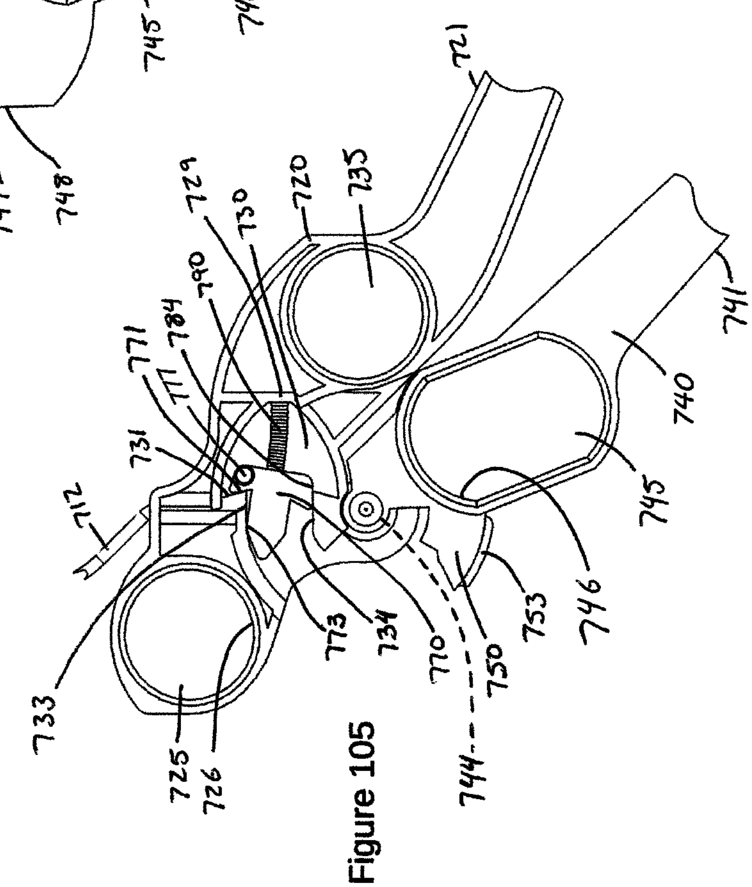
FIG. 105 is a close-up front view of the area generally outlined by the ellipse R in FIG. 103, with the moving wing guard flange removed so as to see the assembly portions behind.

FIG. 105 is an identical view to that of FIG. 104, with the exception of having the guard flange 743 removed so as to show the components behind. The latch member 770 is positioned within the latch chamber 730 along with the latch spring 790 which has one end attached to the latch member 770 and the other end firmly attached to a spring support structure 729 on the static wing 720. The latch member 770 is canted toward the upper region of the latch chamber 730 and its faces 771, 784 and edge 773 abut the latch chamber surfaces 731, 734, and 733 respectively. The positional relationships and contact conditions of these specific surfaces and edges, 771 to 731, 784 to 734, and 773 to 733, are what hold the latch member 770 up and disengaged with the guard flange 743 and latch catch 747. This positioning also prevents the latch member 770 from moving any further left (in this view) within the latch chamber 730.

Figure 106:
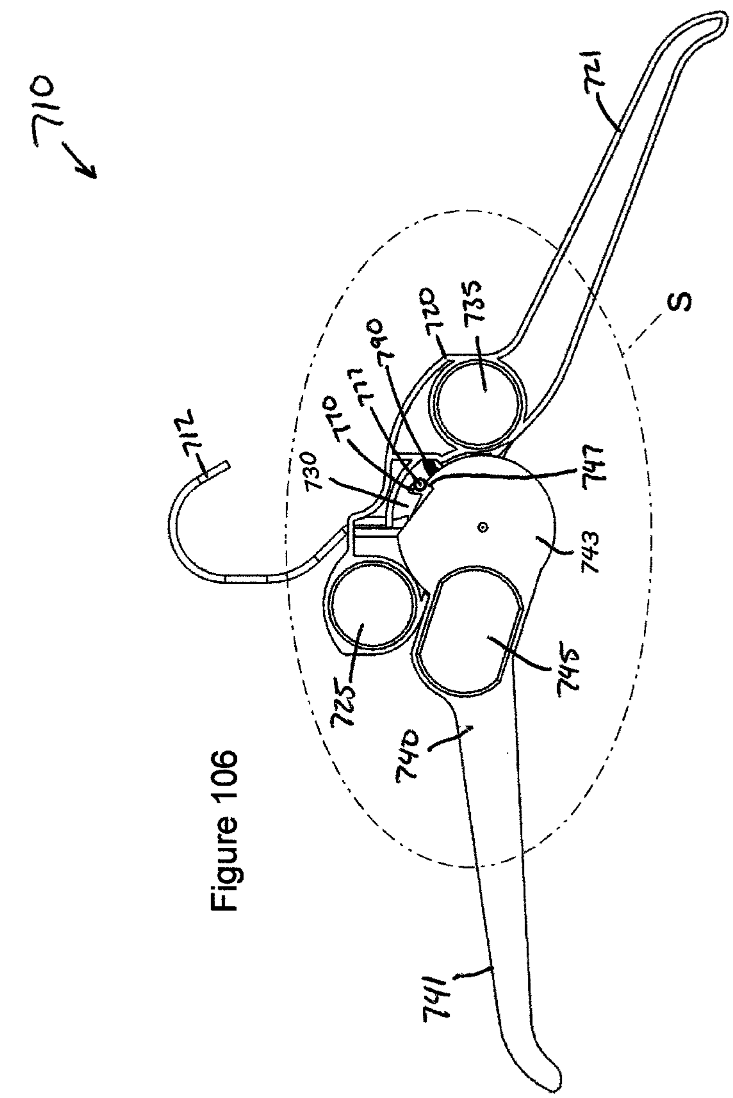
FIG. 106 is a front view of the collapsing hanger assembly of FIG. 90, with the components repositioned to the re-latching configuration.

To initiate the expanding sequence a thumb of one hand can be placed through the clearance opening 725 so as to rest on the handle surface 726 with one or more fingers from the same hand placed through the clearance opening 745 so as to rest on the handle surface 746. The thumb and fingers can then be squeezed together in the directions denoted by the arrows G and H in FIG. 103, in an action much like closing a pair of scissors. Under these forces the moving wing 740 will be caused to rotate clockwise (in this view) about the axis of the pivot boss 744 with respect to the static wing 720, until it reaches the re-latching configuration as seen in FIG. 106.

Figure 107:
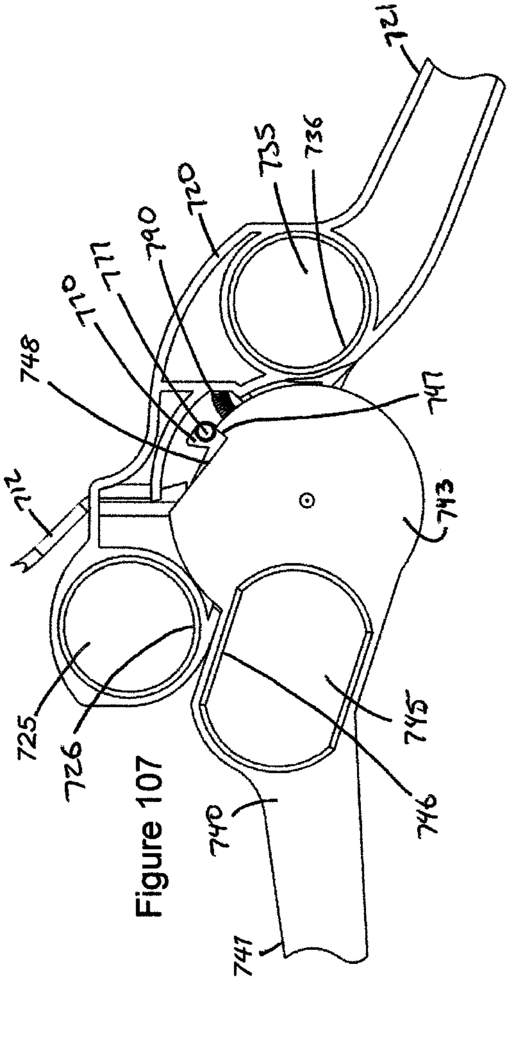
FIG. 107 is a close-up front view of the area generally outlined by the ellipse S in FIG. 106.

FIG. 107 is a close-up view of the central components of the collapsing hanger 710 when in the re-latching configuration. The latch boss 777 can be seen in close proximity to the latch catch 747.

Figure 108:
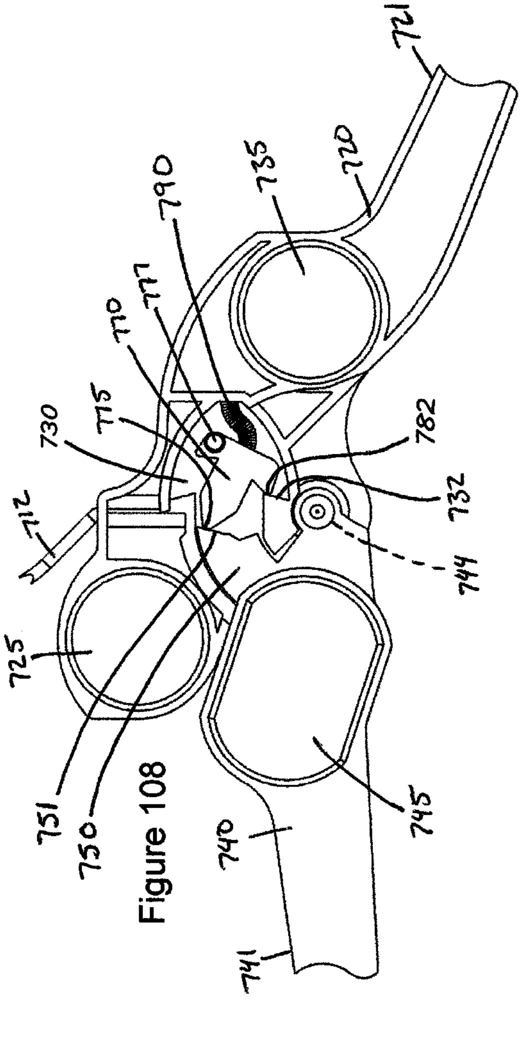
FIG. 108 is a close-up front view of the area generally outlined by the ellipse S in FIG. 106, with the moving wing guard flange removed so as to see the assembly portions behind.

FIG. 108 is an identical view to that of FIG. 107, with the exception of having the guard flange 743 removed so as to show the components behind. As the moving wing 740 neared the end of its rotation to the re-latch position, the latch plunger contact surface 751 came into contact with the latch tip 775 and pushed the latch member 770 to the right (in this view) from the position as seen in FIG. 105. As that motion proceeded the latch contact face 784 moved in plane with the latch chamber surface 734 until the latch contact edge 782 moved beyond the chamber surface 732, after which the latch member 770 pivoted about the latch tip 775 allowing the latch contact edge 782 to rest upon the latch chamber surface 732, as seen in FIG. 108. The latch spring 790 can be seen in a deformed condition as it continues to provide some back pressure on the latch member 770 toward the latch plunger 750.

To complete the expanding sequence the squeezing force is released by the operative hand and the moving wing 740 is repositioned to the expanded configuration as seen in FIG. 96. As the moving wing 740 rotates from the re-latch configuration to the extended configuration, the latch member 770 is urged from the position shown in FIG. 108 to that as seen in FIG. 99 by virtue of the force provided by the latch spring 790, and the latch boss 777 moves within the latch clearance notch 748 until it comes to rest abutted to the latch catch 747 as seen in FIG. 98.

The latch spring 790 in the described figures is shown as if of a conventional metal compression spring design. It is conceivable that an alternate resilient biasing means may be used to provide the forces needed to operate the latching mechanism.

In this described embodiment, the latch chamber 730 is formed as part of the static wing 720 and the plunger 750 and latch catch 747 are formed as part of the moving wing 740. Alternatively, the hanger would retain its functionality if the latch member 770 sat within a latch chamber 730 formed as part the moving wing 740 and the plunger 750 and latch catch 747 were formed as part of the static wing 720. It is further conceivable that the portions of the collapsing hanger 710 which make up the latching mechanism (latch member 770, latch chamber 730, latch spring 790, latch catch 747, plunger 750, etc.) could be reoriented to function in an alternate plane but still retain the necessary function to achieve the desired latching and unlatching.

In this described embodiment, the various handle surfaces 726, 736, 746 are presented as interior surfaces of generally ring-shaped features. Alternatively, the handle surfaces used to manipulate this design could be of various size, shape, and number so long as they allow for the effective locking, collapsing, and extending of the wings 720, 740.

The latching mechanism as described in this embodiment, hereto known as the Push-to-Unlatch/Push-to-Re-latch mechanism, operates in a method similar to the Toggle Operated Alternate Push Rocking Latch used for operating a retractable ball pen as detailed in U.S. Pat. No. 2,898,887. It is possible that other types of push-to-lock/push-to-unlock mechanisms could be fashioned so as to provide the needed latching action. Some preexisting example push-to-lock/ push-to-unlock mechanisms include those shown in U.S. Pat. Nos. 1,509,780, 2,817,554, 3,152,822 and 3,205,863. The exact details of the latching mechanism are not critical to the design so long as they provide the needed Push-to-Unlatch/Push-to-Re-latch action for proper hanger operation.

Figure 109:
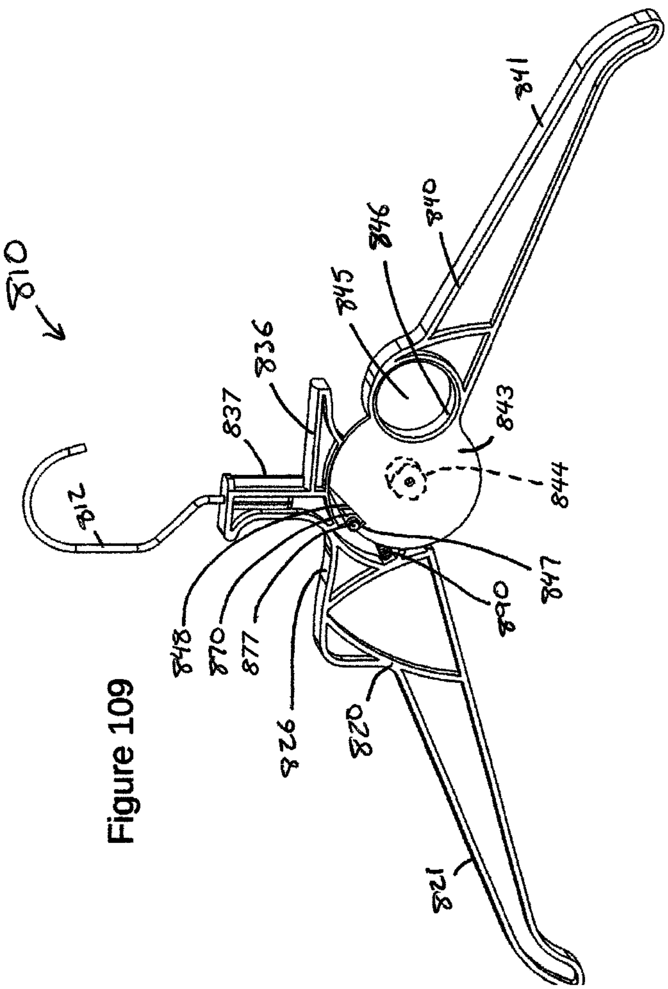
FIG. 109 is a front perspective view of a collapsing hanger assembly with the wings extended to an open position, according to a twelfth embodiment.

FIG. 109 is a front perspective view of a twelfth example single hand operated collapsing hanger 810, in its expanded configuration. The embodiment shown in FIG. 109 generally includes a hanging hook 812, a first static wing 820 having a first garment support surface 821, a second moving wing 840 having a second garment support surface 841, a latch member 870, and a spring 890. In this example embodiment, the hanging hook 812 is formed of metal and is interference press fit into the static wing 820, which is shown as constructed of plastic. Alternatively, any of the hanger components could be constructed of alternate materials, and the hanging hook 812 could be affixed to the static wing 820 by some alternate method, or integrally formed as part of the static wing 820. The moving wing 840 is pivotably mounted to the static wing 820 by way of a pivot boss 844 (shown as hidden).

Figure 110:
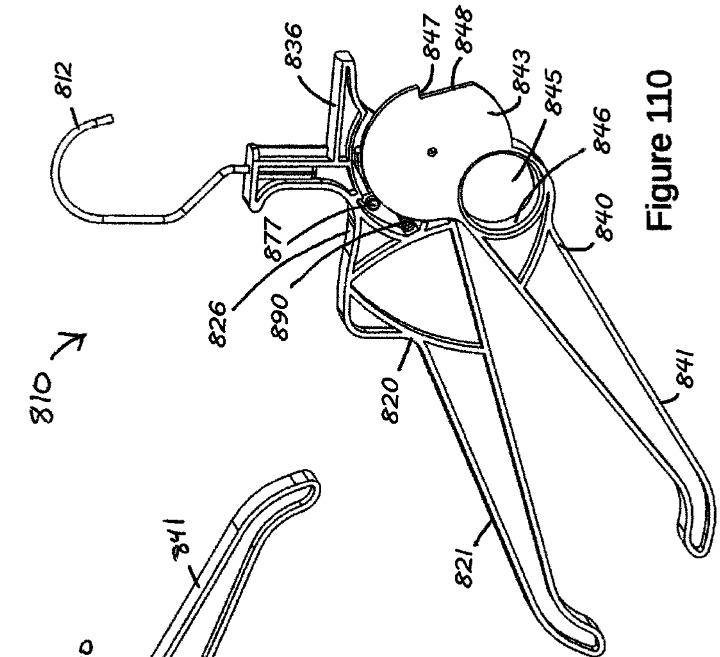
FIG. 110 is a front perspective view of the collapsing hanger assembly of FIG. 109, with the components repositioned to the collapsed configuration.

FIG. 110 is a front perspective view of the hanger 810, in its collapsed, or folded, configuration. In this view the moving wing 840 has been pivoted about its mount to the static wing 820. The wings 820, 840 can be seen with their free ends positioned very close to one another so as to create a small insertion profile.

Figure 111:
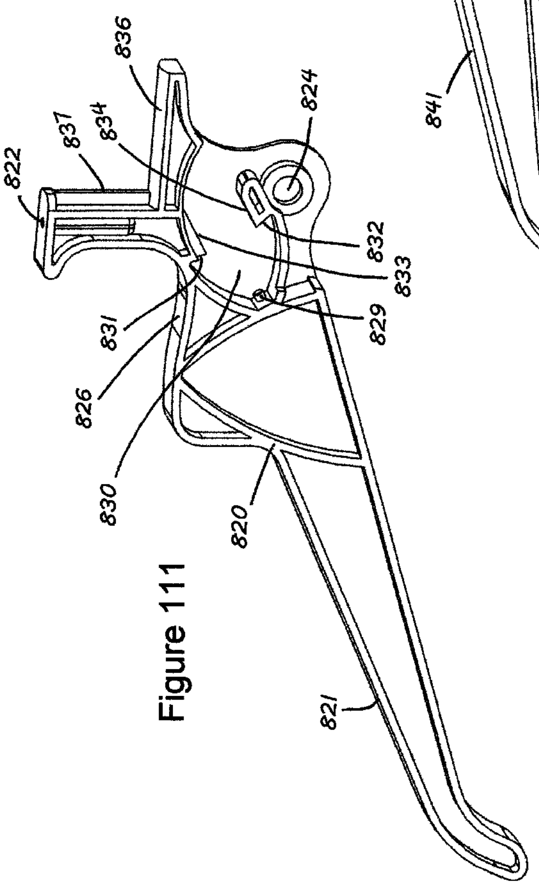
FIG. 111 is a front perspective view of the static wing member of the collapsing hanger assembly of FIG. 109.

FIG. 111 is a front perspective view of the static wing 820. A hook connection hole 822 can be seen on the top surface of the static wing 820. Below the hook connection hole 822 is an arrow shaped formation of ribs that surround the latch chamber 830 and which form the latch chamber surfaces 831, 832, 833, 834. Below the latch chamber 830 is the pivot hole 824, through which the moving wing pivot boss 844 (FIG. 112) fits. A palm rest surface 826 can be seen to the left and above (in this view) the latch chamber 830. To the right and above (in this view) the latch chamber 830 are the thumb handle surface 836 and the thumb brace surface 837. The garment support surface 821 can be seen on the left end (in this view) of the static wing 820, with an appropriate structure below it.

Figure 112:
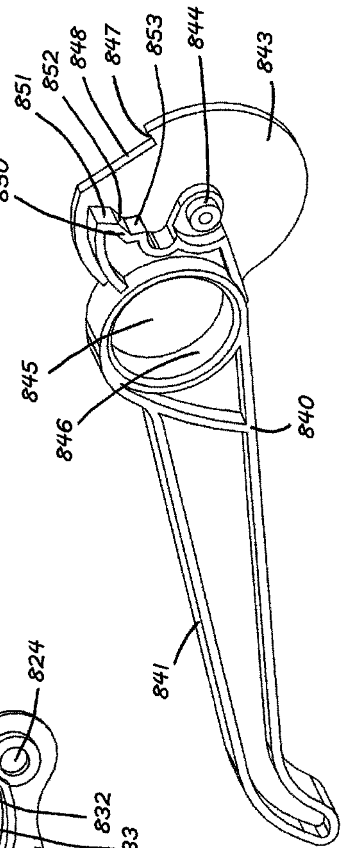
FIG. 112 is a rear perspective view of the moving wing member of the collapsing hanger assembly of FIG. 109.

FIG. 112 is a rear perspective view of the moving wing 840. Near the center of the moving wing 840 the finger clearance opening 845 can be seen, the perimeter of which forms the moving wing handle surface 846. The garment support surface 841 can be seen to the left (in this view) of the clearance opening 845, with an appropriate structure below it. To the right (in this view) of the clearance opening 845 is the pivot boss 844 projecting from the center of the guard flange 843. Formed into the top of the guard flange 843 are the latch clearance notch 848 and the latch catch 847. Formed onto the visible side (in this view) of the guard flange 843 is the latch plunger 850, with its contact surfaces 851, 852, and 853. The latch plunger 850 is formed so as to be able to pass between the latch chamber surfaces 833 and 834 (FIG. 111) when performing the unlatching and re-latching operations of the hanger.

Figure 113:
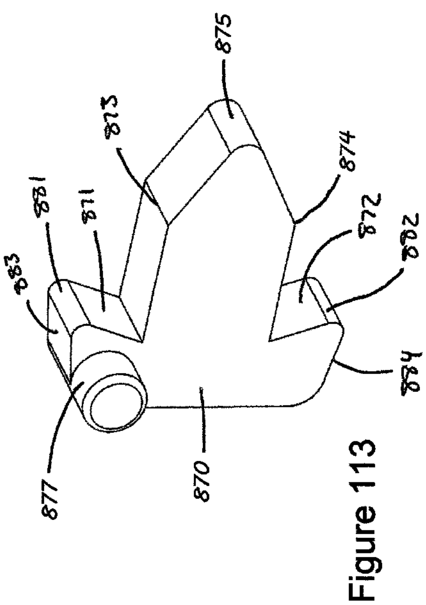
FIG. 113 is a front upper-right view of the latch member of the collapsing hanger assembly of FIG. 109.

FIG. 113 shows an upper-right front view of the latch member 870, which is generally formed as a "T" shape with a latch boss 877 projecting out from its primary structure. Around the perimeter of the latch member 870, the various latch contact faces 871, 872, 883, 884 and latch contact edges 873, 874, 881, 882 can be seen. The smaller end of the latch member 870 narrows to an acute edge, which is the latch tip 875.

Figure 114:
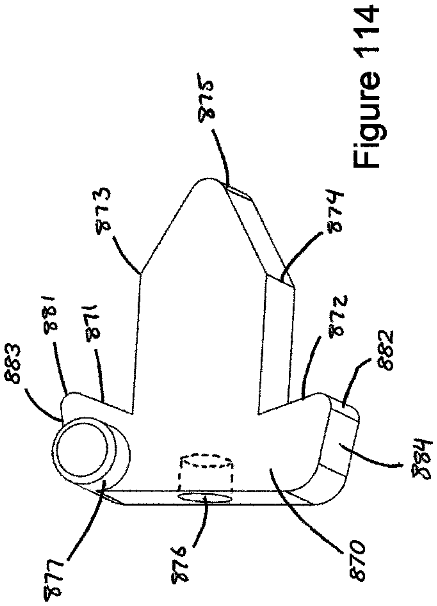
FIG. 114 is a front lower-left view of the latch member of the collapsing hanger assembly of FIG. 109.
Figure 118:
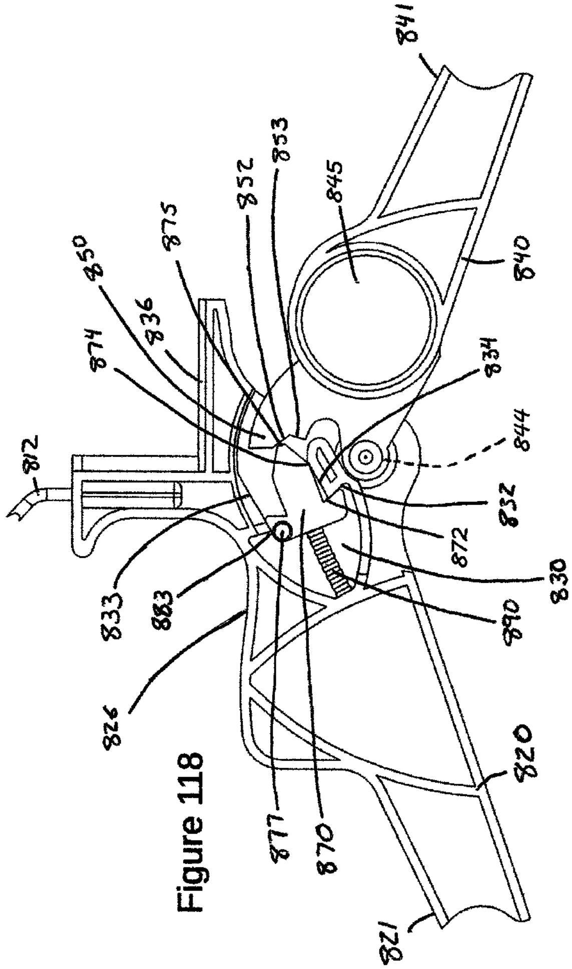
FIG. 118 is a close-up front view of the area generally outlined by the ellipse T in FIG. 115, with the moving wing guard flange removed so as to see the assembly portions behind.
Figure 119:
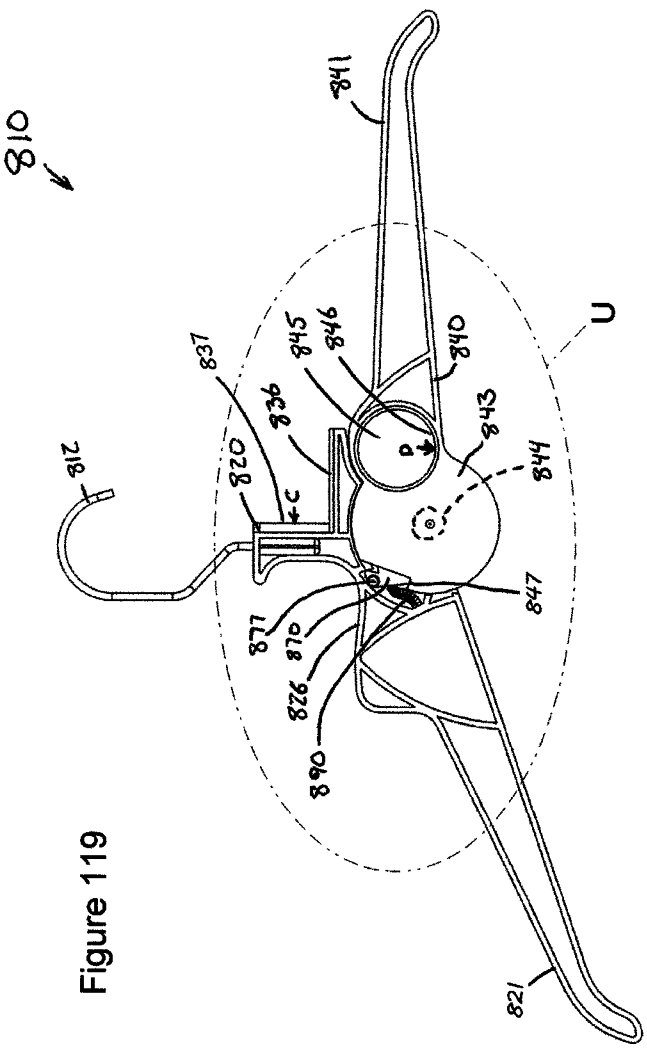
FIG. 119 is a front view of the collapsing hanger assembly of FIG. 109, with the components repositioned to the unlatching configuration.

FIG. 114 shows a lower-left front view of the latch member 870. At the larger end of the latch member 870, there is a latch spring attachment pocket 876 (shown as partially hidden) which provides for firm attachment to one end of the latch spring 890 (FIG. 118). The contact edges 881 and 882, as well as the latch tip 875, are shown to be formed as small radiused surfaces which will aid in friction reduction as the latch member 870 moves through its operational paths.

Figures 115, 116:
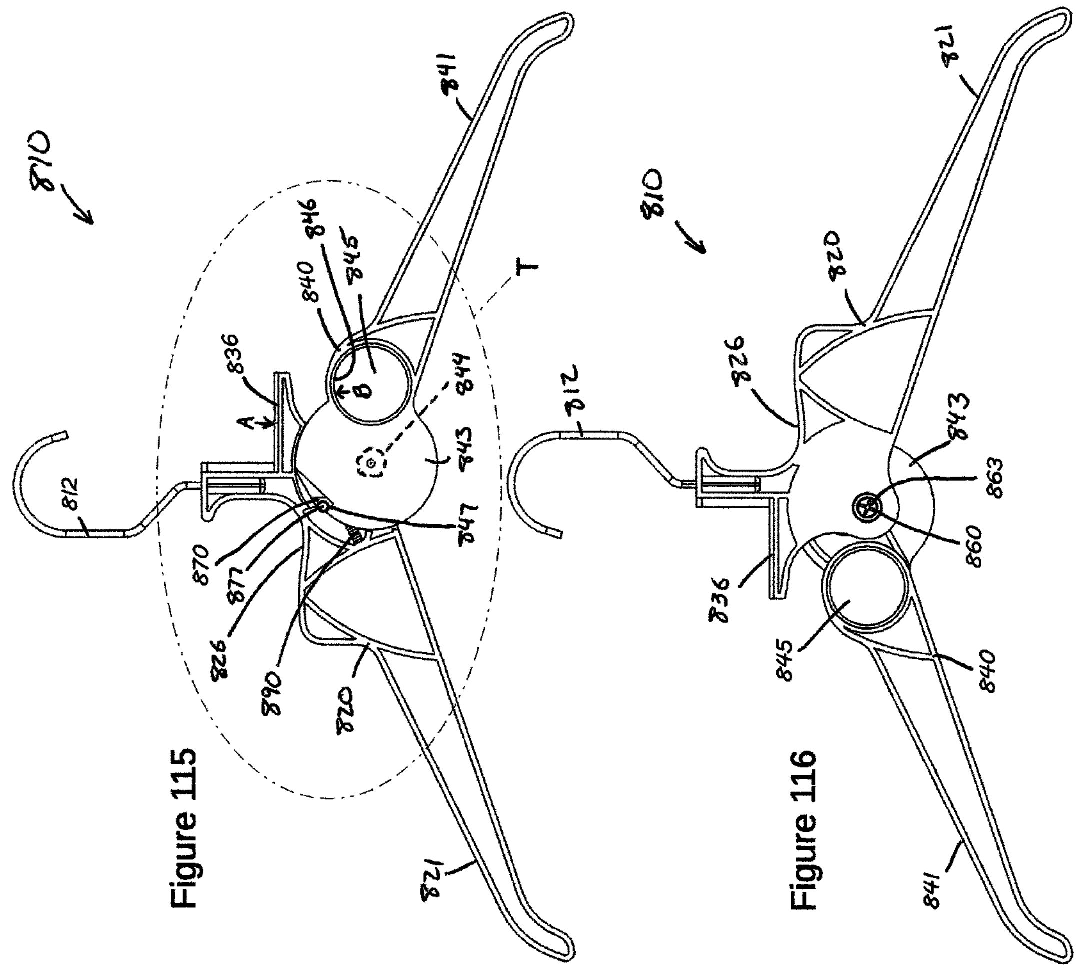
FIG. 115 is a front view of the collapsing hanger assembly of FIG. 109, with the wings extended to an open position.
FIG. 116 is a rear view of the collapsing hanger assembly of FIG. 109, with the wings extended to an open position.

FIG. 115 is a front view of the present embodiment of the collapsing hanger assembly 810, in its locked and expanded condition. If the hanging hook 812 were adequately supported (as if hanging on a bar) and downward forces, such as garment weight, were applied to the garment support surfaces 821, 841, the hanger will retain its extended shape barring a structural failure.

To initiate the hanger collapsing process, a single hand can be placed with its palm on the palm rest surface 826 of the hanger 810. The thumb of the same hand can be placed upon the thumb handle surface 836, the index finger can be placed inside the clearance opening 845 so as to contact the moving wing handle surface 846, and the remaining fingers can wrap beneath the body of the static wing 820 so as to support the entire hanger and any garment upon it. The Push-to-Unlatch action will start when upward pressure is applied by the index finger upon the moving wing handle surface 846, causing the moving wing 840 to rotate upward toward the thumb handle surface 836.

FIG. 116 is a rear view of the present embodiment of the collapsing hanger assembly 810, in its locked as expanded condition. Near the center of the hanger assembly 810 is the pivot cap 860 which is attached to the pivot boss 844 (FIG. 112) with a screw 863 so as to sandwich a portion of the static wing structure around the pivot hole 824 (FIG. 111) with enough clearance to allow for an easily pivotable connection between the static wing 820 and moving wing 840. Although a screw is used to create the connection in this example, it is possible that an alternate method could be used to pivotably connect the wings 820, 840, such as a rivet, a snap-fit, or the like.

Figure 117:
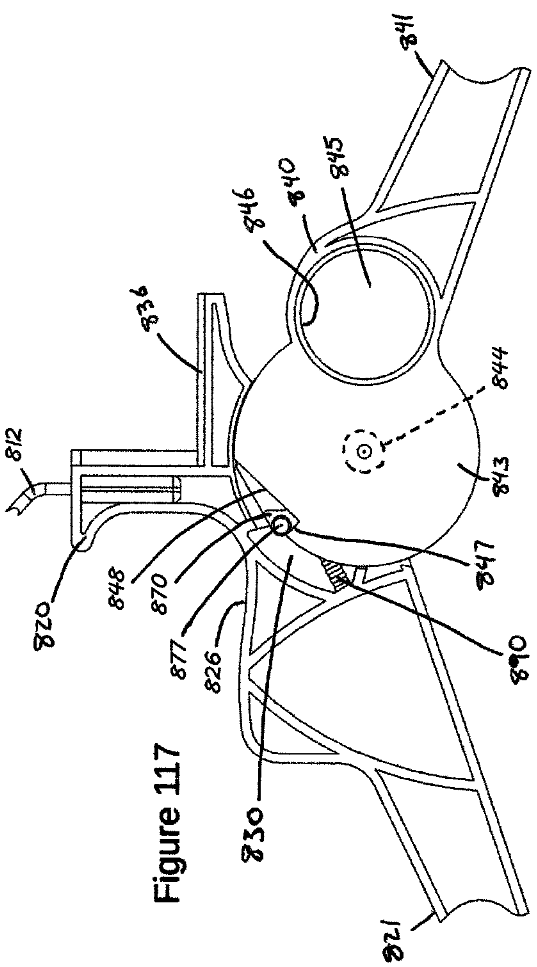
FIG. 117 is a close-up front view of the area generally outlined by the ellipse T in FIG. 115.

FIG. 117 is a close-up view of the central components of the collapsing hanger 810 when in the extended configuration. The latch catch 847 can be seen abutting the latch boss 877 portion of the latch member 870 which is secured so as to prevent the clockwise (in this view) rotation of the moving wing 840.

FIG. 118 is an identical view to that of FIG. 117, with the exception of having the guard flange 843 removed so as to show the components behind. As the Push-to-Unlatch action begins, the latch plunger 850 will make contact at surface 852 with the latch member 870 at the latch tip 875. As the latch member 870 moves leftward (in this view) the latch tip 875 will slide across the surface 852 until contacting surface 853, which is angled in such a manner as to position the latch member 870 appropriately as the collapsing sequence continues.

Figure 120:
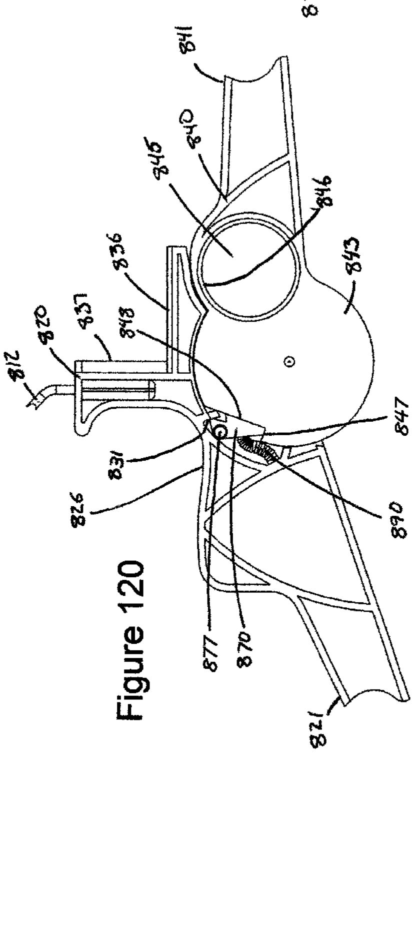
Figure 121:
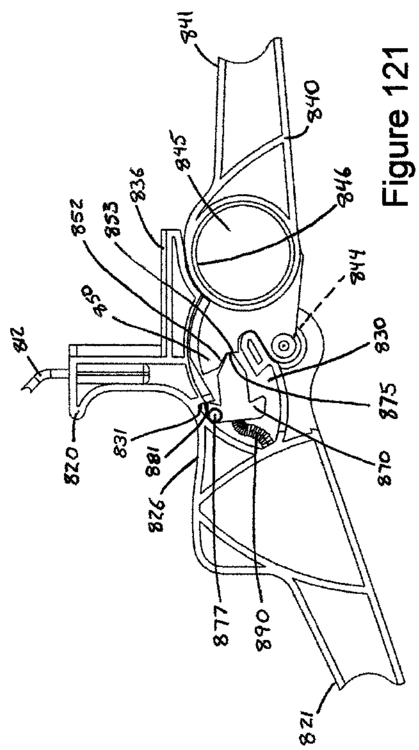

FIG. 120 is a close-up view of the central components of the collapsing hanger 810 when in the unlatching configuration. The latch catch 847 can be seen thoroughly removed from the latch boss 877. FIG. 121 is an identical view to that of FIG. 120, with the exception of having the guard flange 843 removed so as to show the components behind. The latch member 870 can be seen shifted to the upper portion of the latch chamber 830.

Figure 123:
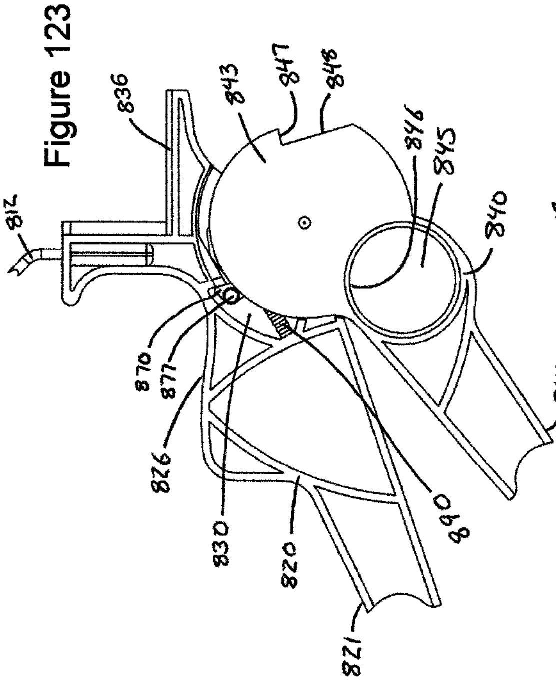
Figure 124:
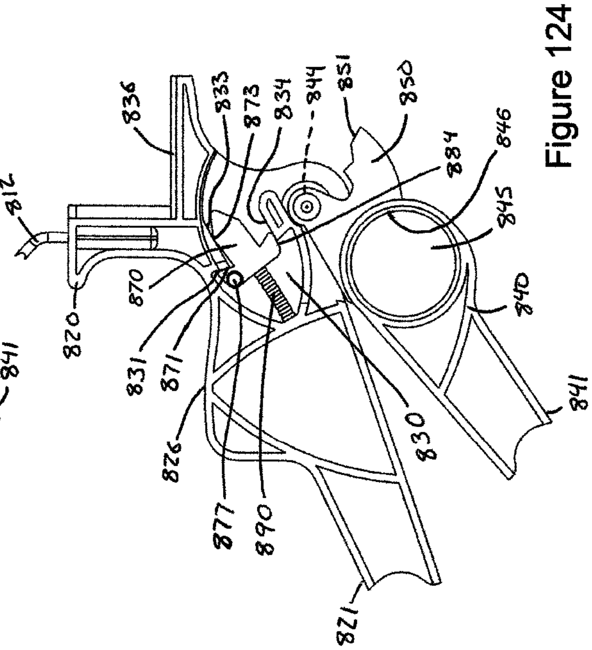
Figure 122:
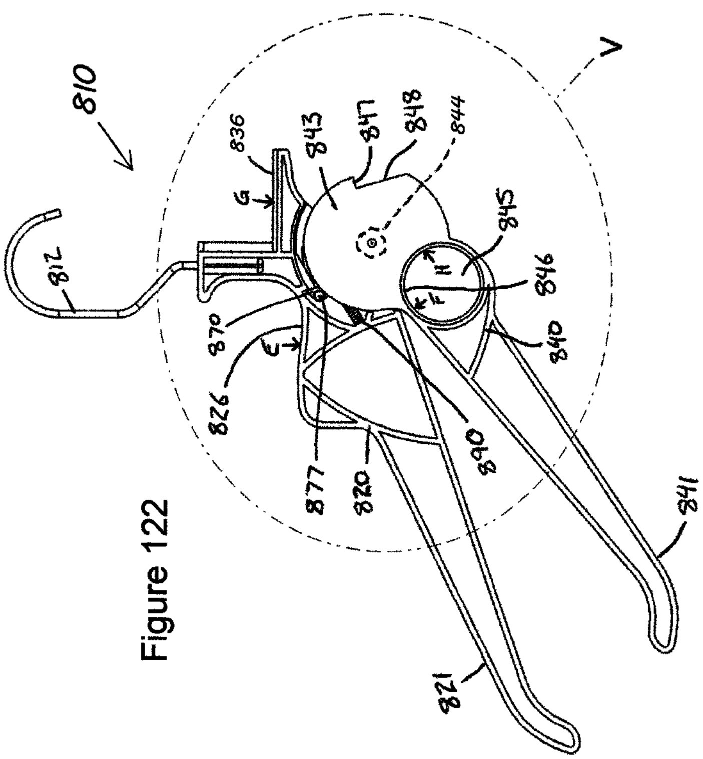

To continue the collapsing sequence the upward force previously applied to the moving handle surface 846 is released and the index finger of the operative hand is pulled down and back so as to rotate the moving wing 840 clockwise (in this view) until reaching the fully collapsed position as seen in FIG. 122. An alternate design of the present embodiment could utilize a resilient biasing means (such as a torsion spring) to urge the moving wing 840 into the collapsed position once the latching mechanism is released. FIG. 123 is a close-up view of the central components of the collapsing hanger 810 when in the collapsed configuration. FIG. 124 is an identical view to that of FIG. 123, with the exception of having the guard flange 843 removed so as to show the components behind.

Figure 125:
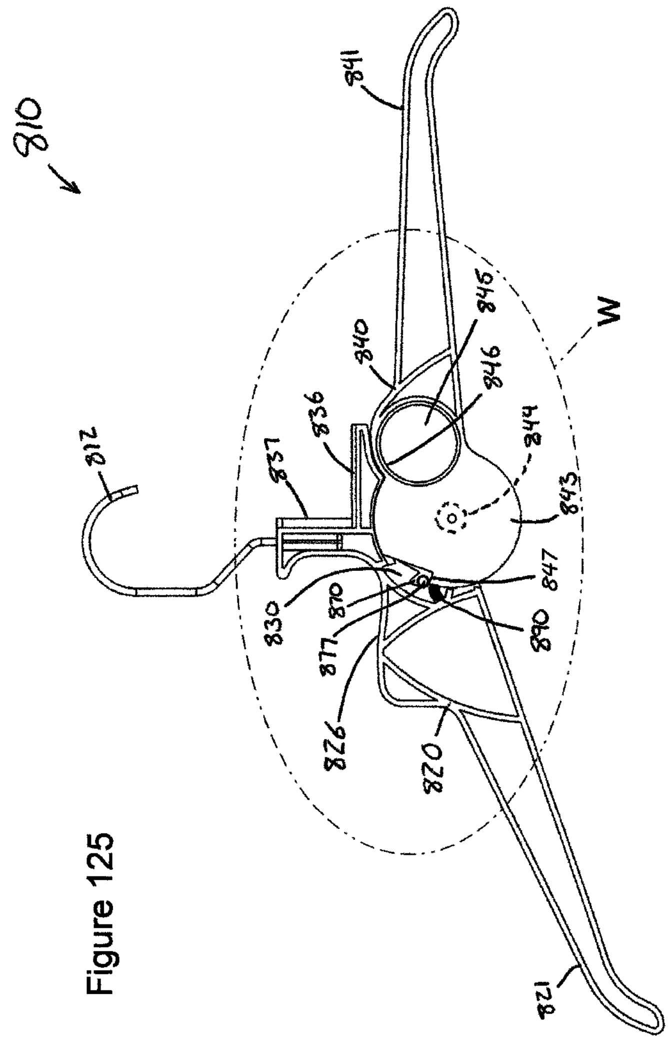

To initiate the expanding sequence a thumb of the operative hand applies a downward force against the thumb handle surface 836, so as to brace against an upward force applied once again by the index finger upon the moving handle surface 846. These forces will cause the moving wing 840 to rotate counter-clockwise (in this view) about the axis of the pivot boss 844 until the hanger assembly 810 is in the re-latching configuration as seen in FIG. 125, thus initiating the Push-to-Re-latch action.

Figure 126:
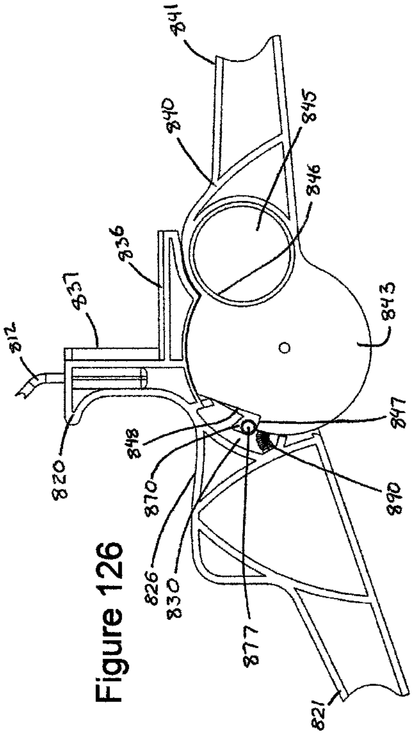
Figure 127:
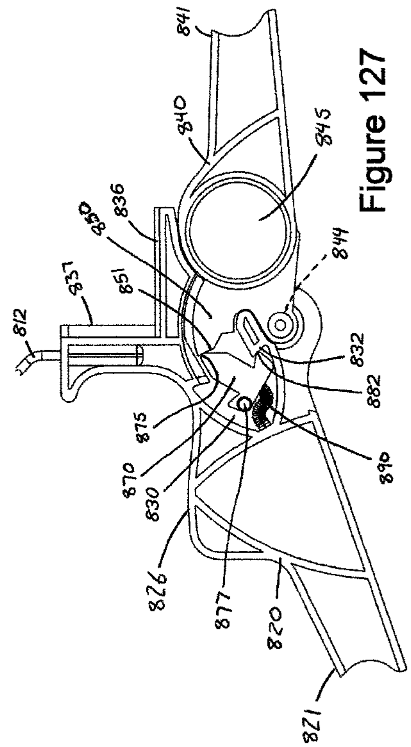

FIG. 126 is a close-up view of the central components of the collapsing hanger 810 when in the re-latching configuration. The latch boss 877 can be seen in close proximity to the latch catch 847. FIG. 127 is an identical view to that of FIG. 126, with the exception of having the guard flange 843 removed so as to show the components behind. The latch member 870 can be seen shifted to the lower portion of the latch chamber 830.

To complete the expanding sequence the upward force to the moving wing 840 is released by the operative hand and the moving wing 740 is allowed to rotate clockwise (in this view) back to the expanded configuration as seen in FIG. 115.

The latch spring 890 in the described figures is shown as if of a conventional metal compression spring design. It is conceivable that an alternate resilient biasing means may be used to provide the forces needed to operate the latching mechanism.

In this described embodiment, the latch chamber 830 is formed as part of the static wing 820 and the plunger 850 and latch catch 847 are formed as part of the moving wing 840. Alternatively, the hanger would retain its functionality if the latch 870 sat within a latch chamber 830 formed as part the moving wing 840 and the plunger 850 and latch catch 847 were formed as part of the static wing 820.

In this described embodiment, the moving wing handle surface 846 is presented as the interior surface of a generally ring-shaped feature. Alternatively, the handle surface 846 could be a different shape so long as allowing for the effective locking, collapsing, and extending of the wings 570, 590.

Figure 130:
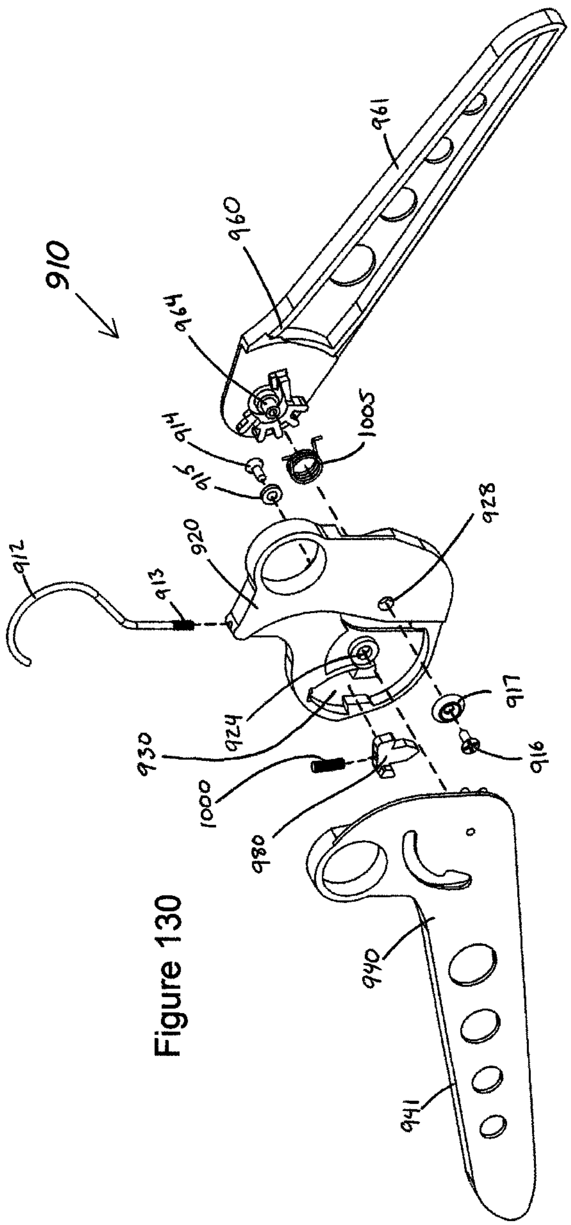

FIG. 128 is a front perspective view of a thirteenth example single hand operated collapsing hanger 910, in its expanded configuration. The embodiment shown in FIG. 128 generally includes a hanging hook 912, a frame 920, a first wing 940 having a first garment support surface 941, a second wing 960 having a second garment support surface 961, a latch member 980, a latch spring 1000, and a torsion spring 1005 (FIG. 130). In this example embodiment, the hanging hook 912 is formed of metal and is interference press fit into the frame 920, which is shown as constructed of plastic. Alternatively, any of the hanger components could be constructed of alternate materials, and the hanging hook 912 could be affixed to the frame 920 by some alternate method, or integrally formed as part of the frame 920. The first wing 940 is pivotably mounted to the frame 920 by way of a pivot boss 944 (shown as hidden). The second wing 960 is pivotably mounted to the frame 920 by way of a pivot boss 964 (hidden).

FIG. 129 is a front perspective view of the hanger 910, in its collapsed, or folded, configuration. The wings 940, 960 are pivoted downward about separate axes, with respect to their positions in FIG. 128, allowing for the assembly to have a much smaller horizontal span. The moving handle 946 part of the first wing 940 can be seen rotated to a greater distance from the static handle 926 part of the frame 920, than that as in FIG. 128. As shown, the lower beveled portion 954 (hidden) of the first wing 940 overlaps the lower beveled portion 974 of the second wing 960.

FIG. 130 is an exploded front perspective view of the hanger 910 in its expanded configuration. Heavy dashed lines show the alignments of the various components in the assembly. The hanging hook 912 has a lower ridged section 913 which allows for interference fit to the frame 920. One end of the latch spring 1000 fits into a receiving hole in the latch member 980, both of which fit into a latch chamber 930 in the frame 920 so that the other end of the latch spring 1000 is affixed to the structure of the frame 920. A first screw 914 passes through a washer 915 from the back side and into the pivot boss 944 (FIG. 131) in the first wing 940 so as to allow a pivoting mount to the frame 920. A second screw 916 passes through a washer 917 from the front side, through the torsion spring 1005, and into the pivot boss 964 in the second wing 960 so as to allow a pivoting mount to the frame 920.

Figure 131:
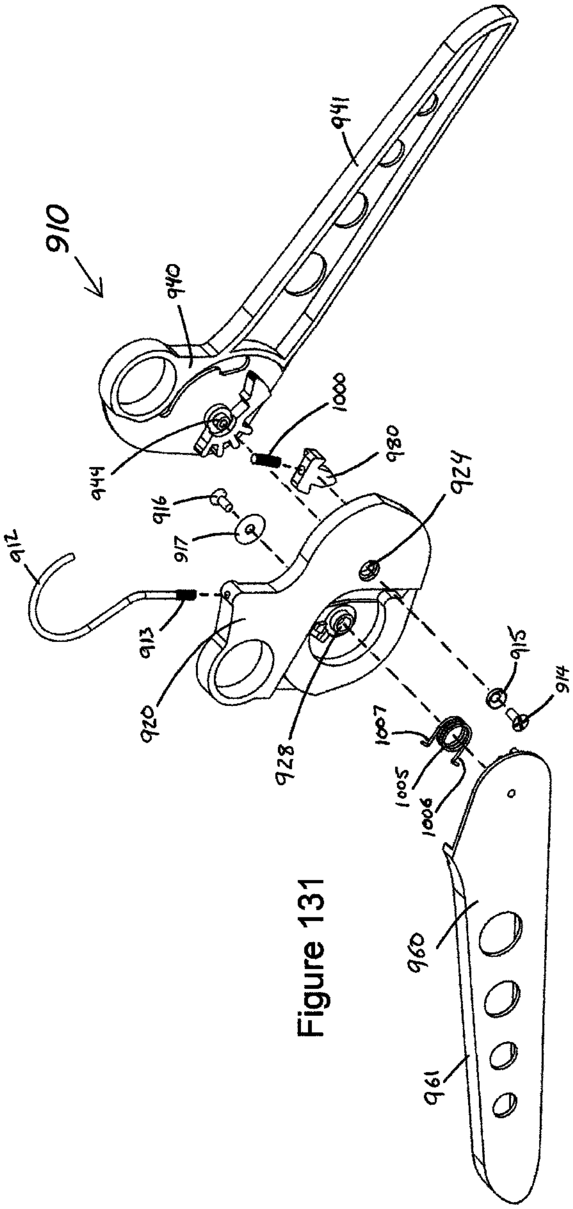

FIG. 131 is an exploded rear perspective view of the hanger 910 in its expanded configuration. Heavy dashed lines show the alignments of the various components in the assembly. The torsion spring 1005 can be seen as having the free ends 1006 and 1007.

FIG. 132 is a front perspective view of the frame 920. A hook connection hole 922 can be seen on the top surface of the frame 920. Left and below the hook connection hole 922 is an arrow shaped latch chamber 930 which includes the latch chamber surfaces 931, 932, 933, 934. At the narrow tip of the latch chamber 930 is a latch spring boss 935, to which one end of the latch spring 1000 (FIG. 130) will attach Immediately right of the latch chamber 930 is the first pivot hole 924, through which the first wing pivot boss 944 (FIG. 134) fits. The back frame wall 929 can be seen above and below the first pivot hole 924. Right and immediately below the hook connection hole 922 is the finger clearance opening 925, around which is formed the static handle surface 926. Below the static handle surface is the front frame wall 927, within which is formed the second pivot hole 928.

FIG. 133 is a rear perspective view of the frame 920. The static handle surface 926 is seen in the upper left extent of the frame. Below the static handle surface 926 can be seen the second pivot hole 928. Surrounding the second pivot hole 928 is a torsion spring depression 937, formed into the back surface of the front frame wall 927. A frame spring brace 938 is rigidly fixed to the front frame wall 927. When the hanger 910 is fully assembled, the torsion spring 1005 (FIG. 131) will sit partially within the spring depression 937 with its free end 1007 braced against the spring contact surface 939 which forms the lower side of the spring brace 938. The back frame wall 929 is seen in the lower right portion of the frame 920, with the first pivot hole 924 formed therein.

FIG. 134 is a rear perspective view of the first wing 940. At the top is the finger clearance opening 945, around which is formed the wing handle surface 946. Below these is first wing wall 943 into which is formed the latch boss clearance slot 949, at the lower end of which is formed the latch clearance notch 948 and the latch catch 947. Fanning out from the pivot boss 944 are the gear teeth 945, to the right of which is the latch plunger 950. Forming the top of the latch plunger 950 are the contact surfaces 951, 952, and 953. Along the top edge of the first wing 940 is the garment support surface 941, below which are the support structure 942 and the beveled surface 954.

FIG. 135 is a front perspective view of the second wing 960. At the left end is the second wing wall 963, in the center of which is the pivot boss 964. Surrounding the pivot boss 964 is a torsion spring depression 967, and fanning out from that are the gear teeth 965 which will mesh with the first wing gear teeth 945 (FIG. 134) when assembled. At the uppermost gear tooth a notch 966 is formed to allow necessary clearance during wing rotation. A wing spring brace 968 is rigidly fixed to the second wing wall 963. When the hanger 910 is fully assembled, the torsion spring 1005 (FIG. 130) will sit partially within the spring depression 967 with its free end 1006 braced against the spring contact surface 969 which forms the lower side of the spring brace 968. Along the top edge of the second wing 960 is the garment support surface 961, below which are the support structure 962 and the beveled surface 974.

FIG. 136 shows an upper-right front view of the latch member 980, which is generally formed as a "T" shape with a latch boss 988 projecting out from its primary structure. Forming one side of the latch boss 988 is the latch face 987 which selectively engages with the latch catch 947 (FIG. 134) during hanger operation. At the larger end of the latch member 980, there is a latch spring receiving hole 986 (shown as partially hidden) which provides for firm attachment to one end of the latch spring 1000 (FIG. 130). Around the perimeter of the latch member 980, the various latch contact faces 981, 982, 993, 994 and latch contact edges 983, 984, 991, 992 can be seen. The smaller end of the latch member 980 narrows to an acute edge, which is the latch tip 985.

FIG. 137 shows a lower-left front view of the latch member 980. The contact edges 991 and 992, as well as the latch tip 985, are shown to be formed as small radiused surfaces which will aid in friction reduction as the latch member 980 moves through its operational paths.

FIG. 138 is a front perspective view of the hanger assembly 910, in its unlatching configuration. Both wings 940, 960 can be seen rotated upward upon their mounts with respect to the frame 920. The latch boss 988 can be seen thoroughly removed from the latch catch 947.

FIG. 139 is a front perspective view of the hanger assembly 910, in its re-latching configuration. Both wings 940, 960 can be seen rotated upward upon their mounts with respect to the frame 920. The latch boss 988 can be seen adjacent to the latch catch 947.

FIG. 140 is a front view of the internal features of the hanger assembly 910 in the extended position, where the first wing wall 943 and front frame wall 927 have been sectioned away to show the components behind. The latch spring 1000 and latch member 980 can be seen in the latched position within the latch chamber 930. The gear teeth 945, 965 can be seen inter-meshed in the center, and the torsion spring 1005 can be seen in position around the second wing pivot boss 964. The torsion spring 1005 is wound in such a way so as to urge the two free ends 1006, 1007 away from one another. The force provided by the torsion spring 1005 acts upon the frame spring brace 938 and the second wing spring brace 968, so as to urge the second wing 960 downward, or clockwise (in this view). The second wing gear teeth 965 impart force against the first wing gear teeth 945, so as to subsequently urge the first wing 940 downward as well, or counter-clockwise (in this view). When in the latched condition, the latch catch 947 (FIG. 134) is braced against the latch boss 988 so as to hold the wings 940, 960 extended as seen in FIG. 128, thus resisting the force of the torsion spring 1005.

To initiate the collapsing sequence, two fingers of the same hand can be placed into the finger clearance openings 945, 925 and used to push upon the handle surfaces 946, 926 in the direction shown by the arrows R and S (respectively). This force will cause both wings 940, 960 to rotate upward by virtue of their pivoted mount locations and inter-meshed gear teeth 945, 965. As the first wing pivots upward, or clockwise (in this view), the plunger contact faces 952 and 953 will make contact with the latch tip 985 and force the latch member 980 upward and toward the left side of the latch chamber 930, thus initiating the Push-to-Unlatch action.

FIG. 141 is a front view of the internal features of the hanger assembly 910 in the unlatching position, where the first wing wall 943 and front frame wall 927 have been sectioned away to show the components behind. The latch spring 1000 and latch member 980 can be seen toward the left side of the latch chamber 930. In this position the latch face 987 will be disengaged from the latch catch 947 (FIG. 134). The torsion spring 1005 can be seen in a slightly more collapsed state than that in FIG. 140, from having the free end 1006 pushed upward by the wing spring contact surface 969 as the second wing 960 pivoted counter-clockwise (in this view). Upon release of the squeezing force applied to the handle surfaces 946, 926, the force of the torsion spring 1005 will be allowed to push downward on the spring contact surface 969, thus causing both wings 940, 960 to rotate downward to the fully collapsed position by virtue of their pivoted mounting locations and inter-meshed gear teeth 945, 965.

FIG. 142 is a front view of the internal features of the hanger assembly 910 in the fully collapsed position, where the first wing wall 943 and front frame wall 927 have been sectioned away to show the components behind. The torsion spring can be seen with the free ends 1006, 1007 spread away from each other. The latch spring 1000 and latch member 980 can be seen in the fully unlatched position within the latch chamber 930.

To initiate the hanger expanding operation, two fingers of the same hand can be placed into the finger clearance openings 945, 925 and used to push upon the handle surfaces 946, 926 in the direction shown by the arrows T and U (respectively). This force will cause both wings 940, 960 to rotate upward by virtue of their pivoted mount locations and inter-meshed gear teeth 945, 965. As the first wing pivots upward, or clockwise (in this view), the plunger contact face 951 will make contact with the latch tip 985 and force the latch member 980 upward and toward the right side of the latch chamber 930, thus initiating the Push-to-Re-latch action.

FIG. 143 is a front view of the internal features of the hanger assembly 910 in the re-latching position, where the first wing wall 943 and front frame wall 927 have been sectioned away to show the components behind. The latch spring 1000 and latch member 980 can be seen in the upper right portion of the latch chamber 930. In this orientation the latch boss 988 is positioned alongside the latch catch 947 and thus the latch member 980 is primed to move back into the latched position, as seen in FIG. 139.

To complete the Push-to-Re-latch action the squeezing force previously applied to the handle surfaces 946, 926 is released, allowing the force of the torsion spring 1005 to push downward on the spring contact surface 969, thus causing both wings 940, 960 to rotate downward again. As this motion takes place the latch spring 1000 pushes the latch member 980 down and to the right so that the latch face 987 drops into place in front of the latch catch 947 as seen in FIG. 128. Once the latch member 980 moves into the fully latched position, the wings 940, 960 will thus again be held in the expanded configuration.

The latch spring 1000 and torsion spring 1005 in the described figures are shown as if of conventional metal designs. It is conceivable that alternate resilient biasing means may be used to provide the forces necessary for proper collapsing hanger 910 operation.

In this described embodiment, the handle surfaces 926, 946 are presented as interior surfaces of generally ring-shaped features. Alternatively, the handle surfaces used to manipulate this design could be of various size, shape, and number so long as they allow for the effective locking, collapsing, and extending of the wings 940, 960. It is also conceivable that the clearance opening 925 and static handle surface 926 could be replaced with a palm handle surface which would allow for the palm of the operative hand to brace against the frame 920, as the fingers of the same hand manipulate the first wing handle surface 946.

FIG. 144 is a front perspective view of a fourteenth example single hand operated collapsing hanger 1010, in its expanded configuration. The embodiment shown in FIG. 144 generally includes a hanging hook 1012, a first static wing 1020 having a first garment support surface 1021, a second moving wing 1040 having a second garment support surface 1041, a latch member 1070, a latch spring 1090, and a torsion spring 1095 (FIG. 146). In this example embodiment, the hanging hook 1012 is formed of metal and is interference press fit into the static wing 1020, which is shown as constructed of plastic. Alternatively, any of the hanger components could be constructed of alternate materials, and the hanging hook 1012 could be affixed to the static wing 1020 by some alternate method, or integrally formed as part of the static wing 1020. The moving wing 1040 is pivotably mounted to the static wing 1020 by way of a pivot boss 1044 (shown as hidden).

FIG. 145 is a front perspective view of the hanger 1010, in its collapsed, or folded, configuration. In this view the moving wing 1040 has been rotated about its mount to the static wing 1020. The wings 1020, 1040 can be seen with their free (or distal) ends positioned very close to one another so as to create a small insertion profile.

FIG. 146 is an exploded front perspective view of the hanger 1010 in its expanded configuration. Heavy dashed lines show the alignments of the various components in the assembly. The hanging hook 1012 has a lower ridged section 1013 which allows for interference fit to the static wing 1020. One end of the latch spring 1090 fits into a receiving hole in the latch member 1070, both of which fit into a latch chamber 1030 in the static wing 1020 so that the other end of the latch spring 1090 is affixed to the structure of the static wing 1020. A screw 1014 passes through a washer 1015 from the back side, through the static wing 1020, through the torsion spring 1095, and into the pivot boss 1044 (FIG. 149) on the moving wing 1040 so as to allow a pivoting mount within the pivot hole 1024 of static wing 1020. Although a screw is used to create the connection in this example, it is possible that an alternate method could be used to pivotably connect the wings 1020, 1040, such as a rivet, a snap-fit, or the like.

FIG. 147 is an exploded rear perspective view of the hanger 1010 in its expanded configuration. Heavy dashed lines show the alignments of the various components in the assembly. The pivot boss 1044 can be seen on the moving wing 1040.

FIG. 148 is a front perspective view of the static wing 1020. A hook connection hole 1023 can be seen on the top surface of the static wing 1020. Below the hook connection hole 1023 is an arrow shaped formation of ribs that surround the latch chamber 1030 and which form the latch chamber surfaces 1031, 1032, 1033, 1034. At the narrow tip of the latch chamber 1030 is a latch spring boss 1035, to which one end of the latch spring 1090 (FIG. 147) will attach. Left of the latch chamber 1030 is the pivot hole 1024, through which the moving wing pivot boss 1044 (FIG. 147) fits. Surrounding the pivot hole 1024 is a torsion spring depression 1028, formed into the front surface of the static wing wall 1027. When the hanger 1010 is fully assembled, the torsion spring 1095 (FIG. 147) will sit partially within the spring depression 1028 with its free end 1097 braced against the spring contact surface 1039. Formed near the top bottom of the static wing wall 1027 are the upper and lower gib channels 1036 and 1037, respectively. Right of the latch chamber 1030 is the kidney-shaped finger clearance opening 1025, the perimeter of which forms the static wing handle surface 1026. Above the finger clearance opening 1025 is the finger leverage handle surface 1029. The garment support surface 1021 can be seen on the right end (in this view) of the static wing 1020, with a support structure 1022 below it.

FIG. 149 is a rear perspective view of the moving wing 1040. In the upper portion of the moving wing 1040 the kidney-shaped finger clearance opening 1045 can be seen, the perimeter of which forms the moving wing handle surface 1046. Above the finger clearance opening 1045 is the finger leverage handle surface 1049. The garment support surface 1041 can be seen to the right (in this view) of the clearance opening 1045, with a support structure 1042 structure below it. To the left (in this view) of the clearance opening 1045 is the pivot boss 1044. Surrounding the pivot boss 1044 is a torsion spring depression 1055, formed into the back surface of the guard flange 1054. A moving wing spring brace 1058 is formed along one side of the spring depression 1055. When the hanger 1010 is fully assembled, the torsion spring 1095 (FIG. 146) will sit partially within the spring depression 1055 with its free end 1096 braced against the spring contact surface 1059 of the spring brace 1058. Formed into the left edge (in this view) of the guard flange 1054 are the latch clearance notch 1048 and the latch catch 1047. Above the pivot boss 1044 is the latch plunger 1050, with its contact surfaces 1051, 1052, and 1053. The upper gib rib 1056 (shown as hidden) is attached to the top edge of the latch plunger 1050, which is formed so as to be able to pass between the latch chamber surfaces 1033 and 1034 (FIG. 148) when performing the unlatching and re-latching operations of the hanger. Right (in this view) of the spring brace 1058 is the lower gib rib 1057 (shown as hidden).

FIG. 150 shows an upper-right front view of the latch member 1070, which is generally formed as a "T" shape with a latch boss 1078 projecting out from its primary structure. Forming one side of the latch boss 1078 is the latch face 1077 which selectively engages with the latch catch 1047 (FIG. 149) during hanger operation. At the larger end of the latch member 1070, there is a latch spring receiving hole 1076 (shown as partially hidden) which provides for firm attachment to one end of the latch spring 1090 (FIG. 147). Around the perimeter of the latch member 1070, the various latch contact faces 1071, 1072, 1083, 1084 and latch contact edges 1073, 1074, 1081, 1082 can be seen. The smaller end of the latch member 1070 narrows to an acute edge, which is the latch tip 1075.

FIG. 151 shows a lower-left front view of the latch member 1070. The contact edges 1081 and 1082, as well as the latch tip 1075, are shown to be formed as small radiused surfaces which will aid in friction reduction as the latch member 1070 moves through its operational paths.

FIG. 152 is a perspective view of the torsion spring 1095, in a twisted condition that is similar to that which it would have in the collapsing hanger assembly 1010 when fully extended as seen in FIG. 144. Relative to a resting spring, the free ends 1096, 1097 are twisted toward one another so as to store significant potential energy.

FIG. 153 is a perspective view of the torsion spring 1095, in a less sprung condition that is similar to that which it would have in the collapsing hanger assembly 1010 when fully collapsed as seen in FIG. 145. In contrast to the spring condition as seen in FIG. 152, some of the potential energy stored within has been used to force the free ends 1096, 1097 to positions closer to the shape of an unsprung resting spring.

FIG. 154 is a front view of the present embodiment of the collapsing hanger assembly 1010, in its locked and expanded condition. If the hanging hook 1012 were adequately supported (as if hanging on a bar) and downward forces, such as garment weight, were applied to the garment support surfaces 1021, 1041, the hanger will retain its extended shape barring a structural failure. FIG. 155 is a front view of the collapsing hanger assembly 1010 in the unlatching configuration.

FIG. 156 is a close-up view of the central components of the collapsing hanger 1010 when in the extended configuration. The latch boss 1078 can be seen projecting forward into the latch clearance notch 1048, so that the latch face 1077 is abutting the latch catch 1047.

FIG. 157 is an identical view to that of FIG. 156, with the exception of having the guard flange 1054 removed so as to show the components behind. The latch member 1070 and latch spring 1090 are positioned within the latch chamber in such a manner so as to prevent their movement upward or to the right (in this view). It is this condition that holds firm the latch member 1070 and latch boss 1078, so as to prevent the moving wing 1040 from rotating counter-clockwise (in this view) about the axis of the pivot boss 1044 by virtue of the latch face 1077 holding the latch catch 1047 as seen in FIG. 156.

In FIG. 157 the torsion spring 1095 can be seen positioned encircling the pivot boss 1044, with one free end 1097 braced against the spring contact surface 1039 and the other free end 1096 applying a downward force on the spring contact surface 1059 of the spring brace 1058. Above the pivot boss 1044 can be seen the latch plunger 1050 with the upper gib rib 1056 attached and partially projecting into the upper gib channel 1036 (shown as hidden), which adds support to the pivoting connection by resisting forces parallel to the pivot axis. The lower gib rib 1057 can be seen completely removed from the lower gib channel 1037 (shown as hidden), as they are not engaged when the hanger assembly 1010 is in the extended configuration.

To initiate the collapsing sequence a thumb of one hand can be placed through the clearance opening 1045 so as to rest on the handle surface 1046 with one or more fingers from the same hand placed through the clearance opening 1025 so as to rest on the handle surface 1026. The thumb and fingers can then be squeezed together in the directions denoted by the arrows V and W in FIG. 156. Alternatively, the same squeezing action can take place with the thumb of one hand acting on the handle surface 1026 and other fingers of the same hand acting on the handle surface 1046, due to the side-to-side symmetry of the hanger assembly 1010.

Under these forces the moving wing 1040 will be caused to rotate clockwise (in this view) about the axis of the pivot boss 1044 with respect to the static wing 1020, and as this happens the latch catch 1047 will release its pressure on the latch face 1077 allowing the latch member 1070 to be repositioned. As the Push-to-Unlatch action begins, the latch plunger contact surfaces 1052 and 1051 will make contact with the latch tip 1075, and will continue to push the latch member 1070 down and to the right (in this view) against the resistive force of the latch spring 1090 until the moving wing 1040 has reached the extent of its unlatching motion. When that point has been reached, structural components of the wings 1020, 1040 will prevent further squeezing motion, and the collapsing hanger 1010 will reach the unlatching configuration as seen in FIG. 155.

FIG. 158 is a close-up view of the central components of the collapsing hanger 1010 when in the unlatching configuration. The latch catch 1047 can be seen thoroughly removed from the latch boss 1078.

FIG. 159 is an identical view to that of FIG. 158, with the exception of having the guard flange 1054 removed so as to show the components behind. The latch spring 1090 can be seen in a deformed condition as it continues to apply a moderate pressure on the latch member 1070 in opposition to the force applied by the latch plunger contact surface 1051 to the latch tip 1075. Through the course of the unlatching sequence the latch contact face 1083 moved in plane with the latch chamber surface 1033 (FIG. 157) until the latch contact edge 1081 moved beyond the chamber surface 1033, after which the latch member 1070 pivoted about the latch tip 1075 allowing the latch contact edge 1081 to rest upon the latch chamber surface 1031. The torsion spring 1095 can be seen in a slightly more twisted condition than previously held, by virtue of the spring contact surface 1059 pushing the free end 1096 closer to the free end 1097 as the moving wing 1040 pivoted upward.

To continue the collapsing sequence, the previously applied hand forces are released allowing the torsion spring to freely push the moving wing 1040 counter-clockwise (in this view) about the axis of the pivot boss 1044 with respect to the static wing 1020, by way of the opposing forces applied to the spring contact faces 1059 and 1039 by the spring free ends 1096 and 1097, respectively. As this motion is initiated the latch plunger contact surface 1051 will release its force upon the latch tip 1075 allowing the latch spring 1090 to push upward and to the right (in this view) upon the latch member 1070 causing it to pivot and slide about the latch edge 1081 along the chamber surface 1031, to eventually rest in the upper right portion of the latch chamber 1030. An alternate collapsing hanger design could be identically made with the exception of having no torsion spring, thus allowing gravitational forces and/or forces applied by the operative hand to urge the unlocked hanger to the collapsed position.

FIG. 160 shows the collapsing hanger 1010 in the fully collapsed position. As the previously applied squeezing force was released and the hanger assembly 1010 was allowed to fold from the unlatching position to this position, the previously inserted thumb and fingers of the same hand can remain within their respective finger clearance openings 1045, 1025, thus allowing the operator to retain a hold on the hanger 1010 with solely the same operative hand. Using a first one hand the collapsed hanger assembly 1010 can be rotated and repositioned as necessary to allow for a previously supported garment to be dropped from the free ends of the wings 1020, 1040, and into the grasp of a second one hand.

FIG. 162 is a close-up view of the central components of the collapsing hanger 1010 when in the collapsed configuration. The latch boss 1078 can be seen positioned adjacent to the guard flange 1054, thoroughly disengaged from the latch catch 1047 and thus offering no resistance to the rotational movement of the moving wing 1040 with respect to the static wing 1020.

FIG. 163 is an identical view to that of FIG. 162, with the exception of having the guard flange 1054 removed so as to show the components behind. The latch member 1070 is canted toward the right (in this view) of the latch chamber 1030 and its faces 1071, 1084 and edge 1073 abut the latch chamber surfaces 1031, 1034, and 1033 respectively. The torsion spring 1095 can be seen positioned encircling the pivot boss 1044, in a less twisted condition than when the hanger assembly 1010 was in the unlatching configuration. The lower gib rib 1057 (partially hidden) is seen projecting into the lower gib channel 1037 (shown as hidden), which adds support to the pivoting connection by resisting forces parallel to the pivot axis. The upper gib rib 1056 can be seen completely removed from the upper gib channel 1036 (shown as hidden), as they are not engaged when the hanger assembly 1010 is in the collapsed configuration.

To hang a garment on the present embodiment of the collapsing hanger assembly 1010, the fingers of a first one hand can be used to hold the folded hanger through the clearance openings 1025, 1045 and position it with the free ends of the wings 1020, 1040 pointing downward. A second one hand can be used to hold a narrow-collared shirt by the edge of its neck opening, with the remainder of the garment hanging freely beneath. The first one hand can then be used to move the hanger assembly 1010 so that the free ends of the wings 1020, 1040 pass down through the neck opening of the garment until the bulk of the hanger assembly 1010 is positioned within the body of the garment. At such a point the fingers of the first one hand can be used to expand the hanger assembly, as the second one hand slowly releases its grip allowing the full weight of the garment to rest upon the support surfaces 1021, 1041 of the hanger assembly 1010.

To initiate the expanding sequence of the hanger assembly 1010 a thumb of one hand can be placed through the clearance opening 1045 so as to rest on the handle surface 1046 and apply a force in the direction denoted by the arrow X in FIG. 162. Additional fingers of the same hand can be on the handle surfaces 1026 and 1029 to apply forces in the directions denoted by the arrows Y and N, respectively. Alternately, the same squeezing action can be achieved by using a thumb of one hand on the handle surface 1026 to exert a force in the direction Y, while using additional fingers of the same hand on handle surfaces 1046 and 1049 in the directions denoted by the arrows X and M, respectively, due to the symmetry of the hanger assembly 1010. Under these forces the moving wing 1040 will be caused to rotate clockwise (in this view) about axis of the pivot boss 1044 (FIG. 163) with respect to the static wing 1020, until it reaches the re-latching configuration as seen in FIG. 161. It is possible that the handle surfaces 1029 or 1049 need not be used for initiating or completing the expanding sequence, so long as sufficient force can be achieved by the thumb and fingers on the other handle surfaces 1026, 1046 in the directions Y and X. It is also possible that fingers of the operative hand may already be in position to initiate the expanding sequence, after the completion of a collapsing sequence. Thus the collapsing hanger 1010 could be cycled through multiple collapsing and expanding sequences solely with one hand, and without the need to reposition the hand.

The collapsing hanger 1010 is designed with large finger clearance openings 1025, 1045 which allow for placing all of the fingers of the operative hand within them during operation, thus reducing the chances of pinching a finger during use. The large finger clearance openings 1025, 1045 also provide enough space to pass the entire thumb of the operative hand through so as to place the thenar eminence upon whichever handle surface 1026 or 1046 is desired. This positioning allows use of the palmer surface of the operative hand in conjunction with the opposed squeezing fingers during the expanding sequence of the collapsing hanger 1010, thus allowing for the stronger portions of the hand to be utilized when overcoming any forces which may resist expansion in use.

FIG. 164 is a close-up view of the central components of the collapsing hanger 1010 when in the re-latching configuration. The latch boss 1078 can be seen disengaged from, but sitting alongside the latch catch 1047.

FIG. 165 is an identical view to that of FIG. 164, with the exception of having the guard flange 1054 removed so as to show the components behind. As the moving wing 1040 neared the end of its rotation to the re-latch position, the latch plunger contact surface 1053 came into contact with the latch tip 1075 and pushed the latch member 1070 down and to the left (in this view) within the latch chamber 1030, thus initiating the Push-to-Re-latch action. As that motion proceeded the latch contact face 1084 moved in plane with the latch chamber surface 1034 (FIG. 163) until the latch contact edge 1082 moved beyond the chamber surface 1034, after which the latch member 1070 pivoted about the latch tip 1075 allowing the latch contact edge 1082 to rest upon the latch chamber surface 1032. The latch spring 1090 can be seen in a deformed condition as it continues to provide some back pressure on the latch member 1070 toward the latch plunger 1050.

To complete the hanger expanding sequence the squeezing force is released by the operative hand, allowing the torsion spring 1095 to urge the moving wing 1040 to rotate counter-clockwise (in this view) with respect to the static wing 1020. As this motion occurs the force applied through the plunger surface 1053 is released from the latch tip 1075, and the latch spring 1090 urges the latch member 1070 to pivot and slide about the edge 1082 across the surface 1032, which concurrently moves the latch boss 1078 into the latch clearance notch 1048 until the various components return to their positions as seen in FIGS. 156 and 157 and the latch catch 1047 is once again abutted to the latch surface 1077.

The latch spring 1090 and torsion spring 1095 in the described figures are shown as if of conventional metal designs. It is conceivable that alternate resilient biasing means may be used to provide the forces necessary for proper collapsing hanger 1010 operation.

In this described embodiment, the hanging hook 1012 is attached to the static wing 1020. Alternatively, the hanging hook 1012 could be attached to (or formed as part of) the moving wing 1040 and the collapsing hanger 1010 would maintain its functionality.

In this described embodiment, the handle surfaces 1026 and 1046 are presented as interior surfaces of generally oval ring-shaped features. Alternatively, the handle surfaces used to manipulate this design could be of various size, shape, and number so long as they allow for the effective locking, collapsing, and extending of the wings 1020, 1040. It is also conceivable that a frame portion could be added to the collapsing hanger 1010 so as to pivotably connect to at least one wing 1020 or 1040, and possibly connect to the hanging hook 1012. Such a frame portion could provide a palm handle surface for the operative hand to brace against, as the fingers of the same hand manipulate the handle surfaces 1026, 1046.

FIG. 166A is a front perspective view of a fifteenth example single hand operated collapsing hanger 1110, in its expanded configuration. The embodiment shown in FIG. 166A generally includes a first static wing 1120 with integral hanging hook 1112 and garment support surface 1121, a second moving wing 1140 having a second garment support surface 1141, a latch member 1170 and latch spring 1190 (each shown as hidden), and a torsion spring (not shown). Alternatively, the hanging hook 1112 could be formed as part of the moving wing 1140 and the collapsing hanger 1110 would maintain its functionality. The moving wing 1140 is pivotably mounted to the static wing 1120 by way of a pivot boss 1144 (shown as hidden), and locked into the extended position by virtue of the latch catch 1147 (FIG. 166B) being braced against the latch boss 1178 portion of the latch member 1170 which nests within the latch chamber 1130. A cover shield 1155 is integrally formed on the front of the moving wing so as to hide and protect the various latching features behind it.

To begin the folding sequence of the hanger 1110, a thumb of one hand can be fit into the moving wing clearance opening 1145 and placed upon the handle surface 1146. Another finger of the same hand can be fit though the static wing clearance opening 1115 and placed upon the handle surface 1116, with the remaining fingers of the same hand fit through the clearance opening 1125 so as to rest on the handle surface 1126. The operative thumb and fingers can then be used to apply a squeezing force in the directions denoted by the arrows E and F, causing the moving wing to pivot clockwise (in this view) about the pivot boss 1144 until reaching the unlatching position, and thus initiating the Push-to-Unlatch action.

FIG. 166B shows the hanger assembly 1110 in the unlatching configuration. The latch boss 1178 is removed from the latch catch 1147, both of which are hidden with the various other latching components behind the cover shield 1155. If previously applied squeezing forces are released from this position, the moving wing 1140 will be allowed to pivot counter-clockwise (in this view) to the collapsed position.

FIG. 166C shows the hanger assembly 1110 in the collapsed, or folded, configuration. The free ends of the wings 1120, 1140 are closely positioned so as to allow for the easy removal from and insertion into the neck opening of a garment. A portion of the static wing wall 1127 can be seen behind the cover shield 1155, with a space in between to house the various pivoting, latching, and spring components.

To initiate the expanding sequence of the hanger assembly 1110 the thumb of one hand can be placed within the clearance opening 1145 so as to push on the handle surface 1146 in the direction denoted by the arrow G, while the remaining fingers of the same hand rest upon the handle surfaces 1116 and 1126 so as to apply a force in the direction denoted by the arrow H. These squeezing forces will cause the moving wing to pivot clockwise (in this view) until reaching the re-latching configuration which closely resembles that of the previous embodiment 1010. The Push-to-Re-latch action will be completed when the squeezing forces are once again released and the moving wing 1140 falls back into the extended position as seen in FIG. 166A.

The collapsing hanger 1110 is designed with large finger clearance openings 1115, 1125, 1145 which allow for placing all of the fingers of the operative hand within them during operation, thus reducing the chances of pinching a finger during use. The large finger clearance opening 1145 also provides enough space to pass the entire thumb of the operative hand through so as to place the thenar eminence upon the handle surface 1146. This positioning allows use of the palmer surface of the operative hand in conjunction with the opposed squeezing fingers during the expanding sequence of the collapsing hanger 1110, thus allowing for the stronger portions of the hand to be utilized when overcoming any forces which may resist expansion in use.

In FIG. 167A, various features can be seen along the length of the garment support surfaces 1121, 1141, which alternately serve to align, hold, and protect the shoulders of garments which might be supported by the wings 1120, 1140. Strap support notches 1137, 1157 are depressions formed roughly mid-span in the garment support surfaces 1121, 1141, and are present to prevent sleeveless garments from sliding off the free (or distal) ends of the wings 1120, 1140 when placed on the hanger 1110. Wide sculpted shoulder platens 1138, 1158 sit atop the free ends of the wings 1120, 1140 to reduce the pressure exerted on the shoulder portions of a hanging garment by distributing the load over a greater area than that provided by a narrow wing tip. Friction pads 1139, 1159 are positioned atop the garment support surfaces 1121, 1141 so as to provide a moderate amount of grip to the inner shoulder surfaces of a garment, preventing either shoulder from sliding freely down the length of the wings 1120, 1140. The friction pads 1139, 1159 may be constructed of rubber, low-durometer plastic, felt, flocking, or other high friction material, and they may be adhered to the garment support surfaces with glue, integrally molded, physically attached, or the like.

FIG. 167B shows a front view of the free end portions of the moving wing 1140. The profile of the strap support notch 1157 can be seen with the friction pad 1159 projecting up from the surface above 1141. The profile of the shoulder platen 1158 can be as curving gently down to the tip of the wing 1140. Beneath these features is the support structure 1142, which is shown extending down the full length of the wing 1140, but could alternately project down just a portion of the wing 1140 with the remaining features constructed to be self-supporting down the length of the free end of the wing 1140.

A top-down view of the garment support surface 1141 is shown in FIG. 167C. It can be seen that the wing 1140 profile narrows as it projects out from the center toward the free end, until it reaches the strap support notch 1157. The upper end of the shoulder platen 1158 begins at the strap support notch 1157 and widens to an apex, then narrows as it approaches the free end of the wing 1140.

The various wing features described above, including the strap support notches 1137, 1157, the shoulder platens 1138, 1158, and the friction pads 1139, 1159 could be added to any of the embodiments included in this application.

In FIG. 168A, a clear view of the attachment screw 1114 can be seen along with the back surface of the static wing wall 1127 which hides and protects the back side of the various springs and latch features within the hanger 1110.

FIG. 168B is a rear perspective view of the moving wing 1140. The latch plunger 1150 is positioned above the pivot boss 1144, both of which are attached to the guard flange

1154. The latch catch 1147 and latch clearance notch 1148 are formed into the edge of the guard flange 1154, with the cover shield 1155 attached to the outer surface of the guard flange 1154 so as to prevent visibility of the latch clearance notch 1148 from the front side of the hanger 1140.

The cover shield feature 1155 could be added to any of the embodiments in this application which utilize the Push-to-Unlatch/Push-to-Re-latch mechanism. Such an addition would serve to protect and hide the latching components in the interiors of those embodiments.

FIG. 169 is a front perspective view of a sixteenth example single hand operated collapsing hanger 1210, in its expanded configuration. The embodiment shown in FIG. 169 generally includes a hanging hook 1212, a first static wing 1220 having a first garment support surface 1221, a second moving wing 1240 having a second garment support surface 1241, a latch member 1270, a latch spring 1290 (FIG. 180), and a coil spring 1295. In this example embodiment, the hanging hook 1212 is formed of metal and is interference press fit into the static wing 1220, which is shown as constructed of plastic. Alternatively, any of the hanger components could be constructed of alternate materials, and the hanging hook 1212 could be affixed to the static wing 1220 by some alternate method, or integrally formed as part of the static wing 1220. The moving wing 1240 includes a pivot opening 1244 in the shape of a Reuleaux triangle with radiused vertices. The static wing 1220 includes a pivot boss 1224, oval in shape and formed with a retaining head 1228 (shown as hidden). The pivot opening 1244 is snap-fit onto the pivot boss 1224 so as provide rotating attachment of the moving wing 1240 to the static wing 1220, with two different pivot centers.

FIG. 170 is a front perspective view of the hanger 1210, in its collapsed, or folded, configuration. In this view the moving wing 1240 has been rotated about its mount to the static wing 1220. The wings 1220, 1240 can be seen with their free ends positioned very close to one another so as to create a small insertion profile.

FIG. 171 is a front perspective view of the static wing 1220. A hook connection hole 1223 can be seen on the top surface of the static wing 1220, alongside the finger leverage handle surface 1229. Below the leverage handle surface 1229 is the kidney-shaped finger clearance opening 1225, the perimeter of which forms the static wing handle surface 1226. A rotation limiting surface 1217 is formed at the lower left of the clearance opening 1225. Below and right (in this view) of the clearance opening 1225 can be seen the coil spring attachment boss 1239, above which is the garment support surface 1221 which extends down the length of the support structure 1222. At the left end (in this view) of the static wing 1220 is an arrow shaped latch chamber 1230 with perimeter surfaces 1231, 1232, 1233, 1234, and back surfaces 1236 and 1237. At the narrow tip of the latch chamber 1230 is a latch spring boss 1235, to which one end of the latch spring 1290 (FIG. 180) will attach. Right of the latch chamber 1230 is the pivot boss 1224 which provides for two different pivot centers, denoted by the cross-marks A and B.

FIG. 172 is a left side perspective view of the static wing 1220. The latch chamber 1230 can be seen as a depression into the platen surface 1238. The pivot boss 1224 can be seen projecting out from the platen surface 1238. The pivot boss contact surface 1227 surrounds the inner portion of the pivot boss 1224, with the retaining head 1228 projecting outward and forward of the contact surface 1227.

FIG. 173 is a front perspective view of the moving wing 1240. At the top can be seen the finger leverage handle surface 1249, below which is the kidney-shaped finger clearance opening 1245 with the perimeter forming the moving wing handle surface 1246. The garment support surface 1241 can be seen to the left (in this view) of the clearance opening 1245, with a support structure 1242 structure below it. Below the clearance opening 1245, the coil spring clearance passage 1243 is formed so as to allow the coil spring 1295 (FIG. 169) to pass through portions of the support structure 1242 and attach to the coil spring attachment boss 1259. At the right end (in this view) of the moving wing 1240 is the guard flange 1254, through which the latch clearance opening 1248 and pivot opening 1244 are formed. The perimeter of the pivot opening 1244 is formed by the contact surface 1255 and the beveled surface 1256.

FIG. 174 is a lower rear perspective view of the moving wing 1240. Near the bottom of the guard flange 1254, the pivot opening 1244 is shown with the three different rotation points identified by the X-marks X, Y, and Z. Alongside the pivot opening 1244, the latch clearance opening 1248 is shown with the latch catch 1247 forming its upper surface. Below the latch clearance opening 1248, the latch plunger 1250 can be seen projecting out from the guard flange 1254. The top surface of the latch plunger 1250 contains the contact surfaces 1251 and 1252. A rotation limiting surface 1257 is formed at the bottom edge of the guard flange 1254.

FIG. 175 shows a right tail-end view of the latch member 1270, which is generally formed as a "T" shape with a latch boss 1278 projecting out from its primary structure. Forming the tail side of the latch boss 1278 is the latch face 1277 which selectively engages with the latch catch 1247 (FIG. 174) during hanger operation. At the tail end of the latch member 1270, there is a latch spring receiving hole 1276 (shown as partially hidden) which provides for firm attachment to one end of the latch spring 1290 (FIG. 180). Around the perimeter of the latch member 1270, the various latch contact faces 1271, 1272, 1283, 1284 and latch contact edges 1273, 1274, 1281, 1282 can be seen. The smaller end of the latch member 1270 narrows to an acute edge, which is the latch tip 1275.

FIG. 176 shows a left tip-end view of the latch member 1270. The contact edges 1281 and 1282, as well as the latch tip 1275, are shown to be formed as small radiused surfaces which will aid in friction reduction as the latch member 1270 moves through its operational paths.

FIG. 177 shows a tail-end view of the latch member 1270, where the profile of the back contact surface 1287 can be seen. The back contact edge 1286 forms the intersection of the contact surface 1283 with the back contact surface 1287.

FIG. 178 is a front view of the present embodiment of the collapsing hanger assembly 1210, in its locked and expanded condition. If the hanging hook 1212 were adequately supported (as if hanging on a bar) and downward forces, such as garment weight, were applied to the garment support surfaces 1221, 1241, the hanger will retain its extended shape barring a structural failure.

FIG. 179 is a close-up view of the central components of the collapsing hanger 1210 when in the extended configuration. The latch boss 1278 can be seen projecting forward into the latch clearance opening 1248, so that the latch face 1277 is abutting the latch catch 1247. The pivot boss 1224 projects through the pivot opening 1244 in a position where pivot center A is aligned with rotation point X, and pivot center B is aligned with rotation point Y. The coil spring 1295 spans between the spring attachment bosses 1239, 1259 so as to provide a pulling force that attempts to pull the free ends of the wings 1220, 1240 together. Such force and any forces downward upon the garment support surfaces 1221, 1241 are counteracted by the holding force provided by the latch member 1270 upon the latch catch 1247, thus preventing the moving wing 1240 from rotation downward relative to the static wing 1220.

FIG. 180 is an identical view to that of FIG. 179, with the exception of having the guard flange 1254 removed so as to show the components behind. The latch member 1270 and latch spring 1290 are positioned within the latch chamber 1230 in such a manner so as to prevent their movement downward or to the right (in this view). Thus the latch member 1270 resists the downward force upon it when the collapsing hanger assembly 1210 is in the locked and expanded condition as previously described. Below the latch member 1270, the latch plunger 1250 sits with the contact surface 1251 separated slightly from the latch tip 1275.

FIG. 181 is a close-up bottom view showing the profile of the latch member 1270 when in the latched configuration, within the latch chamber 1230. The latch member 1270 can be seen canted forward (up in this view) by virtue of the back contact edge 1286 resting on the curved latch chamber back surface 1236 (both shown as hidden), and the latch member back surface 1287 resting on the flat latch chamber back surface 1237. This causes the latch boss 1278 to project out from the plane of the platen surface 1238, allowing for the latch face 1277 to make contact with the latch catch 1247 (FIG. 179). A partial profile of the pivot boss 1224 is shown with the retaining head 1228 projecting beyond the inner surface 1227, so as to be able to hold back on the beveled surface 1256 of the moving wing 1240 (FIG. 173).

To initiate the collapsing sequence a thumb of one hand can be placed through the clearance opening 1245 so as to rest on the handle surface 1246 with one or more fingers from the same hand placed through the clearance opening 1225 so as to rest on the handle surface 1226, seen in FIG. 179. The thumb and fingers can then be squeezed together in the directions denoted by the arrows C and D. Alternatively, the same squeezing action can take place with the thumb of one hand acting on the handle surface 1226 and other fingers of the same hand acting on the handle surface 1246, due to the side-to-side symmetry of the hanger assembly 1210.

Under these forces the moving wing 1240 will be caused to rotate clockwise (in this view) with respect to the static wing 1220 at the rotation point Y about the pivot center B, and as this happens the latch catch 1247 will release its pressure on the latch face 1277 allowing the latch member 1270 to be repositioned. As the Push-to-Unlatch action initiates, the latch plunger contact surface 1251, seen in FIG. 180, will make contact with the latch tip 1275, and will continue to push the latch member 1270 up and to the right (in this view) against the resistive force of the latch spring 1290 until the moving wing 1240 has reached the extent of its unlatching motion. When that point has been reached, structural components of the wings 1220, 1240 will prevent further squeezing motion, and the collapsing hanger 1210 will reach the unlatching configuration as seen in FIG. 182.

FIG. 183 is a close-up view of the central components of the collapsing hanger 1210 when in the unlatching configuration. The latch catch 1247 can be seen removed from the latch boss 1278. The pivot center B is aligned with rotation point Y and the rotation point X has moved to a position above the pivot center A.

FIG. 184 is an identical view to that of FIG. 183, with the exception of having the guard flange 1254 removed so as to show the components behind. The latch spring 1290 can be seen in a deformed condition as it continues to apply a moderate pressure on the latch member 1270 in opposition to the force applied by the latch plunger contact surface 1251 to the latch tip 1275. Through the course of the unlatching sequence the latch contact face 1284 moved in plane with the latch chamber surface 1234 (FIG. 180) until the latch contact edge 1282 moved beyond the chamber surface 1234, after which the latch member 1270 pivoted about the latch tip 1275 allowing the latch contact edge 1282 to rest upon the latch chamber surface 1232. The coil spring 1295 can be seen in a slightly more stretched condition than before and partially bent around the latch plunger 1250, as the spring attachment bosses 1239, 1259 have pivoted slightly away from one another.

FIG. 185 is a close-up bottom view showing the profile of the latch member 1270 when in the configuration shown in FIG. 184. The latch member 1270 can be seen with most of its mass positioned behind the plane of the platen surface 1238 of the moving wing 1220.

To continue the collapsing sequence, the previously applied hand forces are released allowing the coil spring to pull the free ends of the wings 1220, 1240 together; first to a point where pivot center A is aligned with rotation point X and the pivot center B is aligned with rotation point Y, and then the moving wing 1220 will begin to rotate at rotation point X about the pivot center A until the hanger assembly 1210 reaches the intermediate configuration as shown in FIG. 186.

FIG. 187 is a close-up view of the central components of the collapsing hanger 1210 when in the intermediate configuration. Hidden outlines of the latch member 1270 and latch spring 1290 are shown in their unlatched positions behind the flange cover 1254 and fully disengaged from the latch clearance opening 1248. The pivot center A is aligned with rotation point X and the pivot center B is now aligned with rotation point Z.

FIG. 188 is an identical view to that of FIG. 187, with the exception of having the guard flange 1254 removed so as to show the components behind. The latch member 1270 is positioned in the lower right portion of the latch chamber 1230 (in this view). The latch plunger 1250 can be seen completely removed from the latch member 1270. The coil spring 1295 continues to apply a pulling force to the spring mounts 1239, 1259, urging the free ends of the wings 1220, 1240 together.

As the collapsing sequence continues, the moving wing will now pivot at the rotation point Z about the pivot center B and will continue until reaching the collapsed configuration as shown in FIG. 189.

FIG. 190 is a close-up view of the central components of the collapsing hanger 1210 when in the collapsed configuration. Continued counter-clockwise (in this view) rotation of the moving wing 1240 is prevented by the contact of the rotation limiting surfaces 1217, 1257 to one another. The coil spring 1295 is now at a much more compressed state than in the other positional configurations. The pivot center B is aligned with rotation point Z and the pivot center A is now aligned with rotation point Y.

FIG. 191 is an identical view to that of FIG. 190, with the exception of having the guard flange 1254 removed so as to show the components behind. The latch member 1270 is positioned as it was when the hanger assembly 1210 was in the intermediate configuration.

FIG. 192 is a close-up bottom view showing the profile of the latch member 1270 when in the configuration shown in FIG. 191. The latch boss 1278 and remainder of the latch member 1270 can be seen completely behind the plane of the platen surface 1238 of the static wing 1220, so as to not interfere with the guard flange 1254 of the moving wing 1240 (FIG. 190).

To initiate the expanding sequence a thumb of one hand can be placed through the clearance opening 1245 so as to rest on the handle surface 1246 and apply a force in the direction denoted by the arrow E in FIG. 190. Additional fingers of the same hand can be placed on the handle surface 1226 to apply a force in the direction denoted by the arrow F. Alternatively, the same squeezing action can take place with the thumb of one hand acting on the handle surface 1226 and other fingers of the same hand acting on the handle surface 1246, due to the side-to-side symmetry of the hanger assembly 1210. Under these squeezing forces the moving wing 1240 will be caused to rotate clockwise (in this view), with respect to the static wing 1220, at rotation point Z about the pivot center B until the hanger assembly 1210 returns to the intermediate configuration as seen in FIG. 187. As the squeezing forces are continually applied the moving wing 1240 will now rotate at rotation point X about pivot center A until the rotation point Y becomes aligned with the pivot center B. The Push-to-Re-latch action will begin as the squeezing forces continue to be applied and the moving wing now rotates at rotation point Y about pivot center B until the hanger assembly 1210 reaches the re-latching configuration as seen in FIG. 193.

FIG. 194 is a close-up view of the central components of the collapsing hanger 1210 when in the re-latching configuration. The latch boss 1278 can be seen once again projecting through the latch clearance opening 1248. The pivot center B is aligned with rotation point Y and the rotation point X has moved to a position above the pivot center A.

FIG. 195 is an identical view to that of FIG. 194, with the exception of having the guard flange 1254 removed so as to show the components behind. As the moving wing 1240 neared the end of its rotation to the re-latch position, the latch plunger contact surface 1252 came into contact with the latch tip 1275 and pushed the latch member 1270 up and to the left (in this view) within the latch chamber 1230. As that motion proceeded the latch contact face 1283 moved in plane with the latch chamber surface 1233 until the latch contact edge 1281 moved beyond the chamber surface 1233, after which the latch member 1270 pivoted about the latch tip 1275 and moved forward within the latch chamber 1230 as it moved further onto the curved back surface 1236. The latch spring 1290 can be seen in a deformed condition as it continues to provide some back pressure on the latch member 1270 toward the latch plunger 1250.

FIG. 196 is a close-up bottom view showing the profile of the latch member 1270 when in the re-latching configuration, within the latch chamber 1230. The latch member 1270 can be seen canted forward (up in this view) by virtue of the back contact edge 1286 resting on the curved latch chamber back surface 1236 (both shown as hidden), and the latch member back surface 1287 resting on the flat latch chamber back surface 1237. This causes the latch boss 1278 to be pushed forward into the latch clearance opening 1248 within the moving wing 1240 (FIG. 194) in preparation for completing the Push-to-Re-latch action.

To complete the hanger expanding sequence the squeezing force is released by the operative hand, allowing the coil spring 1295 to urge the moving wing 1240 to rotate counterclockwise at the rotation point Y about the pivot center B (FIG. 194). As this motion occurs the force applied through the plunger surface 1252 is released from the latch tip 1275, and the latch spring 1290 urges the latch member 1270 to slide and rotate into the position as seen in FIGS. 180 and 181 as the latch catch 1247 once again moves into position abutted to the latch surface 1277 as seen in FIG. 179.

The latch spring 1290 in the described figures is shown as if of a conventional metal compression spring design. It is conceivable that an alternate resilient biasing means may be used to provide the forces needed to operate the latching mechanism. The coil spring 1295 in the described figures is shown as if of a conventional metal extension spring design. It is conceivable that the coil spring could be made of another material, replaced by an elastic band, or replaced by an alternate resilient biasing method that would urge the wings 1220, 1240 to fold.

In this described embodiment, the hanging hook 1212 is attached to the static wing 1220. Alternatively, the hanging hook 1212 could be attached to (or formed as part of) the moving wing 1240 and the collapsing hanger 1210 would maintain its functionality.

In this described embodiment, the handle surfaces 1226 and 1246 are presented as interior surfaces of generally oval ring-shaped features. Alternatively, the handle surfaces used to manipulate this design could be of various size, shape, and number so long as they allow for the effective locking, collapsing, and extending of the wings 1220, 1240.

FIG. 197 is a front perspective view of a seventeenth example single hand operated collapsing hanger 1310, in its expanded configuration. The embodiment shown in FIG. 197 generally includes a hanging hook 1312, a first static wing 1320 having a first garment support surface 1321, a second moving wing 1340 having a second garment support surface 1341, shoulder supports 1360, and a latch member 1370 and torsion spring 1390 as seen in FIG. 199. In this example embodiment, the hanging hook 1312 is formed of metal and is fit into the static wing 1320, which is shown as constructed of plastic. Alternatively, any of the hanger components could be constructed of alternate materials, and the hanging hook 1312 could be affixed to the static wing 1320 by some alternate method, or integrally formed as part of the static wing 1320. The moving wing 1340 is pivotably mounted to the static wing 1320 by way of a pivot boss 1324 (FIG. 199). The shoulder supports 1360 are pivotably mounted to the wings 1320, 1340 by way of attachment posts 1327, 1347. In FIG. 197 the shoulder supports 1360 are shown in their retracted positions.

FIG. 198 is a front perspective view of the hanger 1310, in its collapsed, or folded, configuration. The moving wing 1340 has been rotated about its mount to the static wing 1320. The wings 1320, 1340 can be seen with their free (or distal) ends positioned very close to one another so as to create a small insertion profile. In this view the hanger 1310 has also been rotated to a vertically narrow orientation, so as to demonstrate the positioning of the hanger as it would most easily fit through the neck opening of a shirt or blouse when held at the collar. FIG. 198 also shows the shoulder supports 1360 in retracted positions.

FIG. 199 is an exploded front perspective view of the hanger 1310 in its expanded configuration. Heavy dashed lines show the alignments of the various components in the assembly. The hanging hook 1312 has a lower bent section 1313 that allows for a hooked fit into the static wing 1320. A screw 1314 passes through a washer 1315, through the moving wing 1340, through the torsion spring 1390, and into the pivot boss 1324 on the static wing 1320 so as to allow a pivoting mount within the pivot hole 1344 of the moving wing 1340. Although a screw is used to create the connection in this example, it is possible that an alternate method could be used to pivotably connect the wings 1320, 1340, such as a rivet, a snap-fit, or the like.

FIG. 200 is an exploded rear perspective view of the hanger 1310 in its expanded configuration. Heavy dashed lines show the alignments of the various components in the assembly. The latch pivot boss 1350 can be seen on the moving wing 1340 in alignment with the latch member 1370, which allows for full rotation of the latch member 1370 about the axis of the latch pivot boss 1350. A hook eyelet 1317 and hook channel 1318 can be seen on the static wing 1320. The hook 1312 is attached to the static wing 1320 by first moving the hook 1312 so as to pass the lower bent section 1313 through the hook eyelet 1317 and then continuing to rotate and thread the hook 1312 shank down through the hook channel 1318 until eventually positioning the lower bent section 1313 underneath the hook retention eave 1319 (FIG. 201).

FIG. 201 is a front perspective view of the static wing 1320. Shown in alignment are the hook eyelet 1317, a portion of the hook channel 1318, and the hook retention eave 1319. The hook eyelet 1317 and hook channel 1318 pass through the upper static wing brace 1336, atop of which is formed the finger handle surface 1316. Right of the hook channel 1318 is the kidney-shaped finger clearance opening 1325, the perimeter of which forms the static wing handle surface 1326. Below the clearance opening 1325 is the lower static wing brace 1337. Left of the hook channel 1318 is the spring contact surface 1338, near the bottom of which is the pivot boss 1324 centered in the static wing wall 1334. Affixed to the lower portion of the wing wall 1334 is the latch plunger 1332 onto with is formed the plunger contact surface 1333. Affixed to the upper portion of the wing wall 1334 is the trigger 1330 onto which are formed the trigger contact edge 1331 and the trigger side surface 1335. The garment support surface 1321 can be seen on the right end (in this view) of the static wing 1320, with a support structure 1322 below it. At the distal end of the static wing 1320 are the static wing shoulder support connection features 1327, 1328, 1329.

FIG. 202 is a rear perspective view of the moving wing 1340. In the upper portion of the moving wing 1340 the contoured thumb clearance opening 1345 can be seen, the perimeter of which forms the moving wing handle surface 1346. At the lower edge of the thumb clearance opening 1345 is formed a thumb rest contour surface 1355. Left of the thumb clearance opening 1345 is the upper moving wing brace 1356, and below the thumb rest contour surface 1355 is the lower moving wing brace 1357. On the left side (in this view) of the moving wing 1340 is the moving wing wall 1354, in the center of which is the pivot hole 1344. Surrounding the pivot hole 1344 is the spring boss 1343. Right of the spring boss 1343 is the latch pivot boss 1350. The garment support surface 1341 can be seen on the right end (in this view) of the moving wing 1340, with a support structure 1342 structure below it. At the distal end of the moving wing 1340 are the moving wing shoulder support connection features 1427, 1428, 1429.

FIG. 203 shows a face perspective view of the latch member 1370, which is generally formed as a "star" shape with a latch pivot hole 1375 passing through its center. FIG. 204 shows a side perspective view of the latch member 1370. At its base is a latch flange 1377, from which projects a hexagonal structure 1380. The six sides of the hexagonal structure 1380 are spring contact surfaces 1376, and the intersection of those sides form the six spring pressure edges 1378. Projecting from the hexagonal structure 1380 is a six-pointed star structure 1381, with each of said points forming a latch impact surface 1371 and a latch dwell surface 1374 with a latch dwell edge 1379 formed at their acute intersection. Projecting from the star structure 1381 are three equally spaced latch catches 1372. A latch catch surface 1373 is formed into the outer-most side of each latch catch 1372. Plunger clearance channels 1382 are formed between the latch catches 1372. All surfaces of the latch member 1370 are formed so as to possess three-fold rotational symmetry. For purposes of simplification, the features are only identified in one location in FIGS. 203 and 204, in spite of some existing in three locations (1372, 1373, 1382) or six locations (1371, 1374, 1376, 1378, 1379) on the latch member 1370.

FIG. 205 is a perspective view of the torsion spring 1390, in a twisted condition that is similar to that which it would have in the collapsing hanger assembly 1310 when fully extended as seen in FIG. 197. Relative to a resting spring, the free ends 1396, 1398 are twisted toward one another so as to store significant potential energy. The latch-side free end 1396 is bent so as to create an improved latch torsion condition when in operation.

FIG. 206 is a perspective view of the torsion spring 1390, in a less sprung condition that is similar to that which it would have in the collapsing hanger assembly 1310 when fully collapsed as seen in FIG. 198. In contrast to the spring condition as seen in FIG. 205, some of the potential energy stored within has been used to force the free ends 1396, 1398 to positions closer to the shape of an unsprung resting spring.

FIG. 207 is a rear view of the present embodiment of the collapsing hanger assembly 1310, in its locked and expanded condition. The shoulder supports 1360 are shown as rotated into their extended positions, so as to provide a wider overall garment support function. If the hanging hook 1312 were adequately supported (as if hanging on a bar) and downward forces, such as garment weight, were applied to the garment support surfaces 1321, 1341, and shoulder supports 1360, the hanger will retain its extended shape barring a structural failure. A portion of the upper static wing brace 1336 is shown positioned behind (in this view) the upper moving wing brace 1356. Having the upper wing braces 1336, 1356 in this configuration coupled with the positions of the wing walls 1334, 1354, creates a physical resistance to any forces in the direction of the pivot axis that may act to separate the wings 1320, 1340.

FIG. 208 is a close-up rear view of the area generally outlined by the ellipse P in FIG. 207, with the static wing wall 1334 removed so as to see the components behind. The torsion spring 1390 can be seen positioned encircling the spring boss 1343, with one free end 1398 braced against the spring contact surface 1338 and the other free end 1396 applying a downward force on the spring contact surface 1376 of the latch member 1370. The latch member 1370 is positioned on the latch pivot boss 1350, and held resistant to pivoting by a combination of the forces applied by the spring free end 1396 and the latch plunger 1332 upon the latch catch 1372. In this view the torsion spring 1390 is urging the moving wing 1340 to rotate clockwise about the pivot boss 1324 but is restrained from pivoting by the counteractive force of the latch member 1370 acting through the latch contact surface 1373 upon the plunger contact surface 1333 which is formed into the static wing 1320.

In FIG. 208 the lower bent section 1313 of the hanging hook 1312 can be seen in position underneath the hook retention eave 1319, by virtue of the static wing wall 1334 being removed from view.

Referring the FIG. 207, to initiate the collapsing sequence a thumb of one hand can be placed through the thumb clearance opening 1345 so as to rest on the handle surface 1346 with one or more fingers from the same hand placed through the clearance opening 1325 so as to rest on the handle surface 1326. The thumb and fingers can then be squeezed together in the directions denoted by the arrows G and H. Under these forces the moving wing 1340 will be caused to rotate counter-clockwise (in this view) about the axis of the pivot boss 1324 with respect to the static wing 1320, and as this happens the latch plunger 1332 will move in turn and release its pressure on the latch catch 1372 allowing the latch member 1370 to be rotated against the force of the free spring end 1396.

FIG. 209 is nearly the same view as FIG. 208, with the exception of having the static wing 1320 components rotated clockwise (in this view) to an intermediate unlatching position. This is the equivalent relative motion as the counter-clockwise movement of the moving wing 1340, as described the in previous paragraph. The latch member 1370 is rotated clockwise (in this view) from its position in FIG. 208, and the trigger contact edge 1331 is shown in contact with the latch impact surface 1371 as well as the spring free end 1396 shown in contact with the spring pressure edge 1378.

As the Push-to-Unlatch action begins, the trigger contact edge 1331 will make contact with the latch impact surface 1371, imparting a rotational force upon the latch member 1370 about the latch pivot boss 1350. The latch member 1370 will begin to rotate clockwise (in this view) as the spring pressure edge 1378 presses up on the spring free end 1396. As the latch member 1370 continues to rotate clockwise the spring pressure edge 1378 will reach an apex point, beyond which the force of the torsion spring 1390 will urge the latch member 1370 to continue to rotate clockwise. As the squeezing forces continue to be applied as shown by arrows G and H (FIG. 207), the upper portions of the wings 1324, 1340 will continue to rotate together until their structural components prevent further squeezing motion, and the collapsing hanger 1310 will reach the unlatching configuration as seen in FIG. 210.

In FIG. 210 the static wing 1320 is shown as if pivoted clockwise relative to the moving wing 1340. In this unlatching configuration, the upper static wing brace 1336 is almost completely hidden (in this view) behind the upper moving wing brace 1356. FIG. 211 is a close-up rear view of the area generally outlined by the ellipse Q in FIG. 210, with the static wing wall 1334 removed so as to see the components behind. Both the static wing 1320 components and the latch member 1370 are shown as rotated clockwise (in this view) about their respective pivot boss connections, 1344 about 1324 and 1375 about 1350, from those as shown in FIG. 209. The trigger contact edge 1331 can be seen seated at the innermost portion of the active latch impact surface 1371, and the active latch dwell surface 1374 is in full contact with the trigger side surface 1335.

To continue the unlatching sequence, the squeezing forces applied at arrows G and H (FIG. 207) are released, allowing the force of the torsion spring 1390 to act through its free ends 1396, 1398 and push the static wing 1320 counter-clockwise (in this view) relative to the moving wing 1340. As this motion begins the trigger 1330 will move away from the active latch impact surface 1371 as the trigger side surface 1335 slides along the active latch dwell surface 1374, continuing until the trigger contact edge 1331 moves past the latch dwell edge 1379. FIG. 212 shows the internal collapsing hanger 1310 components in this configuration when the trigger 1330 is just losing contact with the latch member 1370, at which point the force of the spring free end 1396 will press down on the spring pressure edge 1378 causing the latch member 1370 to continue to rotate clockwise (in this view) until the spring free end 1396 has come into full contact with the next active spring contact surface 1376. In this view a plunger clearance channel 1382 can be seen coming into alignment with the latch plunger 1332, which will allow the plunger 1332 to pass between the latch catches 1372 as the wings 1320, 1340 rotate about one another into the fully collapsed position as shown in FIG. 213.

In FIG. 213 the collapsing hanger assembly 1310 is shown oriented as if ready to pass through the neck opening of an upright shirt, which could be achieved by using one hand to hold the shirt at the rim of the collar and using the other hand to hold the hanger by placing a thumb through the thumb clearance opening 1345 so as to support the handle surface 1346 and another finger of the same hand to pass through the finger clearance opening 1325 so as to support the handle surface 1326. The lower static wing brace 1337 is shown positioned behind (hidden in this view) the lower moving wing brace 1357. Having the lower wing braces 1337, 1357 in this configuration coupled with the positions of the wing walls 1334, 1354, creates a physical resistance to any forces in the direction of the pivot axis that may act to separate the wings 1320, 1340. Also in this view the shoulder supports 1360 are shown as rotated to their extended positions, which will not impede the insertion of the collapsed hanger 1310 into the neck opening of a shirt, relative to their retracted positions as shown in FIG. 198.

FIG. 214 is a close-up rear view of the area generally outlined by the ellipse R in FIG. 213, with the static wing wall 1334 removed so as to see the components behind. The torsion spring 1390 continues to urge the moving wing 1340 to rotate clockwise (in this view) about the pivot boss 1324, but is held resistant to further movement by the structure of the wings 1320, 1340. The latch plunger 1332 can be seen extending completely through the plunger clearance channels 1382 between the latch catches 1372. The spring free end 1396 can also be seen completely in contact with the now active spring contact face 1376.

To initiate the expanding sequence of the hanger assembly 1310, a thumb of one hand can be placed through the thumb clearance opening 1345 so as to rest on the moving wing handle surface 1346 with one or more fingers of the same hand placed on the finger handle surface 1316 and the remaining fingers of the same hand placed through the clearance opening 1325 so as to rest on the static wing handle surface 1326. The thumb and fingers can then be squeezed together in the directions denoted by the arrows J, K and L. Under these forces the moving wing 1340 will be caused to rotate counter-clockwise (in this view) about the axis of the pivot boss 1324 with respect to the static wing 1320, until reaching the re-latching configuration which from the exterior will look identical to that shown in FIG. 210.

As the Push-to-Re-latch action initiates, the trigger contact edge 1331 comes back into contact with a new active latch impact surface 1371 as the wings 1320, 1340 near their movement to the re-latching configuration. After said contact, the trigger 1330 will continue to push the latch member 1370 clockwise about its pivot boss 1350 until all components reach their positions shown in FIG. 215.

FIG. 215 is a close-up rear view of the area generally outlined by the ellipse Q in FIG. 210, with the static wing wall 1334 removed, but the internal components repositioned as if in the re-latching condition. The trigger contact edge 1331 can be seen seated at the innermost portion of the active latch impact surface 1371, and the active latch dwell surface 1374 is in full contact with the trigger side surface 1335. FIG. 216 is the same view as FIG. 215, with exception of having the static wing 1320 components removed so as to clearly see the contact of the spring 1390 to the latch member 1370. As such, the spring free end 1396 can be seen pressing down on the spring pressure edge 1378, so as to urge the latch member 1370 to rotate clockwise (in this view) about the latch pivot boss 1350. This spring free end 1396 to spring pressure edge 1378 contact condition is the same in all configurations when the trigger side surface 1335 remains in complete contact with the latch dwell surface 1371. The only difference between unlatching and re-latching configurations is a 60 degree rotational positioning of the latch member 1370 about the latch pivot boss 1350.

To complete the re-latching sequence, the squeezing forces previously applied at arrows J, K, and L in FIG. 213 are released so as to let the torsion spring 1390 force the wings 1320, 1340 to rotate upon their pivot mount, 1324 to 1344, so as to push them from their re-latching positions (FIG. 215) back toward their expanded positions (FIG. 208). FIG. 217 shows the internal components of the collapsing hanger 1310 in an intermediate configuration when the trigger 1330 is just losing contact with the latch member 1370, at which point the force of the spring free end 1396 will press down on the spring pressure edge 1378 causing the latch member 1370 to continue to rotate clockwise (in this view) until the spring free end 1396 has come into full contact with the next active spring contact surface 1376. In this view the plunger contact surface 1333 can be seen coming into proximity with the soon active latch catch surface 1373, whereby they will make full contact when the wings 1320, 1340 complete their rotation back to the expanded configuration as shown in FIG. 207 and the latch member 1370 returns to the position seen in FIG. 208.

The rotating latch member 1370 used in this embodiment could conceivably be formed as a different shape and still provide the necessary functionality for the Push-to-Latch/Push-to-Re-latch mechanism to function. For example, the inventor has successfully created a different design which made use of an alternate latch member with four spring contact faces and two latch catches. The number of spring faces and latch catches could vary, and the latch member could still function so long as it could still rotate from a position that restricts rotation of the wings 1320, 1340 to a position that allows for their rotation. It is further conceivable that the shape of the latch plunger 1332 could vary, or multiple plungers could be used so long as they provide the necessary contact against the latch catch.

FIG. 218 is an upper perspective view of the free (distal) end of the static wing 1320 with no attachments in place. Formed near the tip is the attachment post 1327 which includes a radially projecting retaining eave 1328, and is formed on top of the garment support surface 1321. Positioned inboard and outboard of the attachment post 1327 are positioning bumps 1329 which also project up from the garment support surface 1321. FIG. 219 is an upper perspective view of the distal end of the static wing 1320 with a shoulder support 1360 affixed in the retracted position. The attachment post 1327 can be seen projecting up through the attachment hole 1367, which is formed into the shoulder support 1360.

FIG. 220 is an upper perspective view of the distal end of the static wing 1320 with a shoulder support 1360 rotated into an intermediate position. The curved arrows AA show the possible rotational degrees of freedom for the shoulder support 1360 to move to either the retracted or extended position. FIG. 221 is an upper perspective view of the distal end of the static wing 1320 with a shoulder support 1360 affixed in the extended position.

FIG. 222 shows an upper perspective view of a shoulder support 1360. Formed offset from the center is the attachment hole 1367, which includes a retaining edge 1368 for eventual fitment over the retaining eave 1328 of the attachment post 1327. By virtue of having the attachment hole 1367 formed off-center, the shoulder support 1360 will naturally extend to a different length when rotated about its mount to the attachment post 1327. FIG. 223 shows a lower perspective view of a shoulder support 1360. Formed inboard and outboard of the attachment hole 1367 are positioning pockets 1369, which engage with the positioning bumps 1329 when the shoulder support 1360 is in either the retracted or extended position. The positioning bumps 1329 and pockets 1369 can be of various shape and number, and are formed so as to create a resistance to rotation of the shoulder support 1360 from either the retracted or extended position, but can be overcome by an adequate force which will allow rotation but not damage the components.

FIG. 224 is a front perspective view of an eighteenth example single hand operated collapsing hanger 1410, in its expanded configuration. The embodiment shown in FIG. 224 generally includes a hanging hook 1412, a first static hub 1420, a second moving hub 1440, a static side wing 1430 having a first garment support surface 1431, a second moving side wing 1460 having a second garment support surface 1461, shoulder supports 1470, and a latch member 1480 and torsion spring 1490 as seen in FIG. 226. In this example embodiment, the hanging hook 1412 is formed of metal and is interference press fit into the static hub 1420, which is shown as constructed of plastic. Alternatively, any of the hanger components could be constructed of alternate materials, and the hanging hook 1412 could be affixed to the static hub 1420 by some alternate method, or integrally formed as part of the static hub 1420. The moving hub 1440 is pivotably mounted to the static hub 1420 by way of a hub pivot boss 1444 (FIG. 227). The wings 1430, 1460 are pivotably connected to one another by way of a wing pivot pin 1433 (FIG. 226), and the wings 1430, 1460 have a pivot-slide connection to the hubs 1420, 1440 by way of pin-in-slot connections 1428 in 1438 and 1448 in 1468, respectively. The shoulder supports 1470 are pivotably mounted to the wings 1430, 1460 near their distal ends. In FIG. 224 the shoulder supports 1470 are shown in their retracted positions.

FIG. 225 is a front perspective view of the hanger 1410, in its collapsed, or folded, configuration. The moving hub 1440 has been rotated about its mount to the static hub 1420. The wings 1430, 1460 have rotated about their pin connection to one another, so as to collapse and create a small insertion profile while maintaining their connections to the hubs 1420, 1440. In this view the hanger 1410 has also been rotated to a vertically narrow orientation, so as to demonstrate the positioning of the hanger as it would most easily fit through the neck opening of a shirt or blouse when held at the collar. FIG. 225 also shows the shoulder supports 1470 in retracted positions.

FIG. 226 is an exploded front perspective view of the hanger 1410 in its expanded configuration. Heavy dashed lines show the alignments of the various components in the assembly. The hanging hook 1412 has a lower ridged section 1413 which allows for interference fit to the static hub 1420. The latch pivot boss 1421 can be seen on the static hub 1420 in alignment with the latch member 1480, which allows for full rotation of the latch member 1480 about the axis of the latch pivot boss 1421. In this hanger assembly 1410, the latch member 1480 has the same form and function as that of the latch member 1370 in the hanger assembly 1310. The wing pivot pin 1433 projects from the front and back sides of the static side wing 1430, and the dashed arrow X denotes the direction that the pin 1433 fits into the wing pivot hole 1463 that is formed in the moving side wing 1460. The dashed arrow Y denotes the direction that the wing pivot pin 1433 fits into the wing pin channel 1423 of the static hub 1420, after passing through the wing pivot hole 1463. On each hub 1420, 1440 is formed a hub blade 1427, 1447, respectively, that fit down into wing pockets 1437, 1467 formed into the wings 1430, 1460, respectively. On each hub blade 1427, 1447 is formed a wing connection pin 1428, 1448, respectively, that fit into the hub connection slots 1438, 1468 formed into the wings 1430, 1460, respectively. In this example the wings 1430, 1460 are shown as if formed of resilient deformable plastic, which will allow for the wing pockets 1437, 1467 to expand so as to allow the wing connection pins 1428, 1468 to pass through and snap into the hub connection slots 1438, 1468. It is possible that alternate connection methods such as removable pins, rivets, etc. could be used for the wing pivot connection and the wing-to-hub connections.

FIG. 227 is an exploded rear perspective view of the hanger 1410 in its expanded configuration. Heavy dashed lines show the alignments of the various components in the assembly. A screw 1414 passes through a washer 1415, through the pivot hole 1424 formed in the static hub 1420, through the torsion spring 1490, and into the pivot boss 1444 on the moving hub 1440 so as to create a pivoting mount. Although a screw is used to create the connection in this example, it is possible that an alternate method could be used to pivotably connect the hubs 1420, 1440, such as a rivet, a snap-fit, or the like. In this hanger assembly 1410, the torsion spring 1490 has the same form and function as that of the torsion spring 1390 in the hanger assembly 1310. The dashed arrow Z denotes the direction that the wing pivot pin 1433 fits into the wing pin channel 1443 of the moving hub 1440.

FIG. 228 is a front perspective view of the static hub 1420. In the center of the static hub wall 1422 is formed the pivot hole 1424, around which is formed the spring boss 1429. Below the spring boss 1424 is formed the wing pin channel 1423 which has side walls that constrict the wing pivot pin 1433 (FIG. 230) to stay within the channel 1423 when moving through the various collapsing hanger 1410 configurations. Offset above the spring boss 1429 is the latch pivot boss 1421. Outboard of the hub wall 1422 is the finger clearance opening 1425, the perimeter of which forms the handle surface 1426. The static hub blade 1427 projects down below the finger clearance opening 1425. Formed near the bottom of the hub blade 1427 is the static side wing connection pin 1428, which projects from the front and back sides.

FIG. 229 is a rear perspective view of the moving hub 1440. In the center of the moving hub wall 1442 is formed the pivot boss 1444. Adjacent to the pivot boss 1444 is the spring contact surface 1458. Below the pivot boss 1444 is formed the wing pin channel 1443 which has side walls that constrict the wing pivot pin 1433 (FIG. 230) to stay within the channel 1443 when moving through the various collapsing hanger 1410 configurations. Formed into one of the walls of the wing pin channel 1443 is a locking ledge 1441 which restricts upward movement of the wing pivot pin 1433 when the hanger 1410 is in the latched and expanded condition. Formed outboard of the pivot boss 1444 is the latch plunger 1452 onto which is formed the contact surface 1453. The trigger 1450 and trigger contact edge 1451 are formed near the top of the moving hub wall 1442. Outboard of the hub wall 1442 is the finger clearance opening 1445, the perimeter of which forms the handle surface 1446. The moving hub blade 1447 projects down below the finger clearance opening 1445. Formed near the bottom of the hub blade 1447 is the moving side wing connection pin 1448, which projects from the front and back sides.

FIG. 230 is a front upper perspective view of the static side wing 1430. At the inboard end is the wing pivot pin 1433, shown projecting from the front and back side. On the back side is the wing contact surface 1434 which touches the moving side wing (FIG. 231) when assembled. The hub connection slot 1438 passes through the wing 1430 from front side to back side. The wing pocket 1437 passes through the wing 1430 from top to bottom, as illustrated by the hidden lines in this view. Outboard of the wing pocket 1437 is a support structure 1432, atop of which is formed the garment support surface 1431. At the distal end of the wing 1430 are formed the various shoulder support connection features 1435, 1439.

FIG. 231 is a front upper perspective view of the moving side wing 1460. At the inboard end is the wing pivot hole 1463 passing through the contact surface 1364, which touches the static side wing surface 1434 (FIG. 233) when assembled. The hub connection slot 1468 passes through the wing 1460 from front side to back side. The wing pocket 1467 passes through the wing 1460 from top to bottom, as illustrated by the hidden lines in this view. Outboard of the wing pocket 1467 is a support structure 1462, atop of which is formed the garment support surface 1461. At the distal end of the wing 1460 are formed the various shoulder support connection features 1465, 1469.

FIG. 232 is a front view of the present embodiment of the collapsing hanger assembly 1410, in its locked and expanded condition. The shoulder supports 1470 are shown as rotated into their extended positions, so as to provide a wider overall garment support function. The internal components of the hanger 1410, such as the torsion spring 1490, spring contact surface 1458, latch member 1480, and latch plunger 1452, are all positioned so as to be in a latched configuration similar to that seen in the embodiment of FIG. 208. If the hanging hook 1412 were adequately supported (as if hanging on a bar) and downward forces, such as garment weight, were applied to the garment support surfaces 1431, 1461, and shoulder supports 1470, the hanger will retain its extended shape barring a structural failure.

FIG. 233A is a close-up front view of the area generally outlined by the circle SA in FIG. 232, with the moving hub wall 1442 removed so as to see the components behind. The torsion spring 1490 can be seen contacting both the moving hub 1440 and the latch member 1480. The latch member 1480 is positioned on the latch pivot boss 1421 and restricts the counter-clockwise (in this view) movement of the latch plunger 1452. The trigger 1450 can be seen in a ready position above the latch member 1480.

FIG. 233B is a close up view of portions of the hubs 1420, 1440 as outlined by the ellipse SB in FIG. 232, with the internal features detailed by hidden lines. Also included in FIG. 233 is a representation of the wing pivot pin 1433 as it is positioned when the hanger 1410 is in this configuration. In this view the pivot pin 1433 can be seen constrained within both the static side wing pin channel 1423 and the moving side wing pin channel 1443. With the pivot pin 1433 positioned as such underneath the locking ledge 1441, the wings 1430, 1460 are restricted from collapsing downward in combination with their additional supports at the wing connection pins 1428, 1448.

Referring the FIG. 232, to initiate the collapsing sequence a thumb of one hand can be placed through the finger clearance opening 1425 so as to rest on the handle surface 1426 with one or more fingers from the same hand placed through the clearance opening 1445 so as to rest on the handle surface 1446. The thumb and fingers can then be squeezed together in the directions denoted by the arrows M and N. Under these forces the moving hub 1440 will be caused to rotate clockwise (in this view) about the axis of the pivot boss 1444 with respect to the static hub 1420 (placing the hubs 1420, 1440 in an "upper position"), and the distal ends of the wings 1430, 1460 will begin to pivot upward and slide upon their mounts to the wing connection pins 1428, 1448. As this Push-to-Unlatch action begins, the internal components will move in a similar manner to those in the embodiment of FIG. 209.

FIG. 234 is a front view of the present embodiment of the collapsing hanger assembly 1410, in its unlatching configuration. The internal components of the hanger 1410, such as the torsion spring 1490, spring contact surface 1458, latch member 1480, and latch plunger 1452, are all positioned so as to be in an unlatching configuration similar to that seen in the embodiment of FIG. 211. In FIG. 234 portions of the hub blades 1427, 1447 can be seen projecting down below the wing support structures 1432, 1462, and the wing connection pins 1428, 1448 can be seen positioned to the outboard ends of the hub connection slots 1438, 1468.

FIG. 235 is a close up view of portions of the hubs 1420, 1440 as outlined by the ellipse Tin FIG. 234, with the internal features detailed by hidden lines. Also included in FIG. 235 is a representation of the wing pivot pin 1433 as it is positioned when the hanger 1410 is in this configuration. In this view the pivot pin 1433 can be seen constrained near the bottom of both the static side wing pin channel 1423 and the moving side wing pin channel 1443.

To continue the unlatching and collapsing sequences, the squeezing forces previously applied in the directions M and N in FIG. 232 are released so as to let the torsion spring 1490 force the hubs 1420, 1440 to rotate their lower portions together (placing the hubs 1420, 1440 in a "lower position"). As this movement continues, the wings 1430, 1460 will begin to rotate downward and slide about their mounts at the connection pins and slots, 1328 to 1338 and 1348 to 1368, as the wing pivot pin 1433 begins to travel back up through the wing pin channels 1423, 1443 (FIG. 237)

FIG. 236 is a front view of the present embodiment of the collapsing hanger assembly 1410, in an intermediate collapsing configuration. The internal latching components of the hanger 1410 are all positioned so as to be in a configuration similar to that seen in the embodiment of FIG. 212, so that the latch plunger 1452 can begin to move past the latch member 1480. In FIG. 234, the wing connection pins 1428, 1448 can be seen positioned to the inboard ends of the hub connection slots 1438, 1468.

FIG. 237 is a close up view of portions of the hubs 1420, 1440 as outlined by the ellipse U in FIG. 236, with the internal features detailed by hidden lines. Also included in FIG. 237 is a representation of the wing pivot pin 1433 as it is positioned when the hanger 1410 is in this configuration. In this view the pivot pin 1433 can be seen as shifted slightly left of center (in this view) so as to begin to move clear of the locking ledge 1441. Said movement is possible by virtue of the wide shape of the moving side hub connection slot 1468, which allows for both wings 1430, 1460 to move slightly left of center (in this view) as the collapsing components reach this position.

FIG. 238 is a front view of the present embodiment of the collapsing hanger assembly 1410, in an advanced collapsing configuration. FIG. 239 is a close up view of portions of the hubs 1420, 1440 as outlined by the ellipse V in FIG. 238, with the internal features detailed by hidden lines. Also included in FIG. 239 is a representation of the wing pivot pin 1433 as it is positioned when the hanger 1410 is in this configuration. In this view the pivot pin 1433 can be seen constrained within the wing pin channels 1423, 1443 and well clear of the locking ledge 1441. As the collapsing sequence continues, the wing pivot pin 1433 will be able to slide unencumbered upward through the wing pin channels 1423, 1443.

FIG. 240 is a front view of the present embodiment of the collapsing hanger assembly 1410, in a fully collapsed configuration. The distal ends of the wings 1420, 1440 have moved close to one another so as to create a small insertion profile for the hanger 1410. The static side wing connection pin 1428 can be seen positioned to the inboard end of the hub connection slot 1438, and the moving side connection pin 1448 can be seen positioned near the center of the hub connection slot 1468, thus allowing for positional symmetry between the folded wings 1420, 1440.

FIG. 241A is a close-up front view of the area generally outlined by the circle WA in FIG. 240, with the moving hub wall 1442 removed so as to see the components behind. The torsion spring 1490 can be seen contacting both the moving hub 1440, and the latch member 1480 which is positioned on the latch pivot boss 1421. The latch plunger 1452 is shown as being fully released of rotational restriction by the latch member 1480. The trigger 1450 can be seen at its furthest operable distance from the latch member 1480.

FIG. 241B is a close up view of portions of the hubs 1420, 1440 as outlined by the ellipse WB in FIG. 240, with the internal features detailed by hidden lines. Also included in FIG. 241 is a representation of the wing pivot pin 1433 as it is positioned when the hanger 1410 is in this configuration. In this view the pivot pin 1433 can be seen centered just below the hub pivot boss 1444 and at the uppermost extents of the wing pin channels 1423, 1443.

To initiate the expanding sequence, fingers can be placed on the handle surfaces 1226, 1446 and squeezing forces applied in the directions denoted by the arrows P and Q in FIG. 240. As these forces continue to be applied the wings 1430, 1460, and hubs 1420, 1440 will move in reverse of the directions traveled in the collapsing sequence until reaching a configuration which will look identical to the exterior view seen in FIG. 234. In other words, the hubs 1420, 1440 move from the lower position to the upper position and the wings rotate upward. In this un-latching configuration, the latch member 1480, torsion spring 1490, and other operative interior components are positioned in a manner similar to those seen in the embodiment of FIG. 215. To complete the expanding sequence, the forces previously applied at arrows P and Q are released, allowing the torsion spring 1490 to urge the hubs 1420, 1440 down until locking back in the latched position, at which point the hanger 1410 will have returned to the expanded condition as seen in FIG. 232.

FIG. 242 is an upper perspective view of the free (distal) end of the static side wing 1430 with no attachments in place. Formed near the tip is the attachment hole 1435 which includes a retaining edge 1436. Positioned inboard and outboard of the attachment 1435 are positioning bumps 1439 which project up from the garment support surface 1431. FIG. 243 is an upper perspective view of the distal end of the static side wing 1430 with a shoulder support 1470 affixed in the retracted position.

FIG. 244 is an upper perspective view of the distal end of the static side wing 1430 with a shoulder support 1470 rotated into an intermediate position. The curved arrows BB show the possible rotational degrees of freedom for the shoulder support 1470 to move to either the retracted or extended position. FIG. 245 is an upper perspective view of the distal end of the static side wing 1430 with a shoulder support 1470 affixed in the extended position.

FIG. 246 shows a side upper perspective view of a shoulder support 1470. Formed offset from the center is the attachment post 1475 which projects down from the bottom surface of the shoulder support 1470. The attachment post 1475 includes a radially projecting retaining eave 1476 for eventual fitment beneath the retaining edge 1436. By virtue of having the attachment post 1475 formed off-center, the shoulder support 1470 will naturally extend to a different length when rotated about its mount to the attachment hole 1435. FIG. 247 shows a lower perspective view of a shoulder support 1470. Formed inboard and outboard of the attachment post 1475 are positioning pockets 1479, which engage with the positioning bumps 1439 when the shoulder support 1470 is in either the retracted or extended position. The positioning bumps 1439 and pockets 1479 can be of various shape and number, and are formed so as to create a resistance to rotation of the shoulder support 1470 from either the retracted or extended position, but can be overcome by an adequate force which will allow rotation but not damage the components.

FIG. 248 is a front perspective view of a nineteenth example single hand operated collapsing hanger 1510, in its expanded configuration. The embodiment shown in FIG. 248 generally includes a hanging hook 1512, a first static hub 1520, a second moving hub 1540, a static side wing 1530 having a first garment support surface 1531, a second moving side wing 1560 having a second garment support surface 1561, and a latch member 1580 and torsion spring 1590 (FIG. 251). In this example embodiment, the hanging hook 1512 is formed of metal and is interference press fit into the moving hub 1540, which is shown as constructed of plastic. Alternatively, any of the hanger components could be constructed of alternate materials, and the hanging hook 1512 could be affixed to the moving hub 1540 by some alternate method, or integrally formed as part of the moving hub 1540. The moving hub 1540 is pivotably mounted to the static hub 1520 by way of a hub pivot boss 1544 (FIG. 251). The wings 1530, 1560 are pivotably connected to one another by way of a wing pivot boss 1564 (shown as hidden in FIG. 248), and the wings 1530, 1560 have pivoting connections to the hubs 1520, 1540 by way of pin-to-hole connections 1538 in 1528 and 1568 in 1448 (shown as hidden), respectively. In the present embodiment, the Push-to-Latch/Push-to-Un-latch mechanism is constructed to operate at the pivotable connection of the wings 1530, 1560 to one another. The latch member 1580, torsion spring 1590 (FIG. 251), and other operative interior components are positioned in a manner similar to those seen in the embodiment of FIG. 208 when the present embodiment hanger 1510 is in the expanded and locked configuration.

To initiate the collapsing sequence a thumb of one hand can be placed through the finger clearance opening 1525 so as to rest on the handle surface 1526 with one or more fingers from the same hand placed through the clearance opening 1545 so as to rest on the handle surface 1546. The thumb and fingers can then be squeezed together in the directions denoted by the arrows R and S in FIG. 248. Under these forces the moving hub 1540 will be caused to rotate clockwise (in this view) about the axis of the hub pivot boss 1544 with respect to the static hub 1520, and the wing connection pins 1538, 1568 will begin to spread from one another causing the distal ends of the wings 1530, 1560 to pivot upward about the axis of the wing pivot boss 1564. As this Push-to-Unlatch action begins, the internal components will move in a similar manner to those in the embodiment of FIG. 209, and the hanger 1510 components will continue to move under the applied forces until reaching a condition as shown in FIG. 249.

FIG. 249 is a front perspective view of the collapsing hanger 1510 in the unlatching configuration, where the latch member 1580, torsion spring 1590 (FIG. 251), and other operative interior components are positioned in a manner similar to those seen in the embodiment of FIG. 211. To continue the collapsing action of the hanger 1510, the previously applied squeezing forces are released, thus allowing the torsion spring 1590 to urge the wings 1530, 1560 to fold downward about their pivot boss 1564 (shown as hidden). As the wings 1530, 1560 fold down the wing connection pins 1538, 1568 will begin to move toward one another, thus pulling the lower portions of the hubs 1520, 1540 together causing the hubs 1520, 1540 to rotate about the hub pivot boss 1544 until reaching a position as seen in FIG. 250.

FIG. 250 is a front perspective view of the collapsing hanger 1510 in the collapsed configuration, where the latch member 1580, torsion spring 1590 (FIG. 251), and other operative interior components are positioned in a manner similar to those seen in the embodiment of FIG. 214. In this configuration, the wing walls 1533, 1563 (FIG. 251) and other internal components have moved up into cavity spaces 1521, 1541 (FIG. 251) interior to the hub walls 1522, 1542.

FIG. 251 is an exploded front perspective view of the hanger 1510 in its expanded configuration. Heavy dashed lines show the alignments of the various components in the assembly. The latch member 1580 and torsion spring 1590 can be seen positioned between the wing walls 1533, 1563 which are formed at the inboard ends of the wings 1530, 1560, respectively. The latch member 1580 is in alignment with the latch pivot boss 1535, to which it mounts, and the wing pivot boss can be seen in alignment with the torsion spring 1590 and the wing pivot hole 1534. The interior cavity areas 1521, 1541 are identified on the interior sides of the hub walls 1522, 1542. The hanger assembly 1510 is held together with a screw 1514 which passes through a washer 1515, the hub pivot hole 1524, and into the hub pivot boss 1544. The inboard wing 1530, 1560 portions are sandwiched between the hub walls 1522, 1542 throughout all hanger 1510 configurations.

FIG. 252 is a close-up front view of the central region of the collapsing hanger 1510 in the expanded configuration, with the interior components identified by hidden lines. The wing pivot boss 1564 can be seen at a position displaced below the hub pivot boss 1544, and the wing walls 1533, 1563 and other interior components can be seen partially sticking out below the hubs 1520, 1540.

FIG. 253 is a close-up front view of the central region of the collapsing hanger 1510 in the collapsed configuration, with the interior components identified by hidden lines. The wing pivot boss 1564 can be seen at a position close to the hub pivot boss 1544, and the wing walls 1533, 1563 and other interior components can be seen enveloped within the interior cavity areas 1521, 1541.

To initiate the expanding sequence, fingers can be returned to the handle surfaces 1526, 1546 and squeezing forces applied in the directions denoted by the arrows T and U in FIG. 253. As these forces continue to be applied the wings 1530, 1560, and hubs 1520, 1540 will move in reverse of the directions traveled in the collapsing sequence until reaching a configuration which will look identical to the exterior view seen in FIG. 249. In this un-latching configuration, the latch member 1580, torsion spring 1590, and other operative interior components are positioned in a manner similar to those seen in the embodiment of FIG. 215. To complete the expanding sequence, the forces previously applied at arrows T and U are released, allowing the torsion spring 1590 to urge the wing pivot boss 1564 down until locking back in the latched position, at which point the hanger 1510 will have returned to the expanded condition as seen in FIG. 248.

FIG. 254 is an upper perspective view of the free (distal) end of an example wing 1630 with no attachments in place, according to a twentieth embodiment. On top of the wing 1630 is a garment support surface 1631, beneath which is a support structure 1632. The most outboard portion forms a narrowed blade section 1633, and near the tip is formed a pivot boss 1635.

FIG. 255 is an upper perspective view of the distal end of the example wing 1630 with a shoulder support 1670 affixed in the retracted position, thus presenting the support surface 1671 on its upper side. The pivot hole 1675 can be seen fit over the pivot boss 1635, and a portion of the blade slot 1673 can be seen near the outermost tip of the shoulder support 1670.

FIG. 256 is an upper perspective view of the distal end of the example wing 1630 with a shoulder support 1670 rotated into an intermediate position. The curved arrows CC show the possible rotational degrees of freedom for the shoulder support 1670 to move to either the retracted or extended position. FIG. 257 is an upper perspective view of the distal end of the example wing 1630 with a shoulder support 1670 affixed in the extended position, thus presenting the support surface 1674 on its upper side. The blade slot 1673 can be seen extending to the full length of the shoulder support 1670.

FIG. 258 is a retracted upper-side perspective view of the shoulder support 1670. The pivot hole 1675 extends completely through the width of the shoulder support 1670. FIG. 259 is an extended upper-side perspective view of the shoulder support 1670. The blade slot 1673 can be seen bisecting the support surface 1674.

This example wing 1630 and shoulder support 1670 mechanism could be applicable to many of the collapsing hanger assemblies of the previous embodiments, for instance to replace the adjustable shoulder support mechanisms of collapsing hangers 1310 and 1410. It is further conceivable that any of the adjustable shoulder supports presented, 1360, 1470, or 1670, could be adapted to work on conventional non-collapsing clothing hangers.

In accordance with the provisions of the patent statutes and jurisprudence, exemplary configurations described above are considered to represent preferred embodiments of the invention. However, it should be noted that the invention can be practiced otherwise than as specifically illustrated and described without departing from its spirit or scope. For example, in any embodiment, the hook could be integrally formed as part of the frame or one of the wings. The hook could also be formed in an alternate shape, such as a "T," or other functional shape which allows for the suspended support of the hanger and garments thereon. The term "hook" includes the anti-theft closed loops and the nail-head-type ends.

What is claimed is:

1. A latch mechanism comprising:

a first body movable in a first direction relative to a second body;

a latch member secured to the first body and rotatable relative to the first body about a latch axis which is transverse to the first direction, the latch member configured to rotate only in a second direction relative to the first body when latching the latch mechanism and when unlatching the latch mechanism, wherein the latch member is configured to selectively allow or restrict the movement of a plunger attached to the second body based upon a relative rotational position of the latch member relative to the first body, thereby selectively permitting or preventing relative movement of the first body in the first direction relative to the second body.

2. The latch mechanism of claim 1 where the latch member further includes a plurality of catch features, said catch features selectively engaging or disengaging the plunger dependent on the rotational position of the latch member.

3. The latch mechanism of claim 1 further including a resilient member configured to act upon a profile of the latch member to index the latch member to discrete engaged or disengaged rotational positions relative to the plunger.

4. The latch mechanism of claim 1 wherein the latch member is rotatable in the second direction through a plurality of discrete engaged positions and a plurality of discrete disengaged positions.

5. The latch mechanism of claim 4 further including a resilient member configured to act upon a profile of the latch member to index the latch member to each of the plurality of discrete engaged positions and to each of the plurality of discrete disengaged positions.

6. The latch mechanism of claim 5 where the first body is pivotably connected to the second body about a body axis and wherein the first direction is a first rotational direction.

7. The latch mechanism of claim 6 where the body axis is offset from the latch axis.

8. The latch mechanism of claim 7 where at least one of the first body or the second body includes a garment supporting feature which will selectively support or not support a garment based upon whether the latch mechanism is engaged or disengaged, respectively.

9. The latch mechanism of claim 1 where the at least one of the first body or the second body comprises a support surface upon which an object can be supported.

10. The latch mechanism of claim 9 where the at least one support surface is shaped so as to support a shirt, blouse, or other garment.

11. A garment hanger comprising:

a central portion;

a first wing including a first garment-supporting upper surface, the first wing extending away from the central portion in a first direction;

a second wing extending away from the central portion in a second direction opposite the first direction, the second wing including a second garment-supporting upper surface; and a first lengthening member including a first end and a second end and an extended garment-supporting upper surface between the first end and the second end, the first lengthening member pivotably mounted to the first wing and pivotable relative to the first wing between a retracted position in which the first end is on top of the first wing and the first end is closer than the second end to the central portion and an extended position in which the second end is on top of the first wing and the second end is closer than the first end to the central portion, wherein the extended garment-supporting upper surface faces upward in both the retracted position and in the extended position.

12. The garment hanger of claim 11 where the lengthening member is elongated and pivotably mounted to the first end about a first axis, wherein the first end of the first lengthening member is closer to the first axis than the second end is to the first axis.

13. The garment hanger of claim 12 where the first axis is transverse to the first direction.

14. The garment hanger of claim 12 further including a first post projecting upward from the upper surface of the first wing, wherein the first lengthening member is pivotably secured to the first post.

15. The garment hanger of claim 13 where first wing and the second wing are repositionable relative to one another between an extended or folded condition.

16. A collapsing garment hanger comprising:

a pair of hubs pivotably attached to one another so as to allow movement between an upper position and a lower position, each of the pair of rotating hubs including a handle feature formed thereon;

a latch movable relative to both of the pair of rotating hubs between a latched position and an unlatched position, such that the hubs are retained in the upper position when the latch is in the latched position, and such that the hubs can be pivoted to the lower position when the latch is in the unlatched position;

a pair of folding wings pivotably secured to one another, each of the folding wings being pivotably secured to one of the pair of hubs, such that the wings are movable between an extended position and a folded position, wherein the wings are able to support a garment when the hubs are in the upper position, and wherein that the wings can be pivoted to the folded position when the hubs are in the lower position; and wherein the handle features allow for the manipulation of said hanger from the extended position to the folded position and from the folded position to the extended position with the use of only one hand, wherein the latch is configured to be sequentially latched and unlatched by subsequent identical movements of the pair of hubs relative to one another.

17. The garment hanger of claim 16 wherein the subsequent identical movements of the pair of hubs relative to one another are subsequent identical rotational movements of the pair of hubs relative to one another.

18. The garment hanger of claim 16 wherein the latching mechanism includes a rotating latch member movable relative to the pair of rotating hubs between a latched position and an unlatched position, wherein in the latched position relative rotation of the pair of hubs is prevented, wherein in the unlatched position relative rotation of the pair of hubs is permitted, wherein the latch member is configured to move alternately between the latched position and the unlatched position by sequentially squeezing handle surfaces of the pair of rotating hubs toward one another.

19. The garment hanger of claim 16 further including a hook for suspending the hanger, and any garments supported thereon, from a bar or other rigid anchor.

20. The garment hanger of claim 11 wherein the first end of the first lengthening member projects a first distance outward of the first wing in the extended position, the second end of the first lengthening member projecting a second distance outward of the first wing in the retracted position, wherein the first distance is greater than the second distance.

* * * * *